(12) United States Patent
Mills

(10) Patent No.: US 7,773,656 B1
(45) Date of Patent: Aug. 10, 2010

(54) MOLECULAR HYDROGEN LASER

(75) Inventor: Randell L. Mills, Cranbury, NJ (US)

(73) Assignee: Blacklight Power, Inc., Cranbury, NJ (US)

( * ) Notice: Subject to any disclaimer, the term of this patent is extended or adjusted under 35 U.S.C. 154(b) by 370 days.

(21) Appl. No.: 10/575,345

(22) PCT Filed: Oct. 22, 2004

(86) PCT No.: PCT/US2004/035143

§ 371 (c)(1),
(2), (4) Date: Mar. 26, 2007

(87) PCT Pub. No.: WO2005/041368

PCT Pub. Date: May 6, 2005

(51) Int. Cl.
*H01S 3/22* (2006.01)

(52) U.S. Cl. .......................... 372/55; 372/57

(58) Field of Classification Search ................... 372/55, 372/57
See application file for complete search history.

(56) References Cited

U.S. PATENT DOCUMENTS

| | | | |
|---|---|---|---|
| 1,001,589 A | 8/1911 | Hatfield |
| 2,708,656 A | 5/1955 | Fermi |
| 3,253,884 A | 5/1966 | Jung et al. |
| 3,297,484 A | 1/1967 | Niedrach |
| 3,300,345 A | 1/1967 | Lyons |
| 3,359,422 A | 12/1967 | Pollock |
| 3,377,265 A | 4/1968 | Caeser |
| 3,448,035 A | 6/1969 | Serfass |
| 3,462,622 A | 8/1969 | Cann et al. |
| 3,669,745 A | 6/1972 | Beccu |
| 3,701,632 A | 10/1972 | Lovelock |
| 3,755,128 A | 8/1973 | Herwig |
| 3,789,319 A * | 1/1974 | Rhodes ........................ 372/74 |
| 3,816,192 A | 6/1974 | Brower |
| 3,835,019 A | 9/1974 | Lovelock |
| 3,917,520 A | 11/1975 | Katz |
| 4,000,036 A | 12/1976 | Ensley |

(Continued)

FOREIGN PATENT DOCUMENTS

EP    0 392 325 A3    10/1990

(Continued)

OTHER PUBLICATIONS

Abdallah, et. al. "The Behavior of Nitrogen Excited in an Inductively Coupled Argon Plasma." *J. Appl. Phys.*, vol. 88, No. 1, Jul. 2000, pp. 20-33.

(Continued)

*Primary Examiner*—Dung T Nguyen
(74) *Attorney, Agent, or Firm*—Finnegan, Henderson, Farabow, Garrett & Dunner, L.L.P.

(57) ABSTRACT

There is disclosed a laser comprising a laser medium comprising $H_2(1/p)$ where p is an integer and $1 \leq p \leq 137$, a cavity comprising the laser medium, and a power source to form an inverted population in the energy level of $H_2(1/p)$. The power source may form excited vibration-rotational levels of $H_2(1/p)$ wherein lasing occurs with a stimulated transition from at least one vibration-rotational level to at least another lower-energy-level other than one with a significant Boltzmann population at the cell neutral-gas temperature, wherein the vibration-rotational levels of $H_2(1/p)$ comprise the inverted population.

47 Claims, 10 Drawing Sheets

U.S. PATENT DOCUMENTS

| | | | |
|---|---|---|---|
| 4,095,118 A | 6/1978 | Rathbun |
| 4,149,931 A | 4/1979 | Christensen |
| 4,155,712 A | 5/1979 | Taschek |
| 4,202,004 A | 5/1980 | Anderson |
| 4,265,720 A | 5/1981 | Winstel |
| 4,274,938 A | 6/1981 | Schulten |
| 4,327,071 A | 4/1982 | Chiu |
| 4,337,126 A | 6/1982 | Gilligan, III et al. |
| 4,353,871 A | 10/1982 | Bartlit et al. |
| 4,464,990 A | 8/1984 | Bendler |
| 4,487,670 A | 12/1984 | Bellanger |
| 4,488,490 A | 12/1984 | Betts |
| 4,512,966 A | 4/1985 | Nelson |
| 4,568,568 A | 2/1986 | Asano |
| 4,664,904 A | 5/1987 | Wolfrum |
| 4,694,755 A | 9/1987 | Ibarra |
| 4,702,894 A | 10/1987 | Cornish |
| 4,737,249 A | 4/1988 | Shepard, Jr. |
| 4,774,065 A | 9/1988 | Penzhorn |
| 4,792,725 A | 12/1988 | Levy et al. |
| 4,808,286 A | 2/1989 | Angelo, II |
| 4,905,118 A | 2/1990 | Rathbun |
| 4,923,770 A | 5/1990 | Grasselli |
| 4,957,727 A | 9/1990 | Bogdanovic |
| 4,968,395 A | 11/1990 | Pavelle |
| 4,986,887 A | 1/1991 | Gupta |
| 5,215,729 A | 6/1993 | Buxbaum |
| 5,273,635 A | 12/1993 | Gernert |
| 5,318,675 A | 6/1994 | Patterson |
| 5,372,688 A | 12/1994 | Patterson |
| 5,449,434 A | 9/1995 | Hooke et al. |
| 5,577,090 A | 11/1996 | Moses |
| 5,593,640 A | 1/1997 | Long et al. |
| 5,669,975 A | 9/1997 | Ashtiani |
| 5,761,481 A | 6/1998 | Kadoch et al. |
| 5,789,744 A | 8/1998 | Spence et al. |
| 5,801,971 A | 9/1998 | Ohta |
| 5,819,073 A | 10/1998 | Nakamura |
| 5,838,760 A | 11/1998 | Moses |
| 5,864,322 A | 1/1999 | Pollon et al. |
| 5,883,005 A | 3/1999 | Minton et al. |
| 5,888,414 A | 3/1999 | Collins et al. |
| 5,969,470 A | 10/1999 | Druz et al. |
| 6,024,935 A | 2/2000 | Mills et al. |
| 6,064,154 A | 5/2000 | Crouch et al. |
| 6,149,829 A | 11/2000 | Takamatsu et al. |
| 6,150,755 A | 11/2000 | Druz et al. |
| 6,151,532 A | 11/2000 | Barone et al. |
| 6,444,137 B1 | 9/2002 | Collins et al. |
| 6,551,939 B2 | 4/2003 | Takamatsu et al. |
| 6,579,465 B1 | 6/2003 | Takamatsu et al. |
| 6,690,705 B2 | 2/2004 | Maksimov et al. |
| 7,188,033 B2 | 3/2007 | Mills |
| 2001/0007725 A1 | 7/2001 | Faris et al. |
| 2001/0008803 A1 | 7/2001 | Takamatsu et al. |
| 2002/0133326 A1 | 9/2002 | Chung et al. |
| 2003/0129117 A1* | 7/2003 | Mills ........................ 423/347 |

FOREIGN PATENT DOCUMENTS

| | | | |
|---|---|---|---|
| EP | 0 395 066 A2 | 10/1990 |
| GB | 2 343 291 | 5/2000 |
| JP | 53-134792 | 11/1978 |
| JP | 56-136644 | 3/1980 |
| JP | 2002008892 A | 1/2002 |
| WO | WO 90/10935 A1 | 9/1990 |
| WO | WO 90/13126 A1 | 11/1990 |
| WO | WO 90/14668 A2 | 11/1990 |
| WO | WO 91/01036 A1 | 1/1991 |
| WO | WO 91/08573 A1 | 6/1991 |
| WO | WO 92/10838 A1 | 6/1992 |
| WO | WO 93/17437 A1 | 9/1993 |
| WO | WO 94/10688 A1 | 5/1994 |
| WO | WO 94/14163 A1 | 6/1994 |
| WO | WO 94/15342 A1 | 7/1994 |
| WO | WO 94/29873 A2 | 7/1994 |
| WO | WO 95/20816 A1 | 8/1995 |
| WO | WO 96/42085 A2 | 12/1996 |
| WO | WO 99/05735 A1 | 3/1999 |
| WO | WO 99/26078 A1 | 5/1999 |
| WO | WO 99/34322 A1 | 7/1999 |
| WO | WO 99/35698 A3 | 7/1999 |
| WO | WO 00/07931 A1 | 2/2000 |
| WO | WO 00/07932 A2 | 2/2000 |
| WO | WO 00/25320 A1 | 5/2000 |
| WO | WO 01/18948 A1 | 3/2001 |
| WO | WO 01/21300 A2 | 3/2001 |
| WO | WO 01/22472 A2 | 3/2001 |
| WO | WO 01/70627 A3 | 8/2001 |
| WO | WO 01/95944 A2 | 12/2001 |
| WO | WO 02/08787 A2 | 1/2002 |
| WO | WO 02/16956 A1 | 2/2002 |
| WO | WO 02/087291 A2 | 10/2002 |
| WO | WO 02/088020 A2 | 11/2002 |
| WO | WO 03/066516 A2 | 8/2003 |
| WO | WO 03/093173 A2 | 11/2003 |
| WO | WO 2004/092058 A2 | 10/2004 |
| WO | WO 2005/067678 A2 | 7/2005 |
| WO | WO 2005/041368 A2 | 10/2005 |
| WO | WO 2005/116630 A1 | 12/2005 |
| WO | WO 2007/051078 A1 | 5/2007 |
| WO | WO 2007/053486 A1 | 5/2007 |

OTHER PUBLICATIONS

Abelès, Ed. Chapter 9, "Structure of Trapped Electron and Trapped Hole Centers in Alkali Halides 'Color Centers'." *Optical Properties of Solids*, 1972, pp. 718-754.

Abramova, et. al."Tornado-type closed magnetic trap for an electron cyclotron resonance ion source." *Review of Scientific Instruments*, vol. 71, No. 2, Feb. 2000, pp. 921-923.

Albagli, et. al. "Measurement and Analysis of Neutron and Gamma-Ray Emission Rates, Other Fusion Products, and Power in Electrochemical Cells Having Pd Cathodes." *Journal of Fusion Energy*, vol. 9, No. 2, Jun. 1990, pp. 133-148.

Alber, et. al."Search for Neutrons from Cold Nuclear Fusion." *Z. Phys. A.—Atomic Nuclei*, vol. 333, 1989, pp. 319-320.

Alessandrello, et. al. "Search for Cold Fusion Induced by Electrolysis in Palladium." *Il Nuovo Cimento*, vol. 103A, No. 11, Nov. 1990, pp. 1617-1638.

Alger et al. "F Centers in Pure and Hydride-Containing Alkali Halide crystals." *Physical Review*, vol. 97, Jan. 15, 1955, pp. 277-287.

Arfken. "Mathematical Methods for Physicists." $2^{nd}$ Ed. *Academic Press*, New York 1970, pp. 413-415.

S. Aaronson, "Hydrino Theory: Which Overturns Quantum Theory, Is in Turn Overturned by Doofusino Theory," <http://www.scottaaronson.com/writings/doofusino.html>.

Associated Press. "Panel Opposes Cold Fusion Efforts." *The Washington Post*, Jul. 13, 1989, p. A14.

Associated Press. "Pennsylvania Company . . . Cold Fusion Mystery." *Lexis Nexis* Reprint, 1991.

Associated Press. "Physicist: Utah Cold-Fusion Gear Doesn't Work." *The Washington Post*, Mar. 29, 1990, p. A3.

"Atomic Spectroscopy" (internet page) physics.nist.gov/Pubs/AtSpec/node20.html (author and date unknown).

Baard, Erik. "The Empire Strikes Back." *The Village Voice*, Apr. 26-May 2, 2000.

Baard, Erik. "Quantum Leap." *The Village Voice*, Dec. 22-28, 1999.

Baard, Erik. "Researcher Claims Power Tech That Defies Quantum Theory." *Dow Jones Newswires*, Oct. 6, 1999.

Baard, Erik, "Hydrino Theorist Gets Nod From NASA-Funded Investigation Eureka?", *The Village Voice*, Dec. 6, 2002.

Balke, et. al. "Limits on Neutron Emission From 'Cold Fusion' in Metal Hydrides.", *Physical Review C*, vol. 42, No. 1, Jul. 1990, pp. 30-37.
Barmann et. al. "Spatially and Temporally Resolved Studies of the Electron Density in Liquid Streamers by Emission Spectroscopy" (Internet page) atompc2.fysic.lth.se/AFDOCS/Progrep956/5al.htm (Atomic Physics Progress Report) (1995-1996).
Barth, "Bigger Than Fire?", Gale Group Magazine DB, The Gale Group, 2003, Skeptic, vol. 8, No. 4, (2001).
Barton, et al, "Investigating Radio Frequency Plasmas Used for the modification of Polymer Surfaces." *J. Phys. Chem. B*, vol. 103, 1999, pp. 4423-4430.
R. W. Bass, "Email from Bob Bass to Randell Mills," Aug. 6, 2000.
Bäuerle et al. "Infared Vinrational Absorption by U-Centers in NaI." *Phys. Stat. Sol.*, vol. 24, 1967, pp. 207-215.
Beiser, A. *Concepts of Modern Physics*, Fourth Edition, McGraw-Hill Book Company, New York, 1978, p. 407.
Benetskii, et. al. "An Attempt to Observe Cold Thermonuclear Fusion in a Condensed Medium." *Nuclear Research Institute*, AS USSR, May 1989, pp. 75-78.
Besenbacher, et. al. "Search for Cold Fusion in Plasma-Charged Pd-D and Ti-D Systems." *Journal of Fusion Energy*, vol. 9, No. 9, Sep. 1990, pp. 315-317.
Best, Ben. "The Copenhagen Interpretation of Quantum Mechanics." (internet page) www.benbest.com/science/quantum.html, (no date listed).
Bethe, et. al. "Quantum Mechanics of One and Two-Electron Atoms." *Cornell University*, Plenum Publishing Com., NY, 1977, pp. 2, 9-12, 47, 83-84, 92, 107.
"The Biggest Venture Capital Conference of the Year is Quickly Approaching," Special to Evening Bullitin Sep. 29, 2006, <http://www.theeveningbulletin.com/site/news.cfm?newsid=17263371&BRD=2737&PAG=461&dept_id=57636&rfi=6>.
Bishop. "It ain't over til it's over . . . Cold Fusion." *Popular Science* , Aug 1993, pp. 47-51.
Bishop. "More Labs Report Cold Fusion Results." *Wall Street Journal*, Oct 19, 1992.
Bjorken et al., "Relativistische Quantenmechanik", *Die Dirac-Gleichung*, pp. 22-25, 1964.
"Blacklight Power—do they have something significant?" (internet page) www.phact.org/e/blp.htm (author and date unknown).
BlackLight Power, "Executive Summary," Jan. 11, 1999, pp. 1-6.
Backlight Power, Inc., "Second Shareholder Newsletter '97" <http://web.archive.org/web/19980212141859/blacklightpower.com/sharenews2.html>.
Blochinzew, *Grundlagen Der Quantenmechanik*, Veb Deutscher Verlag Der Wissenschaften, 1967.
Blue. "Cold Fusion Lies 6." *Deja News on the Internet*, Apr. 13, 1997, pp. 1-2, available at http://x7.dejanew/us.com.
Blue. "Randell Mills' Sells Pot Shards." *Deja News on the Internet*, Apr. 30, 1997, pp. 1-2, available at http://x7.dejanew/us.com.
Bogaerts, et al. "Effects of adding hydrogen to an argon glow discharge: overview of relevant processes and some qualitative explanations." *Journal of Analytical Atomic Spectrometry*, Mar. 2000.
Boniface, et. al. "Calorimetry for a Ni/$K_2CO_3$ Cell." A Research, Jun. 1994.
Bosch, et. al. "Electrochemical Cold Fusion Trials at IPP Garching." *Journal of Fusion Energy*, vol. 9, No. 2, Jun. 1990, pp. 165-186.
*Boston Globe.*, "Successful nuclear fusion experiment by the Italians." Wednesday, Apr. 19, 1989.
Braaten. "Ridiculously Easy Test Yields Claim of Energy Triumph." *The Washington Times*, Mar. 24, 1989, p. A5.
Bradford. "A Calorimetric Investigation of the Reaction of Hydrogen with Sample PSU #1." A Confidential Report submitted to Hydrocatalysis Power Corporation, Sep. 1994.
Briars. "Critique of New Energy, New Physics." *7 segments, Deja News on the Internet*, Mar. 9, 1989, pp. 1-9, available at http://x7.dejanew/us.com.
Brewer, Shelby T. Book review of "The grand Unified Theory of Classical Quantum Mechanics (Hardcover) by Randell L., Dr. Mills." (internet page) http://www.amazon.com/gp/product/product-description/0963517139/ref=dp_proddesc_0/103-5711659-8507030 (date unknown).

Broad. "2 Teams Put New Life in Cold Fusion Theory." *New York Times*, Apr. 26, 1991, p. A18.
Broad. "Cold-Fusion Claim is Faulted on Ethics as Well as Science." *The New York Times*, Mar. 17, 1991, pp. 1 and 30.
Brodowsky, "Solubility and diffusion of hydrogen an deuterium in Palladium and Palladium Alloys," Tech. Bulletin, England Indust., Vol. 7, No. 1-2 (1966), pp. 41-50.
Browne. "Fusion Claims is Greeted With Scorn by Physicists." *The New York Times*, May 3, 1989, pp. A1 and A22.
Browne. "Physicists Put Atom in 2 Places at Once." *The New York Times*.
Bush. "A Light Water Excess Heat Reaction Suggests That 'Cold Fusion' May Be 'Alkali-Hydrogen Fusion'." *Fusion Technology*, vol. 22, Sep. 1992, pp. 301-322.
Bush, et. al. "Helium Production During the Electrolysis . . . Experiments." *J. Electroanal Chem.*, vol. 304, 1991, pp. 271-278.
Bush, et. al. "Helium Production During the Electrolysis . . . Experiments." *Preliminary Note, Univ. Of Texas*, pp. 1-12.
Bush, et. al. "Power in a Jar: the Debate Heats Up." 88 Bus. Week, *Science & Technology*, Oct. 26, 1992.
Carolina, et al. "Effect of Dielectric Constant, Cavities in Series and Cavities in Parallel on the Product Distribution of the Oligomerization of Methane via Microwave Plasmas." *J. Phys. Chem.*, vol. 100, 1996, pp. 17866-17872.
Catlett, et. al. "Hydrogen transport in lithium hydride as a function of pressure." *The Journal of Chemical Physics*, vol. 58, No. 8, Apr. 1978, pp. 3432-3438 (Apr. 1978).
Chapline. "Cold Confusion." *UCRL-101583*, Jul. 1989, pp. 1-9.
Chemistry Course Listings in MIT OpenCourseWare. MIT 2005. http://ocw.mit.edu/Ocw/Web/Chemistry/index.htm.
"The Chemistry of Halogens," http://chemed.chem.purdue.edu/genchem/topicreview/bp/ch10/group7.html.
Chien, et. al. "On an Electrode . . . Tritium and Helium." *J. Electroanal Chem.*, 1992, pp. 189-212.
CiteSeer, "Citations: Observation of Extreme Ultraviolet Hydrogen Emission from Incandescently Heated Hydrogen Gas with Strontium that Produced an Anomalous Optically Measured Power Balance," Int. J. Hydrogen Energy 26 (4) 2001, p. 309-326 <http://citeseer.ist.psu.edu/comntext/1749692/449101>.
Clark, et. al. "Excess Energy Cell Final Report." Apr. 1995.
Close. "Too Hot to Handle-The Race for Cold Fusion." *Princeton University Press*, 1989.
Collins, "Selling the Free Lunch," *Scientific American*, (Nov. 2002).
Condon, et. al. "The Theory of Atomic Spectra." MacMillan Company: New York. 1935. pp. 44-78, 112-146.
Conrads, et. al. "Emission in the Deep Vacuum Ultraviolet from an Incandescently Driven Plasma in a Potassium Carbonate Cell", *Plasma Sources Science and Technology*, submitted.
Conversion Table cgs/Si-Units. www.plasmaphysics.org.uk/convers.htm.
Cooke. "ORNL/FTR-3341." Jul. 31, 1989, pp. 2-15.
Cribier, et. al. "Conventional Sources of Fast Neutrons in Cold Fusion Experiments." *Physics Letters B*, vol. 228, No. 1, Sep. 7, 1989, pp. 163-166.
Criddle. "The Roles of Solution . . . Excess Heating." *Electrochemical Science & Technology Centre*, Univ. of Ottawa.
Cvetanovic et. al. "Excessive Balmer line broadening in a plane cathode abnormal glow discharge in hydrogen." *Journal of Applied Physics 97*. Jan. 18, 2005.
Datz, et. al. "Molecular Association in Alkali Halide Vapors." Journal of Chemical Physics, vol. 34, No. 5, Feb. 1961, pp. 558-564.
Dagani. "Cold Fusion believer turns skeptic crusades for more rigorous research." *C&EN Washington*, Jun. 5, 1995, pp. 34-45.
Dagani "Cold Fusion-Utah Pressures Pons, Fleischmann." *C&EN*, Jan. 14, 1991, pp. 4-5.
Dagani. "Latest Cold Fusion Results Fail to Win Over Skeptics." *C&EN*, Jun. 14, 1993, pp. 38-40.
Dagani. "New Evidence Claimed for Nuclear Process in 'Cold Fusion'." *C&EN Washington*, Apr. 1991, pp. 31-33.
Delbecq et al. "Pragmatic Resonance Investigation of Irradiated KCl Crystals Containing U-Centers." *Phys. Rev.*, vol. 104, No. 1, 1956, pp. 599-604.

Dennis "Hidden Variables and Relativistic Tachyons" (internet page) www.objectivescience.com/articles/ed_tachy.htm (Date unknown).
Dery et. al. "Effect of Dielectric constant, Cavities in Series, and Cavities in Parallel on the Product Description of the Oligomerization of Methane via Microwave Plasmas." *Journal of Physical Chemistry 1996*, vol. 100. Jul. 8, 1996, pp. 17866-17872.
Directory: Blacklight Power, From PESWiki "A Top 100 Energy Technology," <http://peswiki.com/index.php/Directory:Blacklight_Power>.
Dötsch et al. "Localized Vibrations of $H$ and $D$ Ions in NaF and LiF." *Solid States Communications*, vol. 3, 1965, pp. 297-298.
Dufour, et. al. "Interaction of Palladium/Hydrogen and Palladium/Deuterium to Measure the Excess Energy Per Atom for Each Isotope." *Fusion Technology*, vol. 31, Mar. 1997, pp. 198-209.
Durr, et. al. "Origin of quantum-mechanical complementarity probed by a 'which-way' experiment in an atom interferometer." *Nature*, vol. 395, Sep. 3, 1998, pp. 33-37.
"Earth Tech's Campaign to Replicate one of BlackLight Power Excess Heat Results." Dec. 20, 1997 available at www.eden.com/~little/blp/prelim.html, pp. 1-41.
EarthTech Reports, http://www.earthtech.org/experiments/blp/prelim.html.
EarthTech Reports, http://www.earthtech.org/experiments/mills/mills1.html "Attempt to Observe Excess Heat in a Ni-H²O-K²CO³ Electrolysis System-9OCT97".
Evans, et. al. "Time-of-Flight Secondary Ion Mass Spectroscopy (TOF-SIMS) Surface Analysis Report." CE & A No. 40150, Mar. 1994, available at http://www.cea.com/inst.htm#esca2.
Evans Analytical Group, http://www.cca.com/tech.htm#escal1.
Evans, et. al. "XPS/ESCA Results." CE & A No. 44545, Nov.1994.
Evans Analytical Group. Product Descriptions: Time-of-Flight Secondary Mass Spectrometry (TOF-SIMS) and X-Ray Photoelectron Spectroscopy (XPS) Electron Spectroscopy for Chemical Anaylsis (ESCA). (no date or author listed).
Dr. Ess, "History and Philosophy of Science," www.drury.edu/ess/philsci/bell.html.
E-mail to Examiner Wayner from Jeffrey A. Simenauer, dated.
Ewing, et. al. "A sensitive multi-detector neutron counter used to monitor cold fusion experiments in an underground laboratory; negative results and positive artifacts." *IEE Transactions on Nuclear Science*, vol. 37, No. 3, Jun. 1990, pp. 1165-1170.
"Experimental Verification by Idaho National Engineering Laboratory." pp. 13-25.
Faller, et. al. "Investigation of Cold Fusion in Heavy Water." *J. Radioanal. Nucl. Chem. Letter*, vol. 137, No. 1, Aug. 21, 1989, pp. 9-16.
Fan et al., "X-ray photoelectron spectroscopy studies of CVD diamond films", *Surface and Interface Analysis*, 34:703-707, 2002.
Feynman, et al. "The Feynman Lectures of Physics vol. III: Quantum Mechanics." Adison-Wesley Publishing Co., 1965 pp. 1-9, 206, 19-1 through 19-18.
Fine, Arthur. "The Shaky Game: Einstein Realism and the Quantum Theory." $2^{nd}$ Ed. *The University of Chicago Press*, 1986, pp. 64-85.
Fischer. "Die optische Absorption der $U_2$-Zentren in Alkalihalogenidkristallen", *Zeitschrift für Physik*, vol. 131, 1952, pp. 488-504.
Fischer et al. "Sh⁻, S⁻ Und S⁻Zentren in KC1-Kristallen." *Physics Letters*, vol. 13, Oct. 27, 1964, pp. 113-114.
Fischer. "Die optische Absorption der $U_2$-Zentren in Alkalihalogeniden des BaCl-Typs," *Zeitschrift für Physik*, vol. 204, 1967, pp. 351-374.
Fitzpatrick, "The Linear Stark Effect," University of Texas Leture, http://farside.ph.utexas.edu/teaching/qm/pertubation/node8.html.
J. Flemming, et. al. "Calorimetric Studies of Electrochemical Incorporation of Hydrogen Isotopes into Palladium," J. of Fusion Energy, vol. 9, No. 4 (Dec. 1990), pp. 517-524.
Fozza, et. al. "Vacuum ultraviolet to visible emission from hydrogen plasma: Effect of excitation frequency." *Journal of Applied Physics*, vol. 88, no. 1, Jul. 2000, pp. 20-33.
Fried et al. "Solution for the Two-Electron Correlation Function in a Plasma." *The Physical Review*, vol. 122, Apr. 1, 1961, pp. 1-8.
Fritz. " Anionlücken und Zwischengitterionen in Alkalihalogenid-Alkalihydrid-Mischkristallen." *J. Phys. Chem. Solids*, vol. 23, 1962, pp. 375-394.
Fritz, "Infrared Absorption and Anharmonicity of the U-Centre Local Mode," Phys. Stat. Sol., vol. 11, (1965) pp. 231-239.
M. Fowler, "The Lorentz Transformation," UVa Physics 252, <http://galileo.phys.virginia.edu/classes/252/lorentztrans.html>.
Fuchs and Peres. "Quantum Theory Needs No 'Interpretation'." *Physics Today*, Mar. 2000, p. 70.
Fujimoto, et. al."Ratio of Balmer line intensities resulting from dissociative excitation of molecular hydrogen in an ionizing plasma." *J. Appl. Phys.*, vol. 66, No. 6, Sep. 1989, pp. 2315-2319.
Fusion Digest, "Cold Nuclear Fusion Bibliography," 1993.
Fusion Digest, "Heat? Neutrons? Charged Particles?," 1993.
Gernert, et. al. "Anomalous Heat From Atomic Hydrogen in Contact with Potassium Carbonate." Thermacore, Inc.
Gottfried, "Quantum electrodynamics: Matter all in the mind", (internet page) www.nature.com/cgi-taf/DynaPage.t...e/journal/v419/n6903/full/419117a_r.html, 2002.
Gulyaev "Gigantic Atoms in Space" (internet page) www.astronomy.org.nz/events/month...reviews/2001/giganic_atoms_in_space.htm (date unknown).
Hadfield. "Lukewarm reception for Japanese cold fusion." *New Scientist*, Oct. 31, 1992, p. 10.
Hajdas, et. al. "Search for Cold-Fusion Events." *Solid State Communications*, vol. 72, No. 4, 1989, pp. 309-313.
Hansen, et. al. "A response to hydrogen +oxygen recombination and related heat generation in undivided electrolysis cells." *J. of Electroanalytical Chemistry*, vol. 447, 1998, pp. 225-226. (Paper III).
Hansen, et. al. "Faradaic efficiencies less than 100% during electrolysis of water can account for excess heat in 'cold fusion' cells," J. of Physical Chem., vol. 99, No. 18 (1997) pp. 6973-6979 (Paper I).
Hansen, et. al. "An assessment of claims to 'excess heat' in 'cold fusion' calorimetry," Thermochimica Acta, vol. 297 (1998) pp. 7-15 (Paper II).
Hardy, et. al. "The Volatility of Nitrates and Nitrites of the Alkali Metals." *Journal of the Chemical Society*, 1963, pp. 5130-5134.
The Harvard Crimson News: Academics Question the Science Behind Blacklight Power, Inc. <http://www.the crimson.com/printerfriendly.aspx?ref=100939>.
Haus. "On the radiation from point charges." *American Journal of Physics*, vol. 54, No. 12, Dec. 1986. pp. 1126-1129.
Hayashi, Shigenobu. "Accurate determination of $^1$H Knight shifts in $Mg_2NiH_x$ and $MgH_x$ by means of high-speed magic angle spinning." *Journal of Alloys and Compounds*, vol. 248, 1997, pp. 66-69. (Paper A).
Hayashi, et. al. "$^1$H NMR and magnetization measurements of a nanostructured composite material of the $Mg_2Ni$-H system synthesized by reactive mechanical grinding." *Journal of Alloys and Compounds*, vol. 256, 1997, pp. 159-165. (Paper B).
Hayashi, et. al. "Local structures and hydrogen dynamics in amorphous and nanostructured MgNi-H systems as studied by $^1$H and $^2$H nuclear magnetic resonance," J. of Alloys and Compounds, vol. 261, (1997), pp. 145-149 (Paper C).
He-II in Solar Spectrum.
Heisenberg, W. "Über den anschaulichen Inhalt der quantentheoretischen Kinematik und Mechanik." *Zeitschrift für Physik*, vol. 43, 1927, pp. 172-198.
Heitler, W. "The Quantum Theory of Radiation." $3^{rd}$ Ed., *University of Zürich*, Dover Publications Inc., NY, 1984, pp. 104.
Henderson, et. at. "More Searches for Cold Fusion." *Journal of Fusion Energy*, vol. 9, No. 4, Dec. 1990, pp. 475-477.
Hilsch. "Eine neue Lichtabsorption in Alkalihalogenidkristalle." *Fachgruppe II*, pp. 322-328.
Hilsch. "Über die Diffusion und Reaktion von Wassestoff in KBr-Kristallen." *Annalen der Physik*, vol. 40, 1937, pp. 407-720.
Hilts. "Significant Errors Reported in Utah Fusion Experts." *The Washington Post*, May 2, 1989, pp. A1 and A7.
Hines, "Scientific Mistakes: N-rays and Polywater", *Pseudoscience and the Paranormal*, Prometheus Books, 1988, pp. 8-13.
Hodoroaba, et. al."Investigations of the effect of hydrogen in an argon glow discharge." *J. of Analytical Atomic Spectrometry*, www.rsc.org/ej/ia/2000/B0023671/ (1 of 14), Aug. 4, 2000.

Hollander, et. al. "Vacuum ultraviolet emission from microwave plasmas of hydrogen and its mixtures with helium and oxygen." *J. Vac. Sci. Technol.*, A12 (3), May/Jun. 1994, pp. 879-882.
Horanyi. "Some Basic Electrochemistry and the Cold Nuclear Fusion of Deuterium." *J. Radioanal. Nucl. Chem. Letters*, vol. 137, No. 1, Aug. 21, 1989, pp. 23-28.
http://omm.hut.fi/optics/l_o/2004/luennot/spectroscopy.pdf.
http:/hyperphisics.phy-ast.gsu.edu/hbase/kinetic/molke.htm.
Huizenga. "Abstract from 'New developments in the cold fusion saga'." *Abstracts of papers of the American Chemical Society*, vol. 207, Mar. 13, 1994, p. 6.
Huizenga. "Cold Fusion." *C & EN*, vol. 70, Jul. 20, 1992, p. 3.
Huizenga. "Cold Fusion Labeled Fiasco of the Century." *Forum for Applied Research and Public Policy*, vol. 7, No. 4, pp. 78-83.
Huizenga. "Cold Fusion-The Scientific Fiasco of the Century." *Oxford University Press*, 1993.
"Hydrino Theory," <http://en.wikipedia.org/wiki/hydrino_theory>.
"The Hydrogen Atom," <http://www.physics.nmt.edu/~raymond/classes/ph13xbook/node208.html>.
Hydrogen News 1999 <http://www.ch2bc.org/bulletin/bulletin19991112.htm>.
INRS-Energie at Materiaux XPS facility, http://goliath.inrs-ener.uquebec.ca/tour/.
The Internet Encyclopedia of Philosophy, "Logical Positivism," http://iep.utm.edu/logpos.htm.
Jackson, John David. "Classical Electrodynamics." 2nd Ed., *University of California*, Berkley, John Wiley and Sons, 1975, Ch. 14.
Jacox, et. al. "INEL XPS Report." Idaho National Engineering Laboratory, EG &G Idaho, Inc., Nov 1993.
Jansson. "Hydrocatalysis:: A New Energy Paradigm for the $21^{st}$ Century." A Thesis, Master of Science in Engineering Degree in the Graduate Division of Rowan University, May 1997.
Jeffreys, et al. "Methods of Mathematical Physics." *Cambridge*, England, 1950, pp. 618.
Johansson, et. al. "A Model for the origin of the anomalous and very bright UV lines of FE II in gaseous condensations of the star η Carinae" *Astronomy & Astrophysics*. vol. 378 (2001) pp. 266-278.
Jones. "Current Issues in Cold Fusion . . . Particles." *Surface and Coatings Technology*, vol. 51, 1992, pp. 283-289.
Jones, et. al. "Examination of Claims of Miles . . . Experiments." *J. Phys. Chem.*, 1995, pp. 6966-6972.
Jones, et. al. "Faradaic Efficiencies . . . Cells." *J. Phys. Chem.*, 1995, pp. 6973-6979.
Jones, et. al. "Serious Flaws in Patterson (SOFE '95)Demo on Cold Fusion." available at http//x7.dejanews.com, Oct. 1995.
Joyce, et. al. " Ion Distribution functions in an Ar-CI ECR Discharge." *Plasma Sources Sci. Technol.*, vol. 9, 2000, pp. 429-436.
Judge, "SHE-2 Latest Solar EUV Measurements"(internet page) www.usc.edu/dept/space_science/seh2data.htm, Aug. 18, 1997.
Ivanco, et. al. "Calorimetry for a $Ni/K_2CO_3$ Cell." *AECL Research*, Jun. 1994.
Kahn. "Confusion in a Jar," *Nova*, 1991.
Karabut, et. al. "Nuclear Product . . . Deuterium." *Physics Letters A170*, 1992, pp. 265-272.
Karplus and Porter. *Atoms and Molecules: An Introduction for Students of Physical Chemistry*, The Benjamin/Cummings Publishing Company, Menlo Park, California, 1970, p. 3, 118-123.
Karplus and Porter. *Atoms and Molecules: An Introduction for Students of Physical Chemistry*, The Benjamin/Cummings Publishing Company, Menlo Park, California, 1970, p. 567.
Kawai, et. al. "Electron temperature, density, and metastable-atom density of argon electroncyclotron-resonance plasma discharged by 7.0, 8.0, and 9.4 Ghz microwaves." *J. Vac. Sci. Technol. A*, vol. 18, No. 5, Sep./Oct. 2000, pp. 2207-2212.
Keefer, Ph.D., "Interim Report on BlackLight Power Technology: Its Apparent Scientific Basis, State of Development and Suitability for Commercialization by Liebert Corporation.".
Kerkhoff. "Zum photochemischen Verhalten sauerstoffhaltiger Komplexe in Alkalihalogenidkristalle." *Zeitschrift für Physik*, vol. 158, 1960, pp. 595-606.
Kerkhoff et al. "Elektronenspin-Resonanz und Photochemie des $U_2$-Zentrums in AlkalihalogenidKristallen." *Zeitschrift für Physik*, vol. 173, 1963, pp. 184-202.

Klein. "Attachments to Report of Cold Fusion Testing." *Cold Fusion*, No. 9, pp. 16-19.
Kleinschrod. "Photochemische Zersetzung von KH und KD in KBr-Kristallen." *Ausgegeban*, Jan. 5, 1939, pp. 143-148.
Kleppner, et. al. "One Hundred Years of Quantum Physics." *SCIENCE*, vol. 289, Aug. 2000, pp. 893-898.
Kline-Anderson, Inc. "Review of Schedule and Resource Requirements to Develop a Hydrocatalysis Functional Prototype Unit." Final Report for Technology Insights, Oct. 1996.
Kolos, et. al. "Accurate Adiabatic Treatment of the Ground State of the Hydrogen Molecule*." *Journal of Chemical Physics*, vol. 41, No. 12, Dec. 1964, pp. 3663-3673 (Paper I).
Kolos, et. al. "Accurate Electronic Wave Functions for the $H_2$ Molecule*." *Reviews of Modern Physics*, vol. 32, No. 2, Apr. 1960, pp. 219-232.
Kolos, et. al. "Improved Theoretical Ground-State Energy of the Hydrogen Molecule*." *Journal of Chemical Physics*, vol. 49, No. 1, Jul. 1968, pp. 404-410 (Paper II).
Kovacevic et. al. "The Dynamic Response of the Plasma on the Dust Formation in $Ar/C_2H_2$ RF Discharges." *International Conference on Phenomena in Ionized Gases* available at http://www.iopig.uni-greifswald.de/proceedings/data/kovacevic_1. (no. date listed).
Kreig "Hydrinos: A state below the ground state" (internet page) www.phact.org/e/x/hydrino.htm and http://ww.freeenergies.org/bl/bwt/z/hydrino/hydrino.htm (date unknown).
Kreysa, et. al. "A Critical Analysis of Electrochemical Nuclear Fusion Experiments." *J. Electroanal. Chem.*, vol. 266, 1989, pp. 437-450.
Kuhn, H.G. "Atomic Spectra." Academic Press: New York. 1962. pp. 114-117.
Kuraica, et. al."Line Shapes of Atomic Hydrogen in a Plane-Cathode abnormal glow discharge." *Physical Review A*, Bol. 46. No. 7, Oct. 1992, pp. 4429-4432.
Kurunczi, et. al."Excimer formation in high-pressure micro hollow cathode discharge plasmas in helium initiated by low-energy electron collisions." *International Journal of Mass Spectrometry*, vol. 205, 2001, pp. 277-283.
Kurunczi, et. al."Hydrogen Lyman-α and Lyman-β emissions from high-pressure micro hollow cathode discharges in Ne-H2 mixtures" *J. Phys. B: At. Mol. Opt. Phys.*, vol. 32, 1999, pp. L651-L658.
Kurtz, et. al. "Report on Calometric Investigations of Gas-Phase Catalyzed Hydrino Formation." Hydrocatalysis Power Corp. Report, Dec. 1996.
http://omm.hut.fi/optics/l_o/2004/luennot/spectroscopy.pdf.
http://hyperphysics.phy-astr.gsu.edu/hbase/kinetic/molke.html.
Labov. "Spectral Observations . . . Background." *The Astrophysical Journal*, vol. 371, Apr. 20, 1991, pp. 810-819.
F. Laloe, "Do we really understand quantum mechanics?" Am. J. Phys., vol. 69(6), (Jun. 2001), pp. 655-701.
Leggett, et. al. "Exact Upper Bound . . . 'Cold Fusion'." *Physical Review Letters*, vol. 63, No. 2, Jul. 1989, pp. 190-194.
"Lehigh X-Ray Photoelectron Spectroscopy Report." Dec. 8, 1993.
Lewis, et. al.,"Searches for Low-Temperature Nuclear Fusion of Deuterium in Palladium." *Nature*, vol. 340, Aug. 17, 1989, pp. 525-530.
Luggenholscher et al., "Investigations on Electric Field Distributions in a Microwave Discharge in Hyrdogen", available at http://www.phys.tue.nl/fltdd/luggenhoelscher.pdf (date unknown).
Lüpke. "Über Sensibilisierung der photochemischen Wirkung in Alkalihalogenidkristallen." *Annalen der Physik*, vol. 21, 1934, pp. 1-14.
Luque et. al. "Experimental research into the influence of ion dynamics when measuring the electron density from the Stark broadening of the Hα and Hβ lines." *Journal of Physics B: Atomic, Molecular, and Optical Physics*, vol. 36. 2003. pp. 1573-1584.
Lüty. "Über Die Natur Der $V_3$-Zentren in Strahlungsverfäbtem KCCI." *J. Phys. Chem. Solids*, vol 1962, pp. 677-681.
Maly, et. al. "Electron Transitions on Deep Dirac Levels I." *ANS Reprint, Fusion Technology*, vol. 24 Nov. 1993, pp. 307-318.
Marchese et. al. "The BlackLight Rocket Engine." Phase I Final Report, Rowan University: Glassboror, NJ. May 1-Nov. 30, 2002, available at www.niac.usra.edu/files/studies/finalreport. also available at http://engineerinq.rowan.edu/~marchese/.

Margenau, et. al. "The Mathematics of Physics and Chemistry." D. Van Nostrand *Yale University*, 1943, pp. 77-79.

Martienssen. "Photochemische Vorgänge in Alkalihalogenidkristallen." *Zeitschrift für Physik*, vol. 131, 1952, pp. 488-504.

"Material Hardness," http://www.calce.umd.edu/general/facilities/hardness_ad_.htm.

Mayo, et. al. "On the Potential of Direct and MHD Conversion of Power from a Novel Plasma Source to Electricity for Micro distributed Power Applications", *IEEE Transactions on Plasma Science*, submitted.

McNally. "On the Possibility of a Nuclear Mass-Energy Resonance in D + D Reactions at Low Energy." *Fusion Technology*, vol. 16, No. 2, Sep. 1989, pp. 237-239.

McQuarrie. "Quantum Chemistry" University Science Books: Sausalito, CA. 1983 Sections 4-3, 6-4 - 6-9, 8-5 - 8-6 and pp. 221-222.

Merriaman, et. al., "An attempted replication of the CETI Cold Fusion Experiment." published on the Internet, May 1, 1997, available at www.math.ucla.edu/~barry/CF/CETIX.html, pp. 1-17.

Merzbacher, Eugen."Quantum Mechanics." 1961, p. 198.

Messiah, Albert. "Quantum Mechanics." *Rutgers-The State University*, vol. 1, 1958, p. 130.

Meulenbroeks, et. al. "The argon-hydrogen expanding plasma: model and experiments." *Plasma Sources Sci Technol.*, vol. 4, 1995, pp. 74-85.

Meulenbroeks, et. al. "Influence of molecular processes on the hydrogen atomic system in an expanding argon-hydrogen plasma." *Phys. Plasmas*, vol. 2, No. 3, Mar. 1995, pp. 1002-1008.

Miles et. al. "Correlation of Excess . . . Palladium Cathodes." *J. Electronl. Chem.*, 1993, pp. 99-117.

Miles et. al. "Electrochemical . . . Palladium Deuterium System." *J. Electroanal Chem.*, 1990, pp. 241-254.

Miles et. al. "Heat and Helium . . . Experiments." *Conference Proceedings*, vol. 33, 1991, pp. 363-372.

Miles, et. al. "Search for Anomalous Effects . . . Palladium Cathodes." *Naval Air Warfare Center Weapons Division, Proceedings of 3rd Int. Conf. On Cold Fusion*, Nagoya, Japan, Oct. 1992, pp. 21-25.

Miller. "Memo from Bennett Miller to Dr. Robert W. Bass." Oct. 9, 1997, pp. 1-10.

Miskelly, et. al. "Analysis of the Published Calorimetric Evidence for Electrochemical Fusion of Deuterium in Palladium." *Science*, vol. 246, No. 4931, Nov. 10, 1989, pp. 793-796.

Monroe, et. al. "A Schrodinger Cat Superposition State of an Atom." *Science*, vol. 272, May 24, 1996, pp. 1131-1101.

Morrison. "Cold Fusion Update No. 12, ICCPG." Jan. 17, 1997, available online at "www.skypoint.com".

Morrison. "Comments on claims of excess enthalpy by Fleischmann and Pons using simple cells made to boil." *Physics Letter A*, vol. 185, Feb. 28, 1994, pp. 498-502.

Morrison. "Review of Progress in Cold Fusion." *Transactions of Fusion Technology*, vol. 26, Dec. 1994, pp. 48-55.

Morrison, "Review of Cold Fusion," Sov. Phys. Usp. 34, Dec. 1991, pp. 1055-1060.

Morrison, "Cold Fusion Update No. 10," dated Apr. 1, 1995, available at http://www.skypoint.com/members/slogajan/files/morrison.txt, pp. 1-8.

Morse, et. al. "Methods of Theoretical Physics," Part I, McGraw-Hill Book Co., *Massachusetts Institute of Technology*, Part 1: Chapters 1-8, 1953, pp. 808-903.

Myers, et. al. "Search for Cold Fusion at D/Pd > 1 Using Ion Implantation." *Journal of Fusion Energy*, vol. 9, No. 3, pp. 30-37, 1990.

Nakhmanson. "The Ghostly Solution of the Quantum Paradoxes and its Experimental Verification." *Frontiers of Fundamental Physics*. Plenum Press: New York. 1994. pp. 591-596, http://arxiv.org/ftp/physics/papers/0103/0103006.pdf.

Neynaber, et. al. "Formation of HeH$^+$ from Low-Energy Collisions of Metastable Helium and Molecular Hydrogen." *Journal of Chemical Physics*, vol. 57, No. 12, Dec. 16, 1972, pp. 5128-5137.

Niedra. "Replication of the Apparent Excess Heat Effect in Light Water . . . Cell." *Nasa Technical Memorandum 107167*, Feb. 1996.

Nieminen. "Hydrogen atoms band together." *Nature*, vol. 356, Mar. 26, 1992, pp. 289-291.

NIST, "Atomic Spectroscopy—Spectral Line Shapes, etc.," available at: http://physics.nist.gov/Pubs/AT_Spec/node20html/.

NIST's Physical Reference Datasheet, "Energy Levels of Hydrogen and Deuterium," <URL http://physics.nist.gov/PhysRefData/HDEL/index.html>.

Noninski. "Excess Heat During the Electrolysis of a Light Water . . . Nickel Cathode." *Fusion Technology*, vol. 21, Mar. 1992, pp. 163-167.

Noninski, et. al. "Determination . . . Heavy Water." *Fusion Technology*, vol. 19, 1990, pp. 365-367.

Notoya. "Cold Fusion . . . Nickel Electrode." *Fusion Technology*, vol. 24, 1993, pp. 202-204.

Notoya. "Tritium Generation . . . Nickel Electrodes." *Fusion Technology*, vol. 26,1994, pp. 179-183.

Notoya, et. al. "Excess Heat Production in Electrolysis . . . Electrodes." *Proceedings of the Int. Conf. on Cold Fusion*, Oct. 21-25, 1992, Tokyo, Japan.

Odenthal et al., "The Zeeman Splitting of the 5876 Å Helium Line Studied by Means of a Turnable Dye Laser",*Physica*, pp. 203-216, 1982.

Ohashi, et. al. "Decoding of Thermal Data in Fleischmann & Pons Paper." *J. of Nucl. Sci.. & Tech.*, vol. 26, No. 7, Jul. 1989, pp. 729-732.

Ohmori, et. al. "Excess Heat Evolution . . . Tin Cathodes." *Fusion Technology*, vol. 24, 1993, pp. 293-295.

Oka, et. al. "$D_2O$-fueled fusion power reactor using electromagnetically induced D-$D_{n1}$ D-$D_{p1}$ and Deuterium-tritium reactions-preliminary design of a reactor system." *Fusion Technology*, vol. 16. No. 2, Sep. 1989, pp. 263-267.

Park, Robert L. "Perpetual Motion: Still Going Around." *Washington Post*, Jan. 12, 2000, p. H03.

Park, "Patent Nonsense, Court Denies BlackLight Power Appeal," What's New, Sep. 6, 2002, available at www.aps.org.wn/wn02/wn090602.html.

Park, What's New, Friday Mar. 17, 2006.

Park, What's New, Friday Jan. 13, 2006.

Park, What's New, Friday Apr. 26, 1991.

Pauling, et. al. "Introduction to Quantum Mechanics with Applications to Chemistry." Dover Publications, Inc., *Harvard University*, 1985, pp. 121-140.

Peterson. "Evaluation of Heat Production from Light Water Electrolysis Cell of Hydrocatalysis Power Corporation." Draft, *Westinghouse STC*, Feb. 1994.

Phillips, et. al. "Additional Calorimetric Examples of Anomalous Heat From Physical Mixture of K/Carbon and PD/Carbon." Consulting Report, Jan. 1996.

Plasmaphysics.org. Conversion Table: cgs/S1- units. (internet page) www.plasmaphysics.org.uk/convers.htm. (no author or date listed).

Platt, Charles. "Testing the Current." *Washington Post*. Jun. 25, 2000, p. X05.

Physics 200-04 course, "Pauli Spin Matrices," http://axion.physics.ubc.ca/200-04/pauli-spin.pdf.

Physics Web Aug. 5, 2005, "Hydrogen results causes controversy".

Popov. "Electrochemical Characterization of BlackLight Power, Inc. MH as Electrodes for Li-ion Batteries." Department of Chemical Engineering University of South Carolina, Feb. 2000.

Powell et al. *Quantum Mechanics*, Addison-Weskey Publishing Co., Inc., pp. 205-229 and 478-482, 1961.

Price, et. al. "Search for Energetic-Charged Particle Emission from Deuterated Ti and Pd Foils." *Physical Review Letters*, vol. 63, No. 18, Oct. 30, 1989, pp. 1926-1929.

Quantum Physics 301, "Paradoxes and Interpretation," http://www.teach.phy.bris.ac.uk/level3/phys30100/coursematerials/paradoxes.pdf.

Radavanov, et. al. "Ion Kinetic-Energy Distributions and Balmer-a Excitation in Ar-$^{H2}$ Radio-Frequency Discharges." *J. Appl. Phys.*, vol. 78, No. 2, Jul. 15, 1995, pp. 746-756.

Rathke "A Critical Analysis of the Hydrino Model", New Journal of Physics, May 19, 2005, http://www.iop.org/ejarticle/1367-2630/7/1/127/njp5_1_127.html.

Rauch et .al. "Some F-Band Optical Oscillator Strengths in Additively Colored Alkali Halides." *Physical Review*, Feb. 1, 1957, vol. 105, pp. 914-920.

Rees. "Cold Fusion . . . What Do We Think?" *Journal of Fusion Energy*, vol. 10, No. 1, 1991, pp. 110-116.

Real Climate, Jan. 20, 2005, "Peer Review: A Necessary But Not Sufficient Condition," <http://www.realclimate.org/index.php?p=109>.

Roberts, et. al. "Hydrogen Balmer alpha line shapes for hydrogen-argon mixtures in a low-pressure rf discharge." J. App. Phys, vol. 74, No. 11, (Dec. 1993).

Rogers, et. al., "Cold Fusion Reaction Products and Their Measurement." *Journal of Fusion Technology*, vol. 9, No. 4, 1990, pp. 483-485.

Rogers. "Isotopic hydrogen fusion in metals." *Fusion Technology*, vol. 16, No. 2, Sep. 1989, pp. 2254-2259.

Rosenblum. "Celebrating Y2K Could Prevent Panic, Ease Transition." *Re: (ise-I) Institute for Social Ecology Newsletter*, Dec. 22, 1998.

Rosenblum. "Four Interviews With Dr. Randell Mills on New Energy, New Physics." *Re: (ise-l) Institute for Social Ecology Newsletter*, Feb 2, 1998.

K. L. Ross, "Kantian Quantum Mechanics," http://www.friesian.com/space-2.htm.

Rothwell. "Italy-Cold Fusion & Judge's Verdict." *NEN*, vol. 4, No. 1, Mar. 26, 1996, available at www.padrak.com/ine/CFLIBEL.html, pp. 9-11.

Rousseau. "Case Studies in Pathological Science." *American Scientist*, vol. 80, 1992, pp. 54-63.

Rout, et. al. "Phenomenon of Low Energy Emissions from Hydrogen/Deuterium Loaded Palladium." $3^{rd}$ *Annual Conference on Cold Fusion*, Oct. 21-25, 1992.

Rudd, et. al. "Backward Peak in the Electron Spectrum from Collisions of 70-keV Protons with a Target from a Hydrogen-Atom Source." *Physical Review Letters*, vol. 68, No. 10, Mar. 1992, pp. 1504-1506.

Salamon, et. al. "Limits . . . Electrolytic Cells." *Nature*, vol. 344, Mar. 29, 1990, pp. 401-405.

Schaefer. "Das Ultrarote Spektrum Des U-Zentrums," *Phys. Chem. Solids*, 1960, vol. 12, pp. 233-244, Pergamon Press, Great Britain.

Schearer et al. "Microwave Saturation of Paraelectri-Resonance Transitions of OH⁻ Ions in Kcl:." *Solid State Communications*, vol. 4, 1966, pp. 639-642.

Schiff, Leonard I. "Quantum Mechanics." *Stanford University*, 1968, pp. 1, 7-8, 10-12, 21, 54-57, 60-61, 81-82, 101, 527.

Schrieder, et. al. "Search for Cold Nuclear Fusion in Palladium-Deuterium." *Z. Phys. B-Condensed Matter*, vol. 76, No. 2, 1989, pp. 141-142.

Service. "Cold Fusion: Still Going." *Newsweek Focus*, Jul. 19, 1993.

Shani, et. al. "Evidence for a Background Neutron Enhanced Fusion in Deuterium Absorbed Palladium." *Solid State Communications*, vol. 72, No. 1, 1989, pp. 53-57.

Shaubach, et. al. "Anomalous Heat . . . Carbonate." *Thermacore, Inc.*, pp. 1-10.

Shelton, et. al. "An assessment of claims of 'excess heat' in 'cold fusion' calorimetry." *Elsevier Science B. V., Thermochimica Acta* 297,1997, pp. 7-15.

Shermer, "Baloney Detection", *Scientific American*, Nov. 2001.

Shkedi, et. al. "Calorimetry, Excess Heat, and Faraday Efficiency in Ni-$H_2$O Electrolytic Cells." *Fusion Technology*, vol. 28, Nov. 1995, pp. 1720-1731.

Shook. "A Pragmatically Realistic Philosophy of Science." *Pragmatic Naturalism and Realism*. Prometheus Books: Amherst, NY. 2003, http://www.pragmatism.ort/shook/pragmatic_and_realistic.htm.

Silvera, et. al. "Deuterated palladium at temperatures from 4.3 to 400K and pressures to 105 kbar; Search for cold fusion." *The American Physical Society*, Physical Review B, vol. 42, No. 14, Nov. 15, 1990, pp. 9143-9146.

Souw, Bernard, "Coherent Telescope array with self-homodyne interfermetric detection for optical communications," Opt. Eng. 42(11) 3139-3157 (Nov. 2003).

Souw et al., "Calculation of the Combined Zeeman and translational Stark Effect on the Hα Multiplet", *Physica*, pp. 353-374, 1983.

E-K Souw, Ph.D. Thesis 1981, University of Dusseldorf, Germany, titled "Investigations of Transport Phenomena in the Wall Region of a Helium Plasma by Means of Spectroscopic Methods."

E.K.Souw, "Plasma Density Measurements in an Imperfect Microwave Cavity," J. Appl. Phys. 61 (1987) p. 1761-1772.

E-K Souw et al., "The Zeeman Splitting of the 5876 A He Line Studied by means of a Tunable Dye Laser," Physica 113c (1982) pp. 203-216.

E-K Souw, "Anomalous Broadening and Splitting of HeI and ArI lines in microwave plasmas," unpublished data, Dec. 1, 2003.

Srianand, et. al. "The cosmic microwave background radiation temperature at a redshift of 2.34." *NATURE*, vol. 408, Dec. 2000, pp. 931-935.

Srinivasan, et. al. "Tritium and Excess Heat Generation during Electrolysis of Aqueous Solutions of Alkali Salts with Nickel Cathode." $3^{rd}$ *Annual Conference on Cold Fusion*, Oct. 21-25, 1992.

Stein. "Theory May Explain Cold Fusion Puzzle." *Lexis Reprint, Washington News*, Apr. 25, 1991.

"Stellar Spectra and the Secrets of Starlight" (Internet Pages) www.kingusa.ab.ca/~brian/asto/course/lectures/fall/a200110g.htm (date and author unknown).

Stripp. "Georgia Group Outlines Errors That Led to Withdrawal of Cold Fusion Claims." *The Wall Street Journal*, Apr. 26, 1989, p. B4.

Storms, et. al. "Electrolytic Tritium Production." *Fusion Technology*, vol. 17, Jul. 1990, pp. 680-695.

Suplee "Two New Theories on Cold Fusion . . . Scientists." *The Washington Post $1^{st}$ Section*, 1991, p. A11.

Taubes. "Bad Science." *Random House*, 1993, pp. 303, 425-481.

Taubes. "Cold Fusion Conundrum at Texas A & M." *Science*, vol. 248, News & Comment, Jun. 15, 1990, pp. 1299-1304.

Taylor, et. al. "Search for neutrons from Deuterated palladium subject to high electrical currents." *Fourth International Conference on Cold Fusion*, Maui Hawaii, L.A-UR 94-970, May 4, 1994, pp. 1-11.

Technology Insights. "Draft: Hydrocatalysis Technical Assessment." PACIFICORP, Aug. 2, 1996.

Tegmark, et. al. "100 Years of Quantum Mysteries." *Scientific American*, Feb. 2001, pp. 68-75.

Thermacore, Inc. "SBIR Phase I Nascent Hydrogen: An Energy Source." Final Report, Mar. 1994.

Thomas. "Zur Photocjemie des KH-KBR-Mischjristalles." *Annalen der Physik*, vol. 38, 1940, pp. 601-608.

Thorne, et. al. "Recombination during the Electrolysis of Light Water in 0.6 M $K_2CO_3$ Can It Account for the Reports of Excess Heat?" *Departments of Physics and Chemistry, Brigham Young University*, Jun. 1993.

Time 2 wake up: "New Power SOURCE that turns physics on its head," Nov. 9, 2005.

Tolman, Richard C. "The Principles of Statistical Mechanics." *California Institute of Technology*, 1979, pp. 180-188.

Turner. "Declaration of Dr. Gary L. Turner." Aug. 24, 2004.

U.S. Department of Commerce, Summary of Ethics Rules, USPTO, 2000; Oct. 15, 2004.

Vaselli et. al. "Screening Effect of Impurities in Metals: A possible Explanation of the Process of Cold Nuclear Fusion." 11 Nuovo Cimento Della Societa Italiana di Fisica, vol. 11 D, No. 6, Jun. 1989, Bologna, Italy, pp. 927-932.

Videnovic, et al. "Spectroscopic investigations of a cathode fall region of the Grimm-type glow discharge." *Spectrochimica Acta Part B*, vol. 51, 1996, pp. 1707-1731.

Vigier. "New Hydrogen Energies in Specially Structured Dense Media : Capillary Chemistry and Capillary Fusion." *Proceedings of the Third Annual Conf. on Cold Fusion*, Nagoya, Japan, Oct. 21-25, 1992, H. Ikegami, Ed. Universal Academy Press., pp. 325-334.

Vigier. "New Hydrogen (Deuterium) Bohr Orbits." *Proc. ICCF4*, vol. 4, 1994, p. 7-10.

Welcome to MIT's OpenCourseWare Home Page. MIT 2005. http://oxw.mit.edu/index.html.

Weisskopf, V.F. "Recent developments in the theory of the electron." *Reviews of Modern Physics*, vol. 21, No. 2, 1949, pp. 305-315.

Wheeler, et. al. "Quantum Theory and Measurement." English Translation of Heisenburg's Uncertainty Principle Paper, *Zeitschrift für Physik*, 1927, vol. 43, pp. 172-198.

Wikipedia, Chapter 9: "Peer Review and Fraud," <http://en.wikipedia.org/wiki/peer_review#peer_review_and_fraud>.

Williams. "Upper Bounds on Cold Fusion in Electrolytic Cells." *Nature*, vol. 342, Nov. 23, 1989, pp. 375-384.

Wilson, et. al. "Analysis of experiments on the calorimetry of LiOD-$D_2O$ electrochemical cells." *Elsevier Sequoia S.A.*, Journal of Electroanalytical Chemistry, vol. 332, Nos. 1 and 2, Aug. 14, 1992, pp. 1-31.

"XPS (EASC)—SAM," http://www.noveonic.com/measurementscience/analyticalservices/xpsescasam.pdf.

Yamaguchi et. al. "Direct Evidence . . . Palladium." *NTT Basic Research Laboratories*, 1992 pp. 1-10.

Ziegler, et. al. "Electrochemical Experiments in Cold Nuclear-Fusion." *Physical Review Letters*, vol. 62, No. 25, Jun. 19, 1989, pp. 2929-2932.

Peter D. Zimmerman, "An Analysis of Theoretical Flaws in So-Called Classical Quantum Mechanics and of Experimental Evidence Against CQM" (2001).

Zweig, "Quark Catalysis of Exothermal Nuclear Reactions", Science, vol. 201, (1978), pp. 973-979.

Critchley et al, "Energy shifts and forbidden transitions in $H_2$ due to electronic g/u symmetry breaking", Molecular Physics, 2003, vol. 101, Nos. 4-5, pp. 651-661, Taylor & Francis Ltd.

Gambus et al., "Spectroscopic Study or Low-Pressure Water Plasmas and Their Reactions with Liquid Hydrocarbons", Energy & Fuels, 2002, 16, pp. 172-176, American Chemical Society.

Akatsuka et al., "Stationary population inversion of hydrogen in an arc-heated magnetically trapped expanding hydrogen-helium plasma jet", Physical Review E, 49, 2, pp. 1534-1544, Feb. 1994, The American Physical Society.

Murakami et al., "Chemisorption of hydrogen into a graphite-potassium intercalation compound $C_8K$ studied by means of position annihilation", J. Chem. Phys., 62 (10), May 15, 1995, American Institute of Physics.

Ahn, "Hydrogen Storage in Metal-Modified Single-Walled Carbon Nanotubes", Division of Engineering and Applied Science, California Institute of Technology, Sep. 15, 2001.

Duan et al., "Numerical calculation of energies of some excited states in a helium atom", Eur. Phys. J., D 19, (2002), pp. 9-12, Societa Italiana di Fisica, Springer-Verlag 2002.

Nixon et al., "Formation and structure of the potassium graphites", Brit. J. Appl. Phys., Ser. 2, vol., 1, pp. 291-299, Great Britain, 2002.

Zellinger, "Experiment and the foundations of quantum physics", Reviews of Modern Physics, vol. 71, No. 2, pp. S288-S297, Centenary 1999, The American Physical Society.

Cotton et al, "Complexes of Cyclic 2-Oxacarbenes, I. A Spontaneous Cyclization to Form a Complex of 2-Oxaclyclopentylidene", Journal of the American Chemical Society, 93:11, pp. 2672-2676, Jun. 2, 1971.

Lindsay et al., "A remeasurement of the 2.4μm spectrum of J = H2 pairs in a parahydrogen crystal", Journal of Molecular Spectroscopy, 218. pp. 131-133, 2003.

Juarez et al, "Photoelectron angular distributions of rotationally resolved states in para-H2+ : A closer to the dynamics of molecular photoionisation", The University of Manchester Atomic, Molecular & Laser Manipulation Group, pp. 1-5.

Weisstein, "Ortho-Para Hydrogen", http://scienceworld.wolfram.com/physics/OrthoParaHydrogen.html.

Smith, "Infrared spectra of BO2—in the alkali halides-L. Potassium and rubidium halides", Spectrochimica Acts, vol. 30A, pp. 875-882, Pergamon Press, 1974.

Leitch et al., "Raman Specreoscopy of Hydrogen Molecules in Crystalline Silicon", Physical Review Letters, 81:2, pp. 421-424, Jul. 13, 1998, The American Physical Society.

Chen et al., "Key to Understanding Interstitial H2 in Si", Physical Review Letters, 88:10, pp. 105507-1-105507-4, Mar. 11, 2002, The American Physical Society.

Chen et al., "Rotation of Molecular Hydrogen in Si: Unambiguous Identification of Ortho-H2 and Para-D2", Physical Review Letters, 88:24, pp. 245503-1-245503-4, Jun. 17, 2002, The American Physical Society.

Lavrov et al., "Ortho and Para Interstitial H2 in Silicon", Physical Review Letters, 89:21, pp. 215501-1 - 215501-4, Nov. 18, 2002, The American Physical Society.

Stavola et al, "Interstitial H2 in Si: are all problems solved?", Physica B, pp. 58-66, 200s Elsevier B.V.

Decius et al, "Force Constants of the Metaborate Ion in Alkali Halides", The Journal of Chemical Physics, 56:10, pp. 5189-5190, May 15, 1972.

Morgan, "Infrared spectra of the metaborate ion in alkali halide solid solution", Research Notes, pp. 600-602.

Smith, "Anharmonic force field of the metaborate ion in alkali halides", The Journal of Chemical physics, 58:11, pp. 4776-4778, Jun. 1, 1973.

Hisatsune et al., "Infrared Spectra of Metaborate Monomer and Trimer Ions", Inorganic Chemistry, pp. 168-174.

Jones et al., "Force Constants of Nickel Carbonyl from Vibrational Spectra of Isotopic Species", The Journal of Chemical Physics, 48:6, pp. 2663-2670, Mar. 15, 1968.

Smith, "Infrared spectra of BO2-in the alkali halides-I. Potassium and rubidium halides", Spectrochimica Acta, 30A, pp. 875-882, 1974, Pergamon Press.

Schoenfelder et al., "Kinetics of Thermal Decomposition of TiH2", J. Vac. Sci. Technol., 10:5, pp. 862-870, Sep./Oct. 1973.

Heatwave Labs, "Emission Characteristics for Scandium Type Dispenser Cathodes", HeatWave Labs, Inc., TB-119, May 24, 2001, Spectra-Mat, Inc.

Heatwave Labs, "Emission Characteristics of 'M Type' Dispenser Cathodes", HeatWave Labs, Inc., TB-117, May 24, 2001, Spectra-Mat, Inc.

"Practical Aspects of Modern Dispenser Cathodes", Microwave Journal, Sep. 1979.

Heatwave Labs, "Standard Series Barium Tungsten Dispenser Cathodes", HeatWave Labs, Inc., TB-198, Jul. 29, 2002, Spectra-Mat, Inc.

Abate et al., "Optimization and enhancement of H- ions in a magnetized sheet plasma", Review of Scientific Instruments, 71:10, pp. 3689-3695, Oct. 2000, American Institute of Physics.

Chabert et al., "On the influence of the gas velocity on dissociation degree and gas temperature in a flowing microwave hydrogen discharge", Journal of Applied Physics, 84:1, pp. 161-167, Jul. 1, 1009, American Institute of Physics.

Gordon et al., "Energy coupling efficiency of a hydrogen microwave plasma reactor", Journal of Applied Physics, 89:3, pp. 1544-1549, Feb. 1, 2001, American Institute of Physics.

Radovanov et al., "Time-resolved Balmer-alpha emission from fast hydrogen atoms in low pressure, radio-frequency discharges in hydrogen", Appl. Phys. Lett., 66:20, pp. 2637-2639, May 15, 1995.

Djurovic et al., "Hydrogen Balmer alpha line shapes for hydrogen-argon mixtures in a low-pressure rf discharge", J. Appl. Phys., 74:11, pp. 6558-6565, Dec. 1, 1993, American Institute of Physics.

Konjevic, "Plasma Broadening and Shifting of Non-Hydrogenic Spectral Lines: Present Status and Applications", Physics Reports, 315, pp. 339-401, 1999, Elsevier.

Benesch et al., "Line shapes of atomic hydrogen in hollow-cathode discharges", Optics Letters, 9:8, pp. 338-340, Aug. 1984, Optical Society of America.

Ayers, et al., "Shapes of atomic-hydrogen lines produced at a cathode surface", Physical Review A, 37:1, pp. 194-200, Jan. 1, 1988, The American Physical Society.

Adamov, et al., "Doppler Spectroscopy of Hydrogen and Deuterium Balmer Alpha Line in an Abnormal Glow Discharge", IEEE Transactions on Plasma Science, 31:3, pp. 444-454, Jun. 3, 2003.

Jovicevic et al., "Excessive Balmer line broadcasting in microwave-induced discharges", Journal of Applied Physics, 95:1, pp. 24-29, Jan. 1, 2004, American Institute of Physics.

Djurovic et al., "Hydrogen Balmer alpha line shapes for hydrogen-argon mixtures in a low-pressure rf discharge", J. Appl. Phys., 74:11, pp. 6558-6565, Dec. 1, 1993, American Institute of Physics.

Mayo, "Thermalization and Energy Distribution in Cold Laboratory Plasmas Comments on the Possibility of Mono-Energetic Species", Apr. 20, 2004.

Videnovic et al., "Spectroscopic investigations of a cathode fall region of the Grimm-type glow discharge", Spectrochimica Acta Part B, 51, pp. 1707-1731, 1996.

Barbeau et al., Spectroscopic investigation of energetic atoms in a DC hydrogen flow discharge, pp. 1168-1174, 1990 IOP Publishing Ltd.

Konjevic et al., "Emission Spectroscopy of the Cathode Fall Region of an Analytical Glow", J. Phys. IV France, 7, pp. C4-247-C4-258, Oct. 1997.

Lifshitz et al., "Resonance absorption measurements of atom concentrations in reacting gas mixtures. I. Shapes of H and D Lyman-$\alpha$ lines from microwave sources", J. Chem. Phys., 70:12, pp. 5607-5613, Jun. 15, 1979, American Institute of Physics.

Kuraica et al., "Line shapes of atomic hydrogen in a plane—cathode abnormal glow discharge", Physical Review A, 46:7, pp. 4429-4432, Oct. 1, 1992, The American Physical Society.

Kuraica et al., "On the Atomic Hydrogen Line Shapes in a Plane-Cathode Obstructed Glow Discharge", Physica Scripta., 50, pp. 487-492, 1994.

Olthoff et al., "Studies of Ion Kinetic-Energy Distributions in the Gaseous Electronics Conference RF Reference Cell", Journal of Research of the National Institute of Standards and Technology, 100:4, pp. 383-400, Jul.-Aug. 1995.

Alexeff et al., "Collisionless Ion-Wave Propagation and the Determination of the Compressions Coefficient of Plasma Electrons", Physical Review Letters, 15:7, pp. 286-288, Aug. 16, 1999.

Arata et al., "Reproducible 'Cold' Fusion Reaction Using a Complex Cathode", Fusion Technology, 22, pp. 287-295, Sep. 1992.

Burkholder et al., "Reactions of boron atoms with molecular oxygen. Infrared spectra of BO, BO2, B2O2, B2O3, and BO2 in solid argon", J. Chem. Phys., 95:12, pp. 8697-8709, Dec. 15, 1991.

Spurgin, "Direct Conversion of the Random Thermal Energy of a Plasma Into Electrical Energy", Master's Thesis, The University of South Florida, Jun. 1972.

Technology Insights, "Hydro Catalysis Technical Assessment," (Part of U.S. Appl. No. 09/009,837 paper No. 20050207. This document was submitted by R. Mills on Jul. 17, 2002 in copending U.S. Appl. No. 09/669,877).

Ess, Notes on David Peat, "Einstein's Moon: Bell's Theorem and the Curious Quest for Quantum Reality," History and Philosophy of Science-Fall, 1997-Dr. Ess, <www.drury.edu/ess/philsci/bell.html>.

"Average Molecular Kinetic Energy", <http://hyperphysics.phy-astr.gsu.edu/hbase/kinetic/molke.html>.

116. K. Akhtar, J. Scharer, R. L. Mills, "Substantial Doppler Broadening of Atomic Hydrogen Lines in DC and Capactively Coupled RF Plasmas," IEEE Transactions on Plasma Science, submitted. (Internet Publication Date: Jun. 6, 2006.).

115. R.L. Mills, H. Zea, J. He, B. Dhandapani, "Water Bath Calorimetry on a Catalytic Reaction of Atomic Hydrogen," International Journal of Hydrogen Energy, in press. (Internet Publication Date: May 12, 2006).

114. R.L. Mills, K. Akhtar, B. Dhandapani, "Tests of Features of Field-Acceleration Models for the Extraordinary Selective H Balmer $\alpha$ Broadening in Certain Hydrogen Mixed Plasmas," J. Plasma Phys., submitted. (Internet Publication Date: Jun. 24, 2005.).

113. R.L. Mills, "Physical Solutions of the Nature of the Atom, Photon, and Their Interactions to Form Excited and Predicted Hydrino States," Physics Essay, in press. . (Internet Publication Date: Jun. 9, 2005.).

112. R. L. Mills, J. He, Y. Lu, Z, M. Nansteel, Chang, B. Dhandapani, "Comprehensive Identification and Potential Applications of New States of Hydrogen," Int. J. Hydrogen Energy, vol. 32, (2007), 2988-3009. (Internet Publication Date: May 9, 2005.).

111. R. L. Mills, J. He, Z, Chang, W. Good, Y. Lu, B. Dhandapani, "Catalysis of Atomic Hydrogen to Novel Hydrogen Species H⁻(1/4) and $H_2(1/4)$ as a New Power Source," International Journal of Hydrogen Energy, vol. 32(13), (2007), pp. 2573-2584. (Internet Publication Date: May 6, 2005.).

110. R. L. Mills, J. He, Z, Chang, W. Good, Y. Lu, B. Dhandapani, "Catalysis of Atomic Hydrogen to Novel Hydrides as a New Power Source," Prepr. Pap.—Am. Chem. Soc., Div. Fuel Chem. 2005, 50(2). (Internet Publication Date: Apr. 22, 2005.).

109. R. L. Mills, M. Nansteel, J. He, B. Dhandapani, "Low-Voltage EUV and Visible Light Source Due to Catalysis of Atomic Hydrogen," J. Plasma Physics, submitted. (Internet Publication Date: Apr. 15, 2005.).

108. R. L. Mills, J. He, M. Nansteel, B. Dhandapani, "Catalysis of Atomic Hydrogen to New Hydrides as a New Power Source," International Journal of Global Energy Issues (IJGEI). Special Edition in Energy Systems, in press. (Internet Publication Date: Apr. 4, 2005.).

107. R. L. Mills, "Maxwell's Equations and QED: Which is Fact and Which is Fiction," Physics Essays, in press. (Internet Publication Date: Oct. 28, 2004.).

106. R. L. Mills, "Exact Classical Quantum Mechanical Solution for Atomic Helium which Predicts Conjugate Parameters from a Unique Solution for the First Time," Physics Essays, submitted. (Internet Publication Date: Oct. 28, 2004.).

105. J. Phillips, C. K. Chen, R. L. Mills, "Evidence of Catalytic Production of Hot Hydrogen in RF-Generated Hydrogen/Argon Plasmas," International Journal of Hydrogen Energy, vol. 32, (2007), 3010-3025. (Internet Publication Date: Sep. 7, 2004.).

104. R. L. Mills, Y. Lu, M. Nansteel, J. He, A. Voigt, W. Good, B. Dhandapani, "Energetic Catalyst-Hydrogen Plasma Reaction as a Potential New Energy Source," Division of Fuel Chemistry, Session: Advances in Hydrogen Energy, 228th American Chemical Society National Meeting, Aug. 22-26, 2004, Philadelphia, PA.

103. R. L. Mills, Dhandapani, W. Good, J. He, "New States of Hydrogen Isolated from $K_2CO_3$ Electrolysis Gases," Chemical Engineering Science, submitted. (Internet Publication Date: Apr. 28, 2004.).

102. R. L. Mills, "Exact Classical Quantum Mechanical Solutions for One- through Twenty-Electron Atoms," Phys. Essays, vol. 18, No. 3 (2005), 321-361. (Internet Publication Date: Apr. 22, 2004.).

101. Mills et al. "Energetic Catalyst-Hydrogen Plasma Reaction as a Potential New Energy Source," Division of Fuel Chemistry, Session: Chemistry of Solid, Liquid, and Gaseous Fuels, 227th American Chemical Society National Meeting, Mar. 28-Apr. 1, 2004, Anaheim, CA.

100. Mills et al., "Highly Stable Amorphous Silicon Hydride from a Helium Plasma Reaction," Materials Chemistry and Physics, 94/2-3, (2005), pp. 298-307. (Internet Publication Date: Nov. 17, 2003.).

99. Mills et al., "Spectral Identification of H2(1/2)," submitted.

98. R. L. Mills, Y. Lu, J. He, M. Nansteel, P. Ray, X. Chen, A. Voigt, B. Dhandapani, "Spectral Identification of New States of Hydrogen," New Journal of Chemistry, submitted. (Internet Publication Date: Nov. 18, 2003.).

97. Mills et al., "Evidence of an Energy Transfer Reaction Between Atomic Hydrogen and Argon II or Helium II as the Source of Excessively Hot H Atoms in RF Plasmas," Journal of Plasma Physics, vol. 72, Issue 4, (2006), pp. 469-484. (Internet Publication Date: Sep. 26, 2003.).

96. Mills et al., "Evidence of the Production of Hot Hydrogen Atoms in RF Plasmas by Catalytic Reactions Between Hydrogen and Oxygen Species," J. Plasma Phys., submitted. (Internet Publication Date: Sep. 12, 2003.).

95. Mills et al., "Excessive Balmer $\alpha$ Line Broadening of Water-Vapor Capacitively-Coupled RF Discharge Plasmas," IEEE Transactions on Plasma Science, submitted. (Internet Publication Date: Aug. 18, 2003.).

94. Mills, "The Nature of the Chemical Bond Revisited and an Alternative Maxwellian Approach," Physics Essays, vol. 17, (2004), pp. 342-389. (Internet Publication Date: Aug. 6, 2003).

93. Mills et al., "Energetic Catalyst-Hydrogen Plasma Reaction Forms a New State of Hydrogen," Doklady Chemistry, submitted.

92. Mills et al., "Energetic Catalyst-Hydrogen Plasma Reaction as a Potential New Energy Source," Central European Journal of Physics, submitted. (Internet Publication Date: Jun. 6, 2003.).

91. R. Mills, P. Ray, "New H I Laser Medium Based on Novel Energetic Plasma of Atomic Hydrogen and Certain Group I Catalysts," J. Plasma Physics, submitted.

90. Mills et al., "Characterization of Energetic Catalyst-Hydrogen Plasma Reaction as a Potential New Energy Source," Am. Chem. Soc. Div. Fuel Chem. Prepr., vol. 48, No. 2, (2003).

89. Mills et al., "Hydrogen Plasmas Generated Using Certain Group I Catalysts Show Stationary Inverted Lyman Populations and Free-Free and Bound-Free Emission of Lower-Energy State Hydride," Fizika A, submitted.

88. Mills et al., "Role of Atomic Hydrogen Density and Energy in Low Power CVD Synthesis of Diamond Films," Thin Solid Films, 478, (2005), pp. 77-90. (Internet Publication Date: Dec. 22, 2003.).

87. Mills et al., "Liquid-Nitrogen-Condensable Molecular Hydrogen Gas Isolated from a Catalytic Plasma Reaction," J. Phys. Chem. B, submitted.

86. Mills et al., "Novel Spectral Series from Helium-Hydrogen Evenson Microwave Cavity Plasmas that Matched Fractional-Principal-Quantum-Energy-Level Atomic and Molecular Hydrogen," European Journal of Physics, submitted. (Internet Publication Date: Apr. 24, 2003.).

85. Mills et al., "Highly Pumped Inverted Balmer and Lyman Populations," New Journal of Physics, submitted.

84. Mills et al., "Comparison of Balmer $\alpha$ Line Broadening and Power Balances of Helium-Hydrogen Plasma Sources," Braz. J. Phys., submitted. (Internet Publication Date: Mar. 12, 2003).

83. Mills et al., "Comparison of Water-Plasma Sources of Stationary Inverted Balmer and Lyman Populations for a CW HI Laser," J. Appl. Spectroscopy, in preparation.

82. Mills et al., "Synthesis and Characterization of Diamond Films from MPCVD of an Energetic Argon-Hydrogen Plasma and Methane," Journal of Materials Science, submitted. (Internet Publication Date: May 7, 2003.).

81. R. Mills, et. al., "Spectroscopic and NMR Identification of Novel Hydride Ions in Fractional Quantum Energy States Formed by an Exothermic Reaction of Atomic Hydrogen with Certain Catalysts," European Physical Journal: Applied Physics, 28, (2004), pp. 83-104. (*Internet Publication Date*: Feb. 21, 2003)

80. Mills, "The Fallacy of Feynman's Argument on the Stability of the Hydrogen Atom According to Quantum Mechanics," Annales De La Fundation Louis De Broglie, vol. 30, No. 2, (2005), pp. 129-151. (Internet Publication Date: Jan. 27, 2003).

79. Mills et al., "Comparison of Catalysts and Microwave Plasma Sources of Vibrational Spectral Emission of Fractional-Rydberg-State Hydrogen Molecular Ion," Canadian Journal of Physics, submitted.

78. Mills et al., "Vibrational Spectral Emission of Fractional-Principal-Quantum-Energy-Level Molecular Hydrogen", J. of the Physical Society of Japan, submitted. (Internet Publication Date: Sep. 9, 2002.).

77. Mills et al., "Water Bath Calorimetric Study of Excess Heat in 'Resonant Transfer' Plasmas,"Journal of Applied Physics, vol. 96, No. 6, (2004), pp. 3095-3102. (Internet Publication Date: Jun. 16, 2003.)

76. Mills et al., "Comparison of Catalysts and Microwave Plasma Sources of Spectral Emission of Fractional-Principal-Quantum-Energy-Level Atomic and Molecular Hydrogen," Journal of Applied Spectroscopy, submitted. (Internet Publication Date: Feb. 12, 2002.).

75. Mills et al., "Novel Liquid-Nitrogen-Condensable Molecular Hydrogen Gas," Acta Physica Polonica A, submitted. (Internet Publication Date: Oct. 29, 2002.).

74. Mills et al., "Spectroscopic Study of Unique Line Broadening and Inversion in Low Pressure Microwave Generated Water Plasmas," Journal of Plasma Physics, vol. 71, Part 6, (2005), pp. 877-878. (Internet Publication Date: Jun. 18, 2003.).

73. Mills et al., "Energetic Helium-Hydrogen Plasma Reaction," AIAA Journal, submitted. (Internet Publication Date: Jul. 26, 2002.).

72. R. L. Mills, M. Nansteel, P. C. Ray, "Bright Hydrogen-Light and Power Source due to a Resonant Energy Transfer with Strontium and Argon Ions," Vacuum, submitted.

71. Mills et al., "Power Source Based on Helium-Plasma Catalysis of Atomic Hydrogen to Fractional Rydberg States," Contributions to Plasma Physics, submitted.

70. Mills et al., "Comparison of Catalysts and Plasma Sources of Vibrational Spectral Emission of Fractional-Rydberg-State Hydrogen Molecular Ion," The European Journal of Applied Physics, submitted. (Internet Publication Date: Sep. 2, 2002.).

69. Mills et al., "Spectroscopic Characterization of the Atomic Hydrogen Energies and Densities and Carbon Species During Helium-Hydrogen-Methane Plasma CVD Synthesis of Diamond Films," Chemistry of Materials, vol. 15, (2003), pp. 1313-1321. (Internet Publication Date: Dec. 31, 2002.).

68. Mills, et. al. "Stationary Inverted Balmer and Lyman Populations for a CW HI Water-Plasma Laser." IEEE Transactions on Plasma Science, submitted. (Internet Publication Date: Aug. 16, 2002).

67. Mills et al., "Extreme Ultraviolet Spectroscopy of Helium-Hydrogen Plasma," J. Phys. D, vol. 36, (2003), pp. 1535-1542. (Internet Publication Date: Jul. 17, 2002.).

66. Mills et al., "Spectroscopic Evidence for a Water-Plasma Laser," Europhysics Letters, submitted. (Internet Publication Date: Sep. 19, 2002.).

65. Mills et al.,"Spectroscopic Evidence for Highly Pumped Balmer and Lyman Populations in a Water-Plasma," J. of Applied Physics, submitted. (Internet Publication Date: Sep. 18, 2002.).

64. Mills et al., "Low Power MPCVD of Diamond Films on Silicon Substrates," Journal of Vacuum Science & Technology A, submitted. (Internet Publication Date: Jun. 26, 2002.).

63. Mills et al., "Plasma Power Source Based on a Catalytic Reaction of Atomic Hydrogen Measured by Water Bath Calorimetry," Thermochimica Acta, vol. 406, Issue 1-2, (2003), pp. 35-53 (Internet Publication Date: Jun. 25, 2002.).

62. Mills et al., "Synthesis and Spectroscopic Identification of Lithium Chloro Hydride," Inorganica Chimica Acta, submitted.

61. Mills et al., "Highly Stable Amorphous Silicon Hydride," Solar Energy Materials & Solar Cells, vol. 80, No. 1, (2003), pp. 1-20. (Internet Publication Date: Apr. 15, 2002.).

60. Mills et al., "Synthesis of HDLC Films from Solid Carbon," Journal of Materials Science, vol. 39, (2004), pp. 3309-3318. (Internet Publication Date: May 3, 2002.).

59. Mills et al., "The Potential for a Hydrogen Water-Plasma Laser," Applied Physics Letters, vol. 82, No. 11, (2003), pp. 1679-1681. (Internet Publication Date: Jul. 11, 2002.).

58. Mills, "Classical Quantum Mechanics," Physics Essays, vol. 16, (2003), pp. 433-498. (Internet Publication Date: May 23, 2002.).

57. Mills, et. al. "Spectroscopic Characterization of Stationary Inverted Lyman Populations and Free-Free and Bound-Free Emission of Lower-Energy State Hydride Ion Formed by a Catalytic Reaction of Atomic Hydrogen and Certain Group I Catalysts, J. of Quantitative Spectroscopy and Radiative Transfer," No. 39, sciencedirect.com, Apr. 17, 2003.

56. R. M. Mayo, R. Mills, "Direct Plasmadynamic Conversion of Plasma Thermal Power to Electricity for Microdistributed Power Applications," 40th Annual Power Sources Conference, Cherry Hill, NJ, Jun. 10-13, (2002), pp. 1-4. (Internet Publication Date: Mar. 28, 2002.).

55. Mills et al., "Chemically-Generated Stationary Inverted Lyman Population for a CW HI Laser," European J of Phys. D, submitted. (Internet Publication Date: Apr. 22, 2002.).

54. Mills et al., "Stationary Inverted Lyman Population Formed from Incandescently Heated Hydrogen Gas with Certain Catalysts," J. Phys. D, Applied Physics, vol. 36, (2003), pp. 1504-1509. (Internet Publication Date: Mar. 20, 2002) also submitted to Chem Phys. Letts.

53. Mills, "A Maxwellian Approach to Quantum Mechanics Explains the Nature of Free Electrons in Superfluid Helium." Braz. J. Phys, submitted. (Internet Publication Date: Jun. 4, 2002).

52. Mills et al., "Bright Hydrogen-Light Source due to a Resonant Energy Transfer with Strontium and Argon Ions," New Journal of Physics, vol. 4, (2002), pp. 70.1-70.28. (Internet Publication Date: Oct. 2002).

51. Mills et al., "CW HI Laser Based on a Stationary Inverted Lyman Population Formed from Incandescently Heated Hydrogen Gas with Certain Group I Catalysts," IEEE Transactions on Plasma Science, vol. 31, No. 2, (2003), pp. 236-247. (Internet Publication Date: Feb. 4, 2002.).

50. Mills et al., "Spectral Emission of Fractional-Principal-Quantum-Energy-Level Atomic and Molecular Hydrogen," Vibrational Spectroscopy, vol. 31, No. 2, (2003), pp. 195-213.

49. Mills et al., "Comparison of Excessive Balmer Line Broadening of Inductively and Capacitively Coupled RF, Microwave, and Glow Discharge Hydrogen Plasmas with Certain Catalysts," IEEE Transactions on Plasma Science, vol. 31, No. 3, (2003), pp. 338-355. (Internet Publication Date: Sep. 17, 2002.).

48. Mills et al., "Direct Plasmadynamic Conversion of Plasma Thermal Power to Electricity," IEEE Transactions on Plasma Science, Oct. (2002), vol. 30, No. 5, pp. 2066-2073. (Internet Publication Date: Mar. 26, 2002.).
47. H. Conrads, R. Mills, Th. Wrubel, "Emission in the Deep Vacuum Ultraviolet from a Plasma Formed by Incandescently Heating Hydrogen Gas with Trace Amounts of Potassium Carbonate," Plasma Sources Science and Technology, vol. 12, (2003), pp. 389.
46. Mills et al., "Emission in the Deep Vacuum Ultraviolet from a Plasma Formed by Incandescently Heating Hydrogen Gas with Trace Amounts of Potassium Carbonate," Plasma Sources Science and Technology, vol. 12, (2003), pp. 389-395.
45. Mills et al., "Synthesis and Characterization of a Highly Stable Amorphous Silicon Hydride as the Product of a Catalytic Helium-Hydrogen Plasma Reaction," Int. J. Hydrogen Energy, vol. 28, No. 12, (2003), pp. 1401-1424. (Internet Publication Date: Apr. 15, 2002.).
44. Mills, et. al. "Synthesis and Characterization of Lithium Chloro Hydride", *International Journal of Hydrogen Energy*, submitted. (Internet Publication Date: Jan. 7, 2002.).
43. Mills et al., "Substantial Changes in the Characteristics of a Microwave Plasma Due to Combining Argon and Hydrogen," New Journal of Physics, www.njp.org, vol. 4, (2002), pp. 22.1-22.17. (Internet Publication Date: Dec. 27, 2001.).
42. Mills et al., "A Comprehensive Study of Spectra of the Bound-Free Hyperfine Levels of Novel Hydride Ion , Hydrogen, Nitrogen, and Air," Int. J. Hydrogen Energy, vol. 28, No. 8, (2003), pp. 825-871. (Internet Publication Date: Nov. 14, 2001.).
41. Mills et al., "Novel Alkali and Alkaline Earth Hydrides for High Voltage and High Energy Density Batteries," Proceedings of the 17th Annual Battery Conference on Applications and Advances, California State University, Long Beach, CA, (Jan. 15-18, 2002), pp. 1-6. (Internet Publication Date: Nov. 9, 2001.).
40. Mills et al., "On the Potential of Direct and MHD Conversion of Power from a Novel Plasma Source to Electricity for Microdistributed Power Applications," IEEE Transactions on Plasma Science, Aug. (2002), vol. 30, No. 4, pp. 1568-1578. (Internet Publication Date: Nov. 12, 2001.).
39. Mills et al., "Stationary Inverted Lyman Populations and Free-Free and Bound-Free Emission of Lower-Energy State Hydride Ion Formed by an Exothermic Catalytic Reaction of Atomic Hydrogen and Certain Group I Catalysts," J. Phys. Chem. A, submitted. (Internet Publication Date: Nov. 13, 2001.).
38. Mills et al., "Highly Stable Novel Inorganic Hydrides from Aqueous Electrolysis and Plasma Electrolysis," Electrochimica Acta, vol. 47, No. 24, (2002), pp. 3909-3926. (Internet Publication Date: Jun. 13, 2002.).
37. Mills et al., "Comparison of Excessive Balmer Line Broadening of Glow Discharge and Microwave Hydrogen Plasmas with Certain Catalysts," J. of Applied Physics, (2002), vol. 92, No. 12, pp. 7008-7022. (Internet Publication Date: Oct. 9, 2002.).
36. Mills et al., "Emission Spectroscopic Identification of Fractional Rydberg States of Atomic Hydrogen Formed by a Catalytic Helium-Hydrogen Plasma Reaction," Vacuum, submitted. (Internet Publication Date: Oct. 9, 2001.).
35. Mills et al., "New Power Source from Fractional Rydberg States of Atomic Hydrogen," Current Appl. Phys., submitted. (Internet Publication Date: Oct. 9, 2001.).
34. Mills et al., "Spectroscopic Identification of Transitions of Fractional Rydberg States of Atomic Hydrogen," J. of Quantitative Spectroscopy and Radiative Transfer, in press. (Internet Publication Date: Oct. 9, 2001.).
33. Mills et al., "New Power Source from Fractional Quantum Energy Levels of Atomic Hydrogen that Surpasses Internal Combustion," J Mol. Struct., vol. 643, No. 1-3, (2002), pp. 43-54. (Internet Publication Date: Oct. 10, 2001.).
32. Mills et al., "Spectroscopic Identification of a Novel Catalytic Reaction of Rubidium Ion with Atomic Hydrogen and the Hydride Ion Product," Int. J. Hydrogen Energy, vol. 27, No. 9, (2002), pp. 927-935. (Internet Publication Date: Sep. 19, 2001.).
31. Mills et al., "Measurement of Energy Balances of Noble Gas-Hydrogen Discharge Plasmas Using Calvet Calorimetry," Int. J. Hydrogen Energy, vol. 27, No. 9, (2002), pp. 967-978. (Internet Publication Date: Sep. 14, 2001.).
30. Mills et al., "Measurement of Hydrogen Balmer Line Broadening and Thermal Power Balances of Noble Gas-Hydrogen Discharge Plasmas," Int. J. Hydrogen Energy, vol. 27, No. 6, (2002), pp. 671-685. (Internet Publication Date: Aug. 22, 2001.).
29. Mills et al., "Vibrational Spectral Emission of Fractional-Principal-Quantum-Energy-Level Hydrogen Molecular Ion," Int. J. Hydrogen Energy, vol. 27, No. 5, (2002), pp. 533-564. (Internet Publication Date: Jul. 19, 2001.).
28. Mills et al., "Spectral Emission of Fractional Quantum Energy Levels of Atomic Hydrogen from a Helium-Hydrogen Plasma and the Implications for Dark Matter," Int. J. Hydrogen Energy, (2002), vol. 27, No. 3, pp. 301-322. (Internet Publication Date: Aug. 1, 2001.).
27. Mills, et. al. "Spectroscopic Identification of a Novel Catalytic Reaction of Potassium and Atomic Hydrogen and the Hydride Ion Product", *International Journal of Hydrogen Energy*, vol. 27, No. 2, (2002), pp. 183-192. (Internet Publication Date: Jan. 11, 2002).
26. Mills, "BlackLight Power Technology-A New Clean Hydrogen Energy Source with the Potential for Direct Conversion to Electricity," Proceedings of the National Hydrogen Association, 12 th Annual U.S. Hydrogen Meeting and Exposition, Hydrogen: The Common Thread, The Washington Hilton and Towers, Washington DC, (Mar. 6-8, 2001), pp. 671-697. (Presented at the conference on Mar. 7, 2001; Internet Publication Date: Apr. 20, 2001.).
25. Mills, et. al. "Minimum heat of formation of potassium iodo hydride." *International Journal of Hydrogen Energy*, vol. 26, 2001, pp. 1199-1208. (Internet Publication Date: Mar. 23, 2001).
24. Mills, et. al. "Stereoscopic Identification of a Novel Catalytic Reaction of Atomic Hydrogen and the hydride ion product." *International Journal of Hydrogen Energy*, vol. 26. 2001. pp. 1041-1058. (Internet Publication Date: Mar. 23, 2001.).
23. Mills et al., "Optically Measured Power Balances of Glow Discharges of Mixtures of Argon, Hydrogen, and Potassium, Rubidium, Cesium, or Strontium Vapor," Int. J. Hydrogen Energy, vol. 27, No. 6, (2002), pp. 651-670. (Internet Publication Date: Jul. 20, 2001.).
22. Mills, "The Grand Unified Theory of Classical Quantum Mechanics," Global Foundation, Inc. Orbis Scientiae entitled the Role of Attractive and Repulsive Gravitational Forces in Cosmic Acceleration of Particles The Origin of the Cosmic Gamma Ray Bursts, (29th Conference on High Energy Physics and Cosmology Since 1964) Dr. Behram N. Kursunoglu, Chairman, Dec. 14-17, 2000, Lago Mar Resort, Fort Lauderdale, FL, Kluwer Academic/Plenum Publishers, New York, pp. 243-258. (Presented at the conference on Dec. 15, 2000. (Internet Publication Date: May 17, 2001.).
21. Mills, "The Grand Unified Theory of Classical Quantum Mechanics," Int. J. Hydrogen Energy, vol. 27, No. 5, (2002), pp. 565-590. (Internet Publication Date: Sep. 17, 2001.).
20. Mills et al., "Argon-Hydrogen-Strontium Discharge Light Source," IEEE Transactions on Plasma Science, vol. 30, No. 2, (2002), pp. 639-653. (Internet Publication Date: Dec. 7, 2000.).
19. Mills et al., "Identification of Compounds Containing Novel Hydride Ions by Nuclear Magnetic Resonance Spectroscopy," Int. J. Hydrogen Energy, vol. 26, No. 9, (2001), pp. 965-979. (Internet Publication Date: Mar. 22, 2001.).
18. Mills, "BlackLight Power Technology-A New Clean Energy Source with the Potential for Direct Conversion to Electricity," Global Foundation International Conference on "Global Warming and Energy Policy," Dr. Behram N. Kursunoglu, Chairman, Fort Lauderdale, FL, Nov. 26-28, 2000, Kluwer Academic/Plenum Publishers, New York, pp. 187-202. (Presented at the conference on Nov. 26, 2000. (Internet Publication Date: Jan. 19, 2001.).
17. Mills, "The Nature of Free Electrons in Superfluid Helium—a Test of Quantum Mechanics and a Basis to Review its Foundations and Make a Comparison to Classical Theory," Int. J. Hydrogen Energy, vol. 26, No. 10, (2001), pp. 1059-1096. (Internet Publicatinon Date: Dec. 11, 2000.).
16. Mills et al., "Excessively Bright Hydrogen-Strontium Plasma Light Source Due to Energy Resonance of Strontium with Hydrogen," J. of Plasma Physics, vol. 69, (2003), pp. 131-158. (Internet Publication Date: Aug. 27, 2001.).

15. Mills et al., "Observation of Extreme Ultraviolet Hydrogen Emission from Incandescently Heated Hydrogen Gas with Certain Catalysts," Int. J. Hydrogen Energy, vol. 25, (2000), pp. 919-943. (Internet Publication Date: Jun. 27, 2000.).

14. R. Mills, "Observation of Extreme Ultraviolet Emission from Hydrogen-KI Plasmas Produced by a Hollow Cathode Discharge," Int. J. Hydrogen Energy, vol. 26, No. 6, (2001), pp. 579-592. (Internet Publication Date: Jul. 10, 2000.).

13. Mills, "Temporal Behavior of Light-Emission in the Visible Spectral Range from a Ti-K2CO3-H-Cell," Int. J. Hydrogen Energy, vol. 26, No. 4, (2001), pp. 327-332. (Internet Publication Date: Jul. 10, 2000.).

12. Mills et al., "Formation of a Hydrogen Plasma from an Incandescently Heated Hydrogen-Catalyst Gas Mixture with an Anomalous Afterglow Duration," Int. J. Hydrogen Energy, vol. 26, No. 7, Jul. (2001), pp. 749-762. (Internet Publication Date: Jun. 28, 2000.).

11. Mills et al., "Observation of Extreme Ultraviolet Hydrogen Emission from Incandescently Heated Hydrogen Gas with Strontium that Produced an Anomalous Optically Measured Power Balance," Int. J. Hydrogen Energy, vol. 26, No. 4, (2001), pp. 309-326. (Internet Publication Date: Jun. 27, 2000.).

10. Mills et al., "Synthesis and Characterization of Potassium Iodo Hydride," Int. J. of Hydrogen Energy, vol. 25, Issue 12, Dec. (2000), pp. 1185-1203. (Internet Publication Date: Nov. 12, 2001.).

9. Mills. "Novel inorganic hydride." International Journal of Hydrogen Energy, vol. 25, 2000, pp. 669-683. (Internet Publication Date: Jun. 28, 2000).

8. Mills et al., "Synthesis and Characterization of Novel Hydride Compounds," Int. J. of Hydrogen Energy, vol. 26, No. 4, (2001), pp. 339-367. (Internet Publication Date: Jun. 13, 2001.).

7. R. Mills, "Highly Stable Novel Inorganic Hydrides," Journal of New Materials for Electrochemical Systems, vol. 6, (2003), pp. 45-54. (Internet Publication Date: Nov. 20, 2001.).

6. R. Mills, "Novel Hydrogen Compounds from a Potassium Carbonate Electrolytic Cell," Fusion Technology, vol. 37, No. 2, Mar., (2000), pp. 157-182. (Internet Publication Date: Jun. 26, 2000.).

5. Mills, "The Hydrogen Atom Revisited," Int. J. of Hydrogen Energy, vol. 25, Issue 12, Dec. (2000), pp. 1171-1183. (Internet Publication Date: Jun. 27, 2000.).

4. Mills et al., "Fractional Quantum Energy Levels of Hydrogen," Fusion Technology, vol. 28, No. 4, Nov. (1995), pp. 1697-1719. (Internet Publication Date: Nov. 1, 2001.).

3. Mills et al., "Dihydrino Molecule Identification," Fusion Technology, vol. 25, 103-119 (Jan. 1994). (Internet Publication Date: Apr. 11, 2001.).

Mills Technologies. "1KW Heat Exchanger System." *Thermacore, Inc.*, Oct. 11, 1991, pp. 1-6.

Mills Technologies. "1KW Heat Exchanger System." *Thermacore, Inc.*, Apr. 17, 1992, pp. 1-6.

Mills, "Classical Quantum Mechanics." Physica Scripta, submitted.

Mills, "The Grand Unified Theory of Classical Quantum Mechanics," (2001), Distributed by Amazon.Com.

2. Mills, et. al., "Excess heat production by electrolysis of an aquous potassium carbonate electrolyte and the implications for cold fusion," Fusion Technol. vol. 20, pp. 65-81 (1991).

Mills,. "Author's response 'A possible trick of Hydride atom'," *International Journal of Hydrogen Energy*, vol. 26, 2001, p. 1225.

Mills, "Blacklight Power Technology: A New Clean Energy Source with the Potential for Direct Conversion to Electricity," *International Conference on Global Warming and Energy Policy*, Ft. Lauderdale, Florida, Nov. 26-28, 2000. Internet Publication Jan. 19, 2001.

Mills, "Hydro catalysis Power Technology," *Statement of Dr. Randell L. Mills*, May, 1993.

Mills, "The Grand Unified Theory of Classical Quantum Mechanics," pp. 1-9.

Mills, "Unification of Spacetime, the Forces, Matter, Energy, Hydro catalysis Power Corporation," 1992, pp. 53-84.

Mills, "Author's response to 'Hydrino atom: novel chemistry or invalid physics'," *International Journal of Hydrogen Energy*, vol. 26, 2001, pp. 1233.

Mills,"Author's response to 'Hydrino theory- a proposed amendment'," *International Journal of Hydrogen Energy*, vol. 26, 2001, pp. 1229-1231.

Mills."Power Spectrum of the Cosmic Microwave Background" *Blacklight Power, Inc.* 2001.

Mills, "The Grand Unified Theory of Classical Quantum Mechanics," pp. 13-14, BlackLight Power, Inc., pp. 433-440, 2001.

Letter from Shelby T. Brewer to the Honorable James E. Rogan, Dec. 21, 2001 and PTO response from Jason C. Roe, Apr. 24, 2002 (see Attachment A).

Park, "Patent Nonsense, Court Denies Blacklight Power Appeal," What's New, Sep. 6, 2002, www.aps.org.WN/WN02/wn090602.html (see Attachment C).

Randi, "Houdini and the Rabbi, The Patent Office Again, A Perpetual Motion/Emotion Car Breaks Down . . . ," Swift, Sep. 20, 2002, www.randi.org/jr/092002.html (see Attachment C).

Voss, "New Physics' Finds a Haven At the Patent Office," Science, vol. 284, pp. 1252-1254, May 21, 1999 (see Attachment D).

PTO Memorandum for All Employees: Media Contact Policy from Acting Assistant Secretary of Commerce and Acting Commissioner of patents and Trademarks, Jun. 22, 1999.

Letter from Jeffrey S. Melcher to Ms. Esther Kepplinger, Feb. 28, 2000 (see Attachment G).

Internet Discussion Forum, "Two Brand New Papers out at BLP's "What's New" page," message No. 7191 on Hydrino Study Group, http://groups.yahoo.com/group/hyrino/message/7191, Sep. 27, 2003 (see Attachment H).

Internet Discussion Forum, "Even Skeptics can lose Objectivity," message No. 7410 on Hydrino Study Group, http://groups.yahoo.com/group/hyrino/message/7410, Oct. 27, 2003 (see Attachment H).

Internet Discussion Forum, "Two Competing Views of Reality Engage in a Battle for Total Control of Oour Physics Paradigm," Hydrino Study Group, http://www.hydrino.org (see Attachment H)

Internet Discussion Forum, "Zimmerman's APS Centennial Meeting Talk," Transcript from Tom Stolper, Nov. 10, 2003 (see Attachment H).

Internet Discussion Forum, "Zimmerman's APS Centennial Meeting Talk," Transcript from Peter Zimmerman and Tom Stopler, Oct. 29, 2003 (see Attachment H).

Internet Discussion Forum, "Zimmerman's APS Centennial Meeting Talk," Transcript from Tom Stolper, Oct. 28, 2003 (see Attachment H).

Internet Discussion Forum, "HSG: Even skeptics can lose objectivity," Transcript from Steve Menton, Oct. 26, 2003 (see Attachment H).

Internet Discussion Forum, "HSG: Zimmerman's Insincere Questions," Transcript from Peter Zimmerman and Steve Menton, Sep. 25, 2003 (see Attachment H).

Internet Discussion Forum, "Re: Re: Zero Electrostatic Self-Interaction Justified," Transcript from Peter Zimmerman, May 22, 2003 http:groups.yahoo.com/group/hydrino/message/6052 (see Attachment H).

Internet Discussion Forum, "HSG: Re: Bool Review by Dr. John Farrell," Transcript from Peter Zimmerman, Feb. 23, 2004 (see Attachment H).

"Regarding PZ's Departing Post," includes many public posts on hydrino study group. pp. 1-75 (see Attachment I).

Park, "Perpetual Motion: Still Going Around," Special to the Washington Post, Jan. 12, 2000, p. H03 (see Attachment J).

Letter from Jeffrey S. Melcher to Ms. Esther Kepplinger with Attachments A-E, Jan. 19, 2001(see Attachment K).

Platt, "Testing the Current," The Washington Post, Jun. 25, 2000, p. X05 (see Attachment M).

USPTO Communication re Interview scheduled for Feb. 21, 2003, Feb. 12, 2001(see Attachment N).

Letter from Senator Ron Wyden to the Honorable Todd Q. Dickinson with attachments, Apr. 5, 2000 (see Attachment O).

Letter from Senator Robert G. Torricelli to Nicholas P. Godici with attachments, Jul. 20, 2001(see Attachment O).

Letter from Senator Jon S. Corzine to the Honorable Todd Q. Dickinson with attachments, Aug. 2, 2001 (see Attachment O).

Letter from Senator Max Cleland to Ms. Jane Cooksey with attachments, Mar. 24, 2000 (see Attachment O).

Letter from Senators Max Cleland and Ron Wyden to Chairman Patrick Leahy, Dec. 20, 2001 (see Attachment O).

Letter from Senators Max Cleland and Ron Wyden to the Honorable Donald L. Evans, Dec. 20, 2001 (see Attachment O).

Letter from Senators Jon S. Corzine and Robert G. Torricelli to the Honorable Donald L. Evans, Dec. 21, 2001 (see Attachment O).

Email re Interview Summary from Jeffrey Simenauer to Ted Liu, Feb. 13, 2003 (see Attachment P).

"APS E-Board Pases Resolution on Perpetual Motion Machines," APS News Online, Aug./Sep. 2002, http://www.eps.org/aps/apsnews/0802/080212.html (see Attachment Q).

Letter from Elizabeth Barlow to John Allen, Mar. 17, 2004 (see Attachment R).

Letters from John Allen to Office of Counsel, US Department of Commerce with attachments, May 12, 2003, Jun. 7, 2003, and Mar. 10, 2004 (see Attachment R).

Brookhaven National Laboratory letter dated Oct. 16, 1991 to Dr. Walter Polansky, U.S. Department of Energy.

"Charles Evans & Associates —Time of Flight-Secondary Ion Mass Spectroscopy Report".

Charles Evans & Associates—Report re "XPS/ESCA Results," Nov. 3, 1994.

"Rule 132 Declaration of Dr. Randell L. Mills," dated Oct. 3, 2007.

"Second Declaration of Randell L. Mills, M.D. under 37 C.F.R. 1.132," dated Mar. 13, 1998.

"Declaration of Dr. Jonathan Phillips," dated Jul. 20, 2000.

"Declaration of Michael G. Jacox," dated Jul. 25, 2000.

"Declaration of Dr. Bala Dhandapani," dated Aug. 14, 2000.

"Declaration of Dr. Gary L. Turner," dated May 18, 2000.

"Declaration of Robert M. Shaubach and Nelson J. Gernert Under 37 C.F.R. 1.132," dated Mar. 10, 1998.

Declaration of Robert M. Shaubach and Nelson J. Gernert, dated Aug. 24, 1992.

Declaration of Sergei B. Nesterov and Alexei P. Kryukov, dated Feb. 26, 1993.

Idaho National Engineering Laboratory, "Experimental Verification".

Mills Statement Before the Subcommittee on Energy, May 5, 1993.

Phillips et al., "Report on Calorimetric Investigations of Gas-Phase Catalyzed Hydrino Formation," Final Report for period Oct.-Dec. 1996.

Phillips et al., "Calorimetric Study of the Gas Phase Production of Hydrinos," Report to HydroCatalysis Power Corporation, Oct. 1996.

* cited by examiner

MOLECULAR HYDROGEN LASER

TABLE OF CONTENTS

I. INTRODUCTION
  1. Field of the Invention
  2. Background of the Invention
    2.1 Hydrinos
    2.2 Dihydrino Molecular Ion, Dihydrino Molecule, and Hydrino Hydride Ion
    2.3 Hydrogen Plasma
    2.4 UV and EUV Laser II. SUMMARY OF THE INVENTION
  1. Catalysis of Hydrogen to Form Novel Hydrogen Species and Compositions of Matter Comprising New Forms of Hydrogen
  2. Hydrogen Power and Plasma Cell and Reactor
  3. Catalysts
    3.1 Atoms and Ions Catalysts
    3.2 Hydrino Catalysts
  4. Adjustment of Catalysis Rate
  5. Noble Gas Catalysts
  6. Spontaneous-Emission Light Source and Light from Hydrogen Catalysis
  7. Energy Reactor
  8. Hydrogen Microwave Plasma and Power Cell and Reactor
  9. Hydrogen Capacitively and Inductively Coupled RF Plasma and Power Cell and Reactor
  10. Molecular Hydrogen Laser

III. BRIEF DESCRIPTION OF THE DRAWINGS

IV. DETAILED DESCRIPTION OF THE INVENTION
  1. Power and Plasma Cell and Reactor
    1.1. Hydrogen Plasma Electrolysis Power and Plasma Cell and Reactor
    1.2 Hydrogen Gas Power and Plasma Cell and Reactor
    1.3 Hydrogen Gas Discharge Power and Plasma Cell and Reactor
    1.4 Hydrogen Radio Frequency (RF) Barrier Electrode Discharge Power and Plasma Cell and Reactor
    1.5 Hydrogen Plasma Torch Power and Plasma Cell and Reactor
  2. Hydrogen RF and Microwave Power and Plasma Cell and Reactor
  3. Hydrogen Capacitively and Inductively Coupled RF Plasma and Power Cell and Reactor
  4. Plasma Confinement by Spatially Controlling Catalysis
  5. Hydrogen Multicusp Power and Plasma Cell and Reactor
  6. Hydrogen Laser
  7. EXPERIMENTAL

I. INTRODUCTION

1. Field of the Invention

Lithography, the technique for manufacturing microelectronics semiconductor devices such as processors and memory chips, presently uses deep UV radiation at 193 nm from the ArF excimer laser. Future sources are $F_2$ lasers at 157 nm and perhaps $H_2$ lasers at 127 nm. Advancements in light sources are required in order to achieve the steady reduction in the size of integrated circuits. Only a free electron laser (FEL) with a minimum beam energy of 500 MeV appears suitable as a light source for the Next Generation Lithography (NGL) based on EUV lithography (13.5 nm) [J. E. Bjorkholm, "EUV lithography—the successor to optical lithography?", Intel Technology Journal, Q3, (1998), pp. 1-8; K. Hesch, E. Pellegrin, R. Rossmanith, R. Steininger, V. Saile, J. Wust, G. Dattoli, A. Doria, G. Gallerano, L. Giannessi, P. Ottaviani, H. Moser, "Extreme ultraviolet (EUV) sources based on synchrotron radiation", Proceedings of the 2001 Particle Accelerator Conference, Chicago, pp. 654-656]. The opportunity exists to replace a FEL that occupies the size of a large building with a table-top laser based on vibration-rotational-state inversion of $H_2(1/13)$ that can lase in the desired 10 to 14 nm range.

This invention relates to a laser based on hydrogen molecules designated $H_2(1/p)$ wherein the internuclear distance of each is about a reciprocal integer p times that of ordinary $H_2$. The $H_2(1/p)$ molecules are vibration-rotationally excited and lase with a transition from a vibration-rotational level to another lower-energy-level other than one with a significant Boltzmann population at the cell neutral-gas temperature such as one with both v and J=0. The lasing medium comprising $H_2(1/p)$ may be supplied from an external source or generated internally or insitu by the catalysis of atomic hydrogen to form $H(1/p)$ that further reacts to form $H_2(1/p)$. The invention comprises a power source that is at least one of an external source and a cell for the catalysis of atomic hydrogen to form novel hydrogen species and/or compositions of matter comprising new forms of hydrogen such as a source of $H_2(1/p)$ and $H_2(1/p)$. The reaction to form and excite $H_2(1/p)$ may be maintained by an electron beam, microwave, or glow discharge plasma of hydrogen and a source of catalyst. The power from the catalysis of hydrogen and external power may create vibration-rotationally excited comprising an inverted population of $H_2(1/p)$ capable of lasing. The $H_2(1/p)$ laser has an application as a light source for photolithography at short wavelengths.

2. Background of the Invention
  2.1 Hydrinos
  A hydrino atom having a binding energy given by $$\text{Binding Energy} = \frac{13.6 \text{ eV}}{\left(\frac{1}{p}\right)^2} \qquad (1)$$

where p is an integer greater than 1, preferably from 2 to 200, is disclosed in R. Mills, *The Grand Unified Theory of Classical Quantum Mechanics*, January 2004 Edition, BlackLight Power, Inc., Cranbury, N.J., ("'04 Mills GUT"), provided by BlackLight Power, Inc., 493 Old Trenton Road, Cranbury, N.J., 08512 (posted at www.blacklightpower.com); R. Mills, *The Grand Unified Theory of Classical Quantum Mechanics*, September 2003 Edition, BlackLight Power, Inc., Cranbury, N.J., ("'03 Mills GUT"), provided by BlackLight Power, Inc., 493 Old Trenton Road, Cranbury, N.J., 08512; R. Mills, *The Grand Unified Theory of Classical Quantum Mechanics*, September 2002 Edition, BlackLight Power, Inc., Cranbury, N.J., ("'02 Mills GUT"), provided by BlackLight Power, Inc., 493 Old Trenton Road, Cranbury, N.J., *The Grand Unified Theory of Classical Quantum Mechanics*, September 2001 Edition, BlackLight Power, Inc., Cranbury, N.J., Distributed by Amazon.com ("'01 Mills GUT"), provided by BlackLight Power, Inc., 493 Old Trenton Road, Cranbury, N.J., 08512; R. Mills, *The Grand Unified Theory of Classical Quantum Mechanics*, January 2000 Edition, Black- Light Power, Inc., Cranbury, N.J., Distributed by Amazon.com ("'00 Mills GUT"), provided by BlackLight Power, Inc., 493 Old Trenton Road, Cranbury, N.J., 08512; R. L. Mills, "Maxwell's. Equations and QED: Which is Fact and Which is Fiction", Physica Scripta, submitted; R. L. Mills, "Exact Classical Quantum Mechanical Solution for Atomic Helium Which Predicts Conjugate Parameters from a Unique Solution for the First Time", Progress of Physics, submitted; J. Phillips, C-K Chen, R. Mills, "Evidence of catalytic Production of Hot Hydrogen in RF Generated Hydrogen/Argon Plasmas", IEEE Transactions on Plasma Science, submitted; R. L. Mills, Y. Lu, M. Nansteel, J. He, A. Voigt, W. Good, B. Dhandapani, "Energetic Catalyst-Hydrogen Plasma Reaction as a Potential New Energy Source", Division of Fuel Chemistry, Session: Advances in Hydrogen Energy, 228th American Chemical Society National Meeting, Aug. 22-26, 2004, Philadelphia, Pa.; R. Mills, B. Dhandapani, W. Good, J. He, "New States of Hydrogen Isolated from $K_2CO_3$ Electrolysis Gases", Chemical Engineering Science, submitted; R. L. Mills, "Exact Classical Quantum Mechanical Solutions for One-Through Twenty-Electron Atoms", Physics Essays, submitted; R. L. Mills, Y. Lu, M. Nansteel, J. He, A. Voigt, B. Dhandapani, "Energetic Catalyst-Hydrogen Plasma Reaction as a Potential New Energy Source", Division of Fuel Chemistry, Session: Chemistry of Solid, Liquid, and Gaseous Fuels, 227th American Chemical Society National Meeting, Mar. 28-Apr. 1, 2004, Anaheim, Calif.; R. Mills, B. Dhandapani, J. He, "Highly Stable Amorphous Silicon Hydride from a Helium Plasma Reaction", Materials Chemistry and Physics, submitted; R. L. Mills, Y. Lu, B. Dhandapani, "Spectral Identification of $H_2(1/2)$", submitted; R. L. Mills, Y. Lu, J. He, M. Nansteel, P. Ray, X. Chen, A. Voigt. B. Dhandapani, "Spectral Identification of New States of Hydrogen", New Journal of Chemistry, submitted; R. Mills, P. Ray, B. Dhandapani, "Evidence of an Energy Transfer Reaction Between Atomic Hydrogen and Argon II or Helium II as the Source of Excessively Hot H Atoms in RF Plasmas", Contributions to Plasma Physics, submitted; J. Phillips, C. K. Chen, R. Mills, "Evidence of the Production of Hot Hydrogen Atoms in RF Plasmas by Catalytic Reactions Between Hydrogen and Oxygen Species", Spectrochimica Acta Part B: Atomic Spectroscopy, submitted; R. L. Mills, P. Ray, B. Dhandapani, "Excessive Balmer α Line Broadening of Water-Vapor Capacitively-Coupled RF Discharge Plasmas" IEEE Transactions on Plasma Science, submitted; R. L. Mills, "The Nature of the Chemical Bond Revisited and an Alternative Maxwellian Approach", Physics Essays, submitted; R. L. Mills, P. Ray, M. Nansteel, J. He, X. Chen, A. Voigt, B. Dhandapani, "Energetic Catalyst-Hydrogen Plasma Reaction Forms a New State of Hydrogen", Doklady Chemistry, submitted; R. L. Mills, P. Ray, M. Nansteel, J. He, X. Chen, A. Voigt, B. Dhandapani, Luca Gamberale, "Energetic Catalyst-Hydrogen Plasma Reaction as a Potential New Energy Source", Central European Journal of Physics, submitted; R. Mills, P. Ray, "New H I Laser Medium Based on Novel Energetic Plasma of Atomic Hydrogen and Certain Group I Catalysts", J. Plasma Physics, submitted; R. L. Mills, P. Ray, M. Nansteel, J. He, X. Chen, A. Voigt, B. Dhandapani, ""Characterization of an Energetic Catalyst-Hydrogen Plasma Reaction as a Potential New Energy Source", Am. Chem. Soc. Div. Fuel Chem. Prepr., Vol. 48, No. 2, (2003); R. Mills, P. C. Ray, M. Nansteel, W. Good, P. Jansson, B. Dhandapani, J. He, "Hydrogen Plasmas Generated Using Certain Group I Catalysts Show Stationary Inverted Lyman Populations and Free-Free and Bound-Free Emission of Lower-Energy State Hydride", Fizika A, submitted; R. Mills, J. Sankar, A. Voigt, J. He, P. Ray, B. Dhandapani, "Role of Atomic Hydrogen Density and Energy in Low Power CVD Synthesis of Diamond Films", Thin Solid Films, submitted; R. Mills, B. Dhandapani, M. Nansteel, J. He, P. Ray, "Liquid-Nitrogen-Condensable Molecular Hydrogen Gas Isolated from a Catalytic Plasma Reaction", J. Phys. Chem. B, submitted; R. L. Mills, P. Ray, J. He, B. Dhandapani, M. Nansteel, "Novel Spectral Series from Helium-Hydrogen Evenson Microwave Cavity Plasmas that Matched Fractional-Principal-Quantum-Energy-Level Atomic and Molecular Hydrogen", European Journal of Physics, submitted; R. L. Mills, P. Ray, R. M. Mayo, Highly Pumped Inverted Balmer and Lyman Populations, New Journal of Physics, submitted; R. L. Mills, P. Ray, J. Dong, M. Nansteel, R. M. Mayo, B. Dhandapani, X. Chen, "Comparison of Balmer α Line Broadening and Power Balances of Helium-Hydrogen Plasma Sources", Braz. J. Phys., submitted; R. Mills, P. Ray, M. Nansteel, R. M. Mayo, "Comparison of Water-Plasma Sources of Stationary Inverted Balmer and Lyman Populations for a CW HI Laser", J. Appl. Spectroscopy, in preparation; R. Mills, J. Sankar, A. Voigt, J. He, P. Ray, B. Dhandapani, "Synthesis and Characterization of Diamond Films from MPCVD of an Energetic Argon-Hydrogen Plasma and Methane", J. of Materials Research, submitted; R. Mills, P. Ray, B. Dhandapani, W. Good, P. Jansson, M. Nansteel, J. He, A. Voigt, "Spectroscopic and NMR Identification of Novel Hydride Ions in Fractional Quantum Energy States Formed by an Exothermic Reaction of Atomic Hydrogen with Certain Catalysts", European Physical Journal-Applied Physics, Vol. 28, (2004), pp. 83-104; R. L. Mills, The Fallacy of Feynman's Argument on the Stability of the Hydrogen Atom According to Quantum Mechanics, Fondation Louis de Broglie, submitted; R. Mills, J. He, B. Dhandapani, P. Ray, "Comparison of Catalysts and Microwave Plasma Sources of Vibrational Spectral Emission of Fractional-Rydberg-State Hydrogen Molecular Ion", Canadian Journal of Physics, submitted; R. L. Mills, P. Ray, X. Chen, B. Dhandapani, "Vibrational Spectral Emission of Fractional-Principal-Quantum-Energy-Level Molecular Hydrogen", J. of the Physical Society of Japan, submitted; J. Phillips, R. L. Mills, X. Chen, "Water Bath Calorimetric Study of Excess Heat in 'Resonance Transfer' Plasmas", Journal of Applied Physics, Vol. 96, No. 6, pp. 3095-3102; R. L. Mills, P. Ray, B. Dhandapani, X. Chen, "Comparison of Catalysts and Microwave Plasma Sources of Spectral Emission of Fractional-Principal-Quantum-Energy-Level Atomic and Molecular Hydrogen", Journal of Applied Spectroscopy, submitted; R. L. Mills, B. Dhandapani, M. Nansteel, J. He, P. Ray, "Novel Liquid-Nitrogen-Condensable Molecular Hydrogen Gas", Acta Physica Polonica A, submitted; R. L. Mills, P. C. Ray, R. M. Mayo, M. Nansteel, B. Dhandapani, J. Phillips, "Spectroscopic Study of Unique Line Broadening and Inversion in Low Pressure Microwave Generated Water Plasmas", J. Plasma Physics, submitted; R. L. Mills, P. Ray, B. Dhandapani, J. He, "Energetic Helium-Hydrogen Plasma Reaction", AIAA Journal, submitted; R. L. Mills, M. Nansteel, P. C. Ray, "Bright Hydrogen-Light and Power Source due to a Resonant Energy Transfer with Strontium and Argon Ions", Vacuum, submitted; R. L. Mills, P. Ray, B. Dhandapani, J. Dong, X. Chen, "Power Source Based on Helium-Plasma Catalysis of Atomic Hydrogen to Fractional Rydberg States", Contributions to Plasma Physics, submitted; R. Mills, J. He, A. Echezuria, B Dhandapani, P. Ray, "Comparison of Catalysts and Plasma Sources of Vibrational Spectral Emission of Fractional-Rydberg-State Hydrogen Molecular Ion", European Journal of Physics D, submitted; R. L. Mills, J. Sankar, A. Voigt, J. He, B. Dhandapani, "Spectroscopic Characterization of the Atomic Hydrogen Energies and Densities and Carbon Species During Helium-Hydrogen-Methane Plasma CVD Synthesis of Diamond Films", Chemistry of Materials, Vol. 15, (2003), pp. 1313-1321; R. Mills, P. Ray, R. M. Mayo, "Stationary Inverted Balmer and Lyman Populations for a CW HI Water-Plasma Laser", IEEE Transactions on Plasma Science, submitted; R. L. Mills, P. Ray, "Extreme Ultraviolet Spectroscopy of Helium-Hydrogen Plasma", J. Phys. D, Applied Physics, Vol. 36, (2003), pp. 1535-1542; R. L. Mills, P. Ray, "Spectroscopic Evidence for a Water-Plasma Laser", Europhysics Letters, submitted; R. Mills, P. Ray, "Spectroscopic Evidence for Highly Pumped Balmer and Lyman Populations in a Water-Plasma", J. of Applied Physics, submitted; R. L. Mills, J. Sankar, A. Voigt, J. He, B. Dhandapani, "Low Power MPCVD of Diamond Films on Silicon Substrates", Journal of Vacuum Science & Technology A, submitted; R. L. Mills, X. Chen, P. Ray, J. He, B. Dhandapani, "Plasma Power Source Based on a Catalytic Reaction of Atomic Hydrogen Measured by Water Bath Calorimetry", Thermochimica Acta, Vol. 406/1-2, (2003), pp. 35-53; R. L. Mills, A. Voigt, B. Dhandapani, J. He, "Synthesis and Spectroscopic Identification of Lithium Chloro Hydride", Materials Characterization, submitted; R. L. Mills, B. Dhandapani, J. He, "Highly Stable Amorphous Silicon Hydride", Solar Energy Materials & Solar Cells, Vol. 80, No. 1, pp. 1-20; R. L. Mills, J. Sankar, P. Ray, A. Voigt, J. He, B. Dhandapani, "Synthesis of HDLC Films from Solid Carbon", Journal of Material Science, Vol. 39, (2004), pp. 3309-3318; R. Mills, P. Ray, R. M. Mayo, "The Potential for a Hydrogen Water-Plasma Laser", Applied Physics Letters, Vol. 82, No. 11, (2003), pp. 1679-1681; R. L. Mills, "Classical Quantum Mechanics", Physics Essays, in press; R. L. Mills, P. Ray, "Spectroscopic Characterization of Stationary Inverted Lyman Populations and Free-Free and Bound-Free Emission of Lower-Energy State Hydride-Ion Formed by a Catalytic Reaction of Atomic Hydrogen and Certain Group I Catalysts", Journal of Quantitative Spectroscopy and Radiative Transfer, No. 39, sciencedirect.com, Apr. 17, (2003); R. M. Mayo, R. Mills, "Direct Plasmadynamic Conversion of Plasma Thermal Power to Electricity for Microdistributed Power Applications", 40th Annual Power Sources Conference, Cherry Hill, N.J., Jun. 10-13, (2002), pp. 1-4; R. Mills, P. Ray, R. M. Mayo, "Chemically-Generated Stationary Inverted Lyman Population for a CW HI Laser", European J of Phys. D, submitted; R. L. Mills, P. Ray, "Stationary Inverted Lyman Population Formed from Incandescently Heated Hydrogen Gas with Certain Catalysts", J. Phys. D, Applied Physics, Vol. 36, (2003), pp. 1504-1509; R. Mills, "A Maxwellian Approach to Quantum Mechanics Explains the Nature of Free Electrons in Superfluid Helium", Low Temperature Physics, submitted; R. Mills and M. Nansteel, P. Ray, "Bright Hydrogen-Light Source due to a Resonant Energy Transfer with Strontium and Argon Ions", New Journal of Physics, Vol. 4, (2002), pp. 70.1-70.28; R. Mills, P. Ray, R. M. Mayo, "CW HI Laser Based on a Stationary Inverted Lyman Population Formed from Incandescently Heated Hydrogen Gas with Certain Group I Catalysts", IEEE Transactions on Plasma Science, Vol. 31, No. 2, (2003), pp. 236-247; R. L. Mills, P. Ray, J. Dong, M. Nansteel, B. Dhandapani, J. He, "Spectral Emission of Fractional-Principal-Quantum-Energy-Level Atomic and Molecular Hydrogen", Vibrational Spectroscopy, Vol. 31, No. 2, (2003), pp. 195-213; R. L. Mills, P. Ray, B. Dhandapani, J. He, "Comparison of Excessive Balmer α Line Broadening of Inductively and Capacitively Coupled RF, Microwave, and Glow Discharge Hydrogen Plasmas with Certain Catalysts", IEEE Transactions on Plasma Science, Vol. 31, No. (2003), pp. 338-355; R. M. Mayo, R. Mills, M. Nansteel, "Direct Plasmadynamic Conversion of Plasma Thermal Power to Electricity", IEEE Transactions on Plasma Science, October, (2002), Vol. 30, No. 5, pp. 2066-2073; H. Conrads, R. Mills, Th. Wrubel, "Emission in the Deep Vacuum Ultraviolet from a Plasma Formed by Incandescently Heating Hydrogen Gas with Trace Amounts of Potassium Carbonate", Plasma Sources Science and Technology, Vol. 12, (2003), pp. 389-395; R. L. Mills, P. Ray, "Stationary Inverted Lyman Population and a Very Stable Novel Hydride Formed by a Catalytic Reaction of Atomic Hydrogen and Certain Catalysts", Optical Materials, in press; R. L. Mills, J. He, P. Ray, B. Dhandapani, X. Chen, "Synthesis and Characterization of a Highly Stable Amorphous Silicon Hydride as the Product of a Catalytic Helium-Hydrogen Plasma Reaction", Int. J. Hydrogen Energy, Vol. 28, No. 12, (2003), pp. 1401-1424; R. L. Mills, A. Voigt, B. Dhandapani, J. He, "Synthesis and Characterization of Lithium Chloro Hydride", Int. J. Hydrogen Energy, submitted; R. L. Mills, P. Ray, "Substantial Changes in the Characteristics of a Microwave Plasma Due to Combining Argon and Hydrogen", New Journal of Physics, www.njp.org, Vol. 4, (2002), pp. 22.1-22.17; R. L. Mills, P. Ray, "A Comprehensive Study of Spectra of the Bound-Free Hyperfine Levels of Novel Hydride Ion $H^-(1/2)$, Hydrogen, Nitrogen, and Air", Int. J. Hydrogen Energy, Vol. 28, No. 8, (2003), pp. 825-871; R. L. Mills, E. Dayalan, "Novel Alkali and Alkaline Earth Hydrides for High Voltage and High Energy Density Batteries", Proceedings of the 17$^{th}$ Annual Battery Conference on Applications and Advances, California State University, Long Beach, Calif., (Jan. 15-18, 2002), pp. 1-6; R. M. Mayo, R. Mills, M. Nansteel, "On the Potential of Direct and MHD Conversion of Power from a Novel Plasma Source to Electricity for Microdistributed Power Applications", IEEE Transactions on Plasma Science, August, (2002), Vol. 30, No. 4, pp. 1568-1578; R. Mills, P. C. Ray, R. M. Mayo, M. Nansteel, W. Good, P. Jansson, B. Dhandapani, J. He, "Stationary Inverted Lyman Populations and Free-Free and Bound-Free Emission of Lower-Energy State Hydride Ion Formed by an Exothermic Catalytic Reaction of Atomic Hydrogen and Certain Group I Catalysts", J. Phys. Chem. A, submitted; R. Mills, E. Dayalan, P. Ray, B. Dhandapani, J. He, "Highly Stable Novel Inorganic Hydrides from Aqueous Electrolysis and Plasma Electrolysis", Electrochimica Acta, Vol. 47, No. 24, (2002), pp. 3909-3926; R. L. Mills, P. Ray, B. Dhandapani, R. M. Mayo, J. He, "Comparison of Excessive Balmer a Line Broadening of Glow Discharge and Microwave Hydrogen Plasmas with Certain Catalysts", J. of Applied Physics, Vol. 92, No. 12, (2002), pp. 7008-7022; R. L. Mills, P. Ray, B. Dhandapani, J. He, "Emission Spectroscopic Identification of Fractional Rydberg States of Atomic Hydrogen Formed by a Catalytic Helium-Hydrogen Plasma Reaction", —Vacuum, submitted; R. L. Mills, P. Ray, B. Dhandapani, M. Nansteel, X. Chen, J. He, "New Power Source from Fractional Rydberg States of Atomic Hydrogen", Current Applied Physics, submitted; R. L. Mills, P. Ray, B. Dhandapani, M. Nansteel, X. Chen, J. He, "Spectroscopic Identification of Transitions of Fractional Rydberg States of Atomic Hydrogen", J. of Quantitative Spectroscopy and Radiative Transfer, in press; R. L. Mills, P. Ray, B. Dhandapani, M. Nansteel, X. Chen, J. He, "New Power Source from Fractional Quantum Energy Levels of Atomic Hydrogen that Surpasses Internal Combustion", J Mol. Struct., Vol. 643, No. 1-3, (2002), pp. 43-54; R. L. Mills, P. Ray, "Spectroscopic Identification of a Novel Catalytic Reaction of Rubidium Ion with Atomic Hydrogen and the Hydride Ion Product", Int. J. Hydrogen Energy, Vol. 27, No. 9, (2002), pp. 927-935; R. Mills, J. Dong, W. Good, P. Ray, J. He, B. Dhandapani, "Measurement of Energy Balances of Noble Gas-Hydrogen Discharge Plasmas Using Calvet Calorimetry", Int. J. Hydrogen Energy, Vol. 27, No. 9, (2002), pp. 967-978; R. L. Mills, A. Voigt, P. Ray, M. Nansteel, B. Dhandapani, "Measurement of Hydrogen Balmer Line Broadening and Thermal Power Balances of Noble Gas-Hydrogen Discharge Plasmas", Int. J. Hydrogen Energy, Vol. 27, No. 6, (2002), pp. 671-685; R. Mills, P. Ray, "Vibrational Spectral Emission of Fractional-Principal-Quantum-Energy-Level Hydrogen Molecular Ion", Int. J. Hydrogen Energy, Vol. 27, No. 5, (2002), pp. 533-564; R. Mills, P. Ray, "Spectral Emission of Fractional Quantum Energy Levels of Atomic Hydrogen from a Helium-Hydrogen Plasma and the Implications for Dark Matter", Int. J. Hydrogen Energy, (2002), Vol. 27, No. 3, pp. 301-322; R. Mills, P. Ray, "Spectroscopic Identification of a Novel Catalytic Reaction of Potassium and Atomic Hydrogen and the Hydride Ion Product", Int. J. Hydrogen Energy, Vol. 27, No. 2, (2002), pp. 183-192; R. Mills, "BlackLight Power Technology—A New Clean Hydrogen Energy Source with the Potential for Direct Conversion to Electricity", Proceedings of the National Hydrogen Association, 12 th Annual U.S. Hydrogen Meeting and Exposition, *Hydrogen: The Common Thread*, The Washington Hilton and Towers, Washington D.C., (Mar. 6-8, 2001), pp. 671-697; R. Mills, W. Good, A. Voigt, Jinquan Dong, "Minimum Heat of Formation of Potassium Iodo Hydride", Int. J. Hydrogen Energy, Vol. 26, No. 11, (2001), pp. 1199-1208; R. Mills, "Spectroscopic Identification of a Novel Catalytic Reaction of Atomic Hydrogen and the Hydride Ion Product", Int. J. Hydrogen Energy, Vol. 26, No. 10, (2001), pp. 1041-1058; R. Mills, N. Greenig, S. Hicks, "Optically Measured Power Balances of Glow Discharges of Mixtures of Argon, Hydrogen, and Potassium, Rubidium, Cesium, or Strontium Vapor", Int. J. Hydrogen Energy, Vol. 27, No. 6, (2002), pp. 651-670; R. Mills, "The Grand Unified Theory of Classical Quantum Mechanics", Global Foundation, Inc. Orbis Scientiae entitled *The Role of Attractive and Repulsive Gravitational Forces in Cosmic Acceleration of Particles The Origin of the Cosmic Gamma Ray Bursts*, (29th Conference on High Energy Physics and Cosmology Since 1964) Dr. Behram N. Kursunoglu, Chairman, Dec. 14-17, 2000, Lago Mar Resort, Fort Lauderdale, Fla., Kluwer Academic/Plenum Publishers, New York, pp. 243-258; R. Mills, "The Grand Unified Theory of Classical Quantum Mechanics", Int. J. Hydrogen Energy, Vol. 27, No. 5, (2002), pp. 565-590; R. Mills and M. Nansteel, P. Ray, "Argon-Hydrogen-Strontium Discharge Light Source", IEEE Transactions on Plasma Science, Vol. 30, No. 2, (2002), pp. 639-653; R. Mills, B. Dhandapani, M. Nansteel, J. He, A. Voigt, "Identification of Compounds Containing Novel Hydride Ions by Nuclear Magnetic Resonance Spectroscopy", Int. J. Hydrogen Energy, Vol. 26, No. 9, (2001), pp. 965-979; R. Mills, "BlackLight Power Technology—A New Clean Energy Source with the Potential for Direct Conversion to Electricity", Global Foundation International Conference on "Global Warming and Energy Policy", Dr. Behram N. Kursunoglu, Chairman, Fort Lauderdale, Fla., Nov. 26-28, 2000, Kluwer Academic/Plenum Publishers, New York, pp. 187-202; R. Mills, "The Nature of Free Electrons in Superfluid Helium—a Test of Quantum Mechanics and a Basis to Review its Foundations and Make a Comparison to Classical Theory", Int. J. Hydrogen Energy, Vol. 26, No. 10, (2001), pp. 1059-1096; R. Mills, M. Nansteel, and P. Ray, "Excessively Bright Hydrogen-Strontium Plasma Light Source Due to Energy Resonance of Strontium with Hydrogen", J. of Plasma Physics, Vol. 69, (2003), pp. 131-158; R. Mills, J. Dong, Y. Lu, "Observation of Extreme Ultraviolet Hydrogen Emission from Incandescently Heated Hydrogen Gas with Certain Catalysts", Int. J. Hydrogen Energy, Vol. 25, (2000), pp. 919-943; R. Mills, "Observation of Extreme Ultraviolet Emission from Hydrogen-KI Plasmas Produced by a Hollow Cathode Discharge", Int. J. Hydrogen Energy, Vol. 26, No. 6, (2001), pp. 579-592; R. Mills, "Temporal Behavior of Light-Emission in the Visible Spectral Range from a Ti—K2CO3-H-Cell", Int. J. Hydrogen Energy, Vol. 26, No. 4, (2001), pp. 327-332; R. Mills, T. Onuma, and Y. Lu, "Formation of a Hydrogen Plasma from an Incandescently Heated Hydrogen-Catalyst Gas Mixture with an Anomalous Afterglow Duration", Int. J. Hydrogen Energy, Vol. 26, No. 7, July, (2001), pp. 749-762; R. Mills, M. Nansteel, and Y. Lu, "Observation of Extreme Ultraviolet Hydrogen Emission from Incandescently Heated Hydrogen Gas with Strontium that Produced an Anomalous Optically Measured Power Balance", Int. J. Hydrogen Energy, Vol. 26, No. 4, (2001), pp. 309-326; R. Mills, B. Dhandapani, N. Greenig, J. He, "Synthesis and Characterization of Potassium Iodo Hydride", Int. J. of Hydrogen Energy, Vol. 25, Issue 12, December, (2000), pp. 1185-1203; R. Mills, "Novel Inorganic Hydride", Int. J. of Hydrogen Energy, Vol. 25, (2000), pp. 669-683; R. Mills, B. Dhandapani, M. Nansteel, J. He, T. Shannon, A. Echezuria, "Synthesis and Characterization of Novel Hydride Compounds", Int. J. of Hydrogen Energy, Vol. 26, No. 4, (2001), pp. 339-367; R. Mills, "Highly Stable Novel Inorganic Hydrides", Journal of New Materials for Electrochemical Systems, Vol. 6, (2003), pp. 45-54; R. Mills, "Novel Hydrogen Compounds from a Potassium Carbonate Electrolytic Cell", Fusion Technology, Vol. 37, No. 2, March, (2000), pp. 157-182; R. Mills, "The Hydrogen Atom Revisited", Int. J. of Hydrogen Energy, Vol. 25, Issue 12, December, (2000), pp. 1171-1183; R. Mills, W. Good, "Fractional Quantum Energy Levels of Hydrogen", Fusion Technology, Vol. 28, No. 4, November, (1995), pp. 1697-1719; R. Mills, W. Good, R. Shaubach, "Dihydrino Molecule Identification", Fusion Technology, Vol. 25, (1994), pp. 103-119; R. Mills, S. Kneizys, Fusion Technol. Vol. 20, (1991), pp. 65-81; and in prior PCT applications PCT/US00/20820; PCT/US00/20819; PCT/US99/17171; PCT/US99/17129; PCT/US 98/22822; PCT/US98/14029; PCT/US96/07949; PCT/US94/02219; PCT/US91/08496; PCT/US90/01998; and prior U.S. patent application Ser. No. 09/225,687, filed on Jan. 6, 1999; Ser. No. 60/095,149, filed Aug. 3, 1998; Ser. No. 60/101,651, filed Sep. 24, 1998; Ser. No. 60/105,752, filed Oct. 26, 1998; Ser. No. 60/113,713, filed Dec. 24, 1998; Ser. No. 60/123,835, filed Mar. 11, 1999; Ser. No. 60/130,491, filed Apr. 22, 1999; Ser. No. 60/141,036, filed Jun. 29, 1999; Ser. No. 09/009,294 filed Jan. 20, 1998; Ser. No. 09/111,160 filed Jul. 7, 1998; Ser. No. 09/111,170 filed Jul. 7, 1998; Ser. No. 09/111,016 filed Jul. 7, 1998; Ser. No. 09/111,003 filed Jul. 7, 1998; Ser. No. 09/110,694 filed Jul. 7, 1998; Ser. No. 09/110,717 filed Jul. 7, 1998; Ser. No. 60/053,378 filed Jul. 22, 1997; Ser. No. 60/068,913 filed Dec. 29, 1997; Ser. No. 60/090,239 filed Jun. 22, 1998; Ser. No. 09/009,455 filed Jan. 20, 1998; Ser. No. 09/110,678 filed Jul. 7, 1998; Ser. No. 60/053,307 filed Jul. 22, 1997; Ser. No. 60/068,918 filed Dec. 29, 1997; Ser. No. 60/080,725 filed Apr. 3, 1998; Ser. No. 09/181,180 filed Oct. 28, 1998; Ser. No. 60/063,451 filed Oct. 29, 1997; Ser. No. 09/008,947 filed Jan. 20, 1998; Ser. No. 60/074,006 filed Feb. 9, 1998; Ser. No. 60/080,647 filed Apr. 3, 1998; Ser. No. 09/009,837 filed Jan. 20, 1998; Ser. No. 08/822,170 filed Mar. 27, 1997; Ser. No. 08/592,712 filed Jan. 26, 1996; Ser. No. 08/467,051 filed on Jun. 6, 1995; Ser. No. 08/416,040 filed on Apr. 3, 1995; Ser. No. 08/467,911 filed on Jun. 6, 1995; Ser. No. 08/107,357 filed on Aug. 16, 1993; Ser. No. 08/075,102 filed on Jun. 11, 1993; Ser. No. 07/626,496 filed on Dec. 12, 1990; Ser. No. 07/345,628 filed Apr. 28, 1989; Ser. No. 07/341,733 filed Apr. 21, 1989 the entire disclosures of which are all incorporated herein by reference (hereinafter "Mills Prior Publications").

The binding energy of an atom, ion, or molecule, also known as the ionization energy, is the energy required to remove one electron from the atom, ion or molecule. A hydrogen atom having the binding energy given in Eq. (1) is hereafter referred to as a hydrino atom or hydrino. The designation for a hydrino of radius $$\frac{a_H}{p},$$

where $a_H$ is the radius of an ordinary hydrogen atom and p is an integer, is $$H\left[\frac{a_H}{p}\right].$$

A hydrogen atom with a radius $a_H$ is hereinafter referred to as "ordinary hydrogen atom" or "normal hydrogen atom." Ordinary atomic hydrogen is characterized by its binding energy of 13.6 eV.

Hydrinos are formed by reacting an ordinary hydrogen atom with a catalyst having a net enthalpy of reaction of about $$m \cdot 27.2 \text{ eV} \tag{2a}$$

where m is an integer. This catalyst has also been referred to as an energy hole or source of energy hole in Mills earlier filed Patent Applications. It is believed that the rate of catalysis is increased as the net enthalpy of reaction is more closely matched to M·27.2 eV. It has been found that catalysts having a net enthalpy of reaction within ±10%, preferably ±5%, of m·27.2 eV are suitable for most applications.

In another embodiment, the catalyst to form hydrinos has a net enthalpy of reaction of about $$m/2 \cdot 27.2 \text{ eV} \tag{2b}$$

where m is an integer greater that one. It is believed that the rate of catalysis is increased as the net enthalpy of reaction is more closely matched to m/2·27.2 eV. It has been found that catalysts having a net enthalpy of reaction within ±10%, preferably ±5%, of m/2·27.2 eV are suitable for most applications.

A catalyst of the present invention may provide a net enthalpy of m·27.2 eV where m is an integer or m/2·27.2 eV where m is an integer greater than one by undergoing a transition to a resonant excited state energy level with the energy transfer from hydrogen. For example, He⁺ absorbs 40.8 eV during the transition from the n=1 energy level to the n=2 energy level which corresponds to 3/2·27.2 eV (m=3 in Eq. (2b)). This energy is resonant with the difference in energy between the p=2 and the p=1 states of atomic hydrogen given by Eq. (1). Thus He⁺ may serve as a catalyst to cause the transition between these hydrogen states.

A catalyst of the present invention may provide a net enthalpy of m·27.2 eV where m is an integer or m/2·27.2 eV where m is an integer greater than one by becoming ionized during resonant energy transfer. For example, the third ionization energy of argon is 40.74 eV; thus, Ar²⁺ absorbs 40.8 eV during the ionization to Ar³⁺ which corresponds to 3/2·27.2 eV (m=3 in Eq. (2b)). This energy is resonant with the difference in energy between the p=2 and the p=1 states of atomic hydrogen given by Eq. (1). Thus Ar²⁺ may serve as a catalyst to cause the transition between these hydrogen states.

This catalysis releases energy from the hydrogen atom with a commensurate decrease in size of the hydrogen atom, $r_n = na_H$. For example, the catalysis of H(n=1) to H(n=1/2) releases 40.8 eV, and the hydrogen radius decreases from $a_H$ to $\frac{1}{2}a_H$. A catalytic system is provided by the ionization of t electrons from an atom each to a continuum energy level such that the sum of the ionization energies of the t electrons is approximately m×27.2 eV where m is an integer. One such catalytic system involves potassium metal. The first, second, and third ionization energies of potassium are 4.34066 eV, 31.63 eV, 45.806 eV, respectively [D. R. Lide, CRC Handbook of Chemistry and Physics, 78 th Edition, CRC Press, Boca Raton, Fla., (1997), p. 10-214 to 10-216]. The triple ionization (t=3) reaction of K to K³⁺, then, has a net enthalpy of reaction of 81.7426 eV, which is equivalent to m=3 in EQ. (2a).

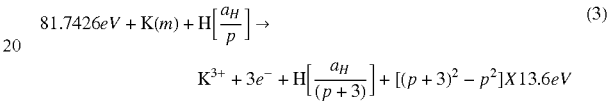

(3)

$$K^{3+} + 3e^- \rightarrow K(m) + 81.7426 \text{ eV} \tag{4}$$

And, the overall reaction is

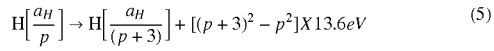

(5)

Rubidium ion (Rb⁺) is also a catalyst because the second ionization energy of rubidium is 27.28 eV. In this case, the catalysis reaction is

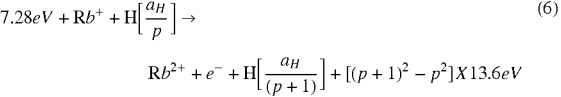

(6)

$$Rb^{2+} + e^- \rightarrow Rb^+ + 27.28 \text{ eV} \tag{7}$$

And, the overall reaction is

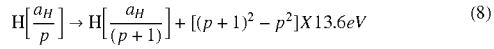

(8)

Strontium ion (Sr⁺) is also a catalyst since the second and third ionization energies of strontium are 11.03013 eV and 42.89 eV, respectively. The ionization reaction of Sr⁺ to Sr³⁺, (t=2), then, has a net enthalpy of reaction of 53.92 eV, which is equivalent to m=2 in Eq. (2a).

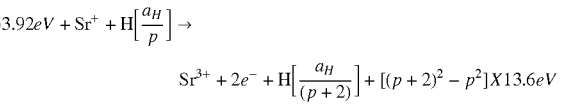

$$Sr^{3+} + 2e^- \rightarrow Sr^+ + 53.92 \text{ eV} \tag{10}$$

And, the overall reaction is $$H\left[\frac{a_H}{p}\right] \to H\left[\frac{a_H}{(p+2)}\right] + [(p+2)^2 - p^2]X13.6eV \quad (11)$$

Helium ion (He$^+$) is also a catalyst because the second ionization energy of helium is 54.417 eV. In this case, the catalysis reaction is $$54.417eV + He^+ + H\left[\frac{a_H}{p}\right] \to \quad (12)$$

$$He^{2+} + e^- + H\left[\frac{a_H}{(p+2)}\right] + [(p+2)^2 - p^2]X13.6eV$$

$$He^{2+} + e^- \to He^+ + 54.417 \text{ eV} \quad (13)$$

And, the overall reaction is $$H\left[\frac{a_H}{p}\right] \to H\left[\frac{a_H}{(p+2)}\right] + [(p+2)^2 - p^2]X13.6eV. \quad (14)$$

Argon ion is a catalyst. The second ionization energy is 27.63 eV.

$$27.63eV + Ar^+ + H\left[\frac{a_H}{p}\right] \to \quad (15)$$

$$Ar^2 + e^- + H\left[\frac{a_H}{(p+1)}\right] + [(p+1)^2 - p^2]X13.6eV$$

$$Ar^{2+} + e^- \to Ar^+ + 27.63 \text{ eV} \quad (16)$$

And, the overall reaction is $$H\left[\frac{a_H}{p}\right] \to H\left[\frac{a_H}{(p+1)}\right] + [(p+1)^2 - p^2]X13.6eV \quad (17)$$

A neon ion and a proton can also provide a net enthalpy of a multiple of that of the potential energy of the hydrogen atom. The second ionization energy of neon is 40.96 eV, and H$^+$ releases 13.6 eV when it is reduced to H. The combination of reactions of Ne$^+$ to Ne$^{2+}$ and H$^+$ to H, then, has a net enthalpy of reaction of 27.36 eV, which is equivalent to m=1 in Eq. (2a).

$$27.36eV + Ne^+ + H^+ + H\left[\frac{a_H}{p}\right] \to \quad (18)$$

$$H + Ne^2 + H\left[\frac{a_H}{(p+1)}\right] + [(p+1)^2 - p^2]X13.6eV$$

$$H + Ne^{2+} \to Ne^+ + 27.36 \text{ eV} \quad (19)$$

And, the overall reaction is $$H\left[\frac{a_H}{p}\right] \to H\left[\frac{a_H}{(p+1)}\right] + [(p+1)^2 - p^2]X13.6eV \quad (20)$$

A neon ion can also provide a net enthalpy of a multiple of that of the potential energy of the hydrogen atom. Ne$^+$ has an excited state Ne$^{+*}$ of 27.2 eV (46.5 nm) which provides a net enthalpy of reaction of 27.2 eV, which is equivalent to m=1 in Eq. (2a).

$$27.2eV + Ne^+ + H\left[\frac{a_H}{p}\right] \to \quad (21)$$

$$Ne^{+*} + H\left[\frac{a_H}{(p+1)}\right] + [(p+1)^2 - p^2]X13.6eV$$

$$Ne^{+*} \to Ne^+ + 27.2 \text{ eV} \quad (22)$$

And, the overall reaction is $$H\left[\frac{a_H}{p}\right] \to H\left[\frac{a_H}{(p+1)}\right] + [(p+1)^2 - p^2]X13.6eV \quad (23)$$

The first neon excimer continuum Ne$_2$* may also provide a net enthalpy of a multiple of that of the potential energy of the hydrogen atom. The first ionization energy of neon is 21.56454 eV, and the first neon excimer continuum Ne$_2$* has an excited state energy of 15.92 eV. The combination of reactions of Ne$_2$* to 2Ne$^+$, then, has a net enthalpy of reaction of 27.21 eV; which is equivalent to m=1 in Eq. (2a).

$$27.21eV + Ne_2* + H\left[\frac{a_H}{p}\right] \to \quad (24)$$

$$2Ne^+ + H\left[\frac{a_H}{(p+1)}\right] + [(p+1)^2 - p^2]X13.6eV$$

$$2Ne^+ \to Ne_2^* + 27.21 \text{ eV} \quad (25)$$

And, the overall reaction is $$H\left[\frac{a_H}{p}\right] \to H\left[\frac{a_H}{(p+1)}\right] + [(p+1)^2 - p^2]X13.6eV \quad (26)$$

Similarly for helium, the helium excimer continuum to shorter wavelengths He$_2$* may also provide a net enthalpy of a multiple of that of the potential energy of the hydrogen atom. The first ionization energy of helium is 24.58741 eV, and the helium excimer continuum He$_2$* has an excited state energy of 21.97 eV. The combination of reactions of He$_2$* to 2He$^+$, then, has a net enthalpy of reaction of 27.21 eV, which is equivalent to m=1 in Eq. (2a).

$$27.21eV + He_2* + H\left[\frac{a_H}{p}\right] \to \quad (27)$$

$$2He^+ + H\left[\frac{a_H}{(p+1)}\right] + [(p+1)^2 - p^2]X13.6eV$$

$$2He^+ \to He_2^* + 27.21 \text{ eV} \quad (28)$$

And, the overall reaction is $$H\left[\frac{a_H}{p}\right] \to H\left[\frac{a_H}{(p+1)}\right] + [(p+1)^2 - p^2] X 13.6 eV \quad (29)$$

Atomic hydrogen in sufficient concentration may serve as a catalyst since the ionization energy of hydrogen is 13.6 eV. Two atoms fulfill the catalyst criterion—a chemical or physical process with an enthalpy change equal to an integer multiple of 27.2 eV since together they ionize at 27.2 eV. Thus, the transition cascade for the pth cycle of the hydrogen-type atom, $$H\left[\frac{a_H}{p}\right],$$

with two hydrogen atoms, $$H\left[\frac{a_H}{1}\right],$$

as the catalyst is represented by $$27.21 eV + 2H\left[\frac{a_H}{1}\right] + H\left[\frac{a_H}{p}\right] \to \quad (30)$$
$$2H^+ + 2e^- + H\left[\frac{a_H}{(p+1)}\right] + [(p+1)^2 - p^2] X 13.6 eV$$

$$2H^+ + 2e^- \to 2H\left[\frac{a_H}{1}\right] + 27.21 eV \quad (31)$$

And, the overall reaction is $$H\left[\frac{a_H}{p}\right] \to H\left[\frac{a_H}{(p+1)}\right] + [(p+1)^2 - p] X 13.6 eV \quad (32)$$

A nitrogen molecule can also provide a net enthalpy of a multiple of that of the potential energy of the hydrogen atom. The bond energy of the nitrogen molecule is 9.75 eV, and the first and second ionization energies of the nitrogen atom are 14.53414 eV and 29.6013 eV, respectively. The combination of reactions of $N_2$ to 2N and N to $N^{2+}$, then, has a net enthalpy of reaction of 53.9 eV, which is equivalent to m=2 in EQ. (2a).

$$53.9 eV + N_2 + H\left[\frac{a_H}{p}\right] \to \quad (33)$$
$$N + N^{2+} + H\left[\frac{a_H}{(p+2)}\right] + [(p+2)^2 - p^2] X 13.6 eV$$

$$N + N^{2+} \to N_2 + 53.9 \text{ eV} \quad (34)$$

And, the overall reaction is $$H\left[\frac{a_H}{p}\right] \to H\left[\frac{a_H}{(p+2)}\right] + [(p+2)^2 - p^2] X 13.6 eV \quad (35)$$

A carbon molecule can also provide a net enthalpy of a multiple of that of the potential energy of the hydrogen atom. The bond energy of the carbon molecule is 6.29 eV, and the first and through the sixth ionization energies of a carbon atom are 11.2603 eV, 24.38332 eV, 47.8878 eV, 64.4939 eV, and 392.087 eV, respectively. The combination of reactions of $C_2$ to 2C and C to $C^{5+}$, then, has a net enthalpy of reaction of 546.40232 eV, which is equivalent to m=20 in Eq. (2a).

$$546.4 eV + C_2 + H\left[\frac{a_H}{p}\right] \to \quad (36)$$
$$C + C^{5+} + H\left[\frac{a_H}{(p+20)}\right] + [(p+20)^2 - p^2] X 13.6 eV$$

$$C + C^{5+} \to C_2 + 546.4 \text{ eV} \quad (37)$$

And, the overall reaction is $$H\left[\frac{a_H}{p}\right] \to H\left[\frac{a_H}{(p+20)}\right] + [(p+20)^2 - p^2] X 13.6 eV \quad (38)$$

An oxygen molecule can also provide a net enthalpy of a multiple of that of the potential energy of the hydrogen atom. The bond energy of the oxygen molecule is 5.165 eV, and the first and second ionization energies of an oxygen atom are 13.61806 eV and 35.11730 eV, respectively. The combination of reactions of $O_2$ to 2O and O to $O^{2+}$, then, has a net enthalpy of reaction of 53.9 eV, which is equivalent to m=2 in Eq. (2a).

$$53.9 eV + O_2 + H\left[\frac{a_H}{p}\right] \to \quad (39)$$
$$O + O^{2+} + H\left[\frac{a_H}{(p+2)}\right] + [(p+2)^2 - p^2] X 13.6 eV$$

$$O + O^{2+} \to O_2 + 53.9 \text{ eV} \quad (40)$$

And, the overall reaction is $$H\left[\frac{a_H}{p}\right] \to H\left[\frac{a_H}{(p+2)}\right] + [(p+2)^2 - p^2] X 13.6 eV \quad (41)$$

An oxygen molecule can also provide a net enthalpy of a multiple of that of the potential energy of the hydrogen atom by an alternative reaction. The bond energy of the oxygen molecule is 5.165 eV, and the first through the third ionization energies of an oxygen atom are 13.61806 eV, 35.11730 eV, and 54.9355 eV, respectively. The combination of reactions of 0, to 2O and O to $O^{3+}$, then, has a net enthalpy of reaction of 108.83 eV, which is equivalent to m=4 in Eq. (2a).

$$108.83 \text{ eV} + O_2 + H\left[\frac{a_H}{p}\right] \to \quad (42)$$
$$O + O^{3+} + H\left[\frac{a_H}{(p+4)}\right] + [(p+4)^2 - p^2] X 13.6 \text{ eV}$$

$$O + O^{3+} \to O_2 + 108.83 \text{ eV} \quad (43)$$

And, the overall reaction is $$H\left[\frac{a_H}{p}\right] \rightarrow H\left[\frac{a_H}{(p+4)}\right] + [(p+4)^2 - p^2] X 13.6 \text{ eV} \quad (44)$$

An oxygen molecule can also provide a net enthalpy of a multiple of that of the potential energy of the hydrogen atom by an alternative reaction. The bond energy of the oxygen molecule is 5.165 eV, and the first through the fifth ionization energies of an oxygen atom are 13.61806 eV, 35.11730 eV, 54.9355 eV, 77.41353 eV, and 113.899 eV, respectively. The combination of reactions of $O_2$ to $2O$ and $O$ to $O^{5+}$, then, has a net enthalpy of reaction of 300.15 eV, which is equivalent to m=11 in Eq. (2a).

$$300.15 \text{ eV} + O_2 + H\left[\frac{a_H}{p}\right] \rightarrow$$
$$O + O^{5+} + H\left[\frac{a_H}{(p+11)}\right] + [(p+11)^2 - p^2] X 13.6 \text{ eV} \quad (45)$$

$$O + O^{5+} \rightarrow O_2 + 300.15 \text{ eV} \quad (46)$$

And, the overall reaction is $$H\left[\frac{a_H}{p}\right] \rightarrow H\left[\frac{a_H}{(p+11)}\right] + [(p+11)^2 - p^2] X 13.6 \text{ eV} \quad (47)$$

In addition to nitrogen, carbon, and oxygen molecules which are exemplary catalysts, other molecules may be catalysts according to the present invention wherein the energy to break the molecular bond and the ionization of t electrons from an atom from the dissociated molecule to a continuum energy level is such that the sum of the ionization energies of the t electrons is approximately m·27.2 eV where t and in are each an integer. The bond energies and the ionization energies may be found in standard sources such as D. R. Linde, CRC Handbook of Chemistry and Physics, 79 th Edition, CRC Press, Boca Raton, Fla., (1999), p. 9-51 to 9-69 and David R. Linde, CRC Handbook of Chemistry and Physics, 79 th Edition, CRC Press, Boca Raton, Fla., (1998-9), p. 10-175 to p. 10-177, respectively. Thus, further molecular catalysts which provide a positive enthalpy of m·27.2 eV to cause release of energy from atomic hydrogen may be determined by one skilled in the art.

Molecular hydrogen catalysts capable of providing a net enthalpy of reaction of approximately m×27.2 eV where m is an integer to produce hydrino whereby the molecular bond is broken and t electrons are ionized from a corresponding free atom of the molecule are given infra. The bonds of the molecules given in the first column are broken and the atom also given in the first column is ionized to provide the net enthalpy of reaction of m×27.2 eV given in the eleventh column where m is given in the twelfth column. The energy of the bond which is broken given by Linde [D. R. Lide, CRC Handbook of Chemistry and Physics, 79 th Edition, CRC Press, Boca Raton, Fla., (1999), p. 9-51 to 9-69] which is herein incorporated by reference is given in the 2nd column, and the electrons which are ionized are given with the ionization potential (also called ionization energy or binding energy). The ionization potential of the nth electron of the atom or ion is designated by $IP_n$ and is given by Linde [D. R. Lide, CRC Handbook of Chemistry and Physics, 79 th Edition, CRC Press, Boca Raton, Fla., (1998-9), p. 10-175 to p. 10-177] which is herein incorporated by reference. For example, the bond energy of the oxygen molecule, BE=5.165 eV, is given in the 2nd column, and the first ionization potential, $IP_1$=13.61806 eV, and the second ionization potential, $IP_2$=35.11730 eV, are given in the third and fourth columns, respectively. The combination of reactions of $O_2$ to $2O$ and $O$ to $O^{2+}$, then, has a net enthalpy of reaction of 53.9 eV, as given in the eleventh column, and m=2 in Eq. (2a) as given in the twelfth column.

TABLE 1

Molecular Hydrogen Catalysts

| Catalyst | BE | IP1 | IP2 | IP3 | IP4 | IP5 | IP6 | IP7 | IP8 | Enthalpy | m |
|---|---|---|---|---|---|---|---|---|---|---|---|
| $C_2$/C | 6.26 | 11.2603 | 24.38332 | 47.8878 | 64.4939 | 392.087 | | | | 546.4 | 20 |
| $N_2$/N | 9.75 | 14.53414 | 29.6013 | | | | | | | 53.9 | 2 |
| $O_2$/O | 5.165 | 13.61806 | 35.11730 | | | | | | | 54.26 | 2 |
| $O_2$/O | 5.165 | 13.61806 | 35.11730 | 54.9355 | | | | | | 108.83 | 4 |
| $O_2$/O | 5.165 | 13.61806 | 35.11730 | 54.9355 | 77.41353 | 113.899 | | | | 300.15 | 11 |
| $CO_2$/O | 5.52 | 13.61806 | 35.11730 | | | | | | | 54.26 | 2 |
| $CO_2$/O | 5.52 | 13.61806 | 35.11730 | 54.9355 | | | | | | 109.19 | 4 |
| $CO_2$/O | 5.52 | 13.61806 | 35.11730 | 54.9355 | 77.41353 | 113.8990 | | | | 300.5 | 11 |
| $NO_2$/O | 3.16 | 13.61806 | 35.11730 | 54.9355 | 77.41353 | 113.8990 | | | | 298.14 | 11 |
| $NO_3$/O | 2.16 | 13.61806 | 35.11730 | 54.9355 | 77.41353 | 113.8990 | 138.1197 | | | 435.26 | 16 |

In an embodiment, a molecular catalyst such as nitrogen is combined with another catalyst such as $He^+$ (Eqs. (12-14)) or $Ar^+$ (Eqs. (15-17)). In an embodiment of a catalyst combination of argon and nitrogen, the percentage of nitrogen is within the range 1-10%. In an embodiment of a catalyst combination of argon and nitrogen, the source of hydrogen atoms is a hydrogen halide such as HF.

The energy given off during catalysis is much greater than the energy lost to the catalyst. The energy released is large as compared to conventional chemical reactions. For example, when hydrogen and oxygen gases undergo combustion to form water $$H_2(g) + \frac{1}{2}O_2(g) \rightarrow H_2O(l) \quad (48)$$

the known enthalpy of formation of water is $\Delta H_f$=−286 kJ/mole or 1.48 eV per hydrogen atom. By contrast, each (n=1) ordinary hydrogen atom undergoing catalysis releases a net of 40.8 eV. Moreover, further catalytic transitions may occur:

$$n = \frac{1}{2} \to \frac{1}{3}, \frac{1}{3} \to \frac{1}{4}, \frac{1}{4} \to \frac{1}{5},$$

and so on. Once catalysis begins, hydrinos autocatalyze further in a process called disproportionation. This mechanism is similar to that of an inorganic ion catalysis. But, hydrino catalysis should have a higher reaction rate than that of the inorganic ion catalyst due to the better. match of the enthalpy to m·27.2 eV.

2.2 Dihydrino Molecular Ion, Dihydrino Molecule, and Hydrino Hydride Ion

Novel emission lines with energies of q·13.6 eV where q=1, 2, 3, 4, 6, 7, 8, 9, or 11 were previously observed by extreme ultraviolet (EUV) spectroscopy recorded on microwave discharges of helium with 2% hydrogen [R. L. Mills, P. Ray, J. Phys. D, Applied Physics, Vol. 36, (2003), pp. 1535-1542]. These lines matched H(1/p), fractional Rydberg states of atomic hydrogen wherein $$n = \frac{1}{2}, \frac{1}{3}, \frac{1}{4}, ..., \frac{1}{p};$$

(p≦137 is an integer) replaces the well known parameter n=integer in the Rydberg equation for hydrogen excited states. Evidence supports that these states are formed by a resonant nonradiative energy transfer to He$^+$ acting as a catalyst. Ar$^+$ also serves as a catalyst to form H(1/p); whereas, krypton, xenon, and their ions serve as controls. H(1/p) may react with a proton and two H(1/p) may react to form H$_2$(1/p)$^+$ and H$_2$(1/p), respectively. The hydrogen molecular ion and molecular charge and current density functions, bond distances, and energies were solved previously [R. L. Mills, "The Nature of the Chemical Bond Revisited and an Alternative Maxwellian Approach", Il Nuovo Cimento, submitted] from the Laplacian in ellipsoidal coordinates with the constraint of nonradiation.

$$(\eta - \zeta)R_\xi \frac{\partial}{\partial \xi}\left(R_\xi \frac{\partial \phi}{\partial \xi}\right) + \tag{49}$$

$$(\zeta - \xi)R_\eta \frac{\partial}{\partial \eta}\left(R_\eta \frac{\partial \phi}{\partial \eta}\right) + (\xi - \eta)R_\zeta \frac{\partial}{\partial \zeta}\left(R_\zeta \frac{\partial \phi}{\partial \zeta}\right) = 0$$

The total energy of the hydrogen molecular ion having a central field of +pe at each focus of the prolate spheroid molecular orbital is $$E_T = -p^2 \left\{ \frac{e^2}{8\pi\varepsilon_o a_H}(4\ln 3 - 1 - 2\ln 3)\left[1 + p\sqrt{\frac{2\hbar\sqrt{\frac{2e^2}{4\pi\varepsilon_o(2a_H)^3 m_e}}}{m_e c^2}}\right] - \right. \tag{50}$$

$$\left. \frac{1}{2}\hbar\sqrt{\frac{k}{\mu}} \right\} = -p^2 16.13392 \text{ eV} - p^3 0.118755 \text{ eV}$$

where p is an integer, h is Planck's constant bar, $m_e$ is the mass of the electron, c is the speed of light in vacuum, μ is the reduced nuclear mass, and k is the harmonic force constant solved previously [R. L. Mills, "The Nature of the Chemical Bond Revisited and an Alternative Maxwellian Approach", Il Nuovo Cimento, submitted]. The total energy of the hydrogen molecule having a central field of +pe at each focus of the prolate spheroid molecular orbital is $$E_T = -p^2 \left\{ \frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \right.\right. \tag{51}$$

$$\left.\left. \sqrt{2}\right]\left[1 + p\sqrt{\frac{2\hbar\sqrt{\frac{e^2}{4\pi\varepsilon_o a_0^3 m_e}}}{m_e c^2}}\right] - \frac{1}{2}\hbar\sqrt{\frac{k}{\mu}} \right\} =$$

$$p^2 31.351 \text{ eV} - p^3 0.326469 \text{ eV}$$

where $a_o$ is the Bohr radius.

The bond dissociation energy $E_D$ of hydrogen molecular ion H$_2$(1/p)$^+$ is the difference between the total energy of the corresponding hydrogen atom H(1/p) and $E_T$:

$$E_D = E(H(1/p)) - E_T \tag{52}$$

where $$E(H(1/p)) = -p^2 13.59844 \text{ eV} \tag{53}$$

$E_D$ is given by Eqs. (52-53) and Eq. (50):

$$E_D = -p^2 13.59844 - E_T \tag{54}$$

$$= -p^2 13.59844 - (-p^2 16.13392 \text{ eV} - p^3 0.118755 \text{ eV})$$

$$= p^2 2.535 \text{ eV} + p^3 0.118755 \text{ eV}$$

The bond dissociation energy $E_D$ of hydrogen molecule $H_2(1/p)$ is the difference between the total energy of the corresponding hydrogen atoms and $E_T$ $$E_D = E(2H(1/p)) - E_T \quad (55)$$

where $$E(2H(1/p)) = p^2 27.20 \text{ eV} \quad (56)$$

$E_D$ is given by Eqs. (55-56) and (51):

$$E_D = -p^2 27.20 \text{ eV} - E_T \quad (57)$$
$$= -p^2 27.20 \text{ eV} - (-p^2 31.351 \text{ eV} - p^3 0.326469 \text{ eV})$$
$$= p^2 4.151 \text{ eV} + p^3 0.326469 \text{ eV}$$

The vibrational and rotational energies of fractional-Rydberg-state hydrogen molecular ion $H_2(1/p)^+$ and molecular hydrogen $H_2(1/p)$ are $p^2$ those of $H_2^+$ and $H_2$, respectively. Thus, the vibrational energies $E_{vib}$ for the v=0 to v=1 transition of hydrogen-type molecular ions $H_2(1/p)^+$ are [R. L. Mills, "The Nature of the Chemical Bond Revisited and an Alternative Maxwellian Approach", Il Nuovo Cimento, submitted]

$$E_{vib} = p^2 0.271 \text{ eV} \quad (58)$$

where p is an integer and the experimental vibrational energy for the v=0 to v=1 transition of $H_2^+$ $E_{H_2^+(v=0 \to v=1)}$ is given by Karplus and Porter [M. Karplus, R. N. Porter, *Atoms and Molecules an Introduction for Students of Physical Chemistry*, The Benjamin/Cummings Publishing Company, Menlo Park, Calif., (1970), pp. 447-484] and NIST [NIST Atomic Spectra Database, www.physics.nist.gov/cgi-bin/AtData/display.ksh]. Similarly, the rotational energies $E_{rot}$ for the J to J+1 transition of hydrogen-type molecular ions $H_2(1/p)^+$ are [R. L. Mills, "The Nature of the Chemical Bond Revisited and an Alternative Maxwellian Approach", Il Nuovo Cimento, submitted]

$$E_{rot} = E_{J+1} - E_J = \frac{\hbar^2}{I}[J+1] = p^2(J+1)0.00739 \text{ eV} \quad (59)$$

where p is an integer, 1 is the moment of inertia, and the experimental rotational energy for the J=0 to J=1 transition of $H_2$ is given by Atkins [P. W. Atkins, *Physical Chemistry*, Second Edition, W. H. Freeman, San Francisco, (1982), p. 589].

The vibrational energies $E_{vib}$ for the v=0 to v=1 transition of hydrogen-type molecules $H_2(1/p)$ are [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted]

$$E_{vib} = p^2 0.515902 \text{ eV} \quad (60)$$

where p is an integer and the experimental vibrational energy for the v=0 to v=1 transition of $H_2$ $E_{H_2(v=0 \to v=1)}$ is given by Beutler [H. Beutler, Z. Physical Chem., "Die dissoziationswarme des wasserstoffmolekuls $H_2$, aus einem neuen ultravioletten resonanzbandenzug bestimmt", Vol. 27B, (1934), pp. 287-302] and Herzberg [G. Herzberg, L. L. Howe, "The Lyman bands of molecular hydrogen", Can. J. Phys., Vol. 37, (1959), pp. 636-659].

The harmonic oscillator potential energy function can be expanded about the internuclear distance and expressed as a Maclaurin series corresponding to a Morse potential after Karplus and Porter (K&P) [M. Karplus. R. N. Porter, *Atoms and Molecules an Introduction for Students of Physical Chemistry*, The Benjamin/Cummings Publishing Company, Menlo Park, Calif., (1970), pp. 447-484] and after Eq. (96) of Ref. [R. L. Mills, Y. Lu, 1. Be, M. Nansteel, P. Ray, X. Chen, A. Voigt, B. Dhandapani, "Spectral Identification of New States of Hydrogen", J. Phys. Chem. B, submitted]. Treating the Maclaurin series terms as anharmonic perturbation terms of the harmonic states, the energy corrections can be found by perturbation methods. The energy $\tilde{v}_v$ of state v is $$\tilde{v}_v = v\omega_0 - v(v-1)\omega_0 x_0, \quad v=0,1,2,3 \quad (61)$$

where $$\omega_0 x_0 = \frac{hc\omega_0^2}{4D_0} \quad (62)$$

From Eqs. (57), (60), and (62)

$$\omega_0 x_0 = \frac{hc\omega_0^2}{4D_0} = \frac{100hc\left(8.06573 \times 10^3 \frac{\text{cm}^{-1}}{\text{eV}} p^2 0.5159 \text{ eV}\right)^2}{4e(p^2 4.151 \text{ eV} + p^3 0.326469 \text{ eV})} \text{cm}^{-1} \quad (63)$$

Using Eqs. (60-63) with p=1 gives $$\overline{V}_v = v 4161 \text{ cm}^{-1} - v(v-1)119.9 \text{ cm}^{-1}, \quad v=0,1,2,3\ldots \quad (64)$$
$$E_{vib\,v} = v 0.5159 \text{ eV} - v(v-1)0.01486 \text{ eV}$$

where the calculated $\omega_0 x_0 = 119.9 \text{ cm}^{-1}$ for $H_2$ is in agreement with the literature values of $117.91 \text{ cm}^{-1}$ from K&P and $121.34 \text{ cm}^{-1}$ from Lide [D. R. Lide, *CRC Handbook of Chemistry and Physics*, 79 th Edition, CRC Press, Boca Raton, Fla., (1998-9), p. 9-82].

Similarly to $H_2(1/p)^+$, the rotational energies $E_{rot}$ for the J to J+1 transition of hydrogen-type molecules $H_2(1/p)$ are [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted]

$$E_{rot} = E_{J+1} - E_J = \frac{\hbar^2}{I}[J+1] = p^2(J+1)0.01509 \text{ eV} \quad (65)$$

where p is an integer, I is the moment of inertia, and the experimental rotational energy for the J=0 to J=1 transition of $H_2$ is given by Atkins [P. W. Atkins, *Physical Chemistry*, Second Edition, W. H. Freeman, San Francisco, (1982), p. 589].

The $p^2$ dependence of the rotational energies results from an inverse p dependence of the internuclear distance and the corresponding impact on I. The predicted internuclear distances 2c' for $H_2(1/p)^+$ and $H_2(1/p)$ are $$2c' = \frac{2a_o}{p} \quad (66)$$

and $$2c' = \frac{a_o\sqrt{2}}{p} \quad (67)$$

respectively.

The catalysis reaction product H(1/4) was predicted to further react to form a new molecular ion $H_2(1/4)^+$. Emission due to the reaction $H(1/4)+H^+ \rightarrow H_2(1/4)^+$ with vibronic coupling with the resonant state $H_2(1/2)^+$ within the transition state was given by the previously derived formula [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted]:

$$E_{D+vib} = E_D(H_2(1/4)^+) - \left(v^* + \frac{1}{2}\right)2^2 E_{vibH_2^+} \quad (68)$$
$$= 48.16 - \left(v^* + \frac{1}{2}\right)1.172 \ eV, \quad v^* = 0, 1, 2, 3...$$

where $E_D(H_2(1/4)^+)$ is the bond energy of $H_2(1/4)^+$ and $E_{vib\ H_2^+}$ is the transition-state vibrational energy of $H_2^+$. The predicted emission was observed for v*=0, 1, 2, 3 ... 24, and the series terminated at about 25.7 nm corresponding to the predicted bond energy of $H_2(1/4)^+$ of 48.16 eV [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted; R. Mills, J. He, B. Dhandapani, P. Ray, "Comparison of Catalysts and Microwave Plasma Sources of Vibrational Spectral Emission of Fractional-Rydberg-State Hydrogen Molecular Ion", Canadian Journal of Physics, submitted; R. Mills, J. He, A. Echezuria, B Dhandapani, P. Ray, "Comparison of Catalysts and Plasma Sources of Vibrational Spectral Emission of Fractional-Rydberg-State Hydrogen Molecular Ion", European Journal of Physics D, submitted, and R. Mills, P. Ray, "Vibrational Spectral Emission of Fractional-Principal-Quantum-Energy-Level Hydrogen Molecular Ion", Int. J. Hydrogen Energy, Vol. 27, No. 5, (2002), pp. 533-564 which are herein incorporated by reference].

The rotational energies provide a very precise measure of I and the internuclear distance using well established theory [M. Karplus, R. N. Porter, *Atoms and Molecules an Introduction for Students of Physical Chemistry*, The Benjamin/Cummings Publishing Company, Menlo Park, Calif., (1970), pp. 447-484]. Neutral molecular emission was anticipated for high pressure argon-hydrogen plasmas excited by a 15 keV electron beam. Rotational lines for $H_2(1/4)$ were anticipated and sought in the 150-250 nm region. The spectral lines were compared to those predicted by Eqs. (60) and (65) corresponding to the internuclear distance of ¼ that of $H_2$ given by Eq. (67). The predicted energies for the $v=1 \rightarrow v=0$ vibration-rotational series of $H_2(1/4)$ (Eqs. (60) and (65) are $$E_{vib-rot} = p^2 E_{vibH_2(\upsilon=0\rightarrow\upsilon=1)} \pm p^2 (J+1)E_{rotH_2} \quad (69)$$
$$= 4^2 E_{vibH_2(\upsilon=0\rightarrow\upsilon=1)} \pm 4^2 (J+1)E_{rotH_2}, \quad J = 0, 1, 2, 3...$$
$$= 8.254432 \ eV \pm (J+1)0.24144 \ eV$$

for p=4. Rotational lines were observed in the 145-300 nm region from atmospheric pressure electron-beam excited argon-hydrogen plasmas. The unprecedented energy spacing of $4^2$ times that of hydrogen established the internuclear distance as ¼ that of $H_2$ and identified $H_2(1/4)$ [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted].

Two H(1/2) may react to form $H_2(1/2)$ with emission of the bond energy from a resonant state within its transition state with vibration-rotational energies that are the same as those of $H_2$. A series of vibration-rotational bands in the 60-67 nm region, a high-energy region for which vibration-rotational spectra are ordinarily unknown, was observed from low-pressure helium-hydrogen (99/1%) microwave plasmas that matched the predicted energy spacing of the vibrational energy of $H_2$ about the bond energy of $H_2(1/2)$ corresponding to the reaction $2H(1/2) \rightarrow H_2(1/2)$ [R. L. Mills, Y. Lu, B. Dhandapani, "Spectral Identification of $H_2(1/2)$", submitted].

The product $H_2(1/p)$ gas was isolated by liquefaction at liquid nitrogen temperature. Helium-hydrogen (90/10%) plasma gases were flowed through a high-vacuum ($10^{-6}$ Torr) capable, liquid nitrogen (LN) cryotrap, and the condensed gas was characterized by $^1H$ nuclear magnetic resonance (NMR) of the LN-condensable gas dissolved in $CDCl_3$. Other sources of hydrogen such as hydrocarbons were eliminated by mass spectroscopy (MS) and Fourier transform infrared spectroscopy (FTIR). The $^1H$ NMR resonance of $H_2(1/p)$ is predicted to be upfield from that of $H_2$ due to the fractional radius in elliptic coordinates wherein the electrons are significantly closer to the nuclei. The predicted shift $$\frac{\Delta B_T}{B}$$

for $H_2(1/p)$ derived previously ['03 Mills GUT Chp. 12 and R. L. Mills, "The Nature of the Chemical Bond Revisited and an Alternative Maxwellian Approach", Il Nuovo Cimento, submitted] is given by the sum of that of $H_2$ and a relativistic term that depends on p>1:

$$\frac{\Delta B_T}{B} = -\mu_0 \left(4 - \sqrt{2} \ \ln \frac{\sqrt{2}+1}{\sqrt{2}-1}\right) \frac{e^2}{36 a_0 m_e}(1+\pi a p) \quad (70)$$

$$\frac{\Delta B_T}{B} = -(28.01 + 0.64p) ppm \quad (71)$$

where p=0 for $H_2$ since there is no relativistic effect and p=integer>1 for $H_2(1/p)$.

In addition to liquefaction at liquid nitrogen temperature, $H_2(1/p)$ gas was also isolated by decomposition of compounds found to contain the corresponding hydride ions $H^-(1/p)$. The total shift $$\frac{\Delta B_T}{B}$$

was calculated previously ['03 Mills GUT, Chp. 7, and R. Mills, P. Ray, B. Dhandapani, W. Good, P. Jansson, M. Nansteel, J. He, A. Voigt, "Spectroscopic and NMR Identification of Novel Hydride Ions in Fractional Quantum Energy States Formed by an Exothermic Reaction of Atomic Hydrogen with Certain Catalysts", European Physical Journal-Applied Physics, submitted] for the hydride ions $H^-(1/p)$ having a fractional principal quantum number. The shift was given by the sum of that of ordinary hydride ion $H^-$ and a component due to a relativistic effect:

$$\frac{\Delta B_T}{B} = -\mu_0 \frac{e^2}{12 \, m_e a_0 \left(1 + \sqrt{s(s+1)}\right)} (1 + \alpha 2\pi p) = -(29.9 + 1.37 \, p) ppm \qquad (72)$$

where p=0 for $H^-$ since there is no relativistic effect and p=integer>1 for $H^-(1/p)$. The experimental absolute resonance shift of tetramethylsilane (TMS) is −31.5 ppm relative to the proton's gyromagnetic frequency. The results of $^1H$ MAS NMR spectroscopy were given previously [R. Mills, P. Ray, B. Dhandapani, W. Good, P. Jansson, M. Nansteel, J. He, A. Voigt, "Spectroscopic and NMR Identification of Novel Hydride Ions in Fractional Quantum Energy States Formed by an Exothermic Reaction of Atomic Hydrogen with Certain. Catalysts", European Physical Journal-Applied Physics, submitted; R. Mills, B. Dhandapani, M. Nansteel, J. He, T. Shannon, A. Echezuria, "Synthesis and Characterization of Novel Hydride Compounds", Int. J. of Hydrogen Energy, Vol. 26, No. 4, (2001), pp. 339-367; R. Mills, B. Dhandapani, N. Greenig, J. He, "Synthesis and Characterization of Potassium Iodo Hydride", Int. J. of Hydrogen Energy, Vol. 25, Issue 12, December, (2000), pp. 1185-1203; R. Mills, B. Dhandapani, M. Nansteel, J. He, A. Voigt, "Identification of Compounds Containing Novel Hydride Ions by Nuclear Magnetic Resonance Spectroscopy", Int. J. Hydrogen Energy, Vol. 26, No. 9, (2001), pp. 965-979] on control and novel hydrides synthesized using atomic potassium as a hydrogen catalyst wherein the triple ionization reaction of K to $K^{3+}$, has a net enthalpy of reaction of 81.7766 eV, which is equivalent to 3·27.2 eV. The KH experimental shift of +1.3 ppm relative to TMS corresponding to absolute resonance shift of −30.2 ppm matched very well the predicted shift of $H^-$ of −30 ppm given by Eq. (72). The $^1H$ MAS NMR spectrum of novel compound KH*Cl relative to external tetramethylsilane (TMS) showed a large distinct upfield resonance at −4.4 ppm corresponding to an absolute resonance shift of −35.9 ppm that matched the theoretical prediction of p=4. A novel peak of KH*1 at −1.5 ppm relative to TMS corresponding to an absolute resonance shift of −33.0 ppm matched the theoretical prediction of p=2. The predicted catalyst reactions, position of the upfield-shifted NMR peaks, and spectroscopic data for $H^-(1/2)$ and $H^-(1/4)$ were found to be in agreement [R. L. Mills, "The Nature of the Chemical Bond Revisited and an Alternative Maxwellian Approach", Il Nuovo Cimento, submitted; R. Mills, P. Ray, B. Dhandapani, W. Good, P. Jansson, M. Nansteel, J. He, A. Voigt, "Spectroscopic and NMR Identification of Novel Hydride Ions in Fractional Quantum Energy States Formed by an Exothermic Reaction of Atomic Hydrogen with Certain Catalysts", European Physical Journal-Applied Physics, submitted; '03 Mills GUT, Chp. 7].

The decomposition reaction of $H^-(1/p)$ is $$2M^+ H^-(1/p) \xrightarrow{\Delta} H_2(1/p) + 2M \qquad (73)$$

where $M^+$ is a metal ion. NMR peaks of $H_2(1/p)$ given by Eqs. (70-71) provide a direct test of whether compounds such as KH*I contain hydride ions in the same fractional quantum state p. Furthermore, the observation of a series of singlet peaks upfield of $H_2$ with a predicted integer spacing of 0.64 ppm provides a powerful means to confirm the existence of $H^-(1/p)$.

$H_2(1/p)$ gas isolated by liquefaction at liquid nitrogen temperature and by decomposition of compounds found to contain the corresponding hydride ions $H^-(1/p)$ was dissolved in $CDCl_3$ and characterized by $^1H$ NMR. Considering solvent effects, singlet peaks upfield of $H_2$ were observed with a predicted integer spacing of 0.64 ppm at 3.47, 3.03, 2.18, 1.25, 0.85, and 0.22 ppm which matched the consecutive series $H_2(1/2)$, $H_2(1/3)$, $H_2(1/4)$, $H_2(1/5)$, $H_2(1/6)$, and $H_2(1/7)$, respectively.

The exothermic helium plasma catalysis of atomic hydrogen was shown previously [R. L. Mills, P. Ray, B. Dhandapani, R. M. Mayo, J. He, "Comparison of Excessive Balmer α Line Broadening of Glow Discharge and Microwave Hydrogen Plasmas with Certain Catalysts", J. of Applied Physics, Vol. 92, No. 12, (2002), pp. 7008-7022; R. L. Mills, P. Ray, B. Dhandapani, J. He, "Comparison of Excessive Balmer α Line Broadening of Inductively and Capacitively Coupled RF, Microwave, and Glow Discharge Hydrogen Plasmas with Certain Catalysts", IEEE Transactions on Plasma Science, Vol. 31, No. (2003), pp. 338-355] by the observation of an average hydrogen atom temperature of 180-210 eV for helium-hydrogen mixed plasmas versus ≈3 eV for hydrogen alone. Since the electronic transitions are very energetic power balances of helium-hydrogen plasmas compared to control krypton plasmas were measured using water bath calorimetry. Excess power was absolutely measured from the helium-hydrogen plasma. For an input of 41.9 W, the total plasma power of the helium-hydrogen plasma measured by water bath calorimetry was 62.1 W corresponding to 20.2 W of excess power in 3 cm$^3$ plasma volume. The excess power density and energy balance were high, 6.7 W/cm$^3$ and −5.4× $10^4$ kJ/mole $H_2$ (280 eV/H atom), respectively.

The hydrino hydride ion of the present invention can be formed by the reaction of an electron source with a hydrino, that is, a hydrogen atom having a binding energy of about $$\frac{13.6 \text{ eV}}{n^2},$$

where $$n = \frac{1}{p}$$

and p is an integer greater than 1. The hydrino hydride ion is represented by $H^-(n=1/p)$ or $H^-(1/p)$:

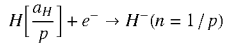  (74a)

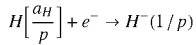  (74b)

The hydrino hydride ion is distinguished from an ordinary hydride ion comprising an ordinary hydrogen nucleus and two electrons having a binding energy of about 0.8 eV. The latter is hereafter referred to as "ordinary hydride ion" or "normal hydride ion" The hydrino hydride ion comprises a hydrogen nucleus including proteum, deuterium, or tritium, and two indistinguishable electrons at a binding energy according to Eq. (75).

The binding energy of a novel hydrino hydride ion can be represented by the following formula:

$$\text{Binding Energy} = \frac{\hbar^2\sqrt{s(s+1)}}{8\mu_e a_0^2 \left[1+\frac{\sqrt{s(s+1)}}{p}\right]^2} - \frac{\pi\mu_0 e^2\hbar^2}{m_e^2}\left(\frac{1}{a_H^3} + \frac{2^2}{a_0^3\left[\frac{1+\sqrt{s(s+1)}}{p}\right]^3}\right) \quad (75)$$

where p is an integer greater than one, s=1/2, π is pi, h is Planck's constant bar, $\mu_0$ is the permeability of vacuum, $m_e$ is the mass of the electron, $\mu_e$ is the reduced electron mass given by $$\mu_e = \frac{m_e m_p}{\frac{m_e}{\sqrt{\frac{3}{4}}} + m_p}$$

where $m_p$ is the mass of the proton, $a_H$ is the radius of the hydrogen atom, $a_o$ is the Bohr radius, and e is the elementary charge. The radii are given by $$r_2 = r_1 = a_0(1 + \sqrt{s(s+1)}); s = \frac{1}{2} \quad (76)$$

The binding energies of the hydrino hydride ion, H⁻(n=1/p) as a function of p, where p is an integer, are shown in TABLE 2.

TABLE 2

The representative binding energy of the hydrino hydride ion H⁻(n = 1/p) as a function of p, Eq. (75).

| Hydride Ion | $r_1$ $(a_0)^a$ | Binding Energy (eV)$^b$ | Wavelength (nm) |
|---|---|---|---|
| H⁻(n = 1) | 1.8660 | 0.7542 | 1644 |
| H⁻(n = 1/2) | 0.9330 | 3.047 | 406.9 |
| H⁻(n = 1/3) | 0.6220 | 6.610 | 187.6 |
| H⁻(n = 1/4) | 0.4665 | 11.23 | 110.4 |
| H⁻(n = 1/5) | 0.3732 | 16.70 | 74.23 |
| H⁻(n = 1/6) | 0.3110 | 22.81 | 54.35 |
| H⁻(n = 1/7) | 0.2666 | 29.34 | 42.25 |
| H⁻(n = 1/8) | 0.2333 | 36.09 | 34.46 |
| H⁻(n = 1/9) | 0.2073 | 42.84 | 28.94 |
| H⁻(n = 1/10) | 0.1866 | 49.38 | 25.11 |
| H⁻(n = 1/11) | 0.1696 | 55.50 | 22.34 |
| H⁻(n = 1/12) | 0.1555 | 60.98 | 20.33 |
| H⁻(n = 1/13) | 0.1435 | 65.63 | 18.89 |
| H⁻(n = 1/14) | 0.1333 | 69.22 | 17.91 |
| H⁻(n = 1/15) | 0.1244 | 71.55 | 17.33 |
| H⁻(n = 1/16) | 0.1166 | 72.40 | 17.12 |
| H⁻(n = 1/17) | 0.1093 | 71.56 | 17.33 |
| H⁻(n = 1/18) | 0.1037 | 68.83 | 18.01 |
| H⁻(n = 1/19) | 0.0982 | 63.98 | 19.38 |
| H⁻(n = 1/20) | 0.0933 | 56.81 | 21.82 |
| H⁻(n = 1/21) | 0.0889 | 47.11 | 26.32 |
| H⁻(n = 1/22) | 0.0848 | 34.66 | 35.76 |
| H⁻(n = 1/23) | 0.0811 | 19.26 | 64.36 |
| H⁻(n = 1/24) | 0.0778 | 0.6945 | 1785 |

$^a$Eq. (76)
$^b$Eq. (75)

The existence of novel alkaline and alkaline earth hydride and halido-hydrides were also previously identified by large distinct upfield ¹H NMR resonances compared to the NMR peaks of the corresponding ordinary hydrides [R. Mills, B. Dhandapani, M. Nansteel, J. He, T. Shannon, A. Echezuria, "Synthesis and Characterization of Novel Hydride Compounds", Int. J. of Hydrogen Energy, Vol. 26, No. 4, (2001), pp. 339-367; R. Mills, B. Dhandapani, N. Greenig, J. He, "Synthesis and Characterization of Potassium Iodo Hydride", Int. J. of Hydrogen Energy, Vol. 25, Issue 12, December, (2000), pp. 1185-1203; R. Mills, B. Dhandapani, M. Nansteel, J. He, A. Voigt, "Identification of Compounds Containing Novel Hydride Ions by Nuclear Magnetic Resonance Spectroscopy", Int. J. Hydrogen Energy, Vol. 26, No. 9, (2001), pp. 965-979.]. Using a number of analytical techniques such as XPS and time-of-flight-secondary-mass-spectroscopy (ToF-SIMS) as well as NMR, the hydrogen content was assigned to H⁻(1/p), novel high-binding-energy hydride ions in stable fractional principal quantum states [R. Mills, B. Dhandapani, M. Nansteel, J. He, T. Shannon, A. Echezuria, "Synthesis and Characterization of Novel Hydride Compounds", Int. J. of Hydrogen Energy, Vol. 26, No. 4, (2001), pp. 339-367; R. Mills, B. Dhandapani, N. Greenig, J. He, "Synthesis and Characterization of Potassium Iodo Hydride", Int. J. of Hydrogen Energy, Vol. 25, Issue 12, December, (2000), pp. 1185-1203; R. L. Mills, B. Dhandapani, J. He, "Highly Stable Amorphous Silicon Hydride", Solar Energy Materials & Solar Cells, Vol. 80, No. 1, pp. 1-20]. The synthesis reactions typically involve metal ion catalysts. For example, Rb⁺ to Rb²⁺ and 2K⁺ to K+K²⁺ each provide a reaction with a net enthalpy equal to the potential energy of atomic hydrogen. It was reported previously [R. L. Mills, P. Ray, "A Comprehensive Study of Spectra of the Bound-Free Hyperfine Levels of Novel Hydride Ion H⁻(1/2), Hydrogen, Nitrogen, and Air", Int. J. Hydrogen Energy, Vol. 28, No. 8, (2003), pp. 825-871] that the presence of these gaseous ions with thermally dissociated hydrogen formed a hydrogen plasma with hydrogen atom energies of 17 and 12 eV respectively, compared to 3 eV for a hydrogen microwave plasma. The energetic catalytic reaction involves a resonance energy transfer between hydrogen atoms and Rb⁺ or 2K⁺ to form a very stable novel hydride ion H⁻(1/2). Its predicted binding energy of 3.0468 eV was observed by high resolution visible spectroscopy as a continuum threshold at 406.82 nm, and a structured, strong emission peak was observed at 407.1 nm corresponding to the fine structure and hyperfine structure of H(1/2). From the electron g factor, bound-free hyperfine structure lines of H$^-$(1/2) were predicted with energies $E_{HF}$ given by $E_{HF}=j^2 3.00213\times10^{-5}+3.0563$ eV (j is an integer) as an inverse Rydberg-type series from 10563 eV to 3.1012 eV—the hydride binding energy peak with the fine structure plus one and five times the spin-pairing energy, respectively. The high resolution visible plasma emission spectra in the region of 399.5 to 406.0 nm matched the predicted emission lines for j=1 to j=39 with the series edge at 399.63 nm up to 1 part in $10^5$.

2.3 Hydrogen Plasma

Developed sources that provide a suitable intensity hydrogen plasmas are high voltage discharges, synchrotron devices, inductively coupled plasma generators, and magnetically confined plasmas. In contrast to the high electric fields, power densities, and temperatures of prior sources, an intense hydrogen plasma is generated at low gas temperatures (e.g. $\approx 10^3$ K) with a very low field (1V/cm) from atomic hydrogen and certain atomized elements or certain gaseous ions which singly or multiply ionize at integer multiples of the potential energy of atomic hydrogen, m·27.2 eV [R. Mills, J. Dong, Y. Lu, "Observation of Extreme Ultraviolet Hydrogen Emission from Incandescently Heated Hydrogen Gas with Certain Catalysts", Int. J. Hydrogen Energy, Vol. 25, (2000), pp. 919-943 which is incorporated by reference]. The so-called resonant transfer or rt-plasma of one embodiment of the present invention forms by a resonant energy transfer mechanism involving the species providing a net enthalpy of a multiple of 27.2 eV and atomic hydrogen.

2.4 UV and EUV Laser

Excited vibration-rotational states of molecules comprise an inverted population in the case that a lower state to which a transition occurs is not normally populated. This is the basis of common gas lasers such as the $CO_2$ laser. Since vibrational levels are on the order of 0.1 eV and rotational levels are on the order of 0.005 eV, lasing typically occurs in the infrared. However, since $H_2(1/p)$ has vibrational and rotational energies that are $p^2$ times those of the species comprising uncatalyzed atomic hydrogen where p is an integer, lasing in the visible through the extreme ultraviolet is possible. Breakthrough applications in UV and EUV photolithography and X-ray laser applications are made possible.

II. SUMMARY OF THE INVENTION

An object of the present invention is to generate laser light from molecular vibration-rotational transitions.

A further object of the present invention is generate short wavelength laser light such as visible, ultraviolet, extreme ultraviolet, and soft X-ray laser light using molecular vibration-rotational transitions.

Another objective of the present invention is to generate a plasma and a source of light such as high energy light such as visible, ultraviolet, extreme ultraviolet, and soft X-ray, and energetic particles via the catalysis of atomic hydrogen.

Another objective of the present invention is to create an inverted population of an energy level of a molecule capable of lasing such as a vibration-rotational level of $H_2(1/p)$.

Another objective of the present invention is to generate a plasma and power and novel hydrogen species and compositions of matter comprising new forms of hydrogen via the catalysis of atomic hydrogen.

Another objective of the present invention is to generate the laser medium insitu. The laser medium may be formed due to the catalysis of atomic hydrogen. The laser medium formed insitu may comprise $H_2(1/p)$.

Another objective of the present invention is to form the inverted population due to at least one of input power and catalysis of atomic hydrogen to lower-energy states. In an embodiment, $H_2(1/p)$ is formed insitu due to the catalysis of atomic hydrogen, the catalysis cell serves as the laser cavity, and an inverted population may be formed due to at least one of catalysis of atomic hydrogen and input power.

1. Catalysis of Hydrogen to Form Novel Hydrogen Species and Compositions of Matter Comprising New Forms of Hydrogen The above objectives and other objectives are achieved by the present invention comprising a power source and hydrogen reactor. The power source and reactor comprises a cell for the catalysis of atomic hydrogen to form novel hydrogen species and compositions of matter comprising new forms of hydrogen. The novel hydrogen compositions of matter comprise:

(a) at least one neutral, positive, or negative hydrogen species (hereinafter "increased binding energy hydrogen species") having a binding energy
  (i) greater than the binding energy of the corresponding ordinary hydrogen species, or
  (ii) greater than the binding energy of any hydrogen species for which the corresponding ordinary hydrogen species is unstable or is not observed because the ordinary hydrogen species' binding energy is less than thermal energies at ambient conditions (standard temperature and pressure, STP), or is negative; and (b) at least one other element. The compounds of the invention are hereinafter referred to as "increased binding energy hydrogen compounds".

By "other element" in this context is meant an element other than an increased binding energy hydrogen species. Thus, the other element can be an ordinary hydrogen species, or any element other than hydrogen. In one group of compounds, the other element and the increased binding energy hydrogen species are neutral. In another group of compounds, the other element and increased binding energy hydrogen species are charged such that the other element provides the balancing charge to form a neutral compound. The former group of compounds is characterized by molecular and coordinate bonding; the latter group is characterized by ionic bonding.

Also provided are novel compounds and molecular ions comprising (a) at least one neutral, positive, or negative hydrogen species (hereinafter "increased binding energy hydrogen species") having a total energy
  (i) greater than the total energy of the corresponding ordinary hydrogen species, or
  (ii) greater than the total energy of any hydrogen species for which the corresponding ordinary hydrogen species is unstable or is not observed because the ordinary hydrogen species' total energy is less than thermal energies at ambient conditions, or is negative; and (b) at least one other element.

The total energy of the hydrogen species is the sum of the energies to remove all of the electrons from the hydrogen species. The hydrogen species according to the present invention has a total energy greater than the total energy of the corresponding ordinary hydrogen species. The hydrogen species having an increased total energy according to the present invention is also referred to as an "increased binding energy hydrogen species" even though some embodiments of the hydrogen species having an increased total energy may have a first electron binding energy less that the first electron binding energy of the corresponding ordinary hydrogen species. For example, the hydride ion of Eq. (75) for p=24 has a first binding energy that is less than the first binding energy of ordinary hydride ion, while the total energy of the hydride ion of Eq. (75) for p=24 is much greater than the total energy of the corresponding ordinary hydride ion.

Also provided are novel compounds and molecular ions comprising (a) a plurality of neutral, positive, or negative hydrogen species (hereinafter "increased binding energy hydrogen species") having a binding energy
  (i) greater than the binding energy of the corresponding ordinary hydrogen species, or
  (ii) greater than the binding energy of any hydrogen species for which the corresponding ordinary hydrogen species is unstable or is not observed because the ordinary hydrogen species' binding energy is less than thermal energies at ambient conditions or is negative; and
(b) optionally one other element. The compounds of the invention are hereinafter referred to as "increased binding energy hydrogen compounds".

The increased binding energy hydrogen species can be formed by reacting one or more hydrino atoms with one or more of an electron, hydrino atom, a compound containing at least one of said increased binding energy hydrogen species, and at least one other atom, molecule, or ion other than an increased binding energy hydrogen species.

Also provided are novel compounds and molecular ions comprising (a) a plurality of neutral, positive, or negative hydrogen species (hereinafter "increased binding energy hydrogen species") having a total energy
  (i) greater than the total energy of ordinary molecular hydrogen, or
  (ii) greater than the total energy of any hydrogen species for which the corresponding ordinary hydrogen species is unstable or is not observed because the ordinary hydrogen species' total energy is less than thermal energies at ambient conditions or is negative; and
(b) optionally one other element. The compounds of the invention are hereinafter referred to as "increased binding energy hydrogen compounds".

The total energy of the increased total energy hydrogen species is the sum of the energies to remove all of the electrons from the increased total energy hydrogen species. The total energy of the ordinary hydrogen species is the sum of the energies to remove all of the electrons from the ordinary hydrogen species. The increased total energy hydrogen species is referred to as an increased binding energy hydrogen species, even though some of the increased binding energy hydrogen species may have a first electron binding energy less than the first electron binding energy of ordinary molecular hydrogen. However, the total energy of the increased binding energy hydrogen species is much greater than the total energy of ordinary molecular hydrogen.

In one embodiment of the invention, the increased binding energy hydrogen species can be $H_n$, and $H_n^-$ where n is a positive integer, or $H_n^+$ where n is a positive integer greater than one. Preferably, the increased binding energy hydrogen species is $H_n$ and $H_n^-$ where n is an integer from one to about $1 \times 10^6$, more preferably one to about $1 \times 10^4$, even more preferably one to about $1 \times 10^2$, and most preferably one to about 10, and $H_n^+$ where n is an integer from two to about $1 \times 10^6$, more preferably two to about $1 \times 10^4$, even more preferably two to about $1 \times 10^2$, and most preferably two to about 10. A specific example of $H_n^-$ is $H_{16}^-$.

In an embodiment of the invention, the increased binding energy hydrogen species can be $H_n^{m-}$ where n and m are positive integers and $H_n^{m+}$ where n and m are positive integers with m<n. Preferably, the increased binding energy hydrogen species is $H_n^{m-}$ where n is an integer from one to about $1 \times 10^6$, more preferably one to about $1 \times 10^4$, even more preferably one to about $1 \times 10^2$, and most preferably one to about 10 and m is an integer from one to 100, one to ten, and $H_n^{m+}$ where n is an integer from two to about $1 \times 10^6$, more preferably two to about $1 \times 10^4$, even more preferably two to about $1 \times 10^2$, and most preferably two to about 10 and m is one to about 100, preferably one to ten.

According to a preferred embodiment of the invention, a compound is provided, comprising at least one increased binding energy hydrogen species selected from the group consisting of (a) hydride ion having a binding energy according to Eq. (75) that is greater than the binding of ordinary hydride ion (about 0.8 eV) for p=2 up to 23, and less for p=24 ("increased binding energy hydride ion" or "hydrino hydride ion"); (b) hydrogen atom having a binding energy greater than the binding energy of ordinary hydrogen atom (about 13.6 eV) ("increased binding energy hydrogen atom" or "hydrino"); (c) hydrogen molecule having a first binding energy greater than about 15.3 eV ("increased binding energy hydrogen molecule" or "dihydrino"); and (d) molecular hydrogen ion having a binding energy greater than about 16.3 eV ("increased binding energy molecular hydrogen ion" or "dihydrino molecular ion").

The compounds of the present invention are capable of exhibiting one or more unique properties which distinguishes them from the corresponding compound comprising ordinary hydrogen, if such ordinary hydrogen compound exists. The unique properties include, for example, (a) a unique stoichiometry; (b) unique chemical structure; (c) one or more extraordinary chemical properties such as conductivity, melting point, boiling point, density, and refractive index; (d) unique reactivity to other elements and compounds; (e) enhanced stability at room temperature and above; and/or (f) enhanced stability in air and/or water. Methods for distinguishing the increased binding energy hydrogen-containing compounds from compounds of ordinary hydrogen include: 1.) elemental analysis, 2.) solubility, 3.) reactivity, 4.) melting point, 5.) boiling point, 6.) vapor pressure as a function of temperature, 7.) refractive index, 8.) X-ray photoelectron spectroscopy (XPS), 9.) gas chromatography, 10.) X-ray diffraction (XRD), 11.) calorimetry, 12.) infrared spectroscopy (IR), 13.) Raman spectroscopy, 14.) Mossbauer spectroscopy, 15.) extreme ultraviolet (EUV) emission and absorption spectroscopy, 16.) ultraviolet (UV) emission and absorption spectroscopy. 17.) visible emission and absorption spectroscopy, 18.) nuclear magnetic resonance spectroscopy, 19.) gas phase mass spectroscopy of a heated sample (solids probe and direct exposure probe quadrapole and magnetic sector mass spectroscopy), 20.) time-of-flight-secondary-ion-mass-spectroscopy (TOFSIMS), 21.) electrospray-ionization-time-of-flight-mass-spectroscopy (ESITOFMS), 22.) thermogravimetric analysis (TGA), 23.) differential thermal analysis (DTA), 24.) differential scanning calorimetry (DSC), 25.) liquid chromatography/mass spectroscopy (LCMS), and/or 26.) gas chromatography/mass spectroscopy (GCMS).

According to the present invention, a hydrino hydride ion (H⁻) having a binding energy according to Eq. (75) that is greater than the binding of ordinary hydride ion (about 0.8 eV) for p=2 up to 23, and less for p=24 (H⁻) is provided. For p=2 to p=24 of Eq. (75), the hydride ion binding energies are respectively 3, 6.6, 11.2, 16.7, 22.8, 29.3, 36.1, 42.8, 49.4, 55.5, 61.0, 65.6, 69.2, 71.6, 72.4, 71.6, 68.8, 64.0, 56.8, 47.1, 34.7, 19.3, and 0.69 eV. Compositions comprising the novel hydride ion are also provided.

Novel compounds are provided comprising one or more hydrino hydride ions and one or more other elements. Such a compound is referred to as a hydrino hydride compound.

Ordinary hydrogen species are characterized by the following binding energies (a) hydride ion, 0.754 eV ("ordinary hydride ion"); (b) hydrogen atom ("ordinary hydrogen atom"), 13.6 eV; (c) diatomic hydrogen molecule, 15.46 eV ("ordinary hydrogen molecule"); (d) hydrogen molecular ion, 16.3 eV ("ordinary hydrogen molecular ion"); and (e) $H_3^+$, 22.6 eV ("ordinary trihydrogen molecular ion"). Herein, with reference to forms of hydrogen, "normal" and "ordinary" are synonymous.

According to a further preferred embodiment of the invention, a compound is provided comprising at least one increased binding energy hydrogen species such as (a) a hydrogen atom having a binding energy of about $$\frac{13.6\ eV}{\left(\frac{1}{p}\right)^2},$$

preferably within ±10% more preferably ±5%, where p is an integer, preferably an integer from 2 to 200; (b) a hydride ion (H⁻) having a binding energy of about $$\frac{\hbar^2 \sqrt{s(s+1)}}{8\mu_e a_0^2 \left[1 + \frac{\sqrt{s(s+1)}}{p}\right]^2} - \frac{\pi \mu_0 e^2 \hbar^2}{m_e^2}\left(\frac{1}{a_H^3} + \frac{2^2}{a_0^3\left[\frac{1+\sqrt{s(s+1)}}{p}\right]^3}\right),$$

preferably within ±10%, more preferably ±5%, where p is an integer, preferably an integer from 2 to 200; (c) $H_4^+(1/p)$; (d) a trihydrino molecular ion, $H_3^+(1/p)$, having a binding energy of about $$\frac{22.6}{\left(\frac{1}{p}\right)^2}\ eV$$

preferably within ±10%, more preferably ±5%, where p is an integer, preferably an integer from 2 to 200; (e) a dihydrino having a binding energy of about given by Eq. (196) of R. L. Mills, "The Nature of the Chemical Bond Revisited and an Alternative Maxwellian Approach", Il Nuovo Cimento, submitted which is herein incorporated by reference, preferably within ±10%, more preferably ±5%, where p is an integer, preferably and integer from 2 to 200; (f) a dihydrino molecular ion with a binding energy of about $IP_2=p^2 16.13392\ eV + p^3 0.118755\ eV$ given by Eq. (197) of R. L. Mills, "The Nature of the Chemical Bond Revisited and an Alternative Maxwellian Approach", Il Nuovo Cimento, submitted which is herein incorporated by reference, preferably within ±10%, more preferably ±5%, where p is an integer, preferably an integer from 2 to 200.

According to one embodiment of the invention wherein the compound comprises a negatively charged increased binding energy hydrogen species, the compound further comprises one or more cations, such as a proton, ordinary $H_2^+$ or ordinary $H_3^+$.

A method is provided for preparing compounds comprising at least one increased binding energy hydride ion. Such compounds are hereinafter referred to as "hydrino hydride compounds". The method comprises reacting atomic hydrogen with a catalyst having a net enthalpy of reaction of about $$\frac{m}{2} \cdot 27\ eV,$$

where m is an integer greater than 1, preferably an integer less than 400, to produce an increased binding energy hydrogen atom having a binding energy of about $$\frac{13.6\ eV}{\left(\frac{1}{p}\right)^2}$$

where p is an integer, preferably an integer from 2 to 200. A further product of the catalysis is energy. The increased binding energy hydrogen atom can be reacted with an electron source, to produce an increased binding energy hydride ion. The increased binding energy hydride ion can be reacted with one or more cations to produce a compound comprising at least one increased binding energy hydride ion.

2. Hydrogen Power and Plasma Cell and Reactor

The invention is also directed to a reactor for producing a increased binding energy hydrogen compounds of the invention, such as dihydrino molecules and hydrino hydride compounds. A further product of the catalysis is plasma, light, and power. Such a reactor is hereinafter referred to as a "hydrogen reactor" or "hydrogen cell". The hydrogen reactor comprises a cell for making hydrinos. The cell for making hydrinos may take the form of a gas cell, a gas discharge cell, a plasma torch cell, or microwave power cell, for example. These exemplary cells which are not meant to be exhaustive are disclosed in $$IP_1 = E_T(H_2^+(1/p)) - E_T(H_2(1/p))$$

$$= -p^2 16.13392\ eV - p^3 0.118755\ eV - (-p^2 31.351\ eV - p^3 0.326469\ eV)$$

$$= p^2 15.2171\ eV + p^3 0.207714\ eV$$

Mills Prior Publications. Each of these cells comprises: a source of atomic hydrogen; at least one of a solid, molten, liquid, or gaseous catalyst for making hydrinos; and a vessel for reacting hydrogen and the catalyst for making hydrinos. As used herein and as contemplated by the subject invention, the term "hydrogen", unless specified otherwise, includes not only proteum ($^1$H), but also deuterium ($^2$H) and tritium ($^3$H).

The reactors described herein as "hydrogen reactors" are capable of producing not only hydrinos, but also the other increased binding energy hydrogen species and compounds of the present invention. Hence, the designation "hydrogen reactors" should not be understood as being limiting with respect to the nature of the increased binding energy hydrogen species or compound produced.

According to one aspect of the present invention, novel compounds are formed from hydrino hydride ions and cations wherein the cell further comprises an electron source. Electrons from the electron source contact the hydrinos and react to form hydrino hydride ions. The reactor produces hydride ions having the binding energy of Eq. (75). The cation may be from an added reductant, or a cation present in the cell (such as a cation comprising the catalyst).

In an embodiment, a plasma forms in the hydrogen cell as a result of the energy released from the catalysis of hydrogen. Water vapor may be added to the plasma to increase the hydrogen concentration as shown by Kikuchi et al. [J. Kikuchi, M. Suzuki, H. Yano, and S. Fujimura, Proceedings SPIE—The International Society for Optical Engineering, (1993), 1803 (Advanced Techniques for Integrated Circuit Processing II), pp. 70-76] which is herein incorporated by reference.

3. Catalysts 3.1 Atom and Ion Catalysts

In an embodiment, a catalytic system is provided by the ionization of t electrons from a participating species such as an atom, an ion, a molecule, and an ionic or molecular compound to a continuum energy level such that the sum of the ionization energies of the t electrons is approximately m×27.2 eV where m is an integer. One such catalytic system involves cesium. The first and second ionization energies of cesium are 3.89390 eV and 23.15745 eV, respectively. The double ionization (t=2) reaction of Cs to $Cs^{2+}$, then, has a net enthalpy of reaction of 27.05135 eV, which is equivalent to m=1 in Eq. (2a).

  (77)

-continued

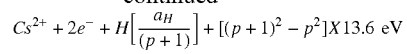

$$Cs^{2+} + 2e^- \rightarrow Cs(m) + 27.05135 \text{ eV} \quad (78)$$

And, the overall reaction is

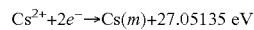  (79)

Thermal energies may broaden the enthalpy of reaction. The relationship between kinetic energy and temperature is given by $$E_{kinetic} = \frac{3}{2}kT \quad (80)$$

For a temperature of 1200 K, the thermal energy is 0.16 eV, and the net enthalpy of reaction provided by cesium metal is 27.21 eV which is an exact match to the desired energy.

Hydrogen catalysts capable of providing a net enthalpy of reaction of approximately m×27.2 eV where m is an integer to produce hydrino whereby t electrons are ionized from an atom or ion are given infra. A further product of the catalysis is energy and plasma. The atoms or ions given in the first column are ionized to provide the net enthalpy of reaction of m×27.2 eV given in the tenth column where m is given in the eleventh column. The electrons which are ionized are given with the ionization potential (also called ionization energy or binding energy). The ionization potential of the nth electron of the atom or ion is designated by $IP_n$ and is given by Linde [D. R. Lide, CRC Handbook of Chemistry and Physics, 78 th Edition, CRC Press, Boca Raton, Fla., (1997), p. 10-214 to 10-216] which is herein incorporated by reference. That is for example,

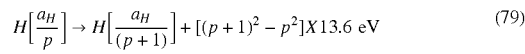
The first ionization potential, $IP_1$=3.89390 eV, and the second ionization potential, $IP_2$=23.15745 eV, are given in the second and third columns, respectively. The net enthalpy of reaction for the double ionization of Cs is 27.05135 eV as given in the tenth column, and m=1 in Eq. (2a) as given in the eleventh column.

TABLE 3

Hydrogen Ion or Atom Catalysts

| Catalyst | IP1 | IP2 | IP3 | IP4 | IP5 | IP6 | IP7 | IP8 | Enthalpy | m |
|---|---|---|---|---|---|---|---|---|---|---|
| Li | 5.39172 | 75.6402 | | | | | | | 81.032 | 3 |
| Be | 9.32263 | 18.2112 | | | | | | | 27.534 | 1 |
| Ar | 15.75962 | 27.62967 | 40.74 | | | | | | 84.12929 | 3 |
| Ar | 15.75962 | 27.62967 | 40.74 | 59.81 | 75.02 | | | | 218.95929 | 8 |
| Ar | 15.75962 | 27.62967 | 40.74 | 59.81 | 75.02 | 91.009 | 124.323 | | 434.29129 | 16 |
| K | 4.34066 | 31.63 | 45.806 | | | | | | 81.777 | 3 |
| Ca | 6.11316 | 11.8717 | 50.9131 | 67.27 | | | | | 136.17 | 5 |
| Ti | 6.8282 | 13.5755 | 27.4917 | 43.267 | 99.3 | | | | 190.46 | 7 |
| V | 6.7463 | 14.66 | 29.311 | 46.709 | 65.2817 | | | | 162.71 | 6 |
| Cr | 6.76664 | 16.4857 | 30.96 | | | | | | 54.212 | 2 |
| Mn | 7.43402 | 15.64 | 33.668 | 51.2 | | | | | 107.94 | 4 |
| Fe | 7.9024 | 16.1878 | 30.652 | | | | | | 54.742 | 2 |
| Fe | 7.9024 | 16.1878 | 30.652 | 54.8 | | | | | 109.54 | 4 |

TABLE 3-continued

Hydrogen Ion or Atom Catalysts

| Catalyst | IP1 | IP2 | IP3 | IP4 | IP5 | IP6 | IP7 | IP8 | Enthalpy | m |
|---|---|---|---|---|---|---|---|---|---|---|
| Co | 7.881 | 17.083 | 33.5 | 51.3 | | | | | 109.76 | 4 |
| Co | 7.881 | 17.083 | 33.5 | 51.3 | 79.5 | | | | 189.26 | 7 |
| Ni | 7.6398 | 18.1688 | 35.19 | 54.9 | 76.06 | | | | 191.96 | 7 |
| Ni | 7.6398 | 18.1688 | 35.19 | 54.9 | 76.06 | 108 | | | 299.96 | 11 |
| Cu | 7.72638 | 20.2924 | | | | | | | 28.019 | 1 |
| Zn | 9.39405 | 17.9644 | | | | | | | 27.358 | 1 |
| Zn | 9.39405 | 17.9644 | 39.723 | 59.4 | 82.6 | 108 | 134 | 174 | 625.08 | 23 |
| As | 9.8152 | 18.633 | 28.351 | 50.13 | 62.63 | 127.6 | | | 297.16 | 11 |
| Se | 9.75238 | 21.19 | 30.8204 | 42.945 | 68.3 | 81.7 | 155.4 | | 410.11 | 15 |
| Kr | 13.9996 | 24.3599 | 36.95 | 52.5 | 64.7 | 78.5 | | | 271.01 | 10 |
| Kr | 13.9996 | 24.3599 | 36.95 | 52.5 | 64.7 | 78.5 | 111 | | 382.01 | 14 |
| Rb | 4.17713 | 27.285 | 40 | 52.6 | 71 | 84.4 | 99.2 | | 378.66 | 14 |
| Rb | 4.17713 | 27.285 | 40 | 52.6 | 71 | 84.4 | 99.2 | 136 | 514.66 | 19 |
| Sr | 5.69484 | 11.0301 | 42.89 | 57 | 71.6 | | | | 188.21 | 7 |
| Nb | 6.75885 | 14.32 | 25.04 | 38.3 | 50.55 | | | | 134.97 | 5 |
| Mo | 7.09243 | 16.16 | 27.13 | 46.4 | 54.49 | 68.8276 | | | 220.10 | 8 |
| Mo | 7.09243 | 16.16 | 27.13 | 46.4 | 54.49 | 68.8276 | 125.664 | 143.6 | 489.36 | 18 |
| Pd | 8.3369 | 19.43 | | | | | | | 27.767 | 1 |
| Sn | 7.34381 | 14.6323 | 30.5026 | 40.735 | 72.28 | | | | 165.49 | 6 |
| Te | 9.0096 | 18.6 | | | | | | | 27.61 | 1 |
| Te | 9.0096 | 18.6 | 27.96 | | | | | | 55.57 | 2 |
| Cs | 3.8939 | 23.1575 | | | | | | | 27.051 | 1 |
| Ce | 5.5387 | 10.85 | 20.198 | 36.758 | 65.55 | | | | 138.89 | 5 |
| Ce | 5.5387 | 10.85 | 20.198 | 36.758 | 65.55 | 77.6 | | | 216.49 | 8 |
| Pr | 5.464 | 10.55 | 21.624 | 38.98 | 57.53 | | | | 134.15 | 5 |
| Sm | 5.6437 | 11.07 | 23.4 | 41.4 | | | | | 81.514 | 3 |
| Gd | 6.15 | 12.09 | 20.63 | 44 | | | | | 82.87 | 3 |
| Dy | 5.9389 | 11.67 | 22.8 | 41.47 | | | | | 81.879 | 3 |
| Pb | 7.41666 | 15.0322 | 31.9373 | | | | | | 54.386 | 2 |
| Pt | 8.9587 | 18.563 | | | | | | | 27.522 | 1 |
| He+ | | 54.4178 | | | | | | | 54.418 | 2 |
| Na+ | | 47.2864 | 71.6200 | 98.91 | | | | | 217.816 | 8 |
| Rb+ | | 27.285 | | | | | | | 27.285 | 1 |
| Fe3+ | | | | 54.8 | | | | | 54.8 | 2 |
| Mo2+ | | | 27.13 | | | | | | 27.13 | 1 |
| Mo4+ | | | | | 54.49 | | | | 54.49 | 2 |
| In3+ | | | | 54 | | | | | 54 | 2 |
| Ar+ | | 27.62967 | | | | | | | 27.62967 | 1 |
| Sr+ | | 11.03 | 42.89 | | | | | | 53.92 | 2 |

In an embodiment, each of the catalysts $Rb^+$, $K^+/K^+$, and $Sr^+$ may be formed from the corresponding metal by ionization. The source of ionization may be UV light or a plasma. At least one of a source of UV light and a plasma may be provided by the catalysis of hydrogen with a one or more hydrogen catalysts given in TABLES 1 and 3. The catalysts may also be formed from the corresponding metal by reaction with hydrogen to form the corresponding alkali hydride or by ionization at a hot filament which may also serve to dissociate molecular hydrogen to atomic hydrogen. The hot filament may be a refractory metal such as tungsten or molybdenum operated within a high temperature range such as 1000 to 2800° C.

A catalyst of the present invention can be an increased binding energy hydrogen compound having a net enthalpy of reaction of about $$\frac{m}{2} \cdot 27 \text{ eV},$$

where m is an integer greater than 1, preferably an integer less than 400, to produce an increased binding energy hydrogen atom having a binding energy of about $$\frac{13.6 \text{ eV}}{\left(\frac{1}{p}\right)^2}$$

where p is an integer, preferably an integer from 2 to 200.

In another embodiment of the catalyst of the present invention, hydrinos are formed by reacting an ordinary hydrogen atom with a catalyst having a net enthalpy of reaction of about $$\frac{m}{2} \cdot 27.2 \text{ eV} \tag{81}$$

where m is an integer. It is believed that the rate of catalysis is increased as the net enthalpy of reaction is more closely matched to $$\frac{m}{2} \cdot 27.2 \text{ eV}.$$

It has been found that catalysts having a net enthalpy of reaction within ±10%, preferably ±5%, of are suitable for most applications.

In an embodiment, catalysts are identified by the formation of a rt-plasma at low voltage as described in Mills publication R. Mills, J. Dong, Y. Lu, "Observation of Extreme Ultraviolet Hydrogen Emission from. Incandescently Heated Hydrogen Gas with Certain Catalysts", Int. J. Hydrogen Energy, Vol. 25, (2000), pp. 919-943 which is incorporated by reference. In another embodiment, a means of identifying catalysts and monitoring the catalytic rate comprises a high resolution visible spectrometer with resolution preferable in the range 1 to 0.01 Å. The identity of a catalysts and the rate of catalysis may be determined by the degree of Doppler broadening of the hydrogen Balmer lines.

3.2 Hydrino Catalysts

In a process called disproportionation, lower-energy hydrogen atoms, hydrinos, can act as catalysts because each of the metastable excitation, resonance excitation, and ionization energy of a hydrino atom is m×27.2 eV. The transition reaction mechanism of a first hydrino atom affected by a second hydrino atom involves the resonant coupling between the atoms of in degenerate multipoles each having 27.21 eV of potential energy [Mills, *The Grand Unified Theory of Classical Quantum Mechanics*, September 2001 Edition, Chps. 5 and 6, BlackLight Power, Inc., Cranbury, N.J., Distributed by Amazon.com; R. Mills, P. Ray, "Spectral Emission of Fractional Quantum Energy Levels of Atomic Hydrogen from a Helium-Hydrogen Plasma and the Implications for Dark Matter", Int. J. Hydrogen Energy, Vol. 27, No. 3, pp. 301-322]. The energy transfer of m×27.2 eV from the first hydrino atom to the second hydrino atom causes the central field of the first atom to increase by in and its electron to drop in levels lower from a radius of $$\frac{a_H}{p}$$

to a radius of $$\frac{a_H}{p+m}.$$

The second interacting lower-energy hydrogen is either excited to a metastable state, excited to a resonance state, or ionized by the resonant energy transfer. The resonant transfer may occur in multiple stages. For example, a nonradiative transfer by multipole coupling may occur wherein the central field of the first increases by m, then the electron of the first drops in levels lower from a radius of $$\frac{a_H}{p}$$

to a radius of $$\frac{a_H}{p+m}$$

with further resonant energy transfer. The energy transferred by multipole coupling may occur by a mechanism that is analogous to photon absorption involving an excitation to a virtual level. Or, the energy transferred by multipole coupling during the electron transition of the first hydrino atom may occur by a mechanism that is analogous to two photon absorption involving a first excitation to a virtual level and a second excitation to a resonant or continuum level [B. J. Thompson, Handbook of Nonlinear Optics, Marcel Dekker, Inc., New York, (1996), pp. 497-548; Y. R. Shen, *The Principles of Nonlinear Optics*, John Wiley & Sons, New York, (1984), pp. 203-210; B. de Beauvoir, F. Nez, L. Julien, B. Cagnac, F. Biraben, D. Touahri, L. Hilico, O. Acef, A. Clairon, and J. J. Zondy, Physical Review Letters, Vol. 78, No. 3, (1997), pp. 440-443]. The transition energy greater than the energy transferred to the second hydrino atom may appear as a photon in a vacuum medium.

The transition of $$H\left[\frac{a_H}{p}\right]$$

to $$H\left[\frac{a_H}{p+m}\right]$$

induced by a multipole resonance transfer of m·27.21 eV and a transfer of $[(p')^2-(p'-m')^2] \times 13.6$ eV−m·27.2 eV with a resonance state of $$H\left[\frac{a_H}{p'-m'}\right]$$

excited in $$H\left[\frac{a_H}{p'}\right]$$

is represented by $$H\left[\frac{a_H}{p'}\right] + H\left[\frac{a_H}{p}\right] \to H\left[\frac{a_H}{p'-m'}\right] + H\left[\frac{a_H}{p+m}\right] + [((p+m)^2 - p^2) - (p'^2 - (p'-m')^2)]X13.6 \text{ eV} \quad (82)$$

where p, p', m, and m' are integers.

Hydrinos may be ionized during a disproportionation reaction by the resonant energy transfer. A hydrino atom with the initial lower-energy state quantum number p and radius $$\frac{a_H}{p}$$

may undergo a transition to the state with lower-energy state quantum number (p+m) and radius $$\frac{a_H}{(p+m)}$$

by reaction with a hydrino atom with the initial lower-energy state quantum number m', initial radius $$\frac{a_H}{m'},$$

and final radius $a_H$ that provides a net enthalpy of m×27.2 eV. Thus, reaction of hydrogen-type atom, $$H\left[\frac{a_H}{p}\right],$$

with the hydrogen-type atom, $$H\left[\frac{a_H}{m'}\right],$$

that is ionized by the resonant energy transfer to cause a transition reaction is represented by $$mX27.21 \text{ eV} + H\left[\frac{a_H}{m'}\right] + H\left[\frac{a_H}{m'}\right] \rightarrow \quad (83)$$

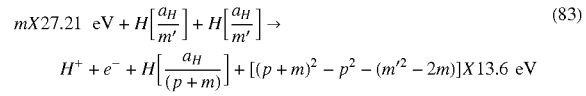

$$H^+ + e^- \rightarrow H\left[\frac{a_H}{1}\right] + 13.6 \text{ eV} \quad (84)$$

And, the overall reaction is $$H\left[\frac{a_H}{m'}\right] + H\left[\frac{a_H}{p}\right] \rightarrow \quad (85)$$

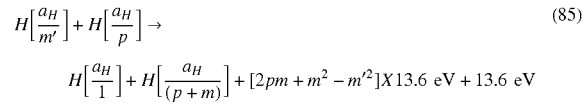

4. Adjustment of Catalysis Rate

It is believed that the rate of catalysis is increased as the net enthalpy of reaction is more closely matched to m·27.2 eV where m is an integer. An embodiment of the hydrogen reactor for producing increased binding energy hydrogen compounds of the invention further comprises an electric or magnetic field source. The electric or magnetic field source may be adjustable to control the rate of catalysis. Adjustment of the electric or magnetic field provided by the electric or magnetic field source may alter the continuum energy level of a catalyst whereby one or more electrons are ionized to a continuum energy level to provide a net enthalpy of reaction of approximately m×27.2 eV. The alteration of the continuum energy may cause the net enthalpy of reaction of the catalyst to more closely match m·27.2 eV. Preferably, the electric field is within the range of 0.01-10⁶ V/m, more preferably 0.1-10⁴ V/m, and most preferably 1-10³ V/m. Preferably, the magnetic flux is within the range of 0.01-50 T. A magnetic field may have a strong gradient. Preferably, the magnetic flux gradient is within the range of $10^{-4}$-$10^2$ Tcm$^{-1}$ and more preferably $10^{-3}$-1 Tcm$^{-1}$.

In an embodiment, the electric field E and magnetic field B are orthogonal to cause an EXB electron drift. The EXB drift may be in a direction such that energetic electrons produced by hydrogen catalysis dissipate a minimum amount of power due to current flow in the direction of the applied electric field which may be adjustable to control the rate of hydrogen catalysis.

In an embodiment of the energy cell, a magnetic field confines the electrons to a region of the cell such that interactions with the wall are reduced, and the electron energy is increased. The field may be a solenoidal field or a magnetic mirror field. The field may be adjustable to control the rate of hydrogen catalysis.

In an embodiment, the electric field such as a radio frequency field produces minimal current. In another embodiment, a gas which may be inert such as a noble gas is added to the reaction mixture to decrease the conductivity of the plasma produced by the energy released from the catalysis of hydrogen. The conductivity is adjusted by controlling the pressure of the gas to achieve an optimal voltage that controls the rate of catalysis of hydrogen. In another embodiment, a gas such as an inert gas may be added to the reaction mixture which increases the percentage of atomic hydrogen versus molecular hydrogen.

For example, the cell may comprise a hot filament that dissociates molecular hydrogen to atomic hydrogen and may further heat a hydrogen dissociator such as transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite). The filament may further supply an electric field in the cell of the reactor. The electric field may alter the continuum energy level of a catalyst whereby one or more electrons are ionized to a continuum energy level to provide a net enthalpy of reaction of approximately m×27.2 eV. In another embodiment, an electric field is provided by electrodes charged by a variable voltage source. The rate of catalysis may be controlled by controlling the applied voltage which determines the applied field which controls the catalysis rate by altering the continuum energy level.

In another embodiment of the hydrogen reactor, the electric or magnetic field source ionizes an atom or ion to provide a catalyst having a net enthalpy of reaction of approximately m×27.2 eV. For examples, potassium metal is ionized to K$^+$, rubidium metal is ionized to Rb$^+$, or strontium metal is ionized to Sr$^+$ to provide the catalyst. The electric field source may be a hot filament whereby the hot filament may also dissociate molecular hydrogen to atomic hydrogen.

The current from a hot filament or an electron gun may replace the electron deficit due to the higher electron mobility compared to ions. In addition, electrons are magnetized over ions at a lower field strength. Confinement of the electrons will also cause the plasma potential to return to the ground potential. In an embodiment, at least one of the electron replacement and electron confinement is controlled to control the plasma potential to control the rate of the hydrogen catalysis reaction. In an embodiment, the magnetic flux is in the range of about 1-100,000 G, preferably the flux is in the range of about 10-1000 G, more preferably the flux in the range of about 50-200 G, most preferably the flux is the range of about 50-150 G. The plasma potential is maintained at a desired potential of about neutral potential, positive, or negative. The plasma potential is controlled to optimize the rate of the catalysis of atomic hydrogen to states with energy levels given by Eq. (1). In an embodiment, the electron flow to the plasma is controlled by controlling the temperature of the filament or the current of the electron gun. Alternatively, the magnetic field strength is controlled The plasma potential may be measured with a probe such as a Langmuir probe, and a feedback loop of the electron flow and the electron confinement may maintain a desired plasma potential to cause a desired rate of hydrogen catalysis. In further embodiments, the catalysis rate is controlled by controlling the concentration of catalysis and atomic hydrogen.

Plasma electrons have a higher mobility than plasma ions; thus the plasma typically acquires a net positive charge and the cell wall acquires a net negative charge. The catalysis rate may be increased by neutralizing the plasma or by providing a net negative charge to at least a portion of the plasma where catalyst and atomic hydrogen is present. In an embodiment of the hydrogen catalysis cell, the plasma has a net negative charge at least in a region where catalyst and atomic hydrogen is present. The negative charge may be provided by at least one of a source of electrons and a means to confine electrons. The means to confine electrons may be a magnetic field such as a magnetic bottle or a selenoidal field. The electron source may be an electron emitter such as a heated filament such as a thoriated W, rhenium, or BaO filament or an alkali (Group I) metal or an alkaline earth (Group II) metal. The source of electrons may be a thermionic cathode. The source of electrons may be an electron gun. Alternatively, the source of electrons may be an electron beam or a discharge electrode such as an anode. The electrons may preferentially be increased in a desired spatial region by an electric field. The electric field may be provided by electrodes. The negative charge may also be provided by a source of negatively charged ions such as hydride ions. In an embodiment, negative ions such as hydride ions are boiled from the surface of the wall of the reactor by maintaining the wall at an elevated temperature.

In a further embodiment of the hydrogen catalysis cell, the plasma has a net positive charge at least in a region where catalyst and atomic hydrogen is present. The positive charge may be provided by at least one of a source of ions and a means to confine ions. The means to confine ions may be a magnetic field such as a magnetic bottle or a selenoidal field. Alternatively, electrons may be confined in a region such that a desired region outside of the electron-rich region is positively charged. The means to confine electrons may be a magnetic field such as a magnetic bottle or a selenoidal field. The source of ions may be an ion beam or a discharge electrode such as a cathode. The ions may preferentially be increased in a desired spatial region by an electric field. The electric field may be provided by electrodes. The positive charge may also be provided by a source of positively charged ions such as a source of alkali (Group I) or alkaline earth (Group II) ions. In an embodiment, positive ions such as alkali or alkaline earth ions are boiled from the surface of the wall of the reactor by maintaining the wall at an elevated temperature. The positive ions may also be provided by boiling off electrons to a different region such that electron-emitting source acquires a net positive charge that positively charges the plasma. Such a source is a thermionic cathode.

The rt-plasma emission was experimentally found to be very strongly dependent on the strength of a weak external magnetic flux. With the application of 86 G, the argon-hydrogen (97/3%)-strontium rt-plasma emission showed a peak as a function of applied field with a maximum peak intensity of 150 times the baseline emission.

5. Noble Gas Catalysts

In an embodiment of the hydrogen power and plasma cell, reactor, and power converter comprising an energy cell for the catalysis of atomic hydrogen to form novel hydrogen species and compositions of matter comprising new forms of hydrogen of the present invention, the catalyst comprises a mixture of a first catalyst and a source of a second catalyst. In an embodiment, the first catalyst produces the second catalyst from the source of the second catalyst. In an embodiment, the energy released by the catalysis of hydrogen by the first catalyst produces a plasma in the energy cell. The energy ionizes the source of the second catalyst to produce the second catalyst. The second catalyst may be one or more ions produced in the absence of a strong electric field as typically required in the case of a glow discharge. The weak electric field may increase the rate of catalysis of the second catalyst such that the enthalpy of reaction of the catalyst matches $m \times 27.2$ eV to cause hydrogen catalysis. In embodiments of the energy cell, the first catalyst is selected from the group of catalyst given in TABLES 1 and 3 such as potassium and strontium, the source of the second catalyst is selected from the group of helium and argon and the second catalyst is selected from the group of $He^+$ and $Ar^+$ wherein the catalyst ion is generated from the corresponding atom by a plasma created by catalysis of hydrogen by the first catalyst. For examples, 1.) the energy cell contains strontium and argon wherein hydrogen catalysis by strontium produces a plasma containing $Ar^+$ which serves as a second catalyst (Eqs. (15-17)) and 2.) the energy cell contains potassium and helium wherein hydrogen catalysis by potassium produces a plasma containing $He^+$ which serves as a second catalyst (Eqs. (12-14)). In an embodiment, the pressure of the source of the second catalyst is in the range of about 1 millitorr to about one atmosphere. The hydrogen pressure is in the range of about 1 millitorr to about one atmosphere. In a preferred embodiment, the total pressure is in the range of about 0.5 torr to about 2 torr. In an embodiment, the ratio of the pressure of the source of the second catalyst to the hydrogen pressure is greater than one. In a preferred embodiment, hydrogen is about 0.1% to about 99%, and the source of the second catalyst comprises the balance of the gas present in the cell. More preferably, the hydrogen is in the range of about 1% to about 5% and the source of the second catalyst is in the range of about 95% to about 99%. Most preferably, the hydrogen is about 5% and the source of the second catalyst is about 95%. These pressure ranges are representative examples and a skilled person will be able to practice this invention using a desired pressure to provide a desired result.

In an embodiment of the power cell and power converter the catalyst comprises at least one selected from the group of $He^+$, $Ne^+$, and $Ar^+$ wherein the ionized catalyst ion is generated from the corresponding atom by a plasma created by methods such as a glow discharge or inductively couple microwave discharge. Preferably, the corresponding reactor such as a discharge cell or hydrogen plasma torch reactor has a region of low electric field strength such that the enthalpy of reaction of the catalyst matches $m \times 27.2$ eV to cause hydrogen catalysis. In one embodiment, the reactor is a discharge cell having a hollow anode as described by Kuraica and Konjevic [Kuraica, M., Konjevic, N., Physical Review A. Volume 46, No. 7, October (1992), pp. 4429-4432]. In another embodiment, the reactor is a discharge cell having a hollow cathode such as a central wire or rod anode and a concentric hollow cathode such as a stainless or nickel mesh. In a preferred embodiment, the cell is a microwave cell wherein the catalyst is formed by a microwave plasma.

6. Spontaneous-Emission Light Source and Light from Hydrogen Catalysis

Typically the emission of vacuum ultraviolet light from hydrogen gas is achieved using discharges at high voltage, synchrotron devices, high power inductively coupled plasma generators, or a plasma is created and heated to extreme temperatures by RF coupling (e.g. >$10^6$ K) with confinement provided by a toroidal magnetic field. Observation of intense extreme ultraviolet (EUV) emission at low temperatures (e.g. ≈$10^3$ K) from atomic hydrogen generated at a tungsten filament that heated a titanium dissociator and certain gaseous atom or ion catalysts of the present invention vaporized by filament heating has been reported previously [R. Mills, J. Dong, Y. Lu, "Observation of Extreme Ultraviolet Hydrogen Emission from Incandescently Heated Hydrogen Gas with Certain Catalysts", Int. J. Hydrogen Energy, Vol. 25, (2000), pp. 919-943]. Potassium, cesium, and strontium atoms and $Rb^+$ ionize at integer multiples of the potential energy of atomic hydrogen formed the low temperature, extremely low voltage plasma called a resonance transfer or rt-plasma having strong EUV emission. Similarly, the ionization energy of $Ar^+$ is 27.63 eV, and the emission intensity of the plasma generated by atomic strontium increased significantly with the introduction of argon gas only when $Ar^+$ emission was observed [R. Mills, "Spectroscopic Identification of a Novel Catalytic Reaction of Atomic Hydrogen and the Hydride Ion Product", Int. J. Hydrogen Energy, Vol. 26, No. 10, (2001), pp. 1041-1058]. In contrast, the chemically similar atoms, sodium, magnesium and barium, do not ionize at integer multiples of the potential energy of atomic hydrogen did not form a plasma and caused no emission.

For further characterization, the width of the 656.3 nm Balmer α line emitted from microwave and glow discharge plasmas of hydrogen alone, strontium or magnesium with hydrogen, or helium, neon, argon, or xenon with 10% hydrogen was recorded with a high resolution visible spectrometer [R. L. Mills, P. Ray, B. Dhandapani, R. M. Mayo, J. He, "Comparison of Excessive Balmer α Line Broadening of Glow Discharge and Microwave Hydrogen Plasmas with Certain Catalysts", J. of Applied Physics, Vol. 92, No. 12, (2002), pp. 7008-7022; R. L. Mills, P. Ray, B. Dhandapani, J. He, "Comparison of Excessive Balmer α Line Broadening of Inductively and Capacitively Coupled RF, Microwave, and Glow Discharge Hydrogen Plasmas with Certain Catalysts", IEEE Transactions on Plasma Science, Vol. 31, No. (2003), pp. 338-355]. It was found that the strontium-hydrogen microwave plasma showed a broadening similar to that observed in the glow discharge cell of 27-33 eV; whereas, in both sources, no broadening was observed for magnesium-hydrogen. With noble-gas hydrogen mixtures, the trend of broadening with the particular noble gas was the same for both sources, but the magnitude of broadening was dramatically different. The microwave helium-hydrogen and argon-hydrogen plasmas showed extraordinary broadening corresponding to an average hydrogen atom temperature of 110-130 eV and 180-210 eV, respectively. The corresponding results from the glow discharge plasmas were 30-35 eV and 33-38 eV, respectively. Whereas, plasmas of pure hydrogen, neon-hydrogen, krypton-hydrogen, and xenon-hydrogen maintained in either source showed no excessive broadening corresponding to an average hydrogen atom temperature of ≈3 eV. Stark broadening or acceleration of charged species due to high fields (e.g. over 10 kV/cm) can not be invoked to explain the microwave results since no high field was observationally present. Rather, the results were explained by a resonant energy transfer between atomic hydrogen and atomic strontium, $Ar^+$, or $He^{2+}$ which ionize at an integer multiple of the potential energy of atomic hydrogen.

In a preferred embodiment, the source of light is from the spontaneous emission of vibration-rotationally excited $H_2(1/p)$. In an embodiment, the fast H formed by the catalysis of atomic hydrogen to lower-energy states excites the vibration-rotation emission of $H_2(1/p)$. In a further embodiment of the power cell, the catalysis of atomic hydrogen to lower-energy states produces a plasma and may also comprise a light source of at least one of extreme ultraviolet, ultraviolet, visible, infrared, microwave, or radio wave radiation.

A light source of the present invention comprises an emitting species, a cell, a power source, and a output window from the cell. The invention may further comprise further optical components to direct or filter the light emitted from the cell. In an embodiment, the light-emitting species comprises hydrogen molecules designated $H_2(1/p)$ wherein the internuclear distance of each is about a reciprocal integer p times that of ordinary $H_2$. The $H_2(1/p)$ molecules are vibration-rotationally excited and emit with a transition from a vibration-rotational level to another lower-energy-level. The vibration-rotational excitation may be by a direct collisional excitation.

Alternatively, the excitation may be by an energy exchange with an excited state species such as an excited activator molecule. The direct excitation and the excitation of the activator may be by collision with an energetic particle from a particle beam such as an electron beam or collision with an energetic species accelerated by power input to the cell. The power input to cause energetic species may be at least one of a particle beam such as an electron beam and microwave, high voltage, and RF discharges. The source of $H_2(1/p)$ may external, or $H_2(1/p)$ may be generated insitu by the catalysis of atomic hydrogen to form $H(1/p)$ that further reacts to form $H_2(1/p)$ wherein the invention further comprises an increased-binding-energy-hydrogen species reactor. In an embodiment, the power source that may at least partially comprise a cell for the catalysis of atomic hydrogen to form novel hydrogen species and/or compositions of matter comprising new forms of hydrogen, an increased-binding-energy-hydrogen species reactor. The reaction may be maintained by a particle beam, microwave, glow, or RF discharge plasma of a source of atomic hydrogen and a source of catalyst such as argon to provide catalyst $Ar^+$. A species such as oxygen may react with the source of catalyst such as $Ar_2^*$; to form the catalyst such as $Ar^+$. At least one of the power from catalysis and an external power source maintains $H_2(1/p)$ in an excited vibration-rotational state from which spontaneous emission may occur. The emission may be in the ultraviolet (UV) and extreme ultraviolet (EUV) which may be used for photolithography. In an embodiment for short wavelength light such as EUV or soft-X-ray light, the light source further comprises a pin-hole optic that may be differentially pumped to serve as a "windowless" exit for the light from the cell.

A light source of the present invention comprises a cell of the present invention that comprises a light propagation structure or window for a desired radiation of a desired wavelength or desired wavelength range. For example, a quartz window may be used to transmit ultraviolet, visible, infrared, microwave, and/or radio wave light from the cell since it is transparent to the corresponding wavelength range. Similarly, a glass window may be used to transmit visible, infrared, microwave, and/or radio wave light from the cell, and a ceramic window may be used to transmit infrared, microwave, and/or radio wave light from the cell. The cell wall may comprise the light propagation structure or window. The cell wall or window may be coated with a phosphor that converts one or more short wavelengths to desired longer wavelengths. For example, ultraviolet or extreme ultraviolet may be converted to visible light. The light source may provide short wavelength light directly, and the short wavelength line emission may be used for applications known in the art such as photolithography. In an embodiment for short wavelength light such as EUV or soft-X-ray light, the light source further comprises a pin-hole optic that may be differentially pumped to serve as a "windowless" exit for the light from the cell.

A light source of the present invention such as a visible light source may comprise a transparent cell wall that may be insulated such that an elevated temperature may be maintained in the cell. In an embodiment, the wall may be a double wall with a separating vacuum space. The dissociator may be a filament such as a tungsten filament. The filament may also heat the catalyst to form a gaseous catalyst. A first catalyst may be at least one selected from the group of potassium, rubidium, cesium, and strontium metal. A second catalyst may be generated by a first. In an embodiment, at least one of helium, neon, and argon is ionized to He, Ne, and $Ar^+$, respectively, by the plasma formed by the catalysis of hydrogen by a first catalysts such as strontium. $He^+$, $Ne^+$, and/or $Ar^+$ serve as second hydrogen catalysts. The hydrogen may be supplied by a hydride that decomposes over time to maintain a desired pressure which may be determined by the temperature of the cell. The cell temperature may be controlled with a heater and a heater controller. In an embodiment, the temperature may be determined by the power supplied to the filament by a power controller.

A further embodiment of the present invention of a light source comprises a tunable light source that may provide coherent or laser light. Extreme ultraviolet (EUV) spectroscopy was recorded on microwave discharges of argon or helium with 10% hydrogen. Novel EUV emission lines were observed from microwave discharges of argon or helium with 10% hydrogen that matched those predicted for the reaction $H(1/4)+H^+ \rightarrow H_2(1/4)^+$ having an energy spacing of $2^2$ times the transition-state vibrational energy of $H_2^+$ with the series ending on the bond energy of $H_2(1/4)^+$ [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted; R. Mills, J. He, B. Dhandapani, P. Ray, "Comparison of Catalysts and Microwave Plasma Sources of Vibrational Spectral Emission of Fractional-Rydberg-State Hydrogen Molecular Ion", Canadian Journal of Physics, submitted; R. Mills, J. He, A. Echezuria, B Dhandapani, P. Ray, "Comparison of Catalysts and Plasma Sources of Vibrational Spectral Emission of Fractional-Rydberg-State Hydrogen Molecular Ion", European Journal of Physics D, submitted, and R. Mills, P. Ray, "Vibrational Spectral Emission of Fractional-Principal-Quantum-Energy-Level Hydrogen Molecular Ion", Int. J. Hydrogen Energy, Vol. 27, No. 5, (2002), pp. 533-564 which are herein incorporated by reference]. These lines having energies in the range of about v1.17 eV to v1.18 eV v=integer may be a source of tunable laser light. The tunable light source of the present invention comprises at least one of the gas, gas discharge, plasma torch, or microwave plasma cell wherein the cell may comprise a laser cavity. A source of tunable laser light may be provided by the light emitted from a dihydrino molecular ion using systems and means which are known in the art as described in *Laser Handbook*, Edited by M. L. Stitch, North-Holland Publishing Company, (1979).

The light source of the present invention may comprise at least one of the gas, gas discharge, plasma torch, or microwave plasma cell wherein ions or excimers are effectively formed that serve as catalysts from a source of catalyst such as He, $He_2^*$, $Ne_2^*$, $Ne^+$, $Ne^+/H^+$ or $Ar^+$ catalysts from helium, helium, neon, neon-hydrogen mixture, and argon gases, respectively. The light may be largely monochromatic light such as line emission of the Lyman series such as Lyman α or Lyman β.

7. Energy Reactor

An energy reactor 50, in accordance with the invention, is shown in FIG. 1 and comprises a vessel 52 which contains an energy reaction mixture 54, a heat exchanger 60, and a power converter such as a steam generator 62 and turbine 70. The heat exchanger 60 absorbs heat released by the catalysis reaction, when the reaction mixture, comprised of hydrogen and a catalyst reacts to form lower-energy hydrogen. The heat exchanger exchanges heat with the steam generator 62 which absorbs heat from the exchanger 60 and produces steam. The energy reactor 50 further comprises a turbine 70 which receives steam from the steam generator 62 and supplies mechanical power to a power generator 80 which converts the steam energy into electrical energy, which can be received by a load 90 to produce work or for dissipation.

The energy reaction mixture 54 comprises an energy releasing material 56 including a source of hydrogen isotope atoms or a source of molecular hydrogen isotope, and a source of catalyst 58 which resonantly remove approximately m×27.21 eV to form lower-energy atomic hydrogen and approximately m×48.6 eV to form lower-energy molecular hydrogen where m is an integer wherein the reaction to lower energy states of hydrogen occurs by contact of the hydrogen with the catalyst.

For example, $He^+$ fulfills the catalyst criterion—a chemical or physical process with an enthalpy change equal to an integer multiple of 27.2 eV since it ionizes at 54.417 eV which is 2·27.2 eV. The catalysis releases energy in a form such as heat and lower-energy hydrogen isotope atoms and/or molecules.

The source of hydrogen can be hydrogen gas, dissociation of water including thermal dissociation, electrolysis of water, hydrogen from hydrides, or hydrogen from metal-hydrogen solutions. In all embodiments, the source of catalysts can be one or more of an electrochemical, chemical, photochemical, thermal, free radical, sonic, or nuclear reaction(s) or inelastic photon or particle scattering reaction(s). In the latter two cases, the present invention of an energy reactor comprises a particle source 75b and/or photon source 75a to supply the catalyst. In these cases, the net enthalpy of reaction supplied corresponds to a resonant collision by the photon or particle. In a preferred embodiment of the energy reactor shown in FIG. 1, atomic hydrogen is formed from molecular hydrogen by a photon source 75a such as a microwave source or a UV source.

The photon source may also produce photons of at least one energy of approximately m×27.21 eV, $$\frac{m}{2} X 27.21 \text{ eV},$$

or 40.8 eV causes the hydrogen atoms undergo a transition to a lower energy state. In another preferred embodiment, a photon source 75a producing photons of at least one energy of approximately m×48.6 eV, 95.7 eV, or m×31.94 eV causes the hydrogen molecules to undergo a transition to a lower energy state. In all reaction mixtures, a selected external energy device 75, such as an electrode may be used to supply an electrostatic potential or a current (magnetic field) to decrease the activation energy of the reaction. In another embodiment, the mixture 54, further comprises a surface or material to dissociate and/or absorb atoms and/or molecules of the energy releasing material 56. Such surfaces or materials to dissociate and/or absorb hydrogen, deuterium, or tritium comprise an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite).

In an embodiment, a catalyst is provided by the ionization of t electrons from an atom or ion to a continuum energy level such that the sum of the ionization energies of the t electrons is approximately m×27.2 eV where t and in are each an integer. A catalyst may also be provided by the transfer of t electrons between participating ions. The transfer of t electrons from one ion to another ion provides a net enthalpy of reaction whereby the sum of the ionization energy of the electron donating ion minus the ionization energy of the electron accepting ion equals approximately m·27.2 eV where t and m are each an integer.

In a preferred embodiment, a source of hydrogen atom catalyst comprises a catalytic material 58, that typically provide a net enthalpy of approximately m×27.21 eV plus or minus 1 eV.

In a preferred embodiment, a source of hydrogen molecule catalysts comprises a catalytic material 58, that typically provide a net enthalpy of reaction of approximately m×48.6 eV plus or minus 5 eV. The catalysts include those given in TABLES 1 and 3 and the atoms, ions, molecules, and hydrinos described in Mills Prior Publications which are incorporated herein by reference.

A further embodiment is the vessel 52 containing a catalysts in the molten, liquid, gaseous, or solid state and a source of hydrogen including hydrides and gaseous hydrogen. In the case of a reactor for catalysis of hydrogen atoms, the embodiment further comprises a means to dissociate the molecular hydrogen into atomic hydrogen including an element, compound, alloy, or mixture of transition elements, inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite) or electromagnetic radiation including UV light provided by photon source 75. Alternatively, the hydrogen is dissociated in a plasma.

The present invention of an electrolytic cell energy reactor, plasma electrolysis reactor, barrier electrode reactor, RF plasma reactor, pressurized gas energy reactor, gas discharge energy reactor, microwave cell energy reactor, and a combination of a glow discharge cell and a microwave and or RF plasma reactor of the present invention comprises: a source of hydrogen; one of a solid, molten, liquid, and gaseous source of catalyst; a vessel containing hydrogen and the catalyst wherein the reaction to form lower-energy hydrogen occurs by contact of the hydrogen with the catalyst; and a means for removing the lower-energy hydrogen product. The present energy invention is further described in Mills Prior Publications which are incorporated herein by reference.

In a preferred embodiment, the catalysis of hydrogen produces a plasma. The plasma may also be at least partially maintained by a microwave generator wherein the microwaves are tuned by a tunable microwave cavity, carried by a waveguide, and are delivered to the reaction chamber though an RF transparent window or antenna. The microwave frequency may be selected to efficiently form atomic hydrogen from molecular hydrogen. It may also effectively form ions or excimers that serve as catalysts from a source of catalyst such as $He^+$, $He_2^*$, $Ne_2^*$, $Ne^+/H^+$ or $Ar^+$ catalysts from helium, helium, neon, neon-hydrogen mixture, and argon gases, respectively. In an embodiment, the cell provides a catalyst for a source of catalyst such as $He^+$, $Ar^+$, and $Ne^+$ from helium, argon, and neon gas, respectively. In embodiments, cell types may be combined for based on specific functions. For example, a glow discharge cell which is very effective at producing catalyst for a source of catalyst such as $He^+$, $Ar^+$, and $Ne^+$ from helium, argon, and neon gas, respectively, may be combined with a reactor such as a microwave reactor that is well suited for the production of atomic hydrogen to react with the catalyst.

In an embodiment, the energy from the catalysis of atomic hydrogen forms or assists the maintenance of a plasma. The plasma dissociates water vapor to hydrogen and oxygen, which is removed and collected as a fuel.

8. Hydrogen Microwave Plasma and Power Cell and Reactor

A hydrogen microwave plasma and power cell and reactor of the present invention for the catalysis of atomic hydrogen to form increased-binding-energy-hydrogen species and increased-binding-energy-hydrogen compounds comprises a vessel having a chamber capable of containing a vacuum or pressures greater than atmospheric, a source of atomic hydrogen, a source of microwave power to form a plasma, and a catalyst capable of providing a net enthalpy of reaction of $m/2 \cdot 27.2 \pm 0.5$ eV where m is an integer, preferably m is an integer less than 400. The source of microwave power may comprise a microwave generator, a tunable microwave cavity, waveguide, and an antenna. Alternatively, the cell may further comprise a means to at least partially convert the power for the catalysis of atomic hydrogen to microwaves to maintain the plasma.

9. Hydrogen Capacitively and Inductively Coupled RF Plasma and Power Cell and Reactor A hydrogen capacitively and/or inductively coupled radio frequency (RF) plasma and power cell and reactor of the present invention for the catalysis of atomic hydrogen to form increased-binding-energy-hydrogen species and increased-binding-energy-hydrogen compounds comprises a vessel having a chamber capable of containing a vacuum or pressures greater than atmospheric, a source of atomic hydrogen, a source of RF power to form a plasma, and a catalyst capable of providing a net enthalpy of reaction of $m/2 \cdot 27.2 \pm 0.5$ eV where m is an integer, preferably m is an integer less than 400. The cell may further comprise at least two electrodes and an RF generator wherein the source of RF power may comprise the electrodes driven by the RF generator. Alternatively, the cell may further comprise a source coil which may be external to a cell wall which permits RF power to couple to the plasma formed in the cell, a conducting cell wall which may be grounded and a RF generator which drives the coil which may inductively and/or capacitively couple RF power to the cell plasma.

10. Hydrogen Laser

A laser of the present invention comprises a laser medium, a laser cavity, laser cavity mirrors, a power source, and a output laser beam from the cavity through one of the mirrors. The invention may further comprise Brewer windows and further optical components to cause stimulated emission of an inverted population of the laser medium in the cavity. In an embodiment, the laser medium comprises hydrogen molecules designated $H_2(1/p)$ wherein the internuclear distance of each is about a reciprocal integer p times that of ordinary $H_2$. The $H_2(1/p)$ molecules are vibration-rotationally excited and lase with a transition from a vibration-rotational level to another lower-energy-level other than one with a significant Boltzmann population at the cell neutral-gas temperature (e.g. one with both v and J=0). The vibration-rotational excitation may be by a direct collisional excitation. Alternatively, the excitation may be by an energy exchange with an excited state species such as an excited activator molecule. The direct excitation and the excitation of the activator may be by collision with an energetic particle from a particle beam such as an electron beam or collision with an energetic species accelerated by power input to the cell. The power input to cause energetic species may be at least one of a particle beam such as an electron beam and microwave, high voltage, and RF discharges. The source of $H_2(1/p)$ may external, or $H_2(1/p)$ may be generated insitu by the catalysis of atomic hydrogen to form $H(1/p)$ that further reacts to form $H_2(1/p)$ wherein the invention further comprises an increased-binding-energy-hydrogen species reactor. In an embodiment, the power source that may at least partially comprise a cell for the catalysis of atomic hydrogen to form novel hydrogen species and/or compositions of matter comprising new forms of hydrogen, an increased-binding-energy-hydrogen species reactor. The reaction may be maintained by a particle beam, microwave, glow, or RF discharge plasma of a source of atomic hydrogen and a source of catalyst such as argon to provide catalyst $Ar^+$. A species such as oxygen may react with the source of catalyst such as $Ar_2^*$ to form the catalyst such as $Ar^+$. At least one of the power from catalysis and an external power source maintains $H_2(1/p)$ in an excited vibration-rotational state from which stimulated emission may occur. The emission may be in the ultraviolet (UV) and extreme ultraviolet (EUV) which may be used for photolithography.

In a further embodiment, the laser comprises an increased-binding-energy-hydrogen species reactor wherein the catalysis reaction product $H(1/p)$ reacts with a proton to form a new molecular ion $H_2(1/p)^+$. Emission may occur due to the reaction $H(1/p)+H^+ \rightarrow H_2(1/p)^+$ with vibronic coupling with the resonant state $H_2(1/p')^+$. Transitions between levels in the transition state is stimulated to form lase light output. The energies of the levels are given by $$E_{D+vib} = E_D(H_2(1/p)^+) - \left(v^* + \frac{1}{2}\right)p'^2 E_{vib-H_2^+}, \quad v^* = 0, 1, 2, 3\ldots \quad (86)$$

where $E_D(H_2(1/p)^+)$ is the bond energy of $H_2(1/p)^+$ and $E_{vib\ H_2}^+$ is the transition-state vibrational energy of $H_2^+$.

In an embodiment, $H(1/4)$ reacts to form the molecular ion $H_2(1/4)^+$. Emission due to the reaction $H(1/4)+H^+H_2(1/4)^+$ with vibronic coupling with the resonant state $H_2(1/2)^+$ within the transition state was given by the previously derived formula [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted]:

$$E_{D+vib} = E_D(H_2(1/4)^+) - \left(v^* + \frac{1}{2}\right)2^2 E_{vibH_2^+}$$
$$= 48.16 - \left(v^* + \frac{1}{2}\right)1.172 \text{ eV}, \quad v^* = 0, 1, 2, 3 \ldots \quad (87)$$

where $E_D(H_2(1/4)^+)$ is the bond energy of $H_2(1/4)^+$ and $E_{vib\ H_2}^+$ is the transition-state vibrational energy of H. The predicted emission was observed for $v^* = 0, 1, 2, 3 \ldots 24$, and the series terminated at about 25.7 nm corresponding to the predicted bond energy of $H_2(1/4)^+$ of 48.16 eV [R. L. Mills, Y. Lu, J. He, M. Nansteel, P. Ray, X. Chen, A. Voigt, B. Dhandapani, "Spectral Identification of New States of Hydrogen", J. Phys. Chem. B, submitted, R. Mills, J. He, B. Dhandapani, P. Ray, "Comparison of Catalysts and Microwave Plasma Sources of Vibrational Spectral Emission of Fractional-Rydberg-State Hydrogen Molecular Ion", Canadian Journal of Physics, submitted, R. Mills, J. He, A. Echezuria, B Dhandapani, P. Ray, "Comparison of Catalysts and Plasma Sources of Vibrational Spectral Emission of Fractional-Rydberg-State Hydrogen Molecular Ion", European Journal of Physics D, submitted, and R. Mills, P. Ray, "Vibrational Spectral Emission of Fractional-Principal-Quantum-Energy-Level Hydrogen Molecular Ion", Int. J. Hydrogen Energy, Vol. 27, No. 5, (2002), pp. 533-564 which are herein incorporated by reference]. Transitions between levels in the transition state given by Eq. (68) is stimulated to form laser light output.

Two $H(1/p)$ may react to form $H_2(1/p)$ with emission of the bond energy from a resonant state within its transition state with vibration-rotational energies that are the same as those of $H_2(1/p')$. The energies $E_{D+vib}$ of this reaction are given by $$E_{D+vib} = E_D(H_2(1/p)) \pm E_{vib\ v} \quad (88)$$

where $E_D(H_2(1/p))$ is the bond energy of $H_2(1/p)$ given by Eq. (57) and $E_{vib\ v}$ is the vibrational energy of $H_2(1/p')$ given by Eq. (60). Transitions between levels in the transition state given by Eq. (88) is stimulated to form laser light output.

In an embodiment, two $H(1/2)$ may react to form $H_2(1/2)$ with emission of the bond energy from a resonant state within its transition state with vibration-rotational energies that are the same as those of $H_2$. A series of vibration-rotational bands in the 60-67 nm region, a high-energy region for which vibration-rotational spectra are ordinarily unknown, was observed from low-pressure helium-hydrogen (99/1%) microwave plasmas that matched the predicted energy spacing of the vibrational energy of $H_2$ about the bond energy of $H_2(1/2)$ corresponding to the reaction $2H(1/2)\ H_2(1/2)$ [R. L. Mills, Y. Lu, B. Dhandapani, "Spectral Identification of $H_2(1/2)$", submitted]. The energies $E_{D+vib}$ of this are given by $$E_{D+vib} = E_D(H_2(1/2)) \pm E_{vib\upsilon}$$
$$= 19.22 \text{ eV} \pm (\upsilon 0.5159 \text{ eV} - \upsilon'(\upsilon' - 1)0.01486 \text{ eV})' \quad (89)$$

$\upsilon = 0, 1$ red series

-continued $\upsilon = 0, 1, 2, 3$ blue series where $E_D(H_2(1/2))$ is the bond energy of $H_2(1/2)$ given by Eq. (57) and $E_{vib\ \upsilon}$ is the vibrational energy of $H_2$ given by Eq. (60). Transitions between levels in the transition state given by Eq. (89) is stimulated to form laser light output.

III. BRIEF DESCRIPTION OF THE DRAWINGS

IV. DETAILED DESCRIPTION OF THE INVENTION

The following preferred embodiments of the invention disclose numerous property ranges, including but not limited to, voltage, current, pressure, temperature, microwave power, electron-beam energy, current, and power, and the like, which are merely intended as illustrative examples. Based on the detailed written description, one skilled in the art would easily be able to practice this invention within other property ranges to produce the desired result without undue experimentation.

1. Hydrogen Power and Plasma Cell and Reactor

Figure 1:
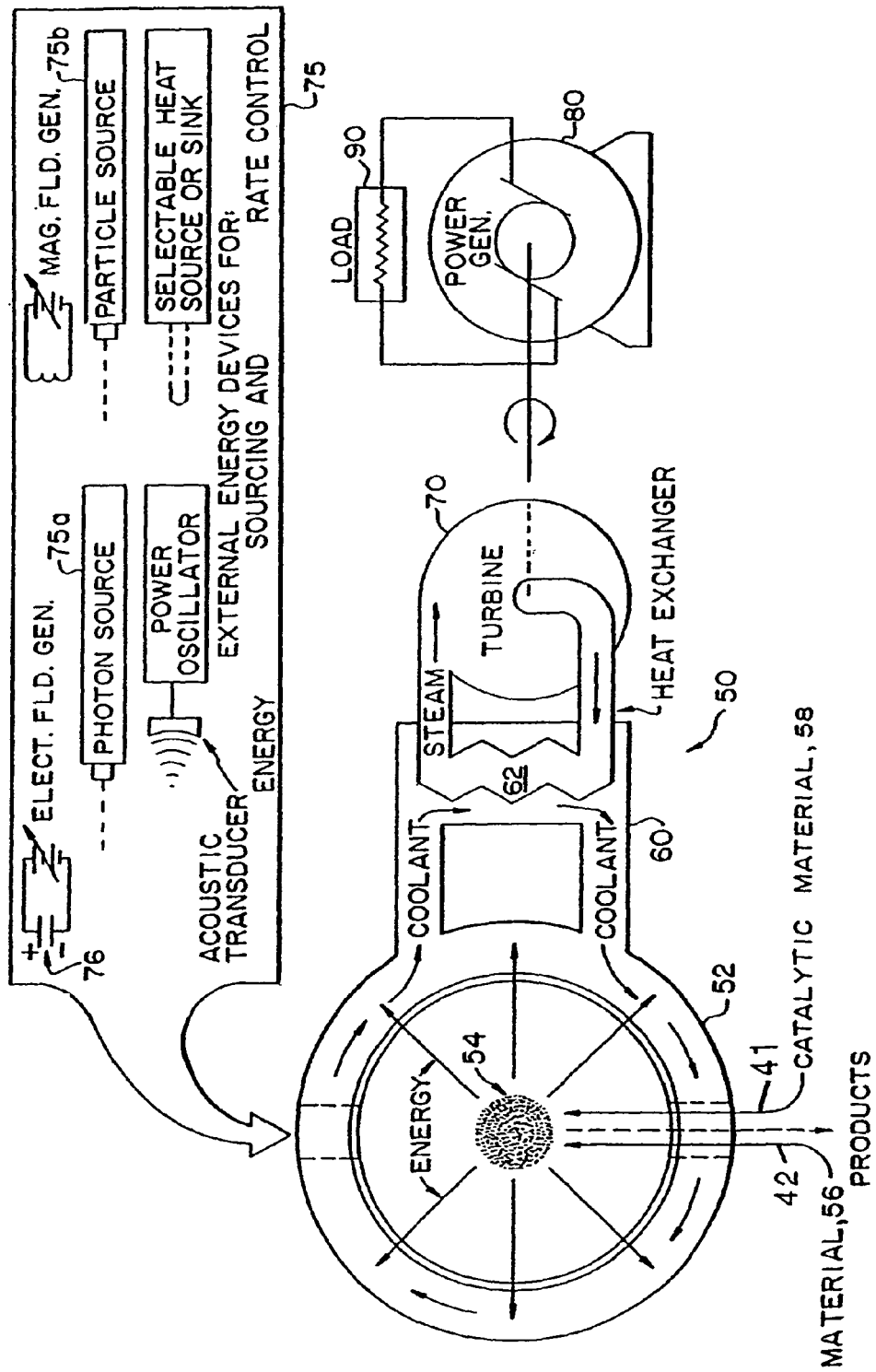
FIG. 1 is a schematic drawing of a power system comprising a hydrogen power and plasma cell and reactor in accordance with the present invention.

One embodiment of the present invention involves a power system comprising a hydrogen power and plasma cell and reactor shown in FIG. 1. The hydrogen power and plasma cell and reactor comprises a vessel 52 containing a catalysis mixture 54. The catalysis mixture 54 comprises a source of atomic hydrogen 56 supplied through hydrogen supply passage 42 and a catalyst 58 supplied through catalyst supply passage 41. Catalyst 58 has a net enthalpy of reaction of about $$\frac{m}{2} \cdot 27.21 \pm 0.5\ eV,$$

where m is an integer, preferably an integer less than 400. The catalysis involves reacting atomic hydrogen from the source 56 with the catalyst 58 to form lower-energy hydrogen "hydrinos" and produce power. The hydrogen reactor may further include an electron source 70 for contacting hydrinos with electrons, to reduce the hydrinos to hydrino hydride ions.

The source of hydrogen can be hydrogen gas, water, ordinary hydride, or metal-hydrogen solutions. The water may be dissociated to form hydrogen atoms by, for example, thermal dissociation or electrolysis. According to one embodiment of the invention, molecular hydrogen is dissociated into atomic hydrogen by a molecular hydrogen dissociating catalyst. Such dissociating catalysts include, for example, noble metals such as palladium and platinum, refractory metals such as molybdenum and tungsten, transition metals such as nickel and titanium, inner transition metals such as niobium and zirconium, and other such materials listed in the Prior Mills Publications.

According to another embodiment of the invention, a photon source such as a microwave or UV photon source dissociates hydrogen molecules to hydrogen atoms.

In the hydrogen power and plasma cell and reactor embodiments of the present invention, the means to form hydrinos can be one or more of an electrochemical, chemical, photochemical, thermal, free radical, sonic, or nuclear reaction(s), or inelastic photon or particle scattering reaction(s). In the latter two cases, the hydrogen reactor comprises a particle source 75*b* and/or photon source 75*a* as shown in FIG. 1, to supply the reaction as an inelastic scattering reaction. In one embodiment of the hydrogen reactor, the catalyst in the molten, liquid, gaseous, or solid state includes those given in TABLES 1 and 3 and those given in the Tables of the Prior Mills Publications (e.g. TABLE 4 of PCT/US90/01998 and pages 25-46, 80-108 of PCT/US94/02219).

When the catalysis occurs in the gas phase, the catalyst may be maintained at a pressure less than atmospheric, preferably in the range about 10 millitorr to about 100 torr. The atomic and/or molecular hydrogen reactant is also maintained at a pressure less than atmospheric, preferably in the range about 10 millitorr to about 100 torr. However, if desired, higher pressures even greater than atmospheric can be used.

The hydrogen power and plasma cell and reactor comprises the following: a source of atomic hydrogen; at least one of a solid, molten, liquid, or gaseous catalyst for generating hydrinos; and a vessel for containing the atomic hydrogen and the catalyst. Methods and apparatus for producing hydrinos, including a listing of effective catalysts and sources of hydrogen atoms, are described in the Prior Mills Publications. Methodologies for identifying hydrinos are also described. The hydrinos so produced may react with the electrons from a reductant to form hydrino hydride ions.

The power system may further comprise a source of electric field 76 which can be used to adjust the rate of hydrogen catalysis. It may further focus ions in the cell. It may further impart a drift velocity to ions in the cell. The cell may comprise a source of microwave power, which is generally known in the art, such as traveling wave tubes, klystrons, magnetrons, cyclotron resonance masers, gyrotrons, and free electron lasers. The present power cell may be an internal source of microwaves wherein the plasma generated from the hydrogen catalysis reaction may be magnetized to produce microwaves.

1.1 Hydrogen Plasma Electrolysis Power and Plasma Cell and Reactor

Figure 2:
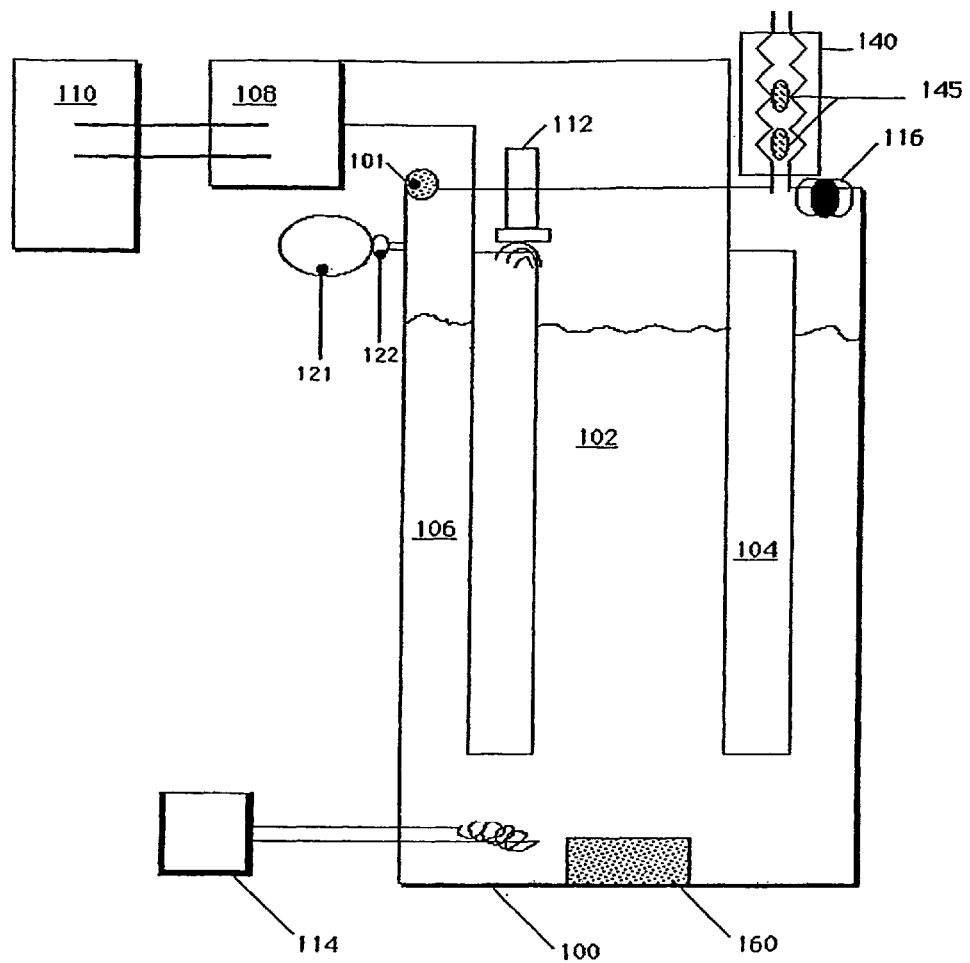
FIG. 2 is a schematic drawing of a hydrogen plasma electrolytic power and plasma cell and reactor in accordance with the present invention.

A hydrogen plasma electrolytic power cell and reactor of the present invention to make lower-energy hydrogen compounds comprises an electrolytic cell forming the reaction vessel 52 of FIG. 1, including a molten electrolytic cell. The electrolytic cell 100 is shown generally in FIG. 2. An electric current is passed through the electrolytic solution 102 having a catalyst by the application of a voltage to an anode 104 and cathode 106 by the power controller 108 powered by the power supply 110. Ultrasonic or mechanical energy may also be imparted to the cathode 106 and electrolytic solution 102 by vibrating means 112. Heal can be supplied to the electrolytic solution 102 by heater 114. The pressure of the electrolytic cell 100 can be controlled by pressure regulator means 116 where the cell can be closed. The reactor further comprises a means 101 that removes the (molecular) lower-energy hydrogen such as a selective venting valve to prevent the exothermic shrinkage reaction from coming to equilibrium.

In an embodiment, the plasma electrolytic cell is further supplied with hydrogen from hydrogen source 121 where the over pressure can be controlled by pressure control means 122 and 116. An embodiment of the electrolytic cell energy reactor, comprises a reverse fuel cell geometry which removes the lower-energy hydrogen under vacuum. The reaction vessel may be closed except for a connection to a condensor 140 on the top of the vessel 100. The cell may be operated at a boil such that the steam evolving from the boiling electrolyte 102 can be condensed in the condensor 140, and the condensed water can be returned to the vessel 100. The lower-energy state hydrogen can be vented through the top of the condensor 140. In one embodiment, the condensor contains a hydrogen/oxygen recombiner 145 that contacts the evolving electrolytic gases. The hydrogen and oxygen are recombined, and the resulting water can be returned to the vessel 100. The heat released from the catalysis of hydrogen and the heat released due to the recombination of the electrolytically generated normal hydrogen and oxygen can be removed by a heat exchanger 60 of FIG. 1 which can be connected to the condensor 140.

Hydrino atoms form at the cathode 106 via contact of the catalyst of electrolyte 102 with the hydrogen atoms generated at the cathode 106. The electrolytic cell hydrogen reactor apparatus may further comprises a source of electrons in contact with the hydrinos generated in the cell, to form hydrino hydride ions. The hydrinos are reduced (i.e. gain the electron) in the electrolytic cell to hydrino hydride ions. Reduction occurs by contacting the hydrinos with other element 160 such as a consumable reductant added to the cell from an outside source. A compound may form in the electrolytic cell between the hydrino hydride ions and cations. The cations may comprise a cation of an added reductant, or a cation of the electrolyte (such as a cation comprising the catalyst).

A hydrogen plasma forming electrolytic power cell and reactor of the present invention for the catalysis of atomic hydrogen to form increased-binding-energy-hydrogen species and increased-binding-energy-hydrogen compounds comprises a vessel, a cathode, an anode, an electrolyte, a high voltage electrolysis power supply, and a catalyst capable of providing a net enthalpy of reaction of $m/2 \cdot 27.2 \pm 0.5$ eV where m is an integer. Preferably m is an integer less than 400. In an embodiment, the voltage is in the range of about 10 V to 50 kV and the current density may be high such as in the range of about 1 to 100 A/cm$^2$ or higher. In an embodiment, K$^+$ is reduced to potassium atom which serves as the catalyst. The cathode of the cell may be tungsten such as a tungsten rod, and the anode of cell of may be platinum. The catalysts of the cell may comprise at least one selected from the group of Li, Be, K, Ca, Ti, V, Cr, Mn, Fe, Co, Ni, Cu, Zn, As, Se, Kr, Rb, Sr, Nb, Mo, Pd, Sn, Te, Cs, Ce, Pr, Sm, Gd, Dy, Pb, Pt, He$^+$, Na$^+$, Rb$^+$, Sr$^+$, Fe$^{3+}$, Mo$^{2+}$, Mo$^{4+}$, and In$^{3+}$. The catalyst of the cell of may be formed from a source of catalyst. The source of catalyst that forms the catalyst may comprise at least one selected from the group of Li, Be, K, Ca, Ti, V, Cr, Mn, Fe, Co, Ni, Cu, Zn, As, Se, Kr, Rb, Sr, Nb, Mo, Pd, Sn, Te, Cs, Ce, Pr, Sm, Gd, Dy, Pb, Pt, He$^+$, Na$^+$, Rb$^+$, Sr$^+$, Fe$^{3+}$, Mo$^{2+}$, Mo$^{4+}$, In$^{3+}$ and K$^+$/K$^+$ alone or comprising compounds. The source of catalyst may comprise a compound that provides K$^+$ that is reduced to the catalyst potassium atom during electrolysis.

The compound of formed comprises (a) at least one neutral, positive, or negative increased binding energy hydrogen species having a binding energy (i) greater than the binding energy of the corresponding ordinary hydrogen species, or (ii) greater than the binding energy of any hydrogen species for which the corresponding ordinary hydrogen species is unstable or is not observed because the ordinary hydrogen species' binding energy is less than thermal energies at ambient conditions, or is negative; and (b) at least one other element.

The increased binding energy hydrogen species may be selected from the group consisting of $H_n$, $H_n^-$ and $H_n^+$ where n is a positive integer, with the proviso that n is greater than 1 when H has a positive charge. The compound formed may be characterized in that the increased binding energy hydrogen species is selected from the group consisting of (a) hydride ion having a binding energy that is greater than the binding of ordinary hydride ion (about 0.8 eV) for p=2 up to 23 in which the binding energy is represented by $$\text{Binding Energy} = \frac{\hbar^2 \sqrt{s(s+1)}}{8\mu_e a_0^2 \left[1 + \frac{\sqrt{s(s+1)}}{p}\right]^2} - \frac{\pi \mu_0 e^2 \hbar^2}{m_e^2} \left(\frac{1}{a_H^3} + \frac{2^2}{a_0^3 \left[1 + \frac{\sqrt{s(s+1)}}{p}\right]^3}\right)$$

where p is an integer greater than one; (b) hydrogen atom having a binding energy greater than about 116 eV; (c) hydrogen molecule having a first binding energy greater than about 15.3 eV; and (d) molecular hydrogen ion having a binding energy greater than about 16.3 eV. The compound may be characterized in that the increased binding energy hydrogen species is a hydride ion having a binding energy of about 3, 6.6, 11.2, 16.7, 22.8, 29.3, 36.1, 42.8, 49.4, 55.5, 61.0, 65.6, 69.2, 71.6, 72.4, 71.6, 68.8, 64.0, 56.8, 47.1, 34.7, 19.3, and 0.69 eV. The compound may characterized in that the increased binding energy hydrogen species is a hydride ion having the binding energy:

$$\text{Binding Energy} = \frac{\hbar^2 \sqrt{s(s+1)}}{8\mu_e a_0^2 \left[1 + \frac{\sqrt{s(s+1)}}{p}\right]^2} - \frac{\pi \mu_0 e^2 \hbar^2}{m_e^2} \left(\frac{1}{a_H^3} + \frac{2^2}{a_0^3 \left[1 + \frac{\sqrt{s(s+1)}}{p}\right]^3}\right)$$

where p is an integer greater than one. The compound may characterized in that the increased binding energy hydrogen species is selected from the group consisting of (a) a hydrogen atom having a binding energy of about $$\frac{13.6 \text{ eV}}{\left(\frac{1}{p}\right)^2}$$

where p is an integer, (b) an increased binding energy hydride ion (H⁻) having a binding energy of about $$\frac{\hbar^2 \sqrt{s(s+1)}}{8\mu_e a_0^2 \left[\frac{1+\sqrt{s(s+1)}}{p}\right]^2} - \frac{\pi\mu_0 e^2 \hbar^2}{m_e^2} \left( \frac{1}{a_H^3} + \frac{2^2}{a_0^3 \left[\frac{1+\sqrt{s(s+1)}}{p}\right]^3} \right);$$

(c) an increased binding energy hydrogen species $H_4^+(1/p)$;

(d) an increased binding energy hydrogen species trihydrino molecular ion, $H_3^+(1/p)$, having a binding energy of about $$\frac{22.6}{\left(\frac{1}{p}\right)^2} \text{ eV}$$

(e) an increased binding energy hydrogen molecule having a binding energy of about $$IP_1 = E_T(H_2^+(1/p)) - E_T(H_2(1/p))$$
$$= -p^2 16.13392 \text{ eV} - p^3 0.118755 \text{ eV} - (-p^2 31.351 \text{ eV} - p^3 0.326469 \text{ eV})$$
$$= p^2 15.2171 \text{ eV} + p^3 0.207714 \text{ eV}$$

given by Eq. (196) of R. L. Mills, "The Nature of the Chemical Bond Revisited and an Alternative Maxwellian Approach", Il Nuovo Cimento, submitted which is herein incorporated by reference, and (f) an increased binding energy hydrogen molecular ion with a binding energy of about $IP_2=p^2 16.13392$ eV+$p^3 0.118755$ eV given by Eq. (197) of R. L. Mills, "The Nature of the Chemical Bond Revisited and an Alternative Maxwellian Approach", Il Nuovo Cimento, submitted which is herein incorporated by reference.

1.2 Hydrogen Gas Power and Plasma Cell and Reactor

Figure 3:
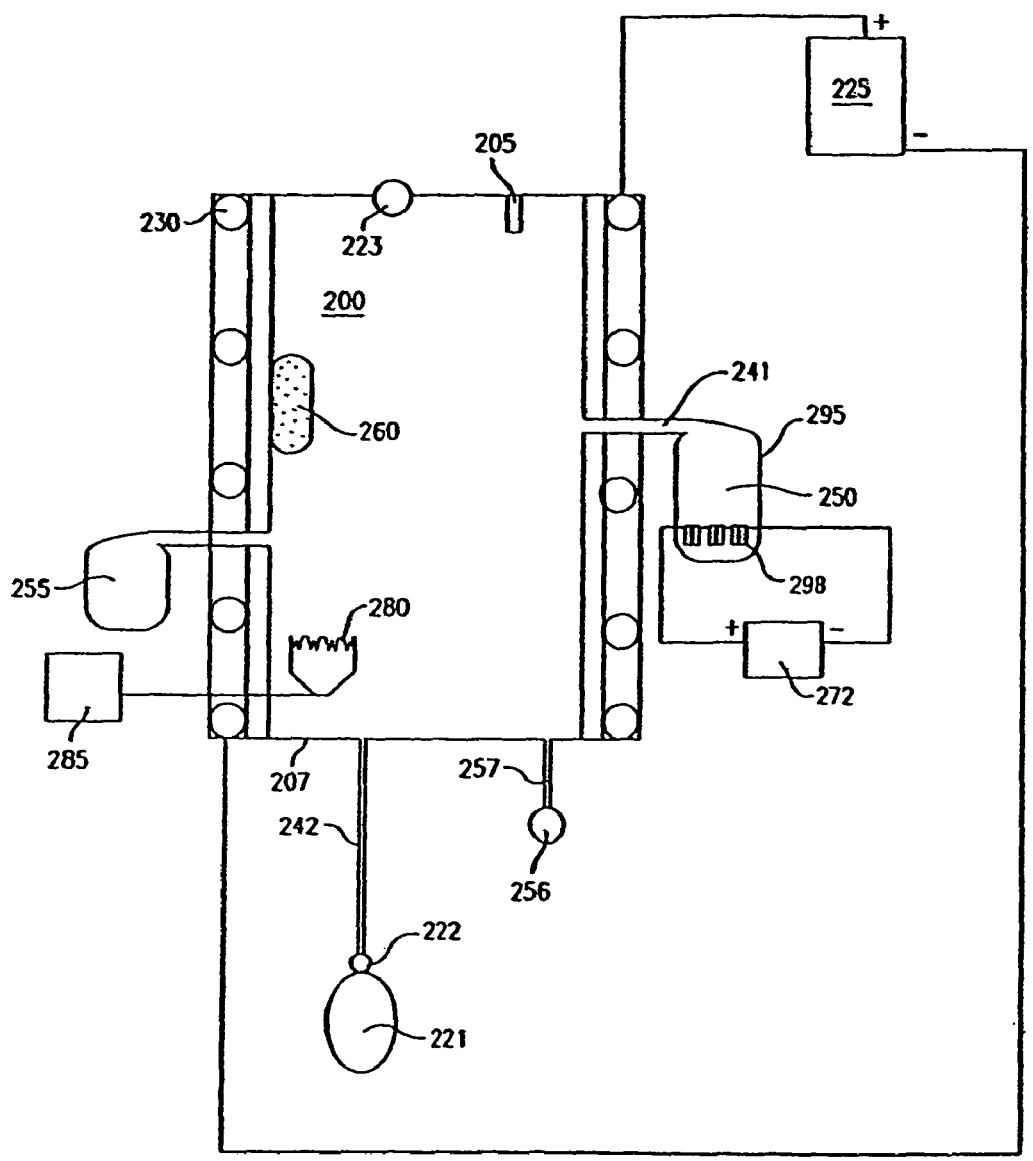
FIG. 3 is a schematic drawing of a hydrogen gas power and plasma cell and reactor in accordance with the present invention.

According to an embodiment of the invention, a reactor for producing hydrinos, plasma, and power may take the form of a hydrogen gas cell. A gas cell hydrogen reactor of the present invention is shown in FIG. 3. Reactant hydrinos are provided by a catalytic reaction with a catalyst such as at least one of those given in TABLES 1 and 3 and/or a by a disproportionation reaction. Catalysis may occur in the gas phase.

The reactor of FIG. 3 comprises a reaction vessel 207 having a chamber 200 capable of containing a vacuum or pressures greater than atmospheric. A source of hydrogen 221 communicating with chamber 200 delivers hydrogen to the chamber through hydrogen supply passage 242. A controller 222 is positioned to control the pressure and flow of hydrogen into the vessel through hydrogen supply passage 242. A pressure sensor 223 monitors pressure in the vessel. A vacuum pump 256 is used to evacuate the chamber through a vacuum line 257. The apparatus may further comprise a source of electrons in contact with the hydrinos to form hydrino hydride ions.

In an embodiment, the source of hydrogen 221 communicating with chamber 200 that delivers hydrogen to the chamber through hydrogen supply passage 242 is a hydrogen permeable hollow cathode of an electrolysis cell. Electrolysis of water produces hydrogen that permeates through the hollow cathode. The cathode may be a transition metal such as nickel, iron, or titanium, or a noble metal such as palladium, or platinum, or tantalum or palladium coated tantalum, or palladium coated niobium. The electrolyte may be basic and the anode may be nickel. The electrolyte may be aqueous $K_2CO_3$. The flow of hydrogen into the cell may be controlled by controlling the electrolysis current with an electrolysis power controller.

A catalyst 250 for generating hydrino atoms can be placed in a catalyst reservoir 295. The catalyst in the gas phase may comprise the catalysts given in TABLES 1 and 3 and those in the Mills Prior Publications. The reaction vessel 207 has a catalyst supply passage 241 for the passage of gaseous catalyst from the catalyst reservoir 295 to the reaction chamber 200. Alternatively, the catalyst may be placed in a chemically resistant open container, such as a boat, inside the reaction vessel.

The molecular and atomic hydrogen partial pressures in the reactor vessel 207, as well as the catalyst partial pressure, is preferably maintained in the range of about 10 millitorr to about 100 torr. Most preferably, the hydrogen partial pressure in the reaction vessel 207 is maintained at about 200 millitorr.

Molecular hydrogen may be dissociated in the vessel into atomic hydrogen by a dissociating material. The dissociating material may comprise, for example, a noble metal such as platinum or palladium, a transition metal such as nickel and titanium, an inner transition metal such as niobium and zirconium, or a refractory metal such as tungsten or molybdenum. The dissociating material may be maintained at an elevated temperature by the heat liberated by the hydrogen catalysis (hydrino generation) and hydrino reduction taking place in the reactor. The dissociating material may also be maintained at elevated temperature by temperature control means 230, which may take the form of a heating coil as shown in cross section in FIG. 3. The heating coil is powered by a power supply 225.

Molecular hydrogen may be dissociated into atomic hydrogen by application of electromagnetic radiation, such as UV light provided by a photon source 205, by a hot filament or grid 280 powered by power supply 285, or by the plasma generated in the cell by the catalysis reaction.

The hydrogen dissociation occurs such that the dissociated hydrogen atoms contact a catalyst which is in a molten, liquid, gaseous, or solid form to produce hydrino atoms. The catalyst vapor pressure is maintained at the desired pressure by controlling the temperature of the catalyst reservoir 295 with a catalyst reservoir heater 298 powered by a power supply 272. When the catalyst is contained in a boat inside the reactor, the catalyst vapor pressure is maintained at the desired value by controlling the temperature of the catalyst boat, by adjusting the boat's power supply.

The rate of production of hydrinos and power by the hydrogen gas cell can be controlled by controlling the amount of catalyst in the gas phase and/or by controlling the concentration of atomic hydrogen. The concentration of gaseous catalyst in vessel chamber 200 may be controlled by controlling the initial amount of the volatile catalyst present in the chamber 200. The concentration of gaseous catalyst in chamber 200 may also be controlled by controlling the catalyst temperature, by adjusting the catalyst reservoir heater 298, or by adjusting a catalyst boat heater when the catalyst is contained in a boat inside the reactor. The vapor pressure of the volatile catalyst 250 in the chamber 200 is determined by the temperature of the catalyst reservoir 295, or the temperature of the catalyst boat, because each is colder than the reactor vessel 207. The reactor vessel 207 temperature is maintained at a higher operating temperature than catalyst reservoir 295 with heat liberated by the hydrogen catalysis (hydrino generation) and hydrino reduction. The reactor vessel temperature may also be maintained by a temperature control means, such as heating coil 230 shown in cross section in FIG. 3. Heating coil 230 is powered by power supply 225. The reactor temperature further controls the reaction rates such as hydrogen dissociation and catalysis.

In an embodiment, the catalyst comprises a mixture of a first catalyst supplied from the catalyst reservoir 295 and a source of a second catalyst supplied from gas supply 221 regulated by flow controller 222. Hydrogen may also be supplied to the cell from gas supply 221 regulated by flow controller 222. The flow controller 222 may achieve a desired mixture of the source of a second catalyst and hydrogen, or the gases may be premixed in a desired ratio. In an embodiment, the first catalyst produces the second catalyst from the source of the second catalyst. In an embodiment, the energy released by the catalysis of hydrogen by the first catalyst produces a plasma in the energy cell. The energy ionizes the source of the second catalyst to produce the second catalyst. The first catalyst may be selected from the group of catalysts given in TABLES 1 and 3 such as potassium and strontium, the source of the second catalyst may be selected from the group of helium and argon and the second catalyst may be selected from the group of $He^+$ and $Ar^+$ wherein the catalyst ion is generated from the corresponding atom by a plasma created by catalysis of hydrogen by the first catalyst. For examples, 1.) the energy cell contains strontium and argon wherein hydrogen catalysis by strontium produces a plasma containing $Ar^+$ which serves as a second catalyst (Eqs. (15-17)) and 2.) the energy cell contains potassium and helium wherein hydrogen catalysis by potassium produces a plasma containing $He^+$ which serves as a second catalyst (Eqs. (12-14)). In an embodiment, the pressure of the source of the second catalyst is in the range of about 1 millitorr to about one atmosphere. The hydrogen pressure is in the range of about 1 millitorr to about one atmosphere. In a preferred embodiment, the total pressure is in the range of about 0.5 torr to about 2 torr. In an embodiment, the ratio of the pressure of the source of the second catalyst to the hydrogen pressure is greater than one. In a preferred embodiment, hydrogen is about 0.1% to about 99%, and the source of the second catalyst comprises the balance of the gas present in the cell. More preferably, the hydrogen is in the range of about 1% to about 5% and the source of the second catalyst is in the range of about 95% to about 99%. Most preferably, the hydrogen is about 5% and the source of the second catalyst is about 95%. These pressure ranges are representative examples and a skilled person will be able to practice this invention using a desired pressure to provide a desired result.

The preferred operating temperature depends, in part, on the nature of the material comprising the reactor vessel 207. The temperature of a stainless steel alloy reactor vessel 207 is preferably maintained at about 200-1200° C. The temperature of a molybdenum reactor vessel 207 is preferably maintained at about 200-1800° C. The temperature of a tungsten reactor vessel 207 is preferably maintained at about 200-3000° C. The temperature of a quartz or ceramic reactor vessel 207 is preferably maintained at about 200-1800° C.

The concentration of atomic hydrogen in vessel chamber 200 can be controlled by the amount of atomic hydrogen generated by the hydrogen dissociation material. The rate of molecular hydrogen dissociation can be controlled by controlling the surface area, the temperature, and/or the selection of the dissociation material. The concentration of atomic hydrogen may also be controlled by the amount of atomic hydrogen provided by the atomic hydrogen source 221. The concentration of atomic hydrogen can be further controlled by the amount of molecular hydrogen supplied from the hydrogen source 221 controlled by a flow controller 222 and a pressure sensor 223. The reaction rate may be monitored by windowless ultraviolet (UV) emission spectroscopy to detect the intensity of the UV emission due to the catalysis and the hydrino, dihydrino molecular ion, dihydrino molecule, hydride ion, and compound emissions.

The gas cell hydrogen reactor further comprises other element as an electron source 260 such a reductant in contact with the generated hydrinos to form hydrino hydride ions. Compounds comprising a hydrino hydride anion and a cation may be formed in the gas cell. The cation which forms the hydrino hydride compound may comprise a cation from an added reductant, or a cation present in the cell (such as the cation of the catalyst). The cell may further comprise a getter or cryotrap 255 to selectively collect the lower-energy-hydrogen species and/or the increased-binding-energy hydrogen compounds.

The rt-plasma may be initiated by external heaters and a tungsten filament that is a source of electrons as given in H. Conrads, R. Mills, Th. Wrubel, "Emission in the Deep Vacuum Ultraviolet from a Plasma Formed by Incandescently Heating Hydrogen Gas with Trace Amounts of Potassium Carbonate", Plasma Sources Science and Technology, Vol. 12, (2003), pp. 389-395 which is herein incorporated by reference. The filament emission may be sufficient at low temperature to initiate the rt-plasma. An efficient source is a rhenium, BaO-coated, or radioactive filament such as a thoriated-tungsten filament. In the latter case, the emission is sufficiently energetic to ionize the catalyst such as $Sr^+$ or $Ar^+$, and the formed-rt-plasma maintains the ionization at a much higher level.

1.3 Hydrogen Gas Discharge Power and Plasma Cell and Reactor

Figure 4:
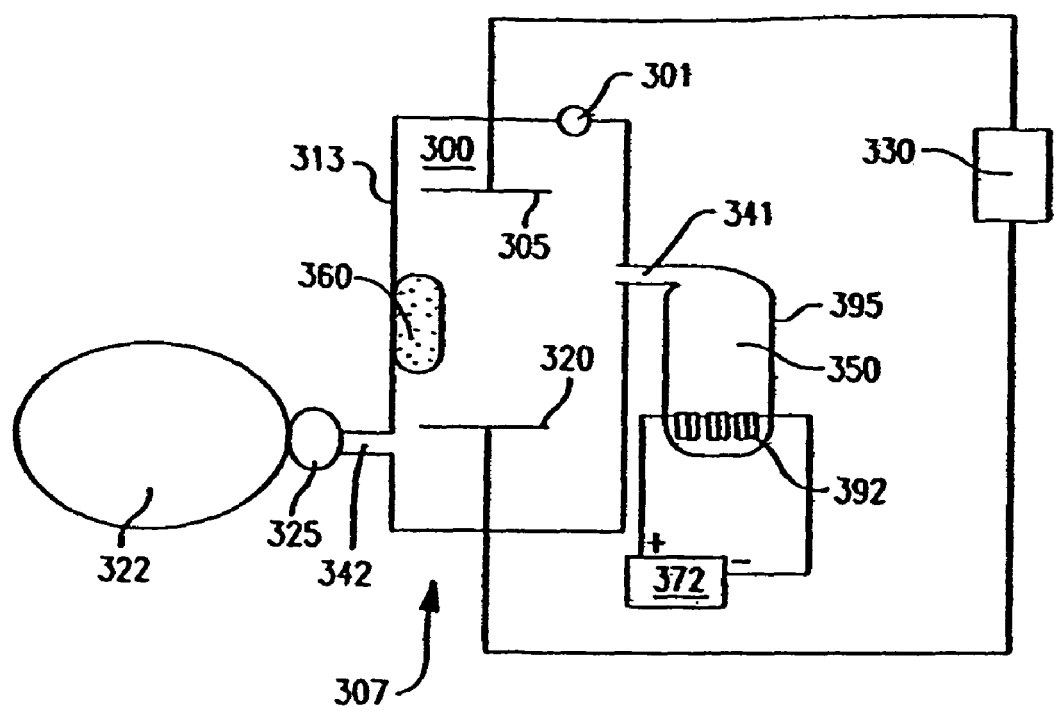
FIG. 4 is a schematic drawing of a hydrogen gas discharge power and plasma cell and reactor in accordance with the present invention.

A hydrogen gas discharge power and plasma cell and reactor of the present invention is shown in FIG. 4. The hydrogen gas discharge power and plasma cell and reactor of FIG. 4, includes a gas discharge cell 307 comprising a hydrogen isotope gas-filled glow discharge vacuum vessel 313 having a chamber 300. A hydrogen source 322 supplies hydrogen to the chamber 300 through control valve 325 via a hydrogen supply passage 342. A catalyst is contained in catalyst reservoir 395. A voltage and current source 330 causes current to pass between a cathode 305 and an anode 320. The current may be reversible. In another embodiment, the plasma is generated with a microwave source such as a microwave generator.

In one embodiment of the hydrogen gas discharge power and plasma cell and reactor, the wall of vessel 313 is conducting and serves as the anode. In another embodiment, the cathode 305 is hollow such as a hollow, nickel, aluminum, copper, tungsten, molybdenum, or stainless steel hollow cathode. In an embodiment, the cathode material may be a source of catalyst such as iron or samarium.

The cathode 305 may be coated with the catalyst for generating hydrinos and energy. The catalysis to form hydrinos and energy occurs on the cathode surface. To form hydrogen atoms for generation of hydrinos and energy, molecular hydrogen is dissociated on the cathode. To this end, the cathode is formed of a hydrogen dissociative material. Alternatively, the molecular hydrogen is dissociated by the discharge.

According to another embodiment of the invention, the catalyst for generating hydrinos and energy is in gaseous form. For example, the discharge may be utilized to vaporize the catalyst to provide a gaseous catalyst. Alternatively, the gaseous catalyst is produced by the discharge current. For example, the gaseous catalyst may be provided by a discharge in rubidium metal to form $Rb^+$, strontium metal to form $Sr^+$, or titanium metal to form $Ti^{2+}$, or potassium to volatilize the metal. The gaseous hydrogen atoms for reaction with the gaseous catalyst are provided by a discharge of molecular hydrogen gas such that the catalysis occurs in the gas phase.

Another embodiment of the hydrogen gas discharge power and plasma cell and reactor where catalysis occurs in the gas phase utilizes a controllable gaseous catalyst. The gaseous hydrogen atoms for conversion to hydrinos are provided by a discharge of molecular hydrogen gas. The gas discharge cell 307 has a catalyst supply passage 341 for the passage of the gaseous catalyst 350 from catalyst reservoir 395 to the reaction chamber 300. The catalyst reservoir 395 is heated by a catalyst reservoir heater 392 having a power supply 372 to provide the gaseous catalyst to the reaction chamber 300. The catalyst vapor pressure is controlled by controlling the temperature of the catalyst reservoir 395, by adjusting the heater 392 by means of its power supply 372. The reactor further comprises a selective venting valve 301.

In another embodiment of the hydrogen gas discharge power and plasma cell and reactor where catalysis occurs in the gas phase utilizes a controllable gaseous catalyst. Gaseous hydrogen atoms provided by a discharge of molecular hydrogen gas. A chemically resistant (does not react or degrade during the operation of the reactor) open container, such as a tungsten or ceramic boat, positioned inside the gas discharge cell contains the catalyst. The catalyst in the catalyst boat is heated with a boat heater using by means of an associated power supply to provide the gaseous catalyst to the reaction chamber. Alternatively, the glow gas discharge cell is operated at an elevated temperature such that the catalyst in the boat is sublimed, boiled, or volatilized into the gas phase. The catalyst vapor pressure is controlled by controlling the temperature of the boat or the discharge cell by adjusting the heater with its power supply.

The gas discharge cell may be operated at room temperature by continuously supplying catalyst. Alternatively, to prevent the catalyst from condensing in the cell, the temperature is maintained above the temperature of the catalyst source, catalyst reservoir 395 or catalyst boat. For example, the temperature of a stainless steel alloy cell is about 0-1200° C.; the temperature of a molybdenum cell is about 0-1800° C.; the temperature of a tungsten cell is about 0-3000° C.; and the temperature of a glass, quartz, or ceramic cell is about 0-1800° C. The discharge voltage may be in the range of about 1000 to about 50,000 volts. The current may be in the range of about 1 µA to about 1 A, preferably about 1 mA.

The discharge current may be intermittent or pulsed. Pulsing may be used to reduce the input power, and it may also provide a time period wherein the field is set to a desired strength by an offset voltage which may be below the discharge voltage. One application of controlling the field during the nondischarge period is to optimize the energy match between the catalyst and the atomic hydrogen. In an embodiment, the offset voltage is between, about 0.5 to about 500 V. In another embodiment, the offset voltage is set to provide a field of about 0.1 V/cm to about 50 V/cm. Preferably, the offset voltage is set to provide a field between about 1 V/cm to about 10 V/cm. The peak voltage may be in the range of about 1 V to 10 MV. More preferably, the peak voltage is in the range of about 10 V to 100 kV. Most preferably, the voltage is in the range of about 100 V to 500 V. The pulse frequency and duty cycle may also be adjusted. An application of controlling the pulse frequency and duty cycle is to optimize the power balance. In an embodiment, this is achieved by optimizing the reaction rate versus the input power. The amount of catalyst and atomic hydrogen generated by the discharge decay during the nondischarge period. The reaction rate may be controlled by controlling the amount of catalyst generated by the discharge such as $Ar^+$ and the amount of atomic hydrogen wherein the concentration is dependent on the pulse frequency, duty cycle, and the rate of decay. In an embodiment, the pulse frequency is of about 0.1 Hz to about 100 MHz. In another embodiment, the pulse frequency is faster than the time for substantial atomic hydrogen recombination to molecular hydrogen. Based on anomalous plasma afterglow duration studies [R. Mills, T. Onuma, and Y. Lu, "Formation of a Hydrogen Plasma from an Incandescently Heated Hydrogen-Catalyst Gas Mixture with an Anomalous Afterglow Duration", Int. J. Hydrogen Energy, Vol. 26, No. 7, July, (2001), pp. 749-762; R. Mills, "Temporal Behavior of Light-Emission in the Visible Spectral Range from a Ti—K2CO3-H-Cell", Int. J. Hydrogen Energy, Vol. 26, No. 4, (2001), pp. 327-332], preferably the frequency is within the range of about 1 to about 200 Hz. In an embodiment, the duty cycle is about 0.1% to about 95%. Preferably, the duty cycle is about 1% to about 50%.

In another embodiment, the power may be applied as an alternating current (AC). The frequency may be in the range of about 0.001 Hz to 1 GHz. More preferably the frequency is in the range of about 60 Hz to 100 MHz. Most preferably, the frequency is in the range of about 10 to 100 MHz. The system may comprises two electrodes wherein one or more electrodes are in direct contact with the plasma; otherwise, the electrodes may be separated from the plasma by a dielectric barrier. The peak voltage may be in the range of about 1 V to 10 MV. More preferably, the peak voltage is in the range of about 10 V to 100 kV. Most preferably, the voltage is in the range of about 100 V to 500 V.

The gas discharge cell apparatus further comprises other element as an electron source 360 such a reductant in contact with the generated hydrinos to form hydrino hydride ions. Compounds comprising a hydrino hydride anion and a cation may be formed in the gas cell. The cation which forms the hydrino hydride compound may comprise a cation from an added reductant, or a cation present in the cell (such as the cation of the catalyst).

In one embodiment of the gas discharge cell apparatus, alkali and alkaline earth hydrino hydrides and energy are produced in the gas discharge cell 307. In an embodiment, the catalyst reservoir 395 contains potassium, rubidium, or strontium metal which may be is ionized to $K^+$, $Rb^+$ or $Sr^+$ catalyst, respectively. The catalyst vapor pressure in the gas discharge cell is controlled by heater 392. The catalyst reservoir 395 is heated with the heater 392 to maintain the catalyst vapor pressure proximal to the cathode 305 preferably in the pressure range 10 millitorr to 100 torr, more preferably at about 200 mtorr. In another embodiment, the cathode 305 and the anode 320 of the gas discharge cell 307 are coated with potassium, rubidium, or strontium. The catalyst is vaporized during the operation of the cell. The hydrogen supply from source 322 is adjusted with control 325 to supply hydrogen and maintain the hydrogen pressure in the 10 millitorr to 100 ton range.

In an embodiment, the electrode to provide the electric field is a compound electrode comprising multiple electrodes in series or parallel that may occupy a substantial portion of the volume of the reactor. In one embodiment, the electrode comprises multiple hollow cathodes in parallel so that the desired electric field is produced in a large volume to generate a substantial power level. One design of the multiple hollow cathodes comprises an anode and multiple concentric hollow cathodes each electrically isolated from the common anode. Another compound electrode comprises multiple parallel plate electrodes connected in series.

A preferable hollow cathode is comprised of refractory materials such as molybdenum or tungsten. A preferably hollow cathode comprises a compound hollow cathode. A preferable catalyst of a compound hollow cathode discharge cell is neon as described in R. L. Mills, P. Ray, J. Dong, M. Nansteel, B. Dhandapani, J. He, "Spectral Emission of Fractional-Principal-Quantum-Energy-Level Atomic and Molecular Hydrogen", Vibrational Spectroscopy, Vol. 31, No. 2, (2003), pp. 195-213 which is herein incorporated by reference in its entirety. In an embodiment of the cell comprising a compound hollow cathode and neon as the source of catalyst with hydrogen, the partial pressure of neon is in the range 99.99%-90% and hydrogen is in the range 0.01-10%. Preferably the partial pressure of neon is in the range 99.9-99% and hydrogen is in the range 0.1-1%.

Figure 5:
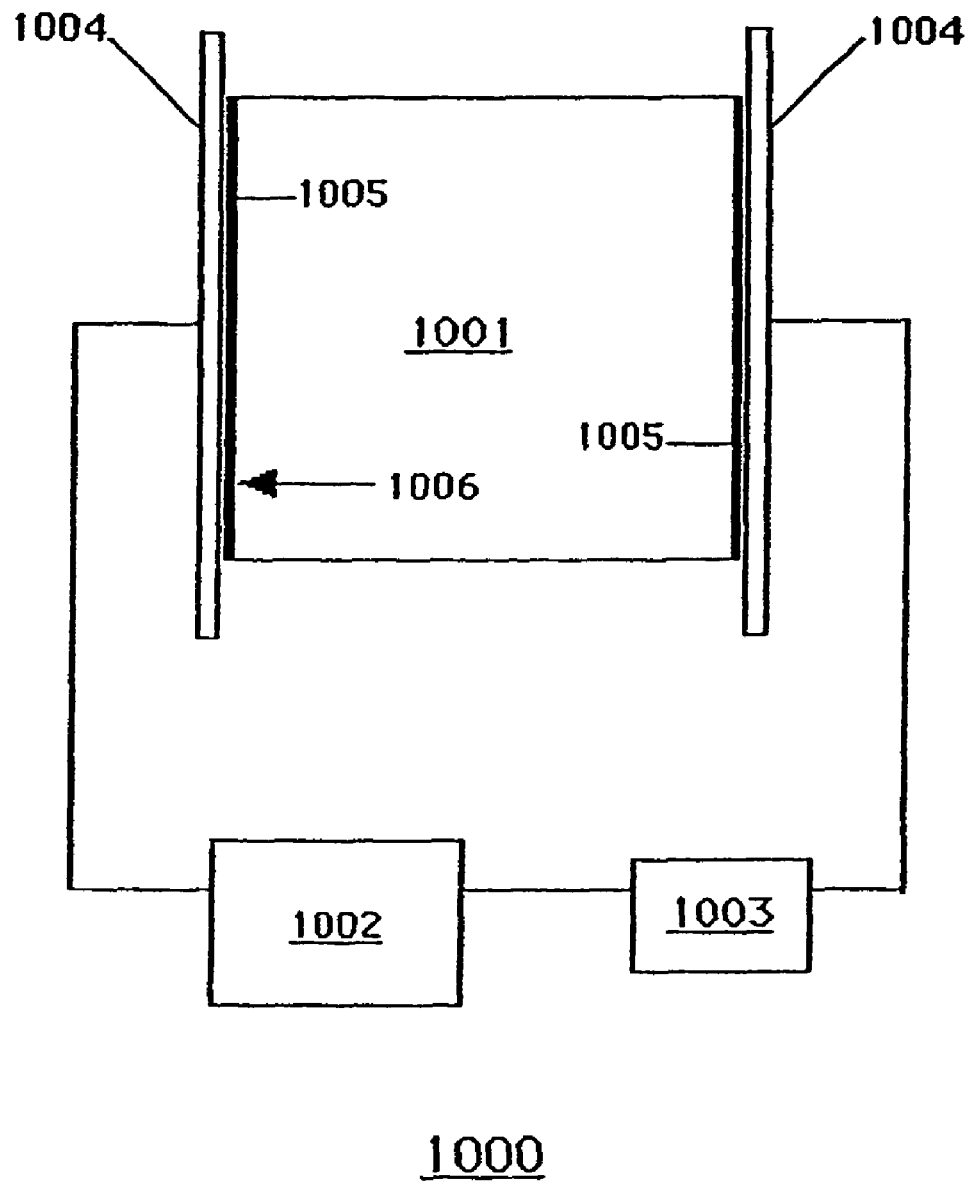
FIG. 5 is a schematic drawing of a hydrogen RF barrier electrode gas discharge power and plasma cell and reactor in accordance with the present invention.

1.4 Hydrogen Radio Frequency (RF) Barrier Electrode Discharge Power and Plasma Cell and Reactor In an embodiment of the hydrogen discharge power and plasma cell and reactor, at least one of the discharge electrodes is shielded by a dielectric barrier such as glass, quartz, Alumina, or ceramic in order to provide an electric field with minimum power dissipation. A radio frequency (RF) barrier electrode discharge cell system 1000 of the present invention is shown in FIG. 5. The RF power may be capacitively coupled. In an embodiment, the electrodes 1004 may be external to the cell 1001. A dielectric layer 1005 separates the electrodes from the cell wall 1006. The high driving voltage may be AC and may be high frequency. The driving circuit comprises a high voltage power source 1002 which is capable of providing RF and an impedance matching circuit 1003. The frequency is preferably in the range of about 100 Hz to about 10 GHz, more preferably, about 1 kHz to about 1 MHz, most preferably about 5-10 kHz. The voltage is preferably in the range of about 100 V to about 1 MV, more preferably about 1 kV to about 100 kV, and most preferably about 5 to about 10 kV.

1.5 Hydrogen Plasma Torch Power and Plasma Cell and Reactor

Figure 6:
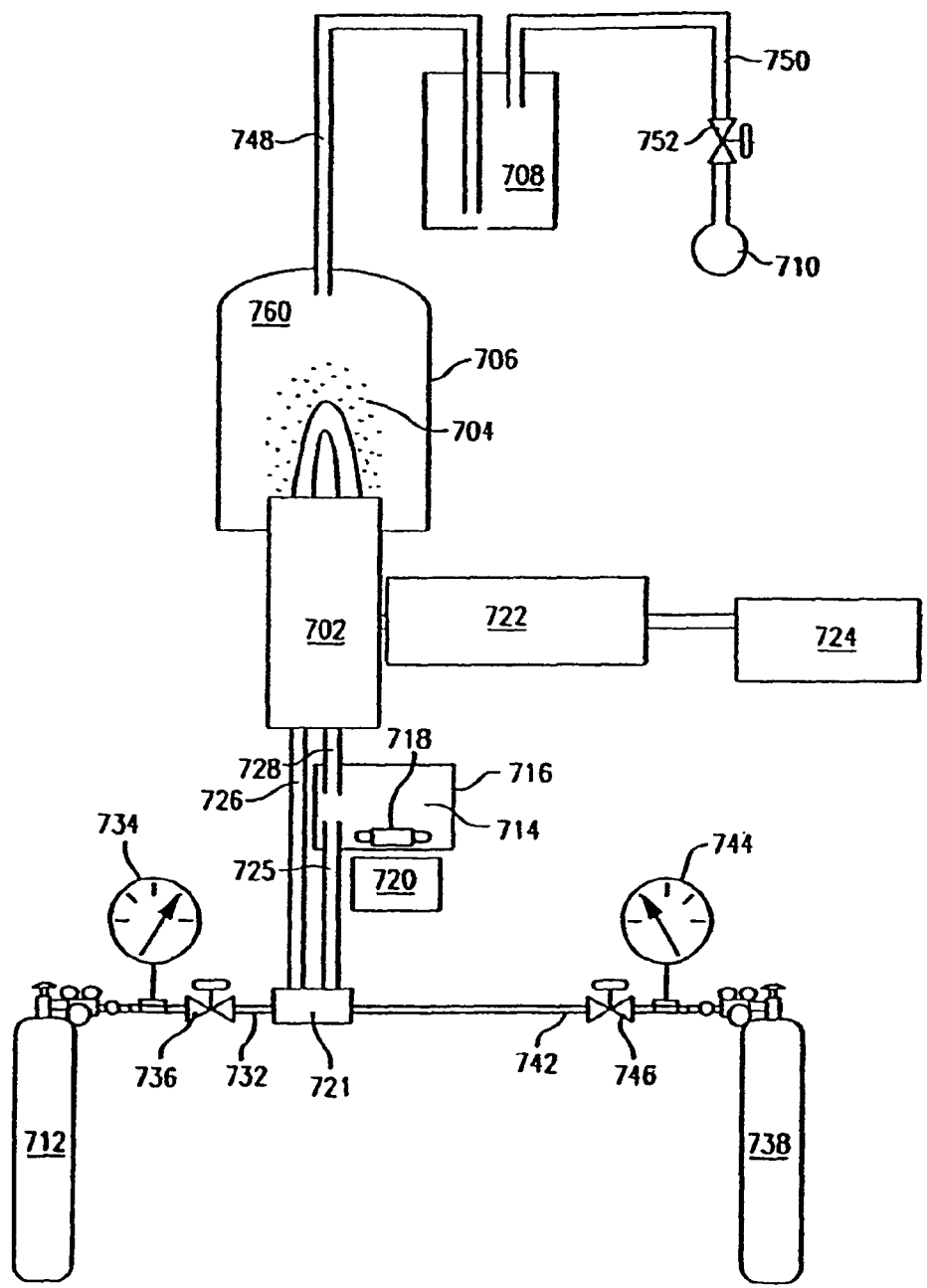
FIG. 6 is a schematic drawing of a hydrogen plasma torch power and plasma cell and reactor in accordance with the present invention.

A hydrogen plasma torch power and plasma cell and reactor of the present invention is shown in FIG. 6. A plasma torch 702 provides a hydrogen isotope plasma 704 enclosed by a manifold 706 and contained in plasma chamber 760. Hydrogen from hydrogen supply 738 and plasma gas from plasma gas supply 712, along with a catalyst 714 for forming hydrinos and energy, is supplied to torch 702. The plasma may comprise argon, for example. The catalyst may comprise at least one of those given in TABLES 1 and 3 or a hydrino atom to provide a disproportionation reaction. The catalyst is contained in a catalyst reservoir 716. The reservoir is equipped with a mechanical agitator, such as a magnetic stirring bar 718 driven by magnetic stirring bar motor 720. The catalyst is supplied to plasma torch 702 through passage 728. The catalyst may be generated by a microwave discharge. Preferred catalysts are $He^+$ or $Ar^+$ from a source such as helium gas or argon gas.

Hydrogen is supplied to the torch 702 by a hydrogen passage 726. Alternatively, both hydrogen and catalyst may be supplied through passage 728. The plasma gas is supplied to the torch by a plasma gas passage 726. Alternatively, both plasma gas and catalyst may be supplied through passage 728.

Hydrogen flows from hydrogen supply 738 to a catalyst reservoir 716 via passage 742. The flow of hydrogen is controlled by hydrogen flow controller 744 and valve 746. Plasma gas flows from the plasma gas supply 712 via passage 732. The flow of plasma gas is controlled by plasma gas flow controller 734 and valve 736. A mixture of plasma gas and hydrogen is supplied to the torch via passage 726 and to the catalyst reservoir 716 via passage 725. The mixture is controlled by hydrogen-plasma-gas mixer and mixture flow regulator 721. The hydrogen and plasma gas mixture serves as a carrier gas for catalyst particles which are dispersed into the gas stream as fine particles by mechanical agitation. The aerosolized catalyst and hydrogen gas of the mixture flow into the plasma torch 702 and become gaseous hydrogen atoms and vaporized catalyst ions (such as $Rb^+$ ions from a salt of rubidium) in the plasma 704. The plasma is powered by a microwave generator 724 wherein the microwaves are tuned by a tunable microwave cavity 722. Catalysis may occur in the gas phase.

The amount of gaseous catalyst in the plasma torch can be controlled by controlling the rate at which the catalyst is aerosolized with a mechanical agitator. The amount of gaseous catalyst can also be controlled by controlling the carrier gas flow rate where the carrier gas includes a hydrogen and plasma gas mixture (e.g., hydrogen and argon). The amount of gaseous hydrogen atoms to the plasma torch can be controlled by controlling the hydrogen flow rate and the ratio of hydrogen to plasma gas in the mixture. The hydrogen flow rate and the plasma gas flow rate to the hydrogen-plasma-gas mixer and mixture flow regulator 721 can be controlled by flow rate controllers 734 and 744, and by valves 736 and 746. Mixer regulator 721 controls the hydrogen-plasma mixture to the torch and the catalyst reservoir. The catalysis rate can also be controlled by controlling the temperature of the plasma with microwave generator 724.

Hydrino atoms, dihydrino molecular ions, dihydrino molecules, and hydrino hydride ions are produced in the plasma 704. Dihydrino molecules and hydrino hydride compounds may be cryopumped onto the manifold 706, or they may flow into a trap 708 such as a cryotrap through passage 748. Trap 708 communicates with vacuum pump 710 through vacuum line 750 and valve 752. A flow to the trap 708 is effected by a pressure gradient controlled by the vacuum pump 710, vacuum line 750, and vacuum valve 752.

Figure 7:
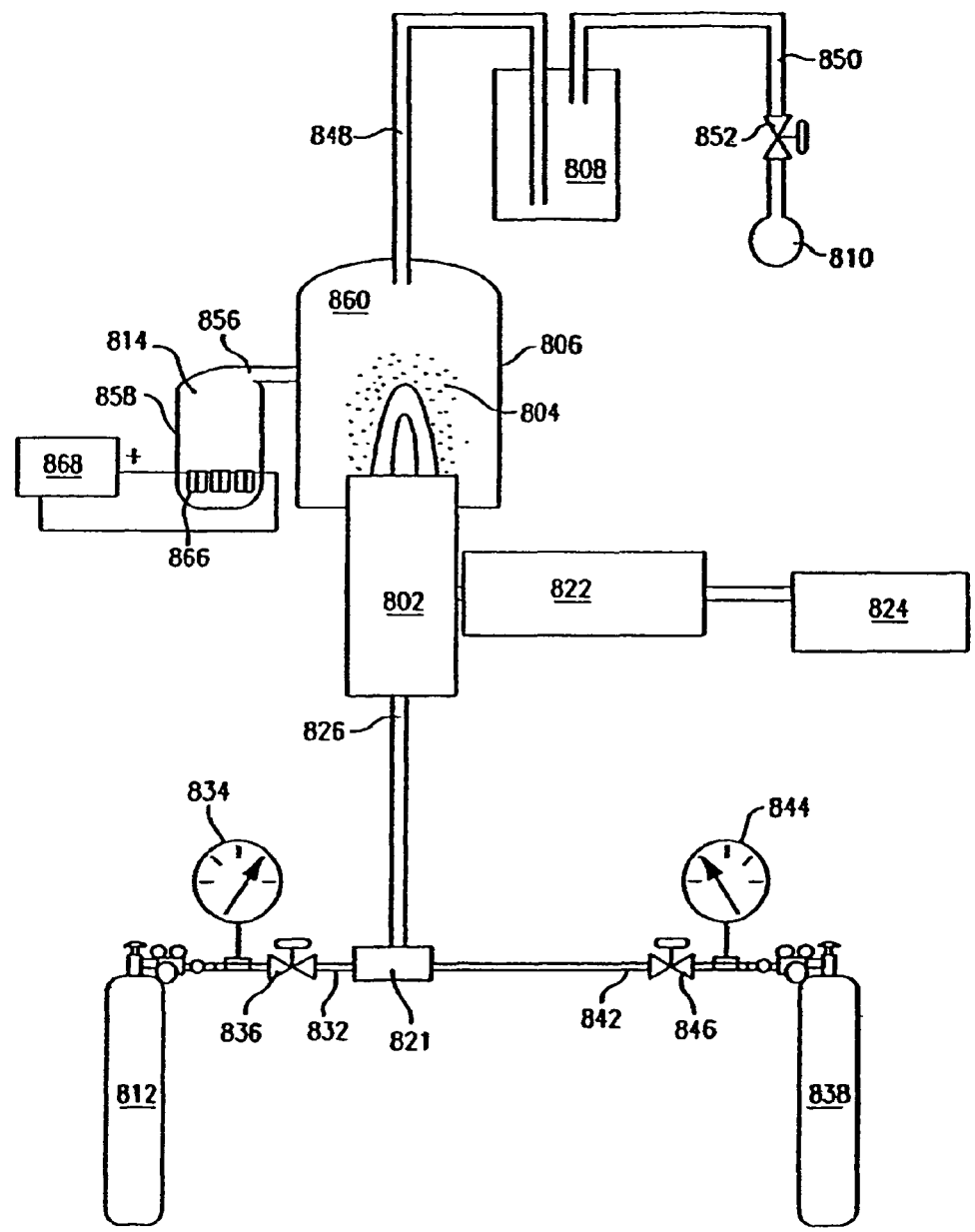
FIG. 7 is a schematic drawing of another hydrogen plasma torch power and plasma cell and reactor in accordance with the present invention.

In another embodiment of the plasma torch hydrogen reactor shown in FIG. 7, at least one of plasma torch 802 or manifold 806 has a catalyst supply passage 856 for passage of the gaseous catalyst from a catalyst reservoir 858 to the plasma 804. The catalyst 814 in the catalyst reservoir 858 is heated by a catalyst reservoir heater 866 having a power supply 868 to provide the gaseous catalyst to the plasma 804. The catalyst vapor pressure can be controlled by controlling the temperature of the catalyst reservoir 858 by adjusting the heater 866 with its power supply 868. The remaining elements of FIG. 7 have the same structure and function of the corresponding elements of FIG. 6. In other words, element 812 of FIG. 7 is a plasma gas supply corresponding to the plasma gas supply 712 of FIG. 6, element 838 of FIG. 7 is a hydrogen supply corresponding to hydrogen supply 738 of FIG. 6, and so forth.

In another embodiment of the plasma torch hydrogen reactor, a chemically resistant open container such as a ceramic boat located inside the manifold contains the catalyst. The plasma torch manifold forms a cell which can be operated at an elevated temperature such that the catalyst in the boat is sublimed, boiled, or volatilized into the gas phase. Alternatively, the catalyst in the catalyst boat can be heated with a boat heater having a power supply to provide the gaseous catalyst to the plasma. The catalyst vapor pressure can be controlled by controlling the temperature of the cell with a cell heater, or by controlling the temperature of the boat by adjusting the boat heater with an associated power supply.

The plasma temperature in the plasma torch hydrogen reactor is advantageously maintained in the range of about 5,000-30,000° C. The cell may be operated at room temperature by continuously supplying catalyst. Alternatively, to prevent the catalyst from condensing in the cell, the cell temperature can be maintained above that of the catalyst source, catalyst reservoir 858 or catalyst boat. The operating temperature depends, in part, on the nature of the material comprising the cell. The temperature for a stainless steel alloy cell is preferably about 0-1200° C. The temperature for a molybdenum cell is preferably about 0-1800° C. The temperature for a tungsten cell is preferably about 0-3000° C. The temperature for a glass, quartz, or ceramic cell is preferably about 0-1800° C. Where the manifold 706 is open to the atmosphere, the cell pressure is atmospheric.

An exemplary plasma gas for the plasma torch hydrogen reactor is argon which may also serve as a source of catalyst. Exemplary aerosol flow rates are about 0.8 standard liters per minute (slm) hydrogen and about 0.15 slm argon. An exemplary argon plasma flow rate is about 5 slm. An exemplary forward input power is about 1000 W, and an exemplary reflected power is about 10-20 W.

In other embodiments of the plasma torch hydrogen reactor, the mechanical catalyst agitator (magnetic stirring bar 718 and magnetic stirring bar motor 720) is replaced with an aspirator, atomizer, or nebulizer to form an aerosol of the catalyst 714 dissolved or suspended in a liquid medium such as water. The medium is contained in the catalyst reservoir 716. Or, the aspirator, atomizer, ultrasonic dispersion means, or nebulizer injects the catalyst directly into the plasma 704. The nebulized or atomized catalyst can be carried into the plasma 704 by a carrier gas, such as hydrogen.

The hydrogen plasma torch cell further includes an electron source in contact with the hydrinos, for generating hydrino hydride ions. In the plasma torch cell, the hydrinos can be reduced to hydrino hydride ions by contacting a reductant extraneous to the operation of the cell (e.g. a consumable reductant added to the cell from an outside source). Compounds comprising a hydrino hydride anion and a cation may be formed in the cell. The cation which forms the hydrino hydride compound may comprise a cation of other element, an oxidized species such as a reductant, or a cation present in the plasma (such as a cation of the catalyst).

2. Hydrogen RF and Microwave Power and Plasma Cell and Reactor

Figure 8:
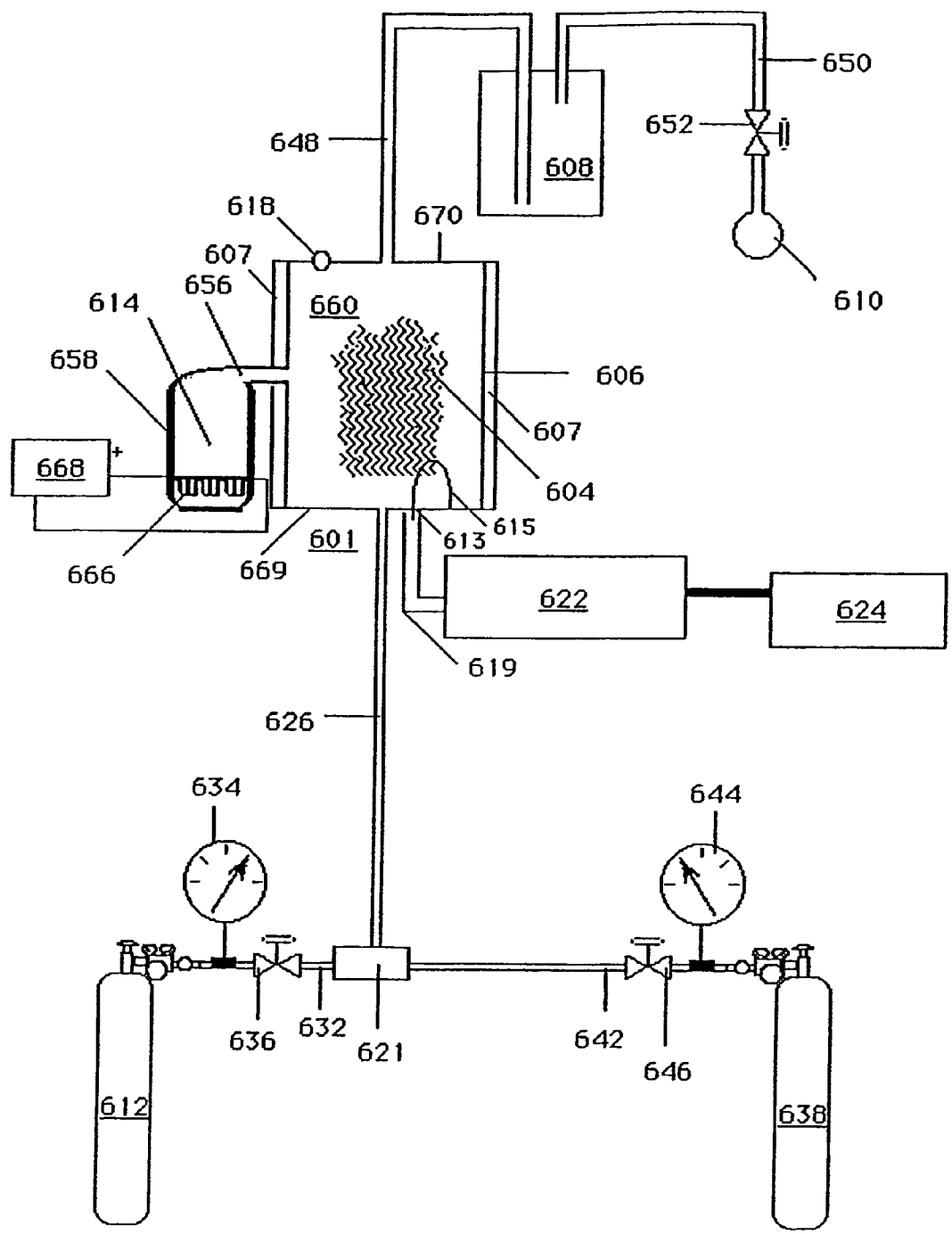
FIG. 8 is a schematic drawing of a hydrogen microwave power and plasma cell and reactor in accordance with the present invention.

According to an embodiment of the invention, a reactor for producing power, plasma, and at least one of hydrinos, hydrino hydride ions, dihydrino molecular ions, and dihydrino molecules may take the form of a hydrogen microwave reactor. A hydrogen microwave gas cell reactor of the present invention is shown in FIG. 8. Hydrinos are provided by a reaction with a catalyst capable of providing a net enthalpy of reaction of $m/2 \cdot 27.2 \pm 0.5$ eV where m is an integer, preferably an integer less than 400 such as those given in TABLES 1 and 3 and/or by a disproportionation reaction wherein lower-energy hydrogen, hydrinos, serve to cause transitions of hydrogen atoms and hydrinos to lower-energy levels with the release of power. Catalysis may occur in the gas phase. The catalyst may be generated by a microwave discharge. Preferred catalysts are $He^+$ or $Ar^+$ from a source such as helium gas or argon gas. The catalysis reaction may provide power to form and maintain a plasma that comprises energetic ions. Microwaves that may or may not be phase bunched may be generated by ionized electrons in a magnetic field; thus, the magnetized plasma of the cell comprises an internal microwave generator. The generated microwaves may then be the source of microwaves to at least partially maintain the microwave discharge plasma.

The reactor system of FIG. 8 comprises a reaction vessel 601 having a chamber 660 capable of containing a vacuum or pressures greater than atmospheric. A source of hydrogen 638 delivers hydrogen to supply tube 642, and hydrogen flows to the chamber through hydrogen supply passage 626. The flow of hydrogen can be controlled by hydrogen flow controller 644 and valve 646. In an embodiment, a source of hydrogen communicating with chamber 660 that delivers hydrogen to the chamber through hydrogen supply passage 626 is a hydrogen permeable hollow cathode of an electrolysis cell of the reactor system. Electrolysis of water produces hydrogen that permeates through the hollow cathode. The cathode may be a transition metal such as nickel, iron, or titanium, or a noble metal such as palladium, or platinum, or tantalum or palladium coated tantalum, or palladium coated niobium. The electrolyte may be basic and the anode may be nickel, platinum, or a dimensionally stable anode. The electrolyte may be aqueous $K_2CO_3$. The flow of hydrogen into the cell may be controlled by controlling the electrolysis current with an electrolysis power controller.

Plasma gas flows from the plasma gas supply 612 via passage 632. The flow of plasma gas can be controlled by plasma gas flow controller 634 and valve 636. A mixture of plasma gas and hydrogen can be supplied to the cell via passage 626. The mixture is controlled by hydrogen-plasma-gas mixer and mixture flow regulator 621. The plasma gas such as helium may be a source of catalyst such as $He^+$ or $He_2^*$, argon may be a source of catalyst such as $Ar^+$, neon may serve as a source of catalyst such as $Ne_2^*$ or $Ne^+$, and neon-hydrogen mixture may serve as a source of catalyst such as $Ne^+/H^+$. The source of catalyst and hydrogen of the mixture flow into the plasma and become catalyst and atomic hydrogen in the chamber 660.

The plasma may be powered by a microwave generator 624 wherein the microwaves are tuned by a tunable microwave cavity 622, carried by waveguide 619, and can be delivered to the chamber 660 though an RF transparent window 613 or antenna 615. Sources of microwaves known in the art are traveling wave tubes, klystrons, magnetrons, cyclotron resonance masers, gyrotrons, and free electron lasers. The waveguide or antenna may be inside or outside of the cell. In the latter case, the microwaves may penetrate the cell from the source through a window of the cell 613. The microwave window may comprise Alumina or quartz.

In another embodiment, the cell 601 is a microwave resonator cavity. In an embodiment, the source of microwave supplies sufficient microwave power density to the cell to ionize a source of catalyst such as at least one of helium, neon-hydrogen mixture, and argon gases to form a catalyst such as $He^+$, $Ne^+$, and $Ar^+$ respectively. In such an embodiment, the microwave power source or applicator such as an antenna, waveguide, or cavity forms a non thermal plasma wherein the species corresponding to the source of catalyst such as helium or argon atoms and ions have a higher temperature than that at thermal equilibrium. Thus, higher energy states such as ionized states of the source of catalyst are predominant over that of hydrogen compared to a corresponding thermal plasma wherein excited states of hydrogen are predominant. In an embodiment, the source of catalyst is in excess compared to the source of hydrogen atoms such that the formation of a nonthermal plasma is favored. The power supplied by the source of microwave power may be delivered to the cell such that it is dissipated in the formation of energetic electrons within about the electron mean free path. In an embodiment, the total pressure is about 0.5 to about 5 Torr and the mean electron free path is about 0.1 cm to 1 cm. In an embodiment, the dimensions of the cell are greater than the electron mean free path. In an embodiment, the cavity is at least one of the group of a reentrant cavity such as an Evenson cavity, Beenakker, McCarrol, and cylindrical cavity. In an embodiment, the cavity provides a strong electromagnetic field which may form a nonthermal plasma. The strong electromagnetic field may be due to a $TM_{010}$ mode of a cavity such as a Beenakker cavity. In a preferred embodiment, the cavity provides an E mode rather than an M mode. In a preferred embodiment, the cavity is a reentrant cavity such as an Evenson cavity that forms a plasma with an E mode. Multiple sources of microwave power may be used simultaneously. For example, the microwave plasma such as a nonthermal plasma may be maintained by multiple Evenson cavities operated in parallel to form the plasma in the microwave cell 601. The cell may be cylindrical and may comprise a quartz cell with Evenson cavities spaced along the longitudinal axis. In another embodiment, a multi slotted antenna such as a planar antenna serves as the equivalent of multiple sources of microwaves such as dipole-antenna-equivalent sources. One such embodiment is given in Y. Yasaka, D. Nozaki, M. Ando, T. Yamamoto, N. Goto, N. Ishii, T. Morimoto, "Production of large-diameter plasma using multi-slotted planar antenna," Plasma Sources Sci. Technol., Vol. 8, (1999), pp. 530-533 which is incorporated herein by reference in its entirety.

In an embodiment, of the hydrogen microwave power and plasma cell and reactor, the output power is optimized by using a cavity such as a reentrant cavity such as an Evenson cavity and tuning the cell to an optimal voltage staging wave. In an embodiment, the reflected versus input power is tuned such that a desired voltage standing wave is obtained which optimizes or controls the output power. Typically, the ratio of the maximum voltage to the minimum voltage on the transmission line determines the voltage standing wave. In another embodiment, the cell comprises a tunable microwave cavity having a desired voltage standing wave to optimize and control the output power.

The cell may further comprise a magnet such a solenoidal magnet 607 to provide an axial magnetic field. The ions such as electrons formed by the hydrogen catalysis reaction produce microwaves to at least partially maintain the microwave discharge plasma. The microwave frequency may be selected to efficiently form atomic hydrogen from molecular hydrogen. It may also effectively form ions that serve as catalysts from a source of catalyst such as $He^+$, $Ne^+$, $Ne^+/H^+$, or $Ar^+$ catalysts from helium, neon, neon-hydrogen mixtures, and argon gases, respectively.

The microwave frequency is preferably in the range of about 1 MHz to about 100 GHz, more preferably in the range about 50 MHz to about 10 GHz, most preferably in the range of about 75 MHz±50 MHz or about 2.4 GHz±1 GHz.

A hydrogen dissociator may be located at the wall of the reactor to increase the atomic hydrogen concentrate in the cell. The reactor may further comprise a magnetic field wherein the magnetic field may be used to provide magnetic confinement to increase the electron and ion energy to be converted into power by means such as a magnetohydrodynamic or plasmadynamic power converter.

A vacuum pump 610 may be used to evacuate the chamber 660 through vacuum lines 648 and 650. The cell may be operated under flow conditions with the hydrogen and the catalyst supplied continuously from catalyst source 612 and hydrogen source 638. The amount of gaseous catalyst may be controlled by controlling the plasma gas flow rate where the plasma gas includes a hydrogen and a source of catalyst (e.g., hydrogen and argon or helium). The amount of gaseous hydrogen atoms to the plasma may be controlled by controlling the hydrogen flow rate and the ratio of hydrogen to plasma gas in the mixture. The hydrogen flow rate and the plasma gas flow rate to the hydrogen-plasma-gas mixer and mixture flow regulator 621 are controlled by flow rate controllers 634 and 644, and by valves 636 and 646. Mixer regulator 621 controls the hydrogen-plasma mixture to the chamber 660. The catalysis rate is also controlled by controlling the temperature of the plasma with microwave generator 624.

Catalysis may occur in the gas phase. Hydrino atoms, dihydrino molecular ions, dihydrino molecules, and hydrino hydride ions are produced in the plasma 604. Dihydrino molecules and hydrino hydride compounds may be cryopumped onto the wall 606, or they may flow into a 608 such as a cryotrap through passage 648. Trap 608 communicates with vacuum pump 610 through vacuum line 650 and valve 652. A flow to the trap 608 can be effected by a pressure gradient controlled by the vacuum pump 610, vacuum line 650, and vacuum valve 652.

In another embodiment of the hydrogen microwave reactor shown in FIG. 8, the wall 606 has a catalyst supply passage 656 for passage of the gaseous catalyst from a catalyst reservoir 658 to the plasma 604. The catalyst in the catalyst reservoir 658 can be heated by a catalyst reservoir heater 666 having a power supply 668 to provide the gaseous catalyst to the plasma 604. The catalyst vapor pressure can be controlled by controlling the temperature of the catalyst reservoir 658 by adjusting the heater 666 with its power supply 668. The catalyst in the gas phase may comprise those given in TABLES 1 and 3, hydrinos, and those described in the Mills Prior Publication.

In another embodiment of the hydrogen microwave reactor, a chemically resistant open container such as a ceramic boat located inside the chamber 660 contains the catalyst. The reactor further comprises a heater that may maintain an elevated temperature. The cell can be operated at an elevated temperature such that the catalyst in the boat is sublimed, boiled, or volatilized into the gas phase. Alternatively, the catalyst in the catalyst boat can be heated with a boat heater having a power supply to provide the gaseous catalyst to the plasma. The catalyst vapor pressure can be controlled by controlling the temperature of the cell with a cell heater, or by controlling the temperature of the boat by adjusting the boat heater with an associated power supply.

In an embodiment, the hydrogen microwave reactor further comprises a structure interact with the microwaves to cause localized regions of high electric and/or magnetic field strength. A high magnetic field may cause electrical breakdown of the gases in the plasma chamber 660. The electric field may form a nonthermal plasma that increases the rate of catalysis by methods such as the formation of the catalyst from a source of catalyst. The source of catalyst may be argon, neon-hydrogen mixture, helium to form $He^+$, $Ne^+$, and $Ar^+$, respectively. The structures and methods are equivalent to those given in the Plasma Torch Cell Hydride Reactor section of my previous PCT Application # filed March 2002.

The nonthermal plasma temperature corresponding to the energetic ion and/or electron temperature as opposed to the relatively low energy thermal neutral gas temperature in the microwave cell reactor is advantageously maintained in the range of about 5,000-5,000,000° C. The cell may be operated without heating or insulation. Alternatively, in the case that the catalyst has a low volatility, the cell temperature is maintained above that of the catalyst source, catalyst reservoir 658 or catalyst boat to prevent the catalyst from condensing in the cell. The operating temperature depends, in part, on the nature of the material comprising the cell. The temperature for a stainless steel alloy cell is preferably about 0-1200° C. The temperature for a molybdenum cell is preferably about 0-1800° C. The temperature for a tungsten cell is preferably about 0-3000° C. The temperature for a glass, quartz, or ceramic cell is preferably about 0-1800° C.

The molecular and atomic hydrogen partial pressures in the chamber 660, as well as the catalyst partial pressure, is preferably maintained in the range of about 1 mtorr to about 100 atm. Preferably the pressure is in the range of about 100 mtorr to about 1 atm, more preferably the pressure is about 100 mtorr to about 20 torr.

An exemplary plasma gas for the hydrogen microwave reactor is argon. Exemplary flow rates are about 0.1 standard liters per minute (slm) hydrogen and about 1 slm argon. An exemplary forward microwave input power is about 1000 W. The flow rate of the plasma gas or hydrogen-plasma gas mixture such as at least one gas selected for the group of hydrogen, argon, helium, argon-hydrogen mixture, helium-hydrogen mixture, water vapor, ammonia is preferably about 0-1 standard liters per minute per $cm^3$ of vessel volume and more preferably about 0.001-10 sccm per $cm^3$ of vessel volume. In the case of an helium-hydrogen, neon-hydrogen, or argon-hydrogen mixture, preferably helium, neon, or argon is in the range of about 99 to about 1%, more preferably about 99 to about 95%. The power density of the source of plasma power is preferably in the range of about 0.01 W to about 100 $W/cm^3$ vessel volume.

In other embodiments of the microwave reactor, the catalyst may be agitated and supplied through a flowing gas stream such as the hydrogen gas or plasma gas which may be an additional source of catalyst such as helium or argon gas. The source of catalyst may also be provided by an aspirator, atomizer, or nebulizer to form an aerosol of the source of catalyst. The catalyst which may become an aerosol may be dissolved or suspended in a liquid medium such as water. The medium may be contained in the catalyst reservoir 614. Alternatively, the aspirator, atomizer, or nebulizer may inject the source of catalyst or catalyst directly into the plasma 604. In another embodiment, the nebulized or atomized catalyst may be carried into the plasma 604 by a carrier gas, such as hydrogen, helium, neon, or argon where the helium, neon-hydrogen, or argon may be ionized to $He^+$, $Ne^+$, or $Ar^+$, respectively, and serve as hydrogen catalysts.

Hydrogen may serve as the catalyst according to Eqs. (30-32). In an embodiment the catalysis of atomic hydrogen to form increased-binding-energy-hydrogen species is achieved with a hydrogen plasma. The cavity may be reentrant cavity such as an Evenson cavity. The hydrogen pressure may be in the range of about 1 mtorr to about 100 atm. Preferably the pressure is in the range of about 100 mtorr to about 1 atm, more preferably the pressure is about 100 mtorr to about 10 torr. The microwave power density may be in the range of about 0.01 W to about 100 $W/cm^3$ vessel volume. The hydrogen flow rate may be in the range of about 0-1 standard liters per minute per $cm^3$ of vessel volume and more preferably about 0.001-10 sccm per $cm^3$ of vessel volume.

The microwave cell may be interfaced with any of the converters of plasma or thermal energy to mechanical or electrical power described herein such as the magnetic mirror magnetohydrodynamic power converter, plasmadynamic power converter, or heat engine, such as a steam or gas turbine system, sterling engine, or thermionic or thermoelectric converter given in Mills Prior Publications. In addition it may be interfaced with the gyrotron, photon bunching microwave power converter, charge drift power, or photoelectric converter as disclosed in Mills Prior Publications.

The hydrogen microwave reactor further includes an electron source in contact with the hydrinos, for generating hydrino hydride ions. In the cell, the hydrinos may be reduced to hydrino hydride ions by contacting a reductant extraneous to the operation of the cell (e.g. a consumable reductant added to the cell from an outside source). In an embodiment, the microwave cell reactor further comprise a selective valve 618 for removal of lower-energy hydrogen products such as dihydrino molecules. Compounds comprising a hydrino hydride anion and a cation may be formed in the gas cell. The cation which forms the hydrino hydride compound may comprise a cation of other element, a cation of an oxidized added reductant, or a cation present in the plasma (such as a cation of the catalyst).

Metal hydrino hydrides may be formed in the microwave plasma reactor having a hydrogen plasma and a source of metal such as a source of the metals given in TABLE 3 that serve as both the catalyst and the reactant. The metal atoms may be provided by vaporization through heating. In one embodiment, the metal is vaporized from a hot filament containing the metal. The vapor pressure of the metal is maintained in the range 0.001 Torr to 100 Torr and the hydrogen plasma is maintained in the range 0.001 Torr to 100 Torr. Preferably the range for both metal and hydrogen is 0.1 Torr to 10 Torr.

3. Hydrogen Capacitively and Inductively Coupled RF Plasma and Power Cell and Reactor According to an embodiment of the invention, a reactor for producing power and at least one of hydrinos, hydrino hydride ions, dihydrino molecular ions, and dihydrino molecules may take the form of a hydrogen capacitively or inductively coupled RF power and plasma cell and reactor. A hydrogen RF plasma reactor of the present invention is also shown in FIG. 8. The cell structures, systems, catalysts, and methods may be the same as those given for the microwave plasma cell reactor except that the microwave source may be replaced by a RF source 624 with an impedance matching network 622 that may drive at least one electrode and/or a coil. The RF plasma cell may further comprise two electrodes 669 and 670. The coaxial cable 619 may connect to the electrode 669 by coaxial center conductor 615. Alternatively, the coaxial center conductor 615 may connect to an external source coil which is wrapped around the cell 601 which may terminate without a connection to ground or it may connect to ground. The electrode 670 may be connected to ground in the case of the parallel plate or external coil embodiments. The parallel electrode cell may be according to the industry standard, the Gaseous Electronics Conference (GEC) Reference Cell or modification thereof by those skilled in the art as described in G A. Hebner, K. E. Greenberg, "Optical diagnostics in the Gaseous electronics Conference Reference Cell, J. Res. Natl. Inst. Stand. Technol., Vol. 100, (1995), pp. 373-383; V. S. Gathen, J. Ropcke, T. Gans, M. Kaning, C. Lukas, H. F. Dobele, "Diagnostic studies of species concentrations in a capacitively coupled RF plasma containing $CH_4$—$H_2$—Ar," Plasma Sources Sci. Technol., Vol. 10, (2001), pp. 530-539; P. J. Hargis, et al., Rev. Sci. Instrum., Vol. 65, (1994), p. 140; Ph. Belenguer, L. C. Pitchford, J. C. Hubinois, "Electrical characteristics of a RF-GD-OES cell," J. Anal. At. Spectrom., Vol. 16, (2001), pp. 1-3 which are herein incorporated by reference in their entirety. The cell which comprises an external source coil such as a13.56 MHz external source coil microwave plasma source is as given in D. Barton, J. W. Bradley, D. A. Steele, and R. D. Short, "investigating radio frequency plasmas used for the modification of polymer surfaces," J. Phys. Chem. B, Vol. 103, (1999), pp. 4423-4430; D. T. Clark, A. J. Dilks, J. Polym. Sci. Polym. Chem. Ed., Vol. 15, (1977), p. 2321; B. D. Beake, J. S. G. Ling, G. L Leggett, J. Mater. Chem., Vol. 8, (1998), p. 1735; R. M. France, R. D. Short, Faraday Trans. Vol. 93, No. 3, (1997), p. 3173, and R. M. France, R. D. Short, Langmuir, Vol. 14, No. 17, (1998), p. 4827 which are herein incorporated by reference in their entirety. At least one wall of the cell 601 wrapped with the external coil is at least partially transparent to the RF excitation. The RF frequency is preferably in the range of about 100 Hz to about 100 GHz, more preferably in the range about 1 kHz to about 100 MHz, most preferably in the range of about 13.56 MHz±50 MHz or about 2.4 GHz±1 GHz.

In another embodiment, an inductively coupled plasma source is a toroidal plasma system such as the Astron system of Astex Corporation described in U.S. Pat. No. 6,150,628 which is herein incorporated by reference in its entirety. In an embodiment, the field strength is high to cause a nonthermal plasma. The toroidal plasma system may comprise a primary of a transformer circuit. The primary may be driven by a radio frequency power supply. The plasma may be a closed loop which acts at as a secondary of the transformer circuit. The RF frequency is preferably in the range of about 100 Hz to about 100 GHz, more preferably in the range about 1 kHz to about 100 MHz, most preferably in the range of about 13.56 MHz±50 MHz or about 2.4 GHz±1 GHz.

In an embodiment, the plasma cell is driven by at least one of a traveling and a standing wave plasma generators such as given in Fossa [A. C. Fossa, M. Moisan, M. R. Wertheimer, "vacuum ultraviolet to visible emission from hydrogen plasma: effect of excitation frequency", Journal of Applied Physics, Vol. 88, No. 1, (2000), pp. 20-33 which is herein incorporated by reference in its entirety].

In another embodiment, the frequency of the cell is 50 kHz and is driven by a radio frequency generator such as that given by Bzenic et. al. [S. A. Bzenic, S. B. Radovanov, S. B. Vrhovac, Z. B. Velikic, and B. M. Jelenkovic, "On the mechanism of Doppler broadening of $H_β$ after dissociative excitation in hydrogen glow discharges". Chem. Phys. Lett., Vol. 184, (1991), pp. 108-112 which is herein incorporate by reference in its entirety].

In another embodiment of the plasma cell for the production of power and lower-energy-hydrogen compounds, the cell comprises a helicon as described in Asian Particle Accelerator Conference (APAC98), March 26th—Poster Presentation 6D-061, Development of DC Accelerator Ion Sources using Helicon Plasmas p. 825, G. S. Eom, I. S. Hong, Y. S. Hwang, KAIST, Taejon, <http://accelconf.web.cern.ch/AccelConf/a98/APAC98/6D061.PD F>http://accelconf.web.cern.ch/AccelConf/a98/APAC98/6D061.P DFG which is herein incorporated by reference in its entirety.

4. Plasma Confinement by Spatially Controlling Catalysis

The plasma formed by the catalysis of hydrogen may be confined to a desired region of the reactor by structures and methods such as those that control the source of catalyst, the source of atomic hydrogen, or the source of an electric or magnetic field which alters the catalysis rate as given in the Adjustment of Catalysis Rate section. In an embodiment, the reactor comprises two electrodes, which provide an electric field to control the catalysis rate of atomic hydrogen. The electrodes may produce an electric field parallel to the z-axis. The electrodes may be grids oriented in a plane perpendicular to the z-axis such as grid electrodes 305 and 320 shown in FIG. 4. The space between the electrodes may define the desired region of the reactor. The electrodes may be used in any or the other reactor of the present invention to catalyze atomic hydrogen to lower-energy states such as a plasma electrolysis reactor, barrier electrode reactor, RF plasma reactor, pressurized gas energy reactor, gas discharge energy reactor, microwave cell energy reactor, and a combination of a glow discharge cell and a microwave and or RF plasma reactor.

In another embodiment, a magnetic field may confine a charged catalyst such as $Ar^+$ to a desired region to selectively form a plasma as described in the Noble Gas Catalysts and Products section. In an embodiment of the cell, the reaction is maintained in a magnetic field such as a solenoidal or minimum magnetic (minimum B) field such that a second catalyst such as $Ar^+$ is trapped and acquires a longer half-life. The second catalyst may be generated by a plasma formed by hydrogen catalysis using a first catalyst. By confining the plasma, the ions such as the electrons become more energetic, which increases the amount of second catalyst such as $Ar^+$. The confinement also increases the energy of the plasma to create more atomic hydrogen.

In another embodiment, a hot filament which dissociates molecular hydrogen to atomic hydrogen and which may also provide an electric field that controls the rate of catalysis may be used to define the desired region in the cell. The plasma may form substantially in the region surrounding the filament wherein at least one of the atomic hydrogen concentration, the catalyst concentration, and the electric field provides a much faster rate of catalysis there than in any undesired region of the reactor.

In another embodiment, the source of atomic hydrogen such as the source of molecular hydrogen or a hydrogen dissociator may be used to determine the desired region of the reactor by providing atomic hydrogen selectively in the desired region.

In an another embodiment, the source of catalyst may determine the desired region of the reactor by providing catalyst selectively in the desired region.

In an embodiment of a microwave power cell, the plasma may be maintained in a desire region by selectively providing microwave energy to that region with at least one antenna 615 or waveguide 619 and RF window 613 shown in FIG. 8. The cell may comprise a microwave cavity which causes the plasma to be localized to the desired region.

5. Hydrogen Multicusp Power and Plasma Cell and Reactor

In an embodiment, the power and plasma cell and reactor comprises a filament, a vacuum vessel capable of pressures above and below atmospheric, a source of atomic hydrogen, a source of catalyst to catalyze atomic hydrogen to a lower-energy state given by Eq. (1), a means to negatively bias the walls of the cell relative to the filament, and magnets to confine a plasma generated in the cell which is formed or enhanced by the catalysis reaction (rt-plasma). In an embodiment, the reactor is described in M. Pealat, J. P. E. Taran, M. Bacal, F. Hillion, J. Chem. Phys., Vol. 82, (1985), p. 45943-4953 and J. Perrin, J. P. M. Schmitt, Chem. Phys. Letts., Vol. 112, (1984), pp. 69-74 which are herein incorporated by reference in their entirety. In this case, in addition, the cell further comprises a source of catalyst to catalyze atomic hydrogen to a lower-energy state given by Eq. (1). An embodiment of the multicusp cell is shown in FIG. 3 wherein the walls are negative biased by a power supply, and magnets such as permanent magnets that enclose the cell to confine the plasma generated inside the cell 200.

6. Hydrogen Laser

The present Invention comprises a laser wherein in one embodiment, the laser medium comprises $H_2(1/p)$ where p is an integer and $1<p\leq 137$. Lasing is due to at least one stimulated transition between excited vibration-rotational levels of $H_2(1/p)$. Lasing occurs with a stimulated transition from a vibration-rotational level to another lower-energy-level other than one with a significant Boltzmann population at the cell neutral-gas temperature such as one with both v and J=0 wherein the vibration-rotational levels of $H_2(1/p)$ comprise an inverted population. The laser comprises a laser cavity, cavity mirrors, and a pumping power source to form an inverted population and to cause stimulated emission of radiation. These components are known by those skilled in the art and are appropriate for the desired wavelength, similar to those of current lasers based on molecular vibration-rotational levels such as the $CO_2$ laser. However, an advantage exists to produce laser light at much shorter wavelengths. A laser based on vibration-rotational levels of $H_2(1/p)$ may lase in the range infrared to soft X-ray. Lasers that emit UV and EUV have significant application in photolithography.

The vibration-rotational excitation may be by a direct collisional excitation. Alternatively, the excitation may be by an energy exchange with an excited state species such as an excited activator molecule. The direct excitation and the excitation of the activator may be by collision with an energetic particle from a particle beam such as an electron beam or collision with an energetic species accelerated by power input to the cell. The power input to cause energetic species may be at least one of a particle beam such as an electron beam and microwave, high voltage, and RF discharges.

The laser medium may further comprise an activator molecule such as $O_2$, $N_2$, $CO_2$, $CO$, $NO_2$, $NO$, XX' where each of X and X' is a halogen atom that is exited by a source of excitation such as at least one of a particle beam such as an electron beam, microwave, glow, or RF discharge power. The excited activator may form an inverted population comprising excited vibration-rotational levels of $H_2(1/p)$ by an energy exchange such as a collisional energy exchange with $H_2(1/p)$.

In the case that a high pressure noble catalyst-hydrogen mixture such as an argon-hydrogen mixture is used, the formation of a plasma with an electron beam may result in the formation of a high concentration of excimers such as $Ar_2^*$.

The noble catalyst-hydrogen mixture may be maintained in the high pressure range of about 100 mTorr to 100 atm, preferably in the range of about 10 Torr to 10 atm, more preferably in range of about 100 Torr to 5 atm, and most preferably in the range of about 300 Torr to 2 atm. In addition to the formation of the catalyst from a source by electron-beam ionization, a source of ionizing ion may be added to form the catalyst from the source of catalyst. In an embodiment, $He^+$, $Ne^+$, $Ne^+/H^+$ or $Ar^+$ catalysts are formed from a source comprising helium, neon, neon-hydrogen mixture, and argon gases, respectively. The source of catalyst may be ionized to form the catalyst by means such as the electron beam and secondarily ionize the source of catalyst to form the catalyst. The ionizing ion may be $O^+$ from $O_2$. The ionizing ion may react with noble gas excimers to form the catalyst. The excimers may be $He_2^*$, $Ne_2^*$, $Ne_2^*$, and $Ar_2^*$, and the catalysts may be $He^+$, $Ne^+$, $Ne^+/H^+$ or $Ar^+$, respectively.

In an embodiment wherein the plasma is maintained with an electron beam from a gun, free electrons may serve as the catalyst wherein the free electrons undergo an inelastic scattering reaction with hydrogen atoms.

In an embodiment, the ionization energy of the noble gas atom is higher than the energy released when the ionizing ion is reduced by ionizing the noble gas atom. The ionization of the noble gas atom occurs because the noble gas atom comprises an excimer in an excited state. The excited state energy makes the ionization energetically favorable. In an embodiment, $Ar_2^*$ has an excited state energy of about 9-10 eV; thus, the ionization reaction $$Ar_2^* + O^+ \rightarrow Ar + Ar^+ + O \tag{90}$$

is energetically favorable wherein the first ionization energies of Ar and O are 15.75962 and 13.61806 eV, respectively.

The pumping power source may a particle bean such as an electron beam. The electron beam may that described by J. Wieser, D. E. Murnick, A. Ulrich, H. A Higgins, A. Liddle, W. L. Brown, "Vacuum ultraviolet rare gas excimer light source", Rev. Sci. Instrum., Vol. 68, No. 3, (1997), pp. 1360-1364 and A. Ulrich, J. Wieser, D. E. Murnick, "Excimer Formation Using Low Energy Electron Beam Excitation", Second International Conference on Atomic and Molecular Pulsed Lasers, Proceedings of SPIE, Vol. 3403, (1998), pp. 300-307 which are herein incorporated by reference in their entirety.

The pumping power source may be from the catalysis of atomic hydrogen to states having a binding energy given by $$E_n = -\frac{e^2}{n^2 8\pi\varepsilon_o a_H} = -\frac{13.598 \text{ eV}}{n^2} \tag{91}$$

$$n = \frac{1}{2}, \frac{1}{3}, \frac{1}{4}, \ldots, \frac{1}{p}; \quad p \leq 137 \text{ is an integer} \tag{92}$$

In an embodiment of the power cell and hydride reactor to form atomic states of hydrogen having energies given by $$\frac{13.6 \text{ eV}}{\left(\frac{1}{p}\right)^2}$$

where p is an integer by reaction of atomic hydrogen with a catalyst, a catalyst is generated from a source of catalyst by ionization or excimer formation. The means to ionize or form an excimer may be an ion beam. The beam may pass through a window into a cell capable of maintaining a vacuum or pressures greater than atmospheric pressure. The beam may be an electron beam. The catalyst may be at least one of $He^+$, $He_2^*$, $Ne_2^*$, $Ne^+$, $Ne^+/H^+$ or $Ar^+$ from a source comprising helium, helium, neon, neon-hydrogen mixture, and argon gases, respectively. The beam energy may be in the range of about 0.1 to 100 MeV, preferably on the range of about 10 eV to 1 MeV, more preferably in the range of about 100 eV to 100 keV, and most preferably in the range of about 1 keV to 50 keV. The beam current may be in the range of about 0.01 µA to 1000 A, preferably on the range of about 0.1 µA to 100 A, more preferably in the range of about 1 µA to 10 A, and most preferably in the range of about 10 µA to 1 A. The beam may maintain a plasma of hydrogen and the source of catalyst. The plasma may provide atomic hydrogen or the atomic hydrogen may be formed by a dissociator such as a filament, or metal such as platinum, palladium, titanium, or nickel.

The source of $H_2(1/p)$ may external, or $H_2(1/p)$ may be generated insitu by the catalysis of atomic hydrogen to form $H(1/p)$ that further reacts to form $H_2(1/p)$. The laser medium may be $H_2(1/p)$ or $H_2(1/p)$ may be formed in the cell during laser operation. In the latter case the cell comprises at least one of an rt-plasma reactor, a plasma electrolysis reactor, barrier electrode reactor, RF plasma reactor, pressurized gas energy reactor, gas discharge energy reactor, microwave cell energy reactor, and a combination of a glow discharge cell and a microwave and or RF plasma reactor of the present invention. Each reactor comprises a source of hydrogen; one of a solid, molten, liquid, and gaseous source of catalyst; a vessel containing hydrogen and the catalyst wherein the reaction to form lower-energy hydrogen occurs by contact of the hydrogen with the catalyst; and a means for providing the lower-energy hydrogen product $H_2(1/p)$ to the laser cavity to comprise the laser medium.

The laser further comprises a laser cavity, cavity mirrors, and a power source that may at least partially comprise a cell for the catalysis of atomic hydrogen to form novel hydrogen species and/or compositions of matter comprising new forms of hydrogen. The reaction may be maintained by a particle beam, microwave, glow, or RF discharge plasma of a source of atomic hydrogen and a source of catalyst such as argon to provide catalyst $Ar^+$. A species such as oxygen may react with the source of catalyst such as $Ar_2^*$ to form the catalyst such as $Ar^+$. At least one of the power from catalysis and an external power source maintains $H_2(1/p)$ in an excited vibration-rotational state from which stimulated emission may occur.

The cavity is designed according to the laser wavelength. Lasing is due to at least one stimulated transition between excited vibration-rotational levels of $H_2(1/p)$ other than one to a state that is has a substantial population at the gas temperature of the laser cavity. As p becomes high, only the $v=0$ and $J=0$ levels are ordinarily populated. Then, excitation to a higher level comprises an inverted population relative to lower-levels other than one to a state with both v and $J=0$. Then, the vibration-rotational levels of $H_2(1/p)$ comprise an inverted population and stimulated emission may occur between levels of the inverted population. In the case that higher energy levels are significantly populated at the neutral gas temperature, the pumped population must be increased to achieve an overpopulation capable of lasing relative to this level. Alternatively, a lower level is selected such that inverted and overpopulation populations are achieved relative to a higher energy lower-level. Table 4A and B give the vibrational energies and rotational energies $H_2(1/p)$ according to Eqs. (60) and (65), respectively. TABLES 5A and B to TABLES 9A and B give the energies of the P and R branches of $H_2(1/2)$ to $H_2(1/6)$ for the $v=1 \rightarrow v=0$ vibrational transition with $\Delta J=+1$. Laser transitions are possible at these wavelengths except in the case that the lower level is significantly populated at the cavity gas temperature such as the P(1) and R(0) transition is some cases.

Table 4A and B give the vibrational energies and rotational energies $H_2(1/p)$ according to Eqs. (60) and (65), respectively. TABLES 10A and B to TABLES 12A and B give the energies of the P and R branches of $H_2(1/12)$ to $H_2(1/14)$ for the $v=1 \rightarrow v=0$ vibrational transition with $\Delta J=+1$. Laser transitions are possible at these wavelengths except in the case that the lower level is significantly populated at the cavity gas temperature such as the P(1) and R(0) transition is some cases. These wavelengths are preferred for EUV photolithography as described in J. E. Bjorkholm, "EUV lithography—the successor to optical lithography?", Intel Technology Journal, Q3, (1998), pp. 1-8; K. Hesch, E. Pellegrin, R. Rossmanith, R. Steininger, V. Saile, J. Wust, G. Dattoli, A. Doria, G. Gallerano, L. Giannessi, P. Ottaviani, H. Moser, "Extreme ultraviolet (EUV) sources based on synchrotron radiation", Proceedings of the 2001 Particle Accelerator Conference, Chicago, pp. 654-656. Specific preferred wavelengths that are suitable for available or anticipated mirrors and other components are 13.4-13.5 nm and 11.3 nm.

In an embodiment that provides EUV laser emission for EUV lithography, the mirrors may comprise multilayer, thin-film coatings such as distributed Bragg reflectors as described by J. E. Bjorkholm, "EUV lithography—the successor to optical lithography?", Intel Technology Journal, Q3, (1998), pp. 1-8 which is herein incorporated by reference. In preferred embodiments, the EUV laser wavelength is in the region between about 11 and 14 nm. In this case, the gas may be at least one of $H_2(1/12)$, $H_2(1/13)$, and $H_2(1/14)$. The transitions are given in TABLES WA and B to TABLES 12A and B. In a further preferred embodiment, the mirror is Mo:Si ML that has been optimized for peak reflectivity at 13.4 nm.

TABLE 4A. The vibrational energies of $H_2(1/p)$ as a function of p given by Eq. (60).

| p | eV |
|---|---|
| 1 | 0.5159 |
| 2 | 2.0636 |
| 3 | 4.6431 |
| 4 | 8.2544 |
| 5 | 12.8976 |
| 6 | 18.5725 |
| 12 | 74.2899 |
| 13 | 87.1874 |
| 14 | 101.1168 |

TABLE 4B. The magnitude of the rotational energies of $H_2(1/p)$ for $\Delta J=\pm 1$ as a function of p given by Eq. (65).

| p | eV |
|---|---|
| 1 | 0.0151 |
| 2 | 0.0604 |
| 3 | 0.1358 |
| 4 | 0.2414 |
| 5 | 0.3773 |
| 6 | 0.5432 |
| 12 | 2.1730 |
| 13 | 2.5502 |
| 14 | 2.9576 |

-continued

| p | eV |
|---|---|

Table 5A. The energies of the P branch of $H_2(1/2)$ for the $v=1 \rightarrow v=0$ vibrational transition with $\Delta J=+1$.

| J + 1 | eV | nm |
|---|---|---|
| 1 | 2.0032 | 618.92 |
| 2 | 1.9429 | 638.15 |
| 3 | 1.8825 | 658.61 |
| 4 | 1.8222 | 680.43 |
| 5 | 1.7618 | 703.74 |
| 6 | 1.7014 | 728.70 |
| 7 | 1.6411 | 755.51 |
| 8 | 1.5807 | 784.36 |
| 9 | 1.5204 | 815.49 |
| 10 | 1.4600 | 849.21 |

Table 5B. The energies of the R branch of $H_2(1/2)$ for the $v=1 \rightarrow v=0$ vibrational transition with $\Delta J=-1$.

TABLE 5B

The energies of the R branch of $H_2(\frac{1}{2})$ for the $v = 1 \rightarrow v = 0$ vibrational transition with $\Delta J = -1$.

| J | eV | nm |
|---|---|---|
| 1 | 2.1240 | 583.74 |
| 2 | 2.1843 | 567.61 |
| 3 | 2.2447 | 552.35 |
| 4 | 2.3050 | 537.89 |
| 5 | 2.3654 | 524.16 |
| 6 | 2.4258 | 511.12 |
| 7 | 2.4861 | 498.71 |
| 8 | 2.5465 | 486.89 |
| 9 | 2.6068 | 475.61 |
| 10 | 2.6672 | 464.85 |

Table 6A. The energies of the P branch of $H_2(1/3)$ for the $v=1 \rightarrow v=0$ vibrational transition with $\Delta J=+1$.

TABLE 6A

The energies of the P branch of $H_2(\frac{1}{3})$ for the $v = 1 \rightarrow v = 0$ vibrational transition with $\Delta J = +1$.

| J + 1 | eV | nm |
|---|---|---|
| 1 | 4.5073 | 275.08 |
| 2 | 4.3715 | 283.62 |
| 3 | 4.2357 | 292.72 |
| 4 | 4.0999 | 302.41 |
| 5 | 3.9641 | 312.77 |
| 6 | 3.8283 | 323.87 |
| 7 | 3.6924 | 335.78 |
| 8 | 3.5566 | 348.60 |
| 9 | 3.4208 | 362.44 |
| 10 | 3.2850 | 377.43 |

Table 6B. The energies of the R branch of $H_2(1/3)$ for the $v=1 \rightarrow v=0$ vibrational transition with $\Delta J=-1$.

TABLE 6B

The energies of the R branch of $H_2(\frac{1}{3})$ for the $v = 1 \rightarrow v = 0$ vibrational transition with $\Delta J = -1$.

| J | eV | nm |
|---|---|---|
| 1 | 4.7789 | 259.44 |
| 2 | 4.9147 | 252.27 |
| 3 | 5.0505 | 245.49 |
| 4 | 5.1864 | 239.06 |
| 5 | 5.3222 | 232.96 |
| 6 | 5.4580 | 227.16 |
| 7 | 5.5938 | 221.65 |
| 8 | 5.7296 | 216.39 |
| 9 | 5.8654 | 211.38 |
| 10 | 6.0012 | 206.60 |

Table 7A. The energies of the P branch of $H_2(1/4)$ for the $v=1 \rightarrow v=0$ vibrational transition with $\Delta J=+1$.

TABLE 7A

The energies of the P branch of $H_2(\frac{1}{4})$ for the $v = 1 \rightarrow v = 0$ vibrational transition with $\Delta J = +1$.

| J + 1 | eV | nm |
|---|---|---|
| 1 | 8.0130 | 154.73 |
| 2 | 7.7716 | 159.54 |
| 3 | 7.5301 | 164.65 |
| 4 | 7.2887 | 170.11 |
| 5 | 7.0472 | 175.93 |
| 6 | 6.8058 | 182.18 |
| 7 | 6.5644 | 188.88 |
| 8 | 6.3229 | 196.09 |
| 9 | 6.0815 | 203.87 |
| 10 | 5.8400 | 212.30 |

Table 7B. The energies of the R branch of $H_2(1/4)$ for the $v=1 \rightarrow v=0$ vibrational transition with $\Delta J=-1$.

TABLE 7B

The energies of the R branch of $H_2(\frac{1}{4})$ for the $v = 1 \rightarrow v = 0$ vibrational transition with $\Delta J = -1$.

| J | eV | nm |
|---|---|---|
| 1 | 8.4959 | 145.94 |
| 2 | 8.7373 | 141.90 |
| 3 | 8.9788 | 138.09 |
| 4 | 9.2202 | 134.47 |
| 5 | 9.4616 | 131.04 |
| 6 | 9.7031 | 127.78 |
| 7 | 9.9445 | 124.68 |
| 8 | 10.1860 | 121.72 |
| 9 | 10.4274 | 118.90 |
| 10 | 10.6688 | 116.21 |

Table 8A. The energies of the P branch of $H_2(1/5)$ for the $v=1 \rightarrow v=0$ vibrational transition with $\Delta J=+1$.

TABLE 8A

The energies of the P branch of $H_2(\frac{1}{5})$ for the $v = 1 \rightarrow v = 0$ vibrational transition with $\Delta J = +1$.

| J + 1 | eV | nm |
|---|---|---|
| 1 | 12.5203 | 99.03 |
| 2 | 12.1431 | 102.10 |
| 3 | 11.7658 | 105.38 |

TABLE 8A-continued

The energies of the P branch of $H_2(1/5)$ for the
$v = 1 \rightarrow v = 0$ vibrational transition with $\Delta J = +1$.

| J + 1 | eV | nm |
|---|---|---|
| 4 | 11.3886 | 108.87 |
| 5 | 11.0113 | 112.60 |
| 6 | 10.6341 | 116.59 |
| 7 | 10.2568 | 120.88 |
| 8 | 9.8796 | 125.50 |
| 9 | 9.5023 | 130.48 |
| 10 | 9.1251 | 135.87 |

Table 8B. The energies of the R branch of $H_2(1/5)$ for the $v=1 \rightarrow v=0$ vibrational transition with $\Delta J=-1$.

TABLE 8B

The energies of the R branch of $H_2(1/5)$ for the
$v = 1 \rightarrow v = 0$ vibrational transition with $\Delta J = -1$.

| J | eV | nm |
|---|---|---|
| 1 | 13.2748 | 93.40 |
| 2 | 13.6521 | 90.82 |
| 3 | 14.0293 | 88.38 |
| 4 | 14.4066 | 86.06 |
| 5 | 14.7838 | 83.87 |
| 6 | 15.1611 | 81.78 |
| 7 | 15.5383 | 79.79 |
| 8 | 15.9156 | 77.90 |
| 9 | 16.2928 | 76.10 |
| 10 | 16.6701 | 74.38 |

Table 9A. The energies of the P branch of $H_2(1/6)$ for the $v=1 \rightarrow v=0$ vibrational transition with $\Delta J=+1$.

TABLE 9A

The energies of the P branch of $H_2(1/6)$ for the
$v = 1 \rightarrow v = 0$ vibrational transition with $\Delta J = +1$.

| J + 1 | eV | nm |
|---|---|---|
| 1 | 18.0292 | 68.77 |
| 2 | 17.4860 | 70.91 |
| 3 | 16.9428 | 73.18 |
| 4 | 16.3995 | 75.60 |
| 5 | 15.8563 | 78.19 |
| 6 | 15.3130 | 80.97 |
| 7 | 14.7698 | 83.95 |
| 8 | 14.2266 | 87.15 |
| 9 | 13.6833 | 90.61 |
| 10 | 13.1401 | 94.36 |

Table 9B. The energies of the R branch of $H_2(1/6)$ for the $v=1 \rightarrow v=0$ vibrational transition with $\Delta J=-1$.

TABLE 9B

The energies of the R branch of $H_2(1/6)$ for the
$v = 1 \rightarrow v = 0$ vibrational transition with $\Delta J = -1$.

| J | eV | nm |
|---|---|---|
| 1 | 19.1157 | 64.86 |
| 2 | 19.6590 | 63.07 |
| 3 | 20.2022 | 61.37 |
| 4 | 20.7454 | 59.77 |
| 5 | 21.2887 | 58.24 |
| 6 | 21.8319 | 56.79 |

TABLE 9B-continued

The energies of the R branch of $H_2(1/6)$ for the
$v = 1 \rightarrow v = 0$ vibrational transition with $\Delta J = -1$.

| J | eV | nm |
|---|---|---|
| 7 | 22.3752 | 55.41 |
| 8 | 22.9184 | 54.10 |
| 9 | 23.4616 | 52.85 |
| 10 | 24.0049 | 51.65 |

Table 10A. The energies of the P branch of $H_2(1/12)$ for the $v=1 \rightarrow v=0$ vibrational transition with $\Delta J=+1$.

TABLE 10A

The energies of the P branch of $H_2(1/12)$ for the
$v = 1 \rightarrow v = 0$ vibrational transition with $\Delta J = +1$.

| J + 1 | eV | nm |
|---|---|---|
| 1 | 72.1169 | 17.19 |
| 2 | 69.9440 | 17.73 |
| 3 | 67.7710 | 18.29 |
| 4 | 65.5980 | 18.90 |
| 5 | 63.4251 | 19.55 |
| 6 | 61.2521 | 20.24 |
| 7 | 59.0792 | 20.99 |
| 8 | 56.9062 | 21.79 |
| 9 | 54.7332 | 22.65 |
| 10 | 52.5603 | 23.59 |

Table 10B. The energies of the R branch of $H_2(1/12)$ for the $v=1 \rightarrow v=0$ vibrational transition with $\Delta J=-1$.

TABLE 10B

The energies of the R branch of $H_2(1/12)$ for the
$v = 1 \rightarrow v = 0$ vibrational transition with $\Delta J = -1$.

| J | eV | nm |
|---|---|---|
| 1 | 76.4628 | 16.22 |
| 2 | 78.6358 | 15.77 |
| 3 | 80.8088 | 15.34 |
| 4 | 82.9817 | 14.94 |
| 5 | 85.1547 | 14.56 |
| 6 | 87.3276 | 14.20 |
| 7 | 89.5006 | 13.85 |
| 8 | 91.6736 | 13.52 |
| 9 | 93.8465 | 13.21 |
| 10 | 96.0195 | 12.91 |

Table 11A. The energies of the P branch of $H_2(1/13)$ for the $v=1 \rightarrow v=0$ vibrational transition with $\Delta J=+1$.

TABLE 11A

The energies of the P branch of $H_2(1/13)$ for the
$v = 1 \rightarrow v = 0$ vibrational transition with $\Delta J = +1$.

| J + 1 | eV | nm |
|---|---|---|
| 1 | 84.6372 | 14.65 |
| 2 | 82.0870 | 15.10 |
| 3 | 79.5368 | 15.59 |
| 4 | 76.9866 | 16.10 |
| 5 | 74.4364 | 16.66 |
| 6 | 71.8862 | 17.25 |
| 7 | 69.3360 | 17.88 |
| 8 | 66.7858 | 18.56 |
| 9 | 64.2356 | 19.30 |

TABLE 11A-continued

The energies of the P branch of H$_2$(1/13) for the
v = 1 → v = 0 vibrational transition with ΔJ = +1.

| J + 1 | eV | nm |
|---|---|---|
| 10 | 61.6854 | 20.10 |

Table 11B. The energies of the R branch of H$_2$(1/13) for the v=1→v=0 vibrational transition with ΔJ=−1.

TABLE 11B

The energies of the R branch of H$_2$(1/13) for the
v = 1 → v = 0 vibrational transition with ΔJ = −1.

| J | eV | nm |
|---|---|---|
| 1 | 89.7376 | 13.82 |
| 2 | 92.2878 | 13.43 |
| 3 | 94.8380 | 13.07 |
| 4 | 97.3882 | 12.73 |
| 5 | 99.9384 | 12.41 |
| 6 | 102.4886 | 12.10 |
| 7 | 105.0388 | 11.80 |
| 8 | 107.5890 | 11.52 |
| 9 | 110.1392 | 11.26 |
| 10 | 112.6894 | 11.00 |

Table 12A. The energies of the P branch of H$_2$(1/14) for the v=1→v=0 vibrational transition with ΔJ=−1.

TABLE 12A

The energies of the P branch of H$_2$(1/14) for the
v = 1 → v = 0 vibrational transition with ΔJ = +1.

| J + 1 | eV | nm |
|---|---|---|
| 1 | 98.1592 | 12.63 |
| 2 | 95.2016 | 13.02 |
| 3 | 92.2440 | 13.44 |
| 4 | 89.2864 | 13.89 |
| 5 | 86.3288 | 14.36 |
| 6 | 83.3712 | 14.87 |
| 7 | 80.4136 | 15.42 |
| 8 | 77.4560 | 16.01 |
| 9 | 74.4984 | 16.64 |
| 10 | 71.5408 | 17.33 |

Table 12B. The energies of the R branch of H$_2$(1/14) for the v=1→v=0 vibrational transition with ΔJ=−1.

TABLE 12B

The energies of the R branch of H$_2$(1/14) for the
v = 1 → v = 0 vibrational transition with ΔJ = −1.

| J | eV | nm |
|---|---|---|
| 1 | 104.0744 | 11.91 |
| 2 | 107.0320 | 11.58 |
| 3 | 109.9896 | 11.27 |
| 4 | 112.9472 | 10.98 |
| 5 | 115.9048 | 10.70 |
| 6 | 118.8624 | 10.43 |
| 7 | 121.8200 | 10.18 |
| 8 | 124.7776 | 9.94 |
| 9 | 127.7352 | 9.71 |
| 10 | 130.6928 | 9.49 |

In further embodiments, the vibrational energies and rotational energies and P and R branch transition energies of H$_2$(1/p) are in the range of about those given in TABLES 4-10 ±20%. More preferably the vibrational energies and rotational energies and P and R branch transition energies of H$_2$(1/p) are in the range of about those given in TABLES 4-10±10%. Most preferably the vibrational energies and rotational energies and P and R branch transition energies of H$_2$(1/p) are in the range of about those given in TABLES 4-10±5%.

As described in the paper, R. L. Mills, Y. Lu, J. He, M. Nansteel, P. Ray, X. Chen, A. Voigt, B. Dhandapani, "Spectral Identification of New States of Hydrogen", J. Phys. Chem. B, submitted, which is herein incorporated by reference in its entirety, vibration-rotational emission of H$_2$(1/4) was investigated using an electron gun provided by Rutgers University and described previously [J. Wieser, D. E. Murnick, A. Ulrich, H. A Higgins, A. Liddle, W. L. Brown, "Vacuum ultraviolet rare gas excimer light source", Rev. Sci. Instrum., Vol. 68, No. 3, (1997), pp. 1360-1364 and A. Ulrich, J. Wieser, D. E. Murnick, "Excimer Formation Using Low Energy Electron Beam Excitation", Second International Conference on Atomic and Molecular Pulsed Lasers, Proceedings of SPIE, Vol. 3403, (1998), pp. 300-307 which are herein incorporated by reference in their entirety] to initiate argon plasmas with 1% hydrogen in the pressure range of 450-1000 Torr. The plasmas cell was flushed with oxygen, then pumped down, flushed with argon-hydrogen (99/1%), then filled with this gas. The electrons were accelerated with a high voltage of 12.5 keV at a beam current of 10 μA. The electron gun was sealed with a thin (300 nm thickness) SiN$_x$ foil that served as a 1 mm$^2$ electron window to the cell at high gas pressure (760 torr). The beam energy was deposited by hitting the target gases, and the light emitted by beam excitation exited the cell thorough a MgF$_2$ window mounted at the entrance of a normal incidence McPherson 0.2 meter monochromator (Model 302) equipped with a 1200 lines/mm holographic grating with a platinum coating. The wavelength region covered by the monochromator was 5-560 nm. P(1), P(2), P(3), P(4), P(5), and P(6) of H$_2$(1/4) were observed at 154.94 nm, 159.74 nm, 165.54 nm, 171.24 nm, 178.14 nm, and 183.14 nm, respectively. The sharp peak at 146.84 nm may be the first member of the R branch, R(0). The transitions P(2), P(3), P(4), P(5), P(6), and R(0) and transitions between these states may lase since they are not to levels where both v and J=0.

Emission of the H$_2$(1/4) vibration-rotational series may occur via electron-collisional excitation of O$_2$ followed by vibration-rotational activation of H$_2$(1/4) through a collisional energy exchange with the excited O$_2$:

$$O_2^* + H_2(1/4) \rightarrow O_2 + H_2(1/4)^* \quad (93)$$

where * denotes an energetic state. This mechanism is favored at the high operating pressure.

The atmospheric-pressure argon plasma formed with the 15 keV electron beam contains a high population of excimers such as Ar$_2$*. Ar$_2$* has an excited state energy of about 9-10 eV; thus, the ionization reaction given by Eq. (90) is energetically favorable wherein the first ionization energies of Ar and O are 15.75962 and 13.61806 eV, respectively. Ar$^+$ serves as a catalyst when H is present.

Another objective of the present invention is to create an inverted population of a vibration-rotational energy level of H$_2$(1/p) which is capable of lasing. The pumping power to form the inverted population is from at least one of an external power supply and the power released from the catalysis of atomic hydrogen to lower-energy states. H$_2$(1/p) may be supplied to the cell from an external source, or it may be generated insitu from the catalysis of hydrogen to lower-energy states given by Eqs. (91) and (92) which further react to form $H_2(1/p)$. In the later embodiment, the catalysis cell may serve as the laser cavity, and an inverted population may be formed due to hydrogen catalysis to lower-energy states given by Eqs. (91) and (92).

Figure 9:
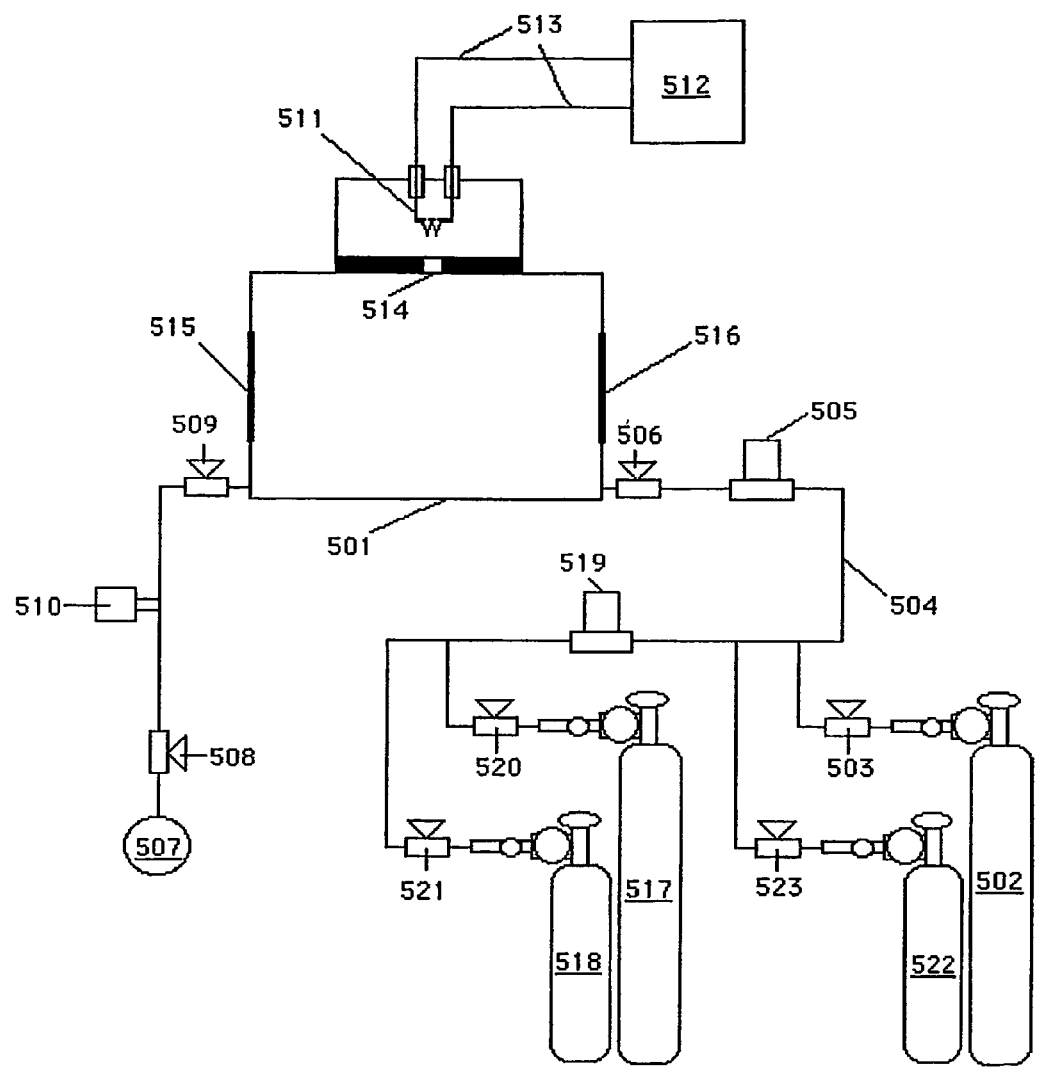
FIG. 9 is a schematic drawing of a power and plasma cell, reactor, and laser in accordance with the present invention.

An embodiment of the laser shown in FIG. 9 comprises a cavity 501 and a source of $H_2(1/p)$ 502. A valve 503, a gas supply line 504, a mass flow controller 505, and a valve 506 control the flow of $H_2(1/p)$ to the cavity. The gas may be flowed through the cavity 501 using pump 507 and valves 508 and 509. The pressure in the cell may be monitored with pressure gauge 510 which also maintains the pressure in the cell with the valves 508 and 509. An inverted vibration-rotational population may be formed in the $H_2(1/p)$ gas in the cavity 501 by the input of power by an electron beam from an electron gun 511 powered by an electron gun supply 512 connected by electrical leads 513. The beam travels from the electron gun 511 through a window 514 such as a $SiN_x$ window and excites the $H_2(1/p)$.

Laser oscillators occur in the cavity 501 which has the appropriate dimensions and mirrors for lasing that is known to those skilled in the art as described in J. J. Ewing, "Excimer Lasers," Laser Handbook, edited by M. L. Stitch, North-Holland Publishing Company, Vol. A4, (1979); Laser Handbook, edited by F. T. Arecchi and E. O. Schultz-Dubois, North-Holland Publishing Company, Amsterdam, Vol. 1-6, (1972); M. Brotherton, Masers and lasers: how they work, what they do, New York: McGraw-Hill Book Company, (1964); J. S. Thorp, Masers and lasers: Physics and design, New York: St. Martin's Press, (1967); G. Troup, Masers and lasers: molecular amplification and oscillation by stimulated emission, 2nd Edition, London: Methuen & Co. Ltd, (1963); T. K. Ishii, Maser and laser engineering, Huntington, N.Y.: Robert E. Krieger Publishing Company, (1980); A. E. Siegman, An introduction to lasers and masers, New York: McGraw-Hill Book Company, (1971); C. A. Hogg and L. Sucsy, Research report: Masers and lasers, Cambridge, Mass.: Maser/Laser Associates, (1962), M. J. Beesley, Lasers and Their Applications, Taylor & Francis Ltd, London, (1971) which are herein incorporated by reference in their entirety. The laser light is contained in the cavity 501 between the mirrors 515 and 516. The mirror 516 may be semitransparent, and the light may exit the cavity through this mirror.

In an embodiment that provides EUV laser emission for EUV lithography, the mirrors 515 and 516 may comprise multilayer, thin-film coatings such as distributed Bragg reflectors as described by J. E. Borkholm, "EUV lithography—the successor to optical lithography?" Intel Technology Journal, Q3, (1998), pp. 1-8, which is herein incorporated by reference. In preferred embodiments, the EUV laser wavelength is in the region between about 11 and 14 nm. In this case, the gas may be at least one of $H_2(1/12)$, $H_2(1/13)$, and $H_2(1/14)$. The transitions are given in TABLES 10A and B to TABLES 12A and B. In a further preferred embodiment, the mirror is Mo:Si ML that has been optimized for peak reflectivity at 13.4 nm. In an embodiment of an EUV laser, the output is through a pin-hole optic that may be differentially pumped. The cavity may be sufficiently long such that lasing occurs without mirrors to increase the path length.

In the embodiment of the $H_2(1/p)$ laser of the present invention, the cavity 501 of FIG. 9 comprises a reactor of the present invention to catalyze atomic hydrogen to lower-energy states such as an rt-plasma reactor, plasma electrolysis reactor, barrier electrode reactor, RF plasma reactor, pressurized gas energy reactor, gas discharge energy reactor, microwave cell energy reactor, and a combination of a glow discharge cell and a microwave and/or RF plasma reactor of the present invention. The reaction may also be maintained by the plasma formed with the electron beam 511. The catalyst may be supplied by a source of catalyst 517, and hydrogen may be supplied to the reactor from a source 518. The flow of catalyst and hydrogen may be controlled independently through line 504 with mass flow controller 519 and valves 520 and 521. The source of catalyst may be argon gas, and the catalyst may be $Ar^+$. An activator gas may be added to at least one of the $H_2(1/p)$ or the catalyst-hydrogen gas mixture from source 522 controlled by valve 523. The activator gas may be at least one of the group comprising $O_2$, $H_2O$, $CO_2$, $N_2$, $NO_2$, NO, CO, and a halogen gas.

In an embodiment, the $H_2(1/p)$ pressure is maintained in the range of about 0.1 mTorr to 10,000 Torr, preferably the $H_2(1/p)$ pressure is in the range of about 10 mTorr to 100 Torr; more preferable the $H_2(1/p)$ pressure is in the range of about 10 mTorr to 10 Torr, and most preferably, the $H_2(1/p)$ pressure is in the range of about 10 mTorr to 1 torr. The $H_2(1/p)$ flow rate is preferably about 0-1 standard liters per minute per $cm^3$ of vessel volume and more preferably about 0.001-10 sccm per $cm^3$ of vessel volume. The power density of the source of pumping power such as the electron-beam power is preferably in the range of about 0.01 W to about 100 $W/cm^3$ vessel volume; more preferably it is in the range of about 0.1 to 10 $W/cm^3$ vessel volume. The mole fraction of activator gas is in the range of about 0.001% to 90%. Preferably it is in the range of about 0.01% to 10%, and most preferably it is in the range of about 0.01% to 1%. The flow rate and pressure are maintained according to that of $H_2(1/p)$ to achieve these desired mole fractions.

In an embodiment of a catalyst-hydrogen mixture to achieve at least one of the formation of $H_2(1/p)$ and the formation of an inverted vibration-rotational population of $H_2(1/p)$, the catalyst-hydrogen mixture pressure is maintained in the range of about 0.1 mTorr to 10,000 Torr, preferably the catalyst-hydrogen mixture pressure is in the range of 10 mTorr to 5000 Torr; more preferably, the catalyst-hydrogen mixture pressure is in the range of 100 Torr to 2000 Torr, and most preferably, the catalyst-hydrogen mixture pressure is in the range of 500 Torr to 1000 Torr. The catalyst-hydrogen mixture flow rate is preferably about 0-1 standard liters per minute per $cm^3$ of vessel volume and more preferably about 0.001-10 sccm per $cm^3$ of vessel volume. The power density of the source of pumping power such as the electron-beam power is preferably in the range of about 0.01 W to about 100 $W/cm^3$ vessel volume; more preferably it is in the range of about 0.1 to 10 $W/cm^3$ vessel volume. The mole fraction of hydrogen in the catalyst-hydrogen gas is in the range of about 0.001% to 90%. Preferably it is in the range of about 0.01% to 10%, and most preferably it is in the range of about 0.1% to 5%. The mole fraction of activator gas is in the range of 0.001% to 90%. Preferably it is in the range of about 0.01% to 10%, and most preferably it is in the range of about 0.01% to 1%. The flow rate and pressure are maintained according to that of catalyst-hydrogen mixture to achieve these desired mole fractions. In an embodiment, the source of catalyst is helium, neon, and argon, and the catalyst is $He^+$, $Ne^+$, $Ne^+/H^+$ or $Ar^+$.

Figure 10:
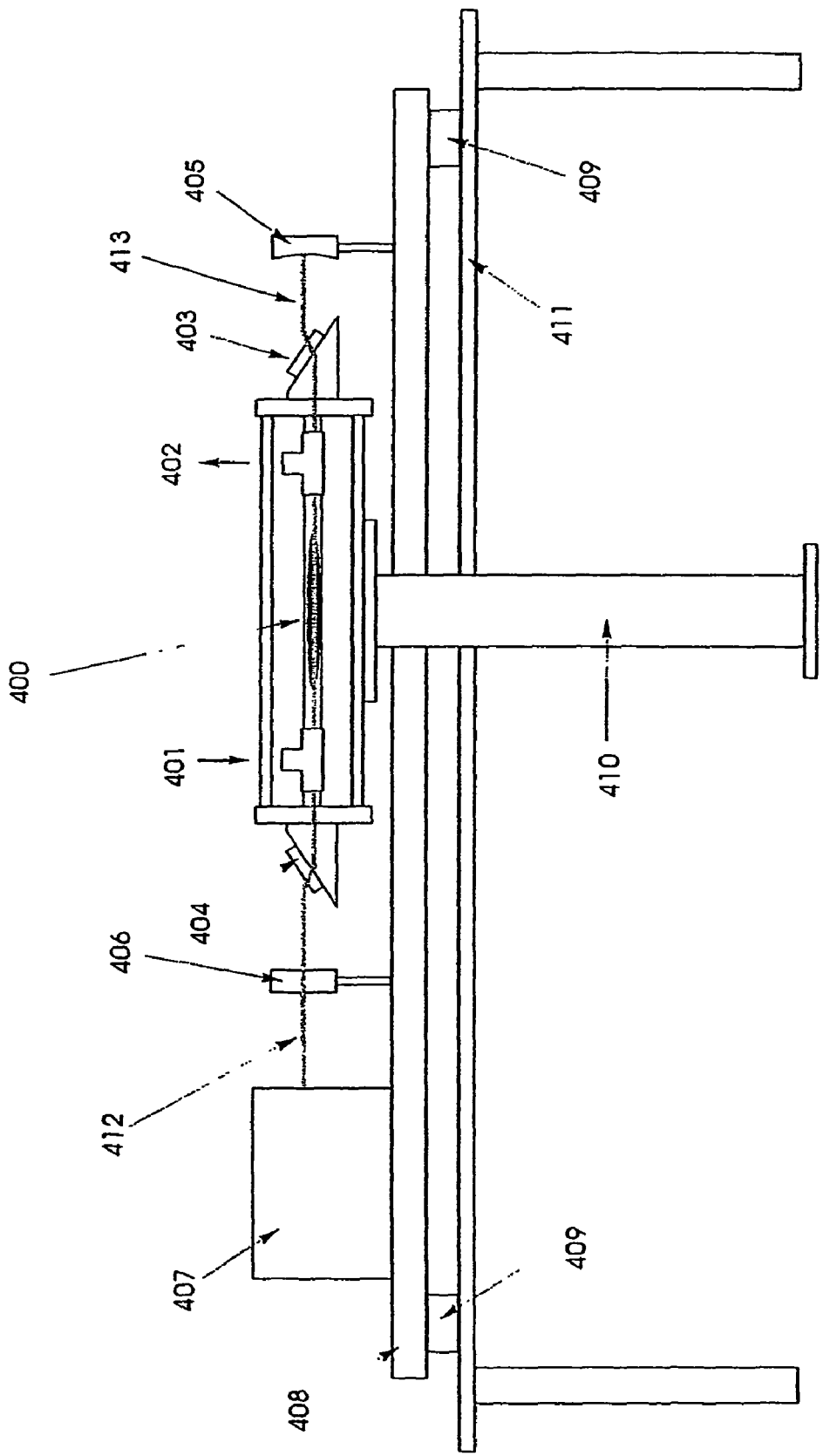
FIG. 10 is a schematic drawing of a laser in accordance with the present invention.

A laser according to the preset invention is shown in FIG. 10. It comprises at least one of an inverted population of $H_2(1/p)$ and a plasma of a catalyst and hydrogen and laser optics. The plasma may be maintained in an rt-plasma reactor, a plasma electrolysis reactor, a barrier electrode reactor, an RF plasma reactor, a pressurized gas energy reactor, a gas discharge energy reactor, a microwave cell energy reactor, and a combination of a glow discharge cell and a microwave and for RF plasma reactor. The plasma 400 may also be maintained by an electron beam (electron gun and cavity are shown in FIG. 9). At least one of the laser medium and plasma gas containing at least one of $H_2(1/p)$, hydrogen and catalyst, and an activator may flow through the cavity via inlet 401 and outlet 402. The laser beam 412 and 413 is directed to a high reflectivity mirror 405, such as a 95 to 99.9999% reflective spherical cavity mirror, and to the output coupler 406 by windows 403 and 404, such as Brewster angle windows. The output coupler may have a transmission in the range 0.1 to 50%, and preferably in the range 1 to 10%. The beam power may be measured by a power meter 407. The laser may be mounted on an optical rail 408 on an optical table 411 which allows for adjustments of the cavity length to achieve lasing at a desired wavelength. Vibrations may be ameliorated by vibration isolation feet 409. The plasma tube may be supported by a plasma tube support structure 410.

The invention claimed is:

1. A laser comprising:
   a laser medium comprising $H_2(1/p)$ where p is an integer and $1 \leq p \leq 137$,
   a cavity comprising the laser medium, and
   a power source to form an inverted population in the energy level of $H_2(1/p)$;
   wherein the power source forms excited vibration-rotational levels of $H_2(1/p)$ and lasing occurs with a stimulated transition from at least one vibration-rotational level to at least another lower-energy-level other than one with a significant Boltzmann population at the cell neutral-gas temperature wherein the vibration-rotational levels of $H_2(1/p)$ comprise the inverted population.

2. The laser of claim 1 further comprising cavity mirrors and a laser-beam output.

3. The laser of claim 1 wherein the laser light is within the range of wavelengths of at least one of infrared, visible, ultraviolet, extreme ultraviolet, and soft X-ray.

4. The laser of claim 1 wherein the laser medium-further comprises an activator molecule.

5. The laser of claim 4 wherein the activator molecule is chosen from $O_2$, $N_2$, $CO_2$, CO, $NO_2$, NO, and XX' where each of X and X' is a halogen atom that may be the same or different.

6. The laser of claim 4 further comprising a means to energetically excite the activator molecule comprising at least one of a particle beam, microwave, glow, and RF discharge power.

7. The laser of claim 1 wherein the power source comprises a particle beam.

8. The laser of claim 7 wherein the particle beam energy ranges from 0.1 to 100 MeV.

9. The laser of claim 7 wherein the particle beam current ranges from 0.01 μA to 1000 A.

10. The laser of claim 1 wherein the vibrational energies are given by $$E_{vib} = p^2 0.515902 \text{ eV}$$

and the rotational energies are given by $$E_{rot} = E_{J+1} - E_J = \frac{\hbar^2}{I}[J+1] = p^2(J+1)0.01509 \text{ eV}$$

within at least one of about ±20%, ±10%, and ±5% where p is an integer greater than one and J is an integer.

11. The laser of claim 1 where the energies of the emission are given by $$E_{vib-rot} = p^2 E_{vib\,\nu} \pm p^2(J+1)E_{rot\,H_2}$$

wherein $$E_{vib\nu} = \nu p^2 0.5159 \text{ eV} -$$

$$\nu(\nu-1)(1.23981 \times 10^{-4})\frac{100hc\left(8.06573 \times 10^3 \frac{\text{cm}^{-1}}{\text{eV}} p^2 0.5159 \text{ eV}\right)^2}{4e(p^2 4.151 \text{ eV} + p^3 0.326469 \text{ eV})} \text{eV}$$

and the rotational energies are given by $$E_{rot} = E_{J+1} - E_J = \frac{\hbar^2}{I}[J+1] = p^2(J+1)0.01509 \text{ eV}$$

within at least one of about ±20%, ±10%, and ±5% where ν=0, 1, 2, 3 ... integer, p is an integer greater than one, and J is an integer.

12. The laser of claim 1 wherein the medium comprises at least one of $H_2$ (1/12), $H_2$ (1/13), and $H_2$ (1/14).

13. The laser of claim 12 wherein the wavelength of laser light ranges from 5-20 nm.

14. The laser of claim 2, wherein the mirrors comprise multilayer, thin film coatings.

15. The laser of claim 14 wherein the wavelength is at least one of about 13.4 nm and 11.3 nm and the mirrors comprise Mo:Si ML.

16. The laser of claim 2, wherein the exit for the beam output comprises an ultraviolet transparent window.

17. The laser of claim 2, wherein the beam output comprises a differentially pumped pin-hole optic.

18. The laser of claim 1, wherein the laser medium comprises a plasma maintained by a particle beam, and wherein the cavity comprises a reactor to catalyze atomic hydrogen to lower-energy states.

19. The laser of claim 1 wherein the $H_2(1/p)$ pressure is maintained in the range of about 0.1 mTorr to 10,000 Torr.

20. The laser of claim 1, wherein the $H_2(1/p)$ flow rate ranges from about 0-1 standard liters per minute per $cm^3$ of vessel volume.

21. The laser of claim 1, wherein the power density of the source of power ranges from about 0.01 W to about 100 $W/cm^3$ vessel volume.

22. The laser of claim 4 wherein the activator molecule comprises a gas having a mole fraction of 0.001% to 90.

23. The laser of claim 1 further comprising a catalyst cell, a catalyst, and a source of hydrogen to catalyze the formation of hydrogen to lower-energy states.

24. The laser of claim 5 wherein energetic particles are formed by the catalysis of atomic hydrogen.

25. The laser of claim 5 wherein the pumping excitation for the formation of the inverted population or the excitation of the activator is due to collisions with energetic particles formed by the catalysis of atomic hydrogen.

26. The laser of claim 1 comprising a source of $H_2(1/p)$.

27. The laser of claim 1 further comprising a catalyst-hydrogen mixture to achieve at least one of the formation of $H_2(1/p)$ and the formation of an inverted vibration-rotational population of $H_2(1/p)$.

28. The laser of claim 1, further comprising a catalyst comprising a molecule in combination with an ion or atom.

29. The laser of claim 28, wherein the catalyst comprises at least one molecule chosen from $C_2$, $N_2$, $O_2$, $CO_2$, $NO_2$, and $NO_3$ in combination with at least one atom or ion chosen from Li, Be, K, Ca, Ti, V, Cr, Mn, Fe, Co, Ni, Cu, Zn, As, Se, Kr, Rb, Sr, Nb, Mo, Pd, Sn, Te, Cs, Ce, Pr, Sm, Gd, Dy, Pb, Pt, Kr, $He^+$, $Na^+$, $Rb^+$, $Sr^+$, $Fe_3^+$, $Mo_2^+$, $Mo_4^+$, $In_3^+$, $He^+$, $Ar^+$, $Xe^+$, $Ar_2^+$, $Ne^+$, and $H^+$.

30. The laser of claim 1 wherein the vibration-rotational excitation occurs by at least one of a direct collisional excitation and an energy exchange with an excited state species.

31. The laser of claim 4 wherein at least one of the direct excitation and the excitation of the activator occurs by collision with an energetic particle.

32. The laser of claim 31 further comprising a particle beam.

33. The laser of claim 32 wherein the particle beam is an electron beam.

34. The laser of claim 31 wherein the power source accelerates the energetic particle.

35. The laser of claim 34 wherein the power source is chosen from at least one of a particle beam, microwave, high voltage, and RF discharges.

36. The laser of claim 33 wherein the cavity further comprises an electron window.

37. The laser of claim 1, further comprising a catalyst comprising a chemical or physical process that provides a net enthalpy of m·27.2±0.5 eV where in m is an integer or m/2·27.2±0.5 eV where m is an integer greater than one.

38. The laser of claim 37, wherein said catalyst provides a net enthalpy of m·27.2±0.5 eV where m is an integer or m/2·27.2±0.5 eV where m is an integer greater than one corresponding to a resonant state energy level of the catalyst that is excited to provide the enthalpy.

39. The laser of claim 37, wherein said catalyst comprises a catalytic system provided by the ionization of t electrons from a participating species such as an atom, an ion, a molecule, and an ionic or molecular compound to a continuum energy level such that the sum of the ionization energies of the t electrons is approximately m·27.2±0.5 eV where m is an integer or m/2·27.2±0.5 eV where m is an integer greater than one and t is an integer.

40. The laser of claim 37, wherein the catalyst is provided by the transfer of t electrons between participating ions; the transfer of t electrons from one ion to another ion provides a net enthalpy of reaction whereby the sum of the ionization energy of the electron donating ion minus the ionization energy of the electron accepting ion equals approximately m·27.2±0.5 eV where m is an integer or m/2·27.2±0.5 eV where m is an integer greater than one and t is an integer.

41. The laser of claim 37, wherein m is an integer less than 400.

42. The laser of claim 37, said catalyst comprising He+ which absorbs 40.8 eV during the transition from the n=1 energy level to the n=2 energy level which corresponds to 3/2·27.2 eV (m=3) that serves as a catalyst for the transition of atomic hydrogen from the n=1 (p=1) state to the n=1/2 (p=2) state.

43. The laser of claim 37, said catalyst comprising $Ar^{2+}$ which absorbs 40.8 eV and is ionized to $Ar^{3+}$ which corresponds to 3/2·27.2 eV (m=3) during the transition of atomic hydrogen from the n=1 (p=1) energy level to the n=1/2 (p=2) energy level.

44. The laser of claim 37, said catalyst comprising at least one of Li, Be, K, Ca, Ti, V, Cr, Mn, Fe, Co, Ni, Cu, Zn, As, Se, Kr, Rb, Sr, Nb, Mo, Pd, Sn, Te, Cs, Ce, Pr, Sm, Gd, Dy, Pb, Pt, $He^+$, $Na^+$, $Rb^+$, $Sr^+$, $Fe^{3+}$, $Mo^{2+}$, $Mo^{4+}$, and $In^{3+}$.

45. A laser of claim 37, wherein said catalyst is capable of providing a net enthalpy of m·27.2±0.5 eV where m is an integer or m/2·27.2±0.5 eV where m is an integer greater than one, and capable of forming a hydrogen atom having a binding energy of about $$\frac{13.6 \text{ eV}}{\left(\frac{1}{p}\right)^2}$$

where p is an integer wherein the net enthalpy is provided by the breaking of a molecular bond of the catalyst and the ionization of t electrons from an atom of the broken molecule each to a continuum energy level such that the sum of the bond energy and the ionization energies of the t electrons is approximately m·27.2±0.5 eV where m is an integer or m/2·27.2±0.5 eV where m is an integer greater than one.

46. The laser of claim 45 wherein the catalyst comprises at least one of $C_2$, $N_2$, $O_2$, $CO_2$, $NO_2$, and $NO_3$.

47. A light source comprising:
a light-emitting medium comprising $H_2(1/p)$ where p is an integer and $1 < p \leq 137$,
a cavity comprising the light-emitting medium, and
a power source to produce and maintain the energy level of $H_2(1/p)$ for emission of light.

* * * * *